(12) United States Patent  (10) Patent No.: US 9,400,591 B2
Sheha et al.  (45) Date of Patent: Jul. 26, 2016

(54) PERSONAL WIRELESS NAVIGATION SYSTEM

(71) Applicant: TeleCommunication Systems, Inc., Annapolis, MD (US)

(72) Inventors: Michael A. Sheha, Coto de Caza, CA (US); Mark Goddard, Santa Margarita, CA (US); John Archer, Irvine, CA (US); Germaine Ewing, Corona, CA (US); Gopal Venkatraman, Irvine, CA (US); Tom Bychowski, Viejo, CA (US); Nidhi Upparapalli, Diamond Bar, CA (US); Ryan Peterson, Seattle, WA (US); Kristy McNight, Dana Point, CA (US); Stephen Petilli, San Juan Capastrano, CA (US); Jam Paydavousi, Newport Beach, CA (US)

(73) Assignee: Telecommunication Systems, Inc., Annapolis, MD (US)

( * ) Notice: Subject to any disclaimer, the term of this patent is extended or adjusted under 35 U.S.C. 154(b) by 216 days.

(21) Appl. No.: 14/106,057

(22) Filed: Dec. 13, 2013

(65) Prior Publication Data

US 2014/0173520 A1   Jun. 19, 2014

Related U.S. Application Data

(63) Continuation of application No. 13/067,292, filed on May 23, 2011, now abandoned.

(60) Provisional application No. 61/344,091, filed on May 21, 2010, provisional application No. 61/344,245, filed on Jun. 18, 2010.

(51) Int. Cl.
  *G06F 3/048* (2013.01)
  *G06F 3/0482* (2013.01)
  (Continued)

(52) U.S. Cl.
  CPC .......... *G06F 3/0482* (2013.01); *G06F 3/04842* (2013.01); *G06Q 30/02* (2013.01); *H04W 4/02* (2013.01)

(58) Field of Classification Search
  CPC ...................................................... G06Q 30/02
  USPC ............................................................ 715/834
  See application file for complete search history.

(56) References Cited

U.S. PATENT DOCUMENTS

| 4,737,916 A | 4/1988 | Ogawa |
| 4,939,662 A | 7/1990 | Nimura |

(Continued)

FOREIGN PATENT DOCUMENTS

| GB | 2305568 | 11/1996 |
| WO | WO96/36930 | 11/1996 |

(Continued)

OTHER PUBLICATIONS

Supplementary European Search Report in European Appl. No. 06839236.4 dated Dec. 6, 2010.

(Continued)

*Primary Examiner* — William Titcomb

(74) *Attorney, Agent, or Firm* — Tarolli, Sundheim, Covell & Tummino LLP

(57) ABSTRACT

A personal wireless navigation system operable on wireless phone devices provides a platform for empowering a merchant-paid search. Performance of a navigation functionality in a personal wireless navigation system is higher and more comparable and competitive with portable navigation devices and in-car navigation systems, and the search capability is comparable and competitive with the most popular web search engines. A user interface (UI) and look and feel of the personal wireless navigation system is provided which is enhanced so that users do not simply want to use the product—they covet it. The personal wireless navigation system may be constructed such that a subset of it with fewer features and functions can be productized, marketed and deployed to users.

24 Claims, 120 Drawing Sheets

(51) Int. Cl.
*G06Q 30/02* (2012.01)
*H04W 4/02* (2009.01)
*G06F 3/0484* (2013.01)

(56) References Cited

U.S. PATENT DOCUMENTS

| | | |
|---|---|---|
| 5,220,507 A | 6/1993 | Kirson |
| 5,389,934 A | 2/1995 | Kass |
| 5,557,254 A | 9/1996 | Johnson |
| 5,636,122 A | 6/1997 | Shah |
| 5,684,951 A | 11/1997 | Goldman |
| 5,689,269 A | 11/1997 | Norris |
| 5,689,809 A | 11/1997 | Grube |
| 5,727,057 A | 3/1998 | Emery |
| 5,774,824 A | 6/1998 | Streit |
| 5,790,974 A | 8/1998 | Tognazzini |
| 5,801,700 A | 9/1998 | Ferguson |
| 5,802,492 A | 9/1998 | DeLorme |
| 5,806,005 A | 9/1998 | Hull |
| 5,904,727 A | 5/1999 | Prabhakaran |
| 5,926,118 A | 7/1999 | Hayashida |
| 5,944,768 A | 8/1999 | Ito |
| 5,982,301 A | 11/1999 | Ohta |
| 6,035,253 A | 3/2000 | Hayahi |
| 6,049,718 A | 4/2000 | Stewart |
| 6,064,880 A | 5/2000 | Alanara |
| 6,084,951 A | 7/2000 | Smith |
| 6,091,957 A | 7/2000 | Larkins |
| 6,138,003 A | 10/2000 | Kingdon |
| 6,169,516 B1 | 1/2001 | Watanabe |
| 6,182,227 B1 | 1/2001 | Blair |
| 6,185,426 B1 | 2/2001 | Alperovich |
| 6,188,957 B1 | 2/2001 | Bechtolsheim |
| 6,204,844 B1 | 3/2001 | Fumarolo |
| 6,208,934 B1 | 3/2001 | Bechtolsheim |
| 6,226,367 B1 | 5/2001 | Smith |
| 6,249,742 B1 | 6/2001 | Frriederich |
| 6,278,936 B1 | 8/2001 | Jones |
| 6,314,296 B1 | 11/2001 | Hamada |
| 6,317,684 B1 | 11/2001 | Roeseler |
| 6,321,158 B1 | 11/2001 | DeLorme |
| 6,331,825 B1 | 12/2001 | Ladner |
| 6,353,664 B1 | 3/2002 | Cannon |
| 6,356,836 B1 | 3/2002 | Adolph |
| 6,360,102 B1 | 3/2002 | Havinis |
| 6,366,782 B1 | 4/2002 | Fumarolo |
| 6,366,856 B1 | 4/2002 | Johnson |
| 6,377,210 B1 | 4/2002 | Moore |
| 6,397,143 B1 | 5/2002 | Peschke |
| 6,415,224 B1 | 7/2002 | Wako |
| 6,441,752 B1 | 8/2002 | Fomukong |
| 6,442,384 B1 | 8/2002 | Shah |
| 6,442,391 B1 | 8/2002 | Johansson |
| 6,459,782 B1 | 10/2002 | Bedrosian |
| 6,466,788 B1 | 10/2002 | Carlsson |
| 6,529,143 B2 | 3/2003 | Mikkola |
| 6,539,080 B1 | 3/2003 | Bruce |
| 6,563,824 B1 | 5/2003 | Bhatia |
| 6,571,174 B2 | 5/2003 | Rigazio |
| 6,621,423 B1 | 9/2003 | Cooper |
| 6,640,185 B2 | 10/2003 | Yokota |
| 6,643,516 B1 | 11/2003 | Stewart |
| 6,661,353 B1 | 12/2003 | Gopen |
| 6,665,613 B2 | 12/2003 | Duvall |
| 6,665,715 B1 | 12/2003 | Houri |
| 6,674,849 B1 | 1/2004 | Froeberg |
| 6,675,089 B2 | 1/2004 | Hirabayashi |
| 6,678,613 B2 | 1/2004 | Andrews |
| 6,721,652 B1 | 4/2004 | Sanqunetti |
| 6,721,716 B1 | 4/2004 | Gross |
| 6,721,787 B1 | 4/2004 | Hiscock |
| 6,741,864 B2 | 5/2004 | Wilcock |
| 6,766,174 B1 | 7/2004 | Kenyon |
| 6,775,371 B2 | 8/2004 | Elsey |
| 6,801,850 B1 | 10/2004 | Wolfson |
| 6,810,405 B1 | 10/2004 | LaRue |
| 6,812,851 B1 | 11/2004 | Dukach |
| 6,816,782 B1 | 11/2004 | Walters |
| 6,819,268 B2 | 11/2004 | Wakamatsu |
| 6,819,919 B1 | 11/2004 | Tanaka |
| 6,829,532 B2 | 12/2004 | Obradovich |
| 6,839,630 B2 | 1/2005 | Sakamoto |
| 6,842,696 B2 | 1/2005 | Silvester |
| 6,845,321 B1 | 1/2005 | Kerns |
| 6,853,849 B1 | 2/2005 | Tognazzini |
| 6,885,874 B2 | 4/2005 | Grube |
| 6,895,329 B1 | 5/2005 | Wolfson |
| 6,898,516 B2 | 5/2005 | Pechatnikov |
| 6,910,818 B2 | 6/2005 | McLoone |
| 6,925,603 B1 | 8/2005 | Naito |
| 6,934,705 B2 | 8/2005 | Tu et al. |
| 6,938,100 B2 | 8/2005 | Kang |
| 6,944,535 B2 | 9/2005 | Iwata |
| 6,970,871 B1 | 11/2005 | Rayburn |
| 7,079,863 B2 | 7/2006 | Chikaishi |
| 7,089,110 B2 | 8/2006 | Pechatnikov |
| 7,139,722 B2 | 11/2006 | Perrella |
| 7,142,196 B1 | 11/2006 | Connor |
| 7,142,205 B2 | 11/2006 | Chithambaram |
| 7,167,187 B2 | 1/2007 | Scott |
| 7,171,304 B2 | 1/2007 | Wako |
| 7,202,801 B2 | 4/2007 | Chou |
| 7,266,376 B2 | 9/2007 | Nakagawa |
| 7,286,929 B2 | 10/2007 | Staton |
| 7,333,820 B2 | 2/2008 | Sheha |
| 7,565,157 B1 | 7/2009 | Ortega |
| 7,653,544 B2 | 1/2010 | Bradley |
| 7,774,003 B1 | 8/2010 | Ortega |
| 7,822,823 B2 | 10/2010 | Jhanji |
| 7,881,730 B2 | 2/2011 | Sheha |
| 8,028,250 B2 | 9/2011 | Vronay |
| 8,112,529 B2 | 2/2012 | Van den Oord |
| 8,264,570 B2 | 9/2012 | Karimoto |
| 8,301,159 B2 | 10/2012 | Hamynen |
| 8,331,611 B2 | 12/2012 | Johnson |
| 8,332,402 B2 | 12/2012 | Forstall |
| 8,347,230 B2 | 1/2013 | Decker |
| 8,566,722 B2 * | 10/2013 | Gordon ............... H04N 21/2665 715/721 |
| 2001/0015756 A1 | 8/2001 | Wilcock |
| 2001/0016849 A1 | 8/2001 | Squibbs |
| 2002/0022492 A1 | 2/2002 | Barak |
| 2002/0032036 A1 | 3/2002 | Nakajima |
| 2002/0034964 A1 | 3/2002 | Bannai |
| 2002/0052786 A1 | 5/2002 | Kim |
| 2002/0059201 A1 | 5/2002 | Work |
| 2002/0069239 A1 | 6/2002 | Katada |
| 2002/0085540 A1 | 7/2002 | Hyvarinen |
| 2002/0086683 A1 | 7/2002 | Kohar |
| 2002/0087262 A1 | 7/2002 | Bullock et al. |
| 2002/0099457 A1 | 7/2002 | Fredlund |
| 2002/0116575 A1 | 8/2002 | Toyomura |
| 2002/0128773 A1 | 9/2002 | Chowanic et al. |
| 2002/0130906 A1 | 9/2002 | Miyaki |
| 2002/0169539 A1 | 11/2002 | Menard |
| 2003/0013441 A1 | 1/2003 | Bhogal |
| 2003/0014487 A1 | 1/2003 | Iwakawa |
| 2003/0035518 A1 | 2/2003 | Fan et al. |
| 2003/0036848 A1 | 2/2003 | Sheha |
| 2003/0036949 A1 | 2/2003 | Kaddeche |
| 2003/0045327 A1 | 3/2003 | Kobayashi |
| 2003/0054840 A1 | 3/2003 | Ito |
| 2003/0060938 A1 | 3/2003 | Duvall |
| 2003/0061113 A1 | 3/2003 | Petrovich |
| 2003/0061211 A1 | 3/2003 | Shultz |
| 2003/0073447 A1 | 4/2003 | Ogaki |
| 2003/0078054 A1 | 4/2003 | Okuda |
| 2003/0100326 A1 | 5/2003 | Grube |
| 2003/0117297 A1 | 6/2003 | Obradovich |
| 2003/0125064 A1 | 7/2003 | Koskinen |
| 2003/0126250 A1 | 7/2003 | Jhanji |
| 2003/0149526 A1 | 8/2003 | Zhou |
| 2003/0151501 A1 | 8/2003 | Teckchandani |
| 2003/0165254 A1 | 9/2003 | Chen |

(56) References Cited

U.S. PATENT DOCUMENTS

| | | |
|---|---|---|
| 2003/0231190 A1 | 12/2003 | Jawerth |
| 2003/0236618 A1 | 12/2003 | Kamikawa |
| 2004/0002814 A1 | 1/2004 | Gogic |
| 2004/0008225 A1 | 1/2004 | Campbell |
| 2004/0021567 A1 | 2/2004 | Dunn |
| 2004/0054428 A1 | 3/2004 | Sheha |
| 2004/0058656 A1 | 3/2004 | Chikaishi |
| 2004/0124977 A1 | 7/2004 | Biffar |
| 2004/0186880 A1 | 9/2004 | Yamamoto |
| 2004/0203842 A1 | 10/2004 | Hanninen |
| 2004/0204829 A1 | 10/2004 | Endo |
| 2004/0205517 A1 | 10/2004 | Lampert |
| 2004/0220957 A1 | 11/2004 | McDonough |
| 2004/0229595 A1 | 11/2004 | Laursen |
| 2005/0027445 A1 | 2/2005 | McDonough |
| 2005/0062636 A1 | 3/2005 | Conway |
| 2005/0085999 A1 | 4/2005 | Onishi |
| 2005/0159883 A1 | 7/2005 | Humphries |
| 2005/0219067 A1 | 10/2005 | Chung |
| 2005/0242168 A1 | 11/2005 | Tesavis |
| 2005/0278656 A1 | 12/2005 | Goldthwaite |
| 2006/0041375 A1 | 2/2006 | Witmer |
| 2006/0048076 A1 | 3/2006 | Vronay |
| 2006/0074547 A1 | 4/2006 | Kaufman |
| 2006/0117340 A1 | 6/2006 | Pavlovskaia |
| 2006/0190817 A1 | 8/2006 | Banks |
| 2006/0200359 A1 | 9/2006 | Khan |
| 2006/0270421 A1 | 11/2006 | Phillips |
| 2007/0004461 A1 | 1/2007 | Bathina |
| 2007/0064644 A1 | 3/2007 | Dowling |
| 2007/0083911 A1 | 4/2007 | Madden |
| 2007/0111703 A1 | 5/2007 | Holland |
| 2007/0139411 A1 | 6/2007 | Jawerth |
| 2007/0208687 A1 | 9/2007 | O'Conor |
| 2007/0268392 A1 | 11/2007 | Paalasmaa |
| 2008/0066167 A1 | 3/2008 | Andri |
| 2008/0077324 A1 | 3/2008 | Hatano |
| 2008/0129475 A1 | 6/2008 | Breed |
| 2008/0170679 A1 | 7/2008 | Sheha |
| 2008/0195314 A1 | 8/2008 | Green |
| 2008/0288166 A1 | 11/2008 | Onishi |
| 2009/0041118 A1 | 2/2009 | Pavlovskaia |
| 2009/0117921 A1* | 5/2009 | Beydler ............ G01S 5/0027 455/457 |
| 2009/0172596 A1 | 7/2009 | Yamashita |
| 2009/0177557 A1 | 7/2009 | Klein |
| 2009/0328163 A1 | 12/2009 | Preece |
| 2010/0004993 A1 | 1/2010 | Troy |
| 2010/0042592 A1 | 2/2010 | Stolz |
| 2010/0076968 A1 | 3/2010 | Boyns |
| 2010/0083179 A1 | 4/2010 | Decker |
| 2010/0175026 A1 | 7/2010 | Bortner |
| 2010/0197323 A1 | 8/2010 | Freeburg |
| 2010/0205563 A1 | 8/2010 | Haapsaari |
| 2010/0227690 A1 | 9/2010 | Brunet |
| 2010/0228577 A1 | 9/2010 | Cunningham |
| 2010/0257056 A1 | 10/2010 | Yeon |
| 2010/0268848 A1 | 10/2010 | Maurya |
| 2011/0078109 A1 | 3/2011 | Griggs |
| 2011/0193857 A1 | 8/2011 | Filppov |
| 2011/0205162 A1 | 8/2011 | Waller |
| 2012/0166074 A1 | 6/2012 | Weng |
| 2013/0232006 A1* | 9/2013 | Holcomb ........ G06F 17/30864 705/14.54 |
| 2013/0325839 A1* | 12/2013 | Goddard ......... G06F 17/30867 707/708 |
| 2013/0339857 A1* | 12/2013 | Garcia Bailo ....... G06F 3/0484 715/723 |

FOREIGN PATENT DOCUMENTS

| | | |
|---|---|---|
| WO | WO03/008992 | 7/2002 |
| WO | WO2006/039660 | 4/2006 |

OTHER PUBLICATIONS

Supplementary European Search Report in European Appl. No. 02 75 0138 dated Oct. 13, 2010.

Examiner's Report No. 4 on Australian Patent Appl. No. 2004302220 dated Jul. 26, 2010.

International Preliminary Report on Patentability received in PCT/US2011/00917 dated May 10, 2012.

* cited by examiner

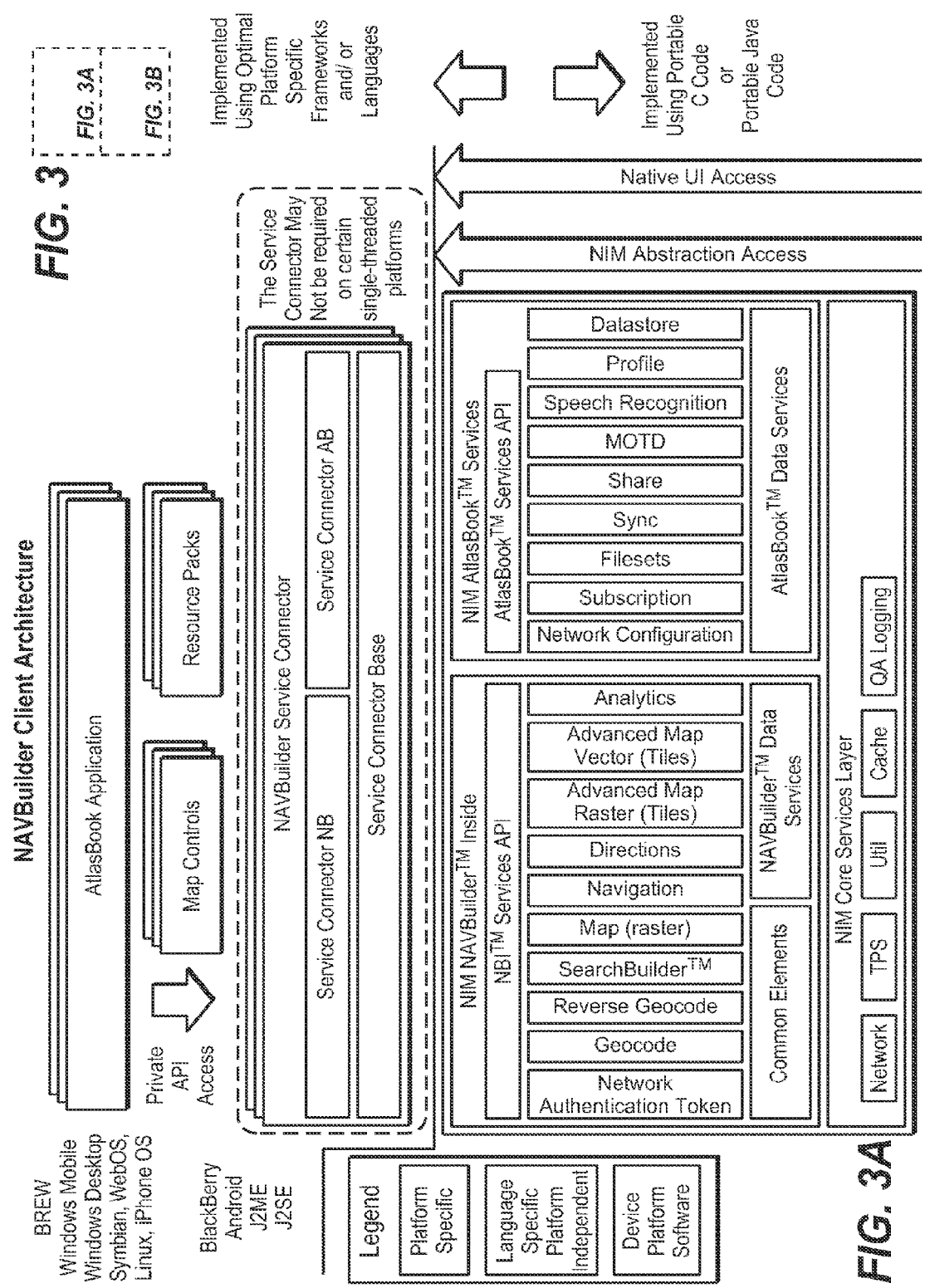

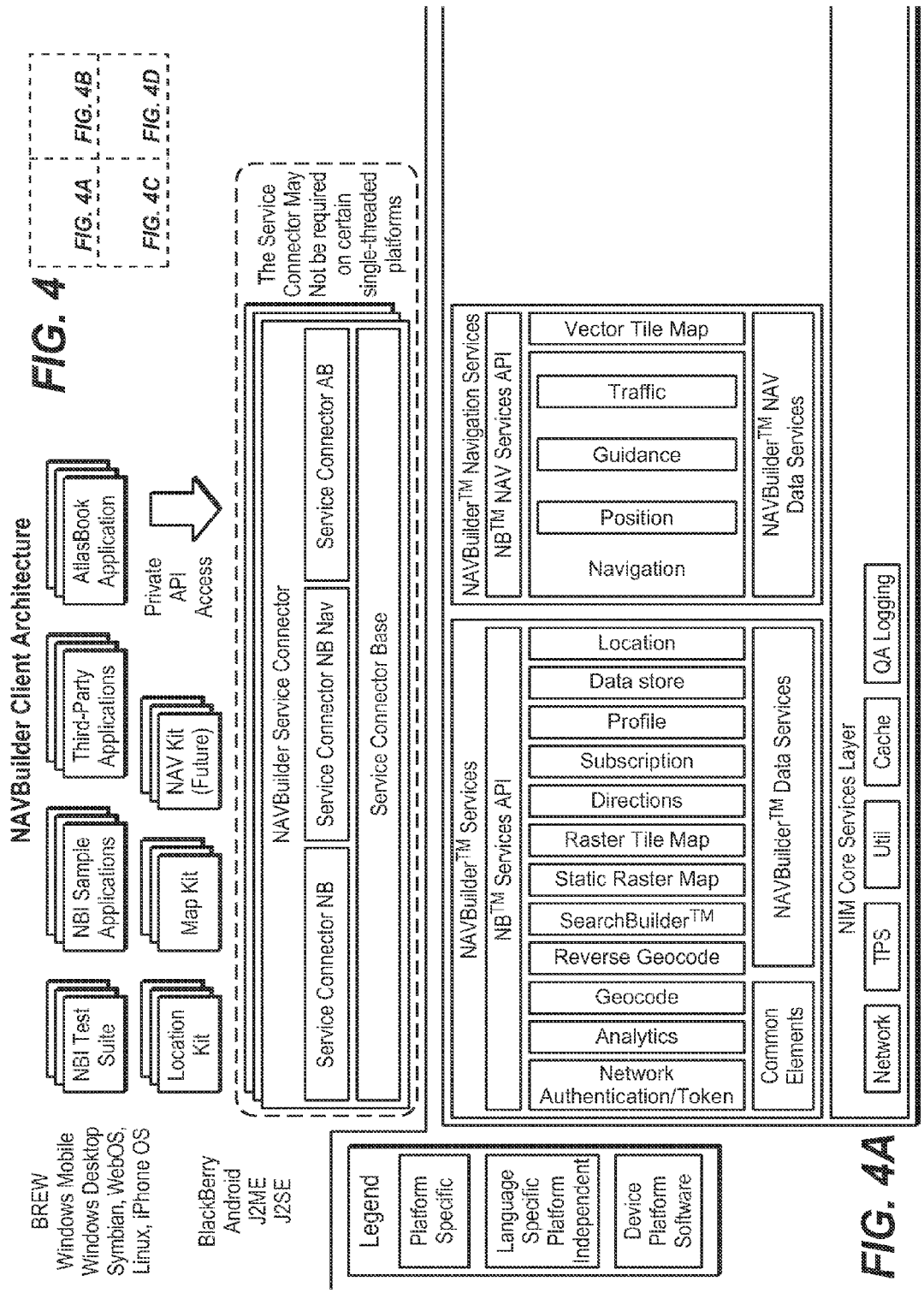

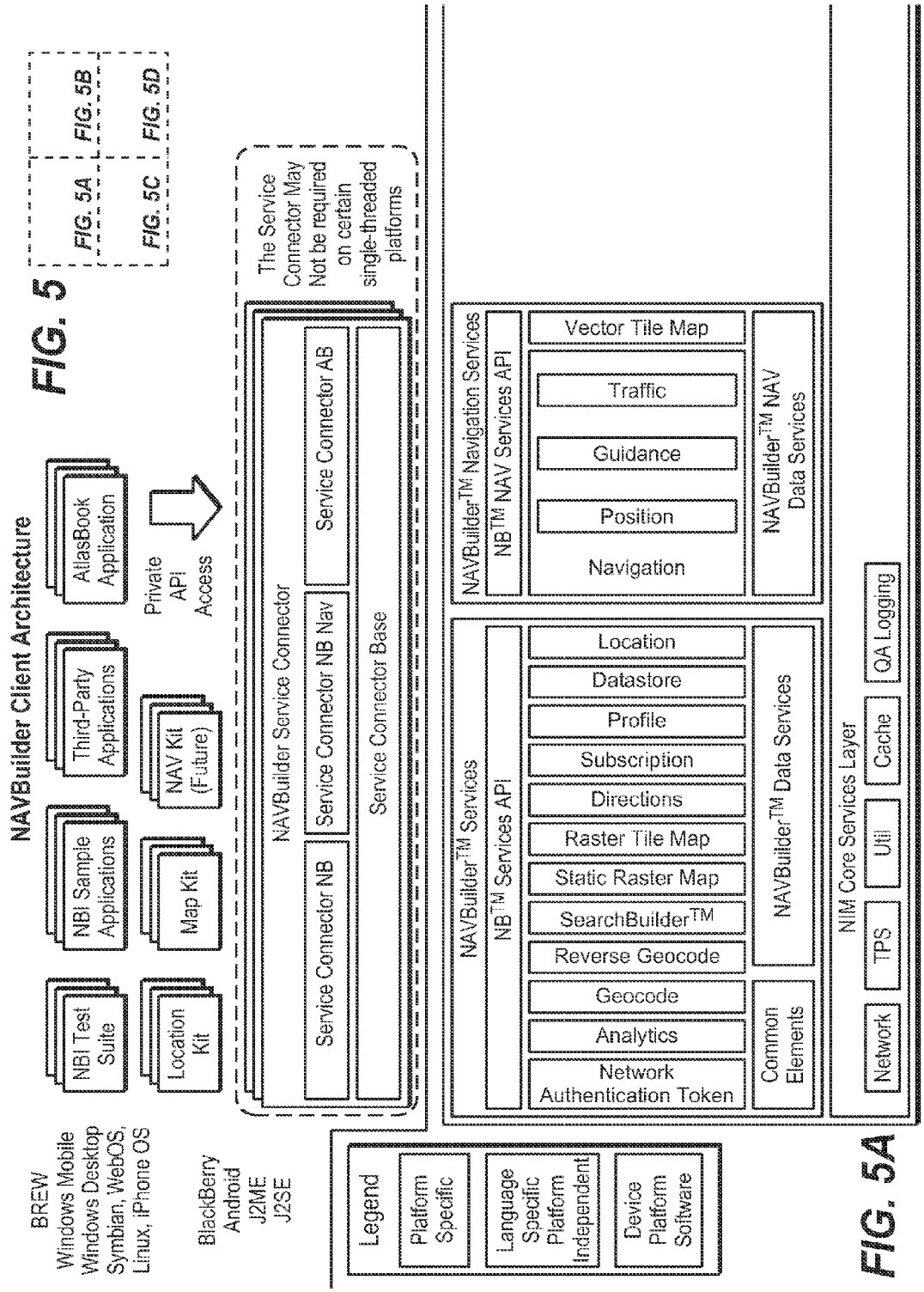

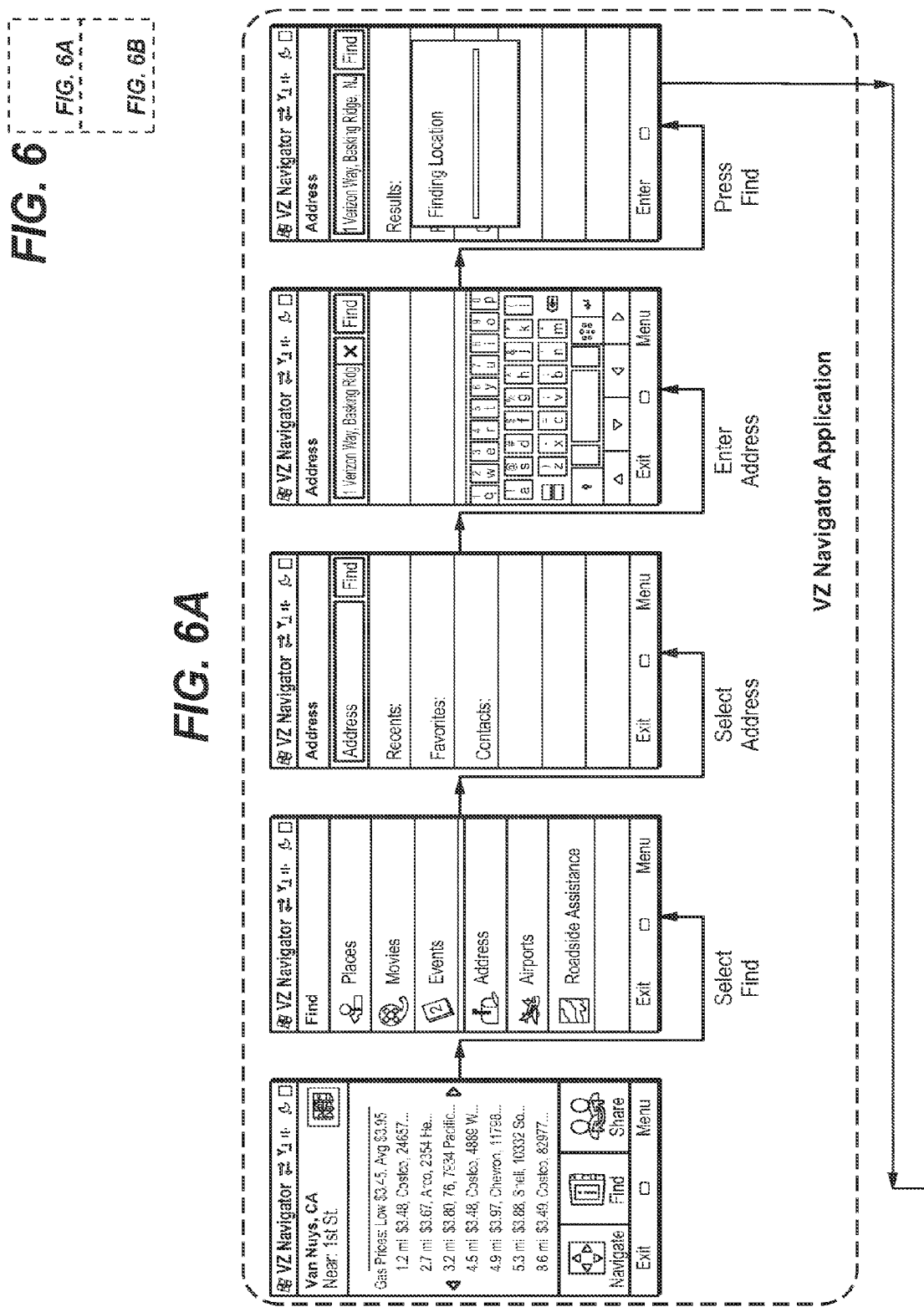

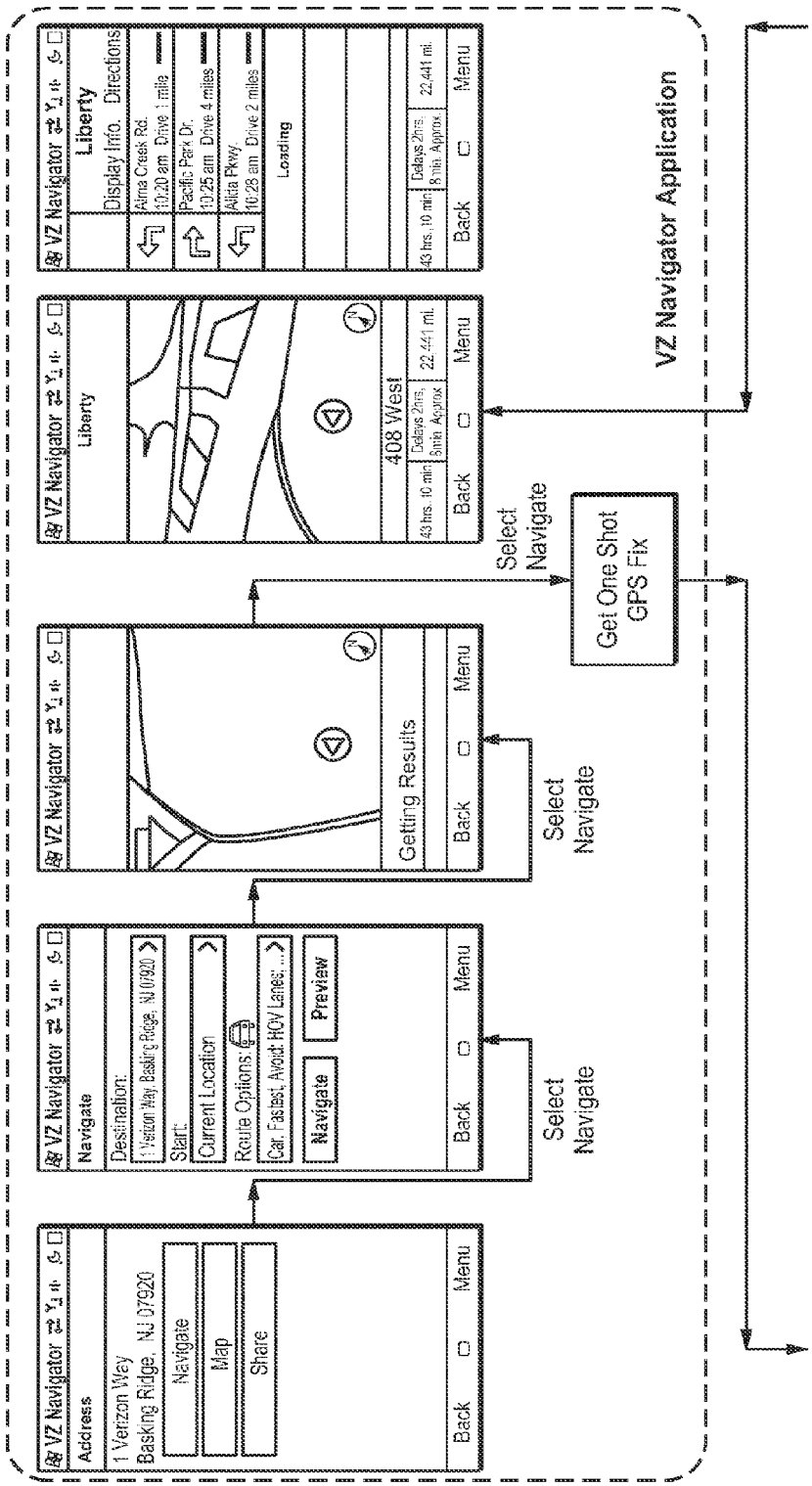

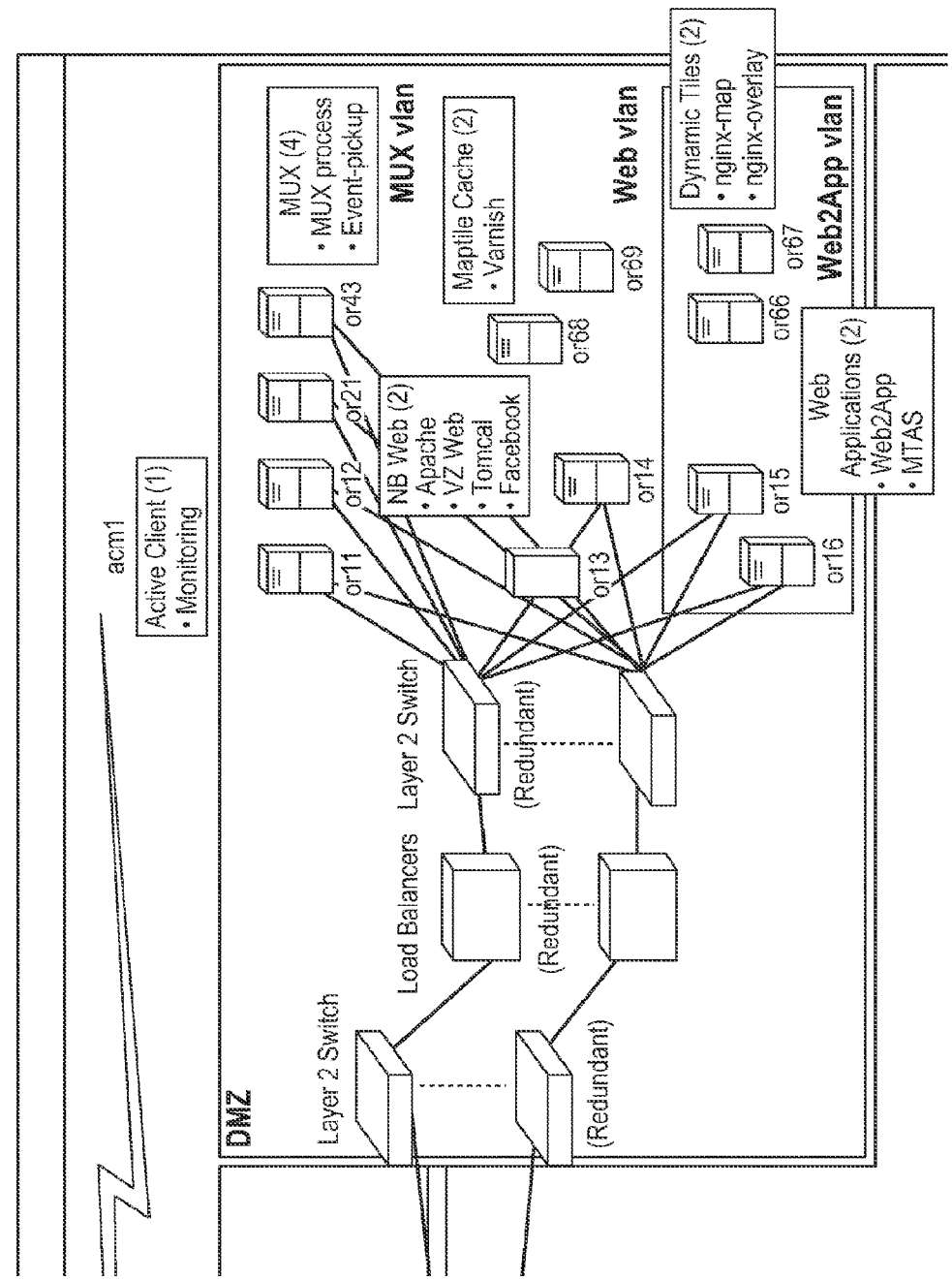

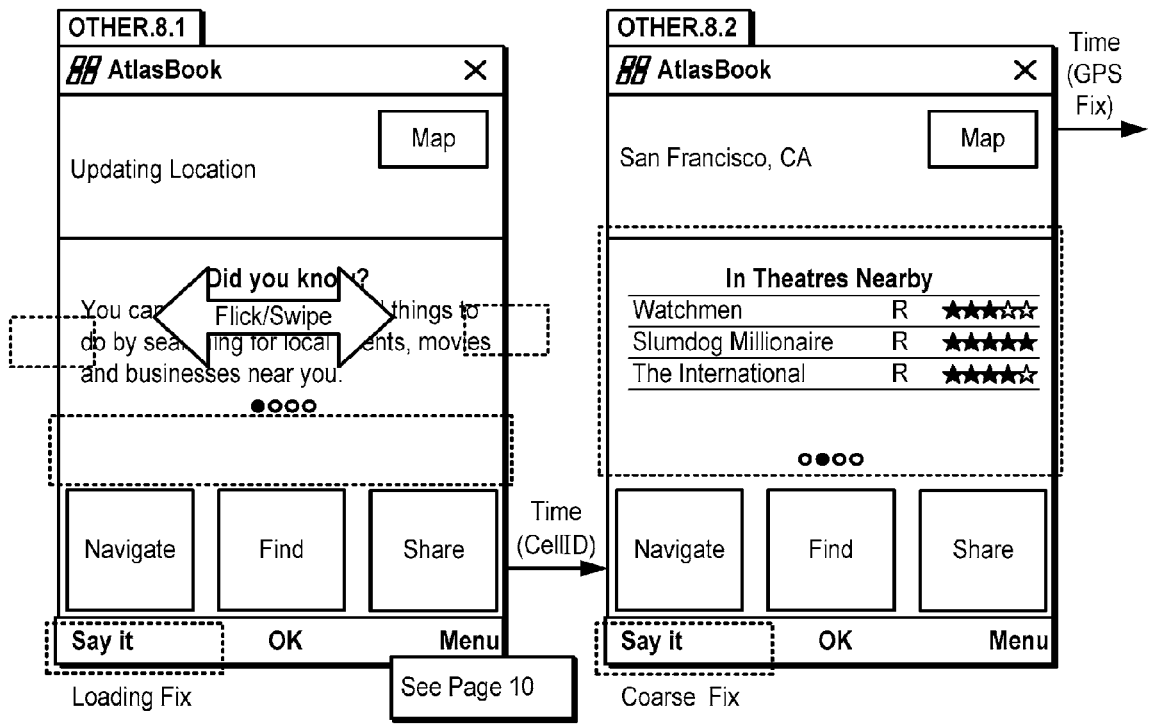
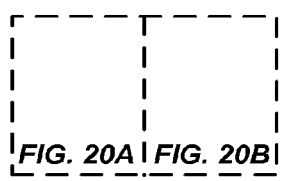
FIG. 20A
FIG. 20

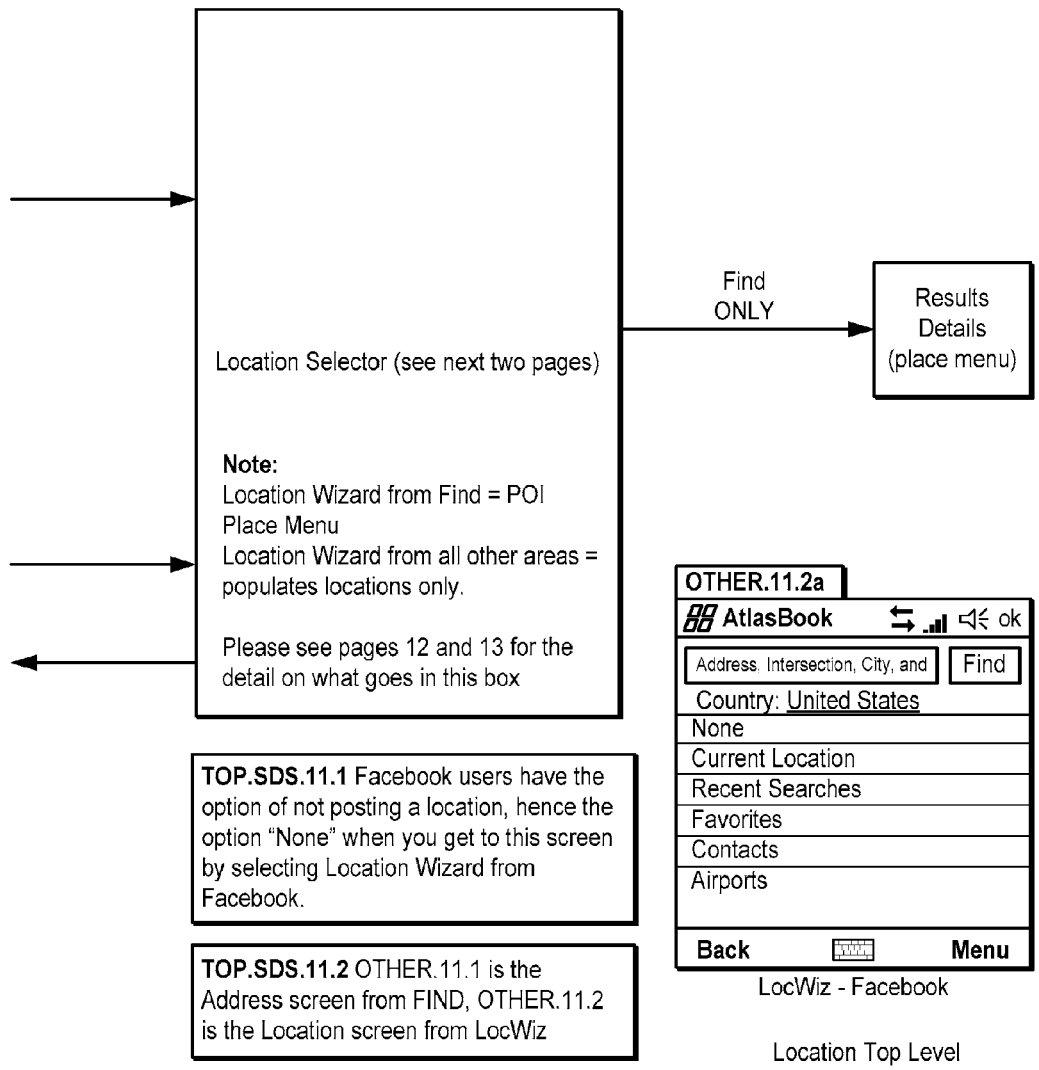
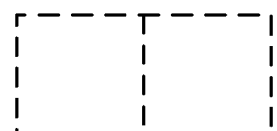
FIG. 23B
FIG. 23

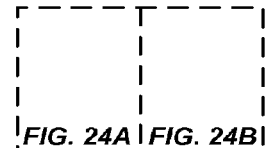
FIG. 24
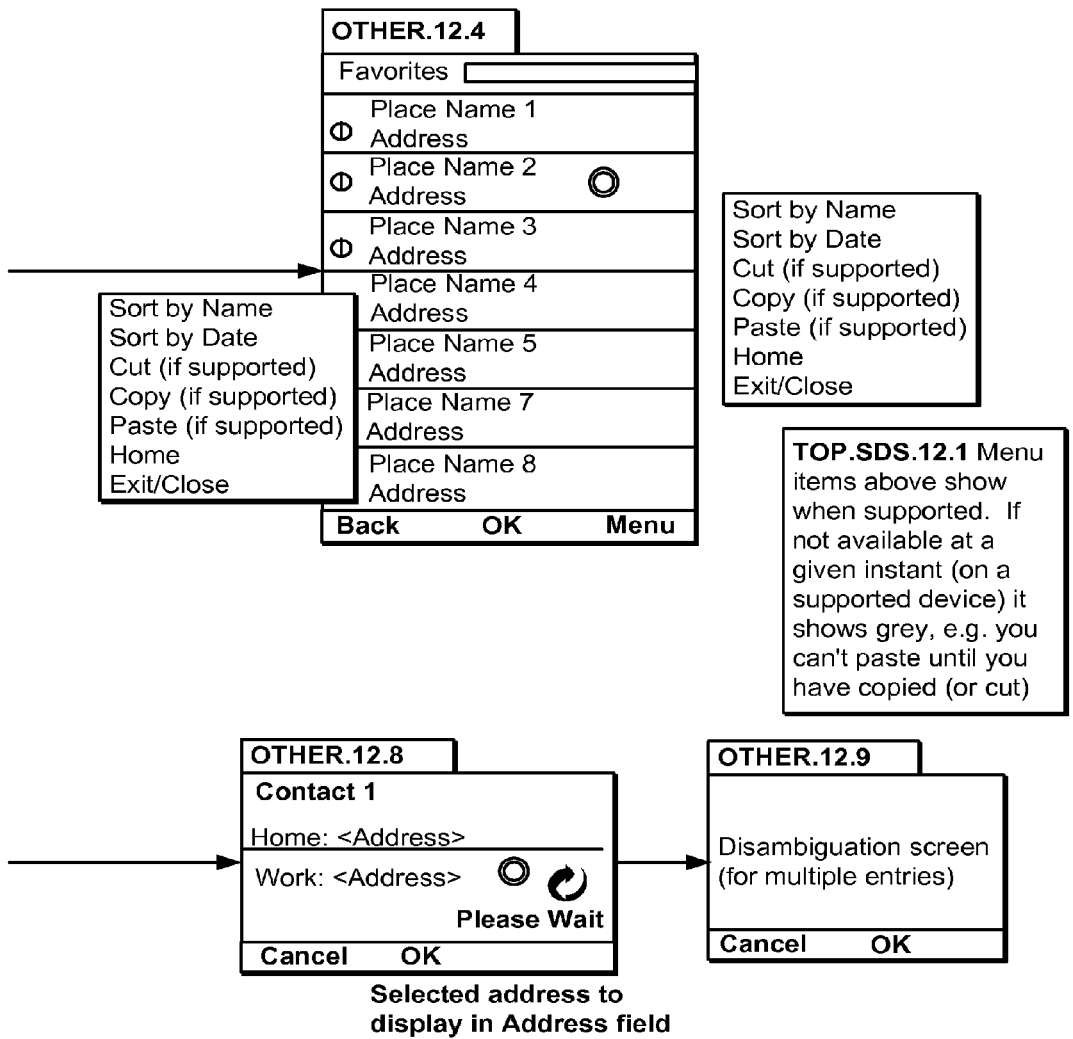
FIG. 24B  Location Wizard Non-Touch

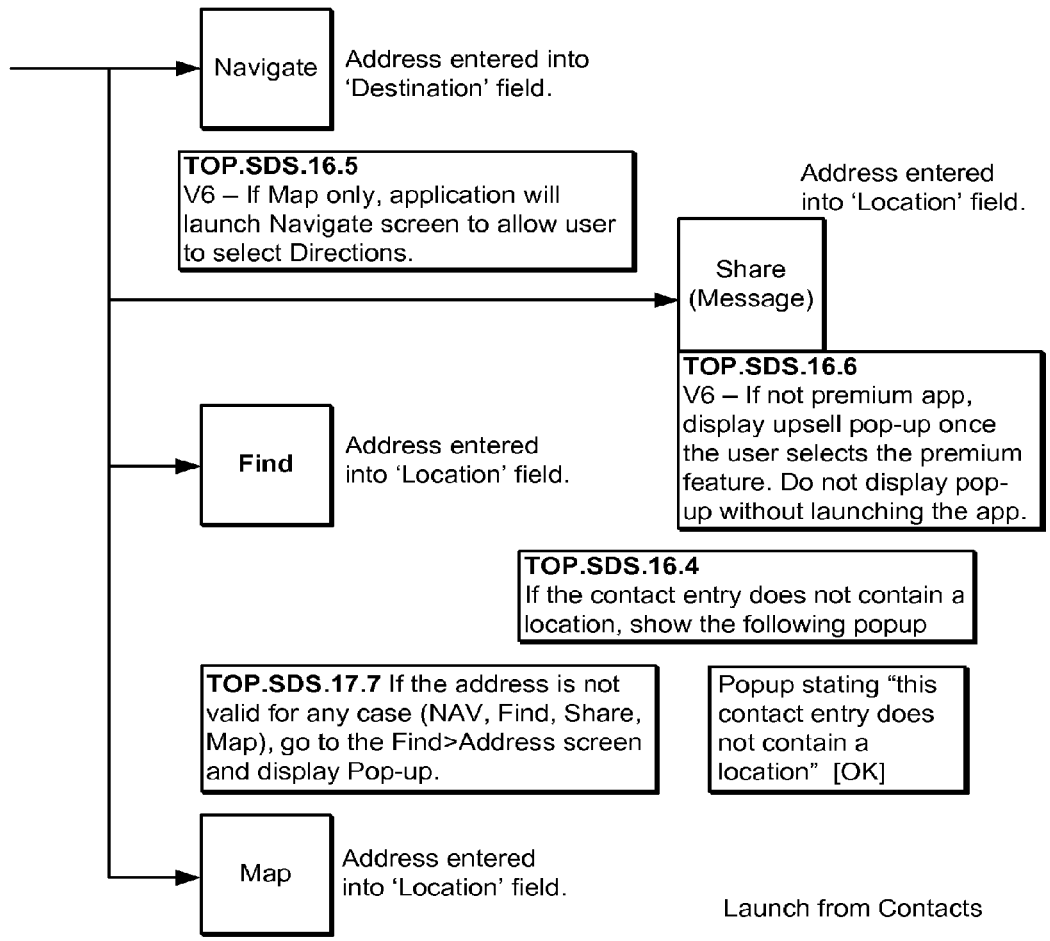
*FIG. 28*

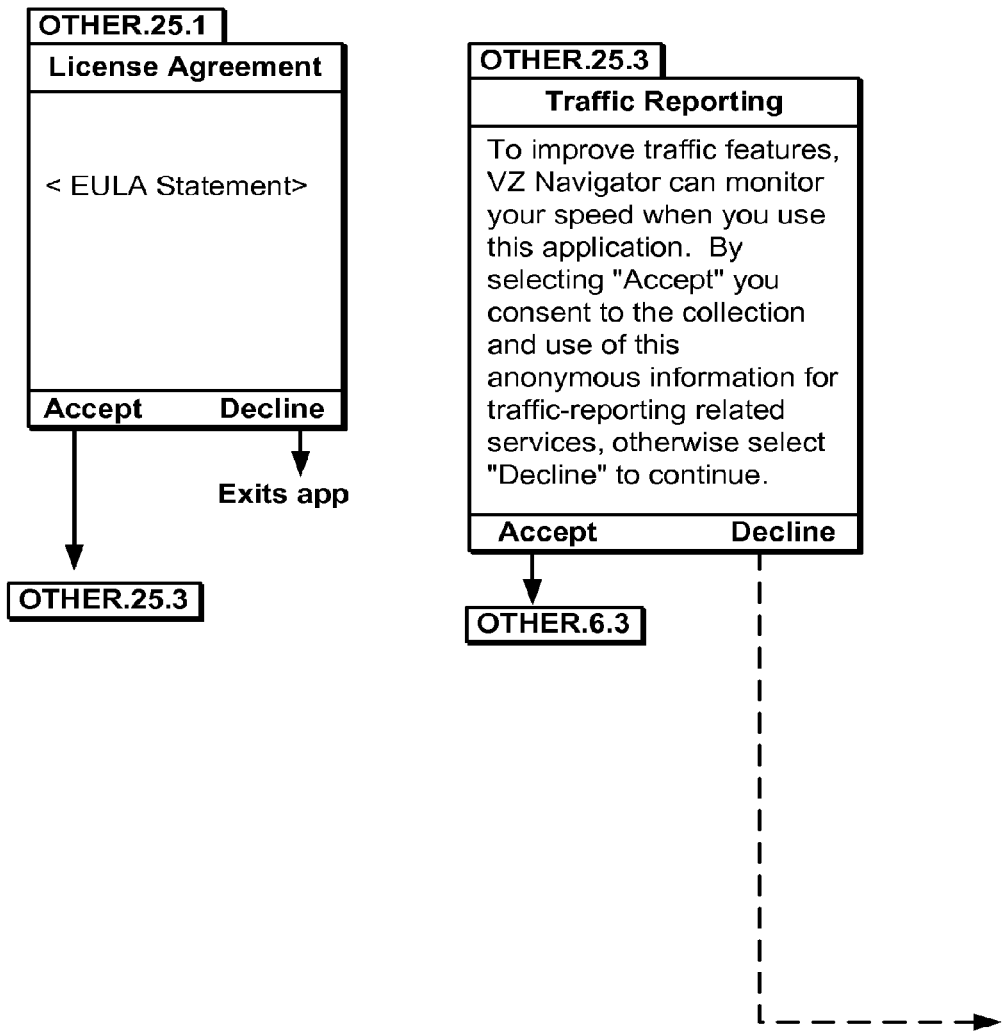
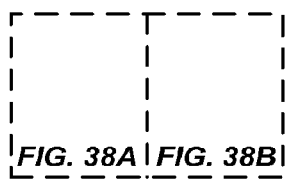
FIG. 38

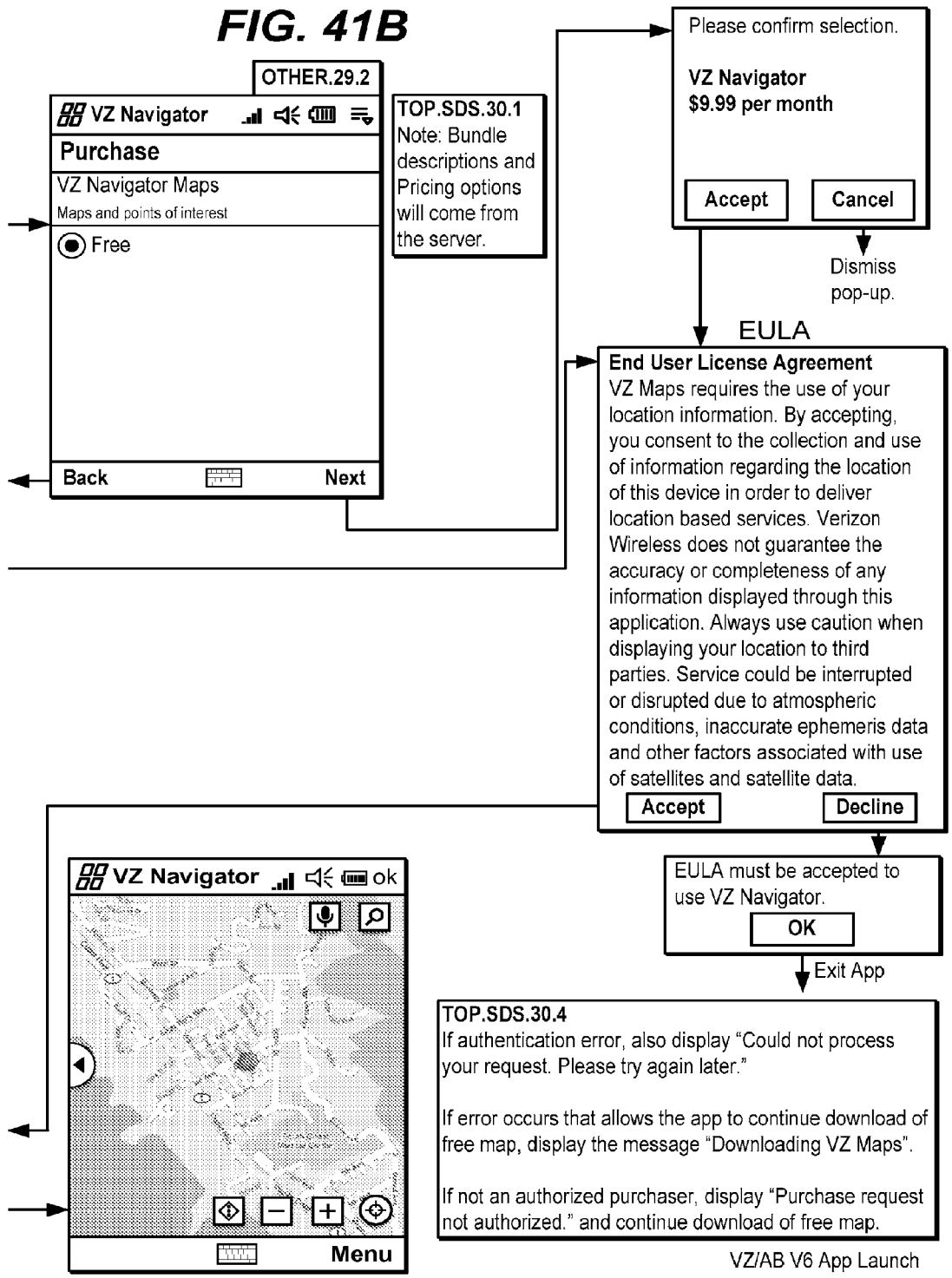

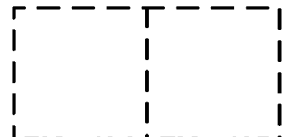
FIG. 42
FIG. 42B
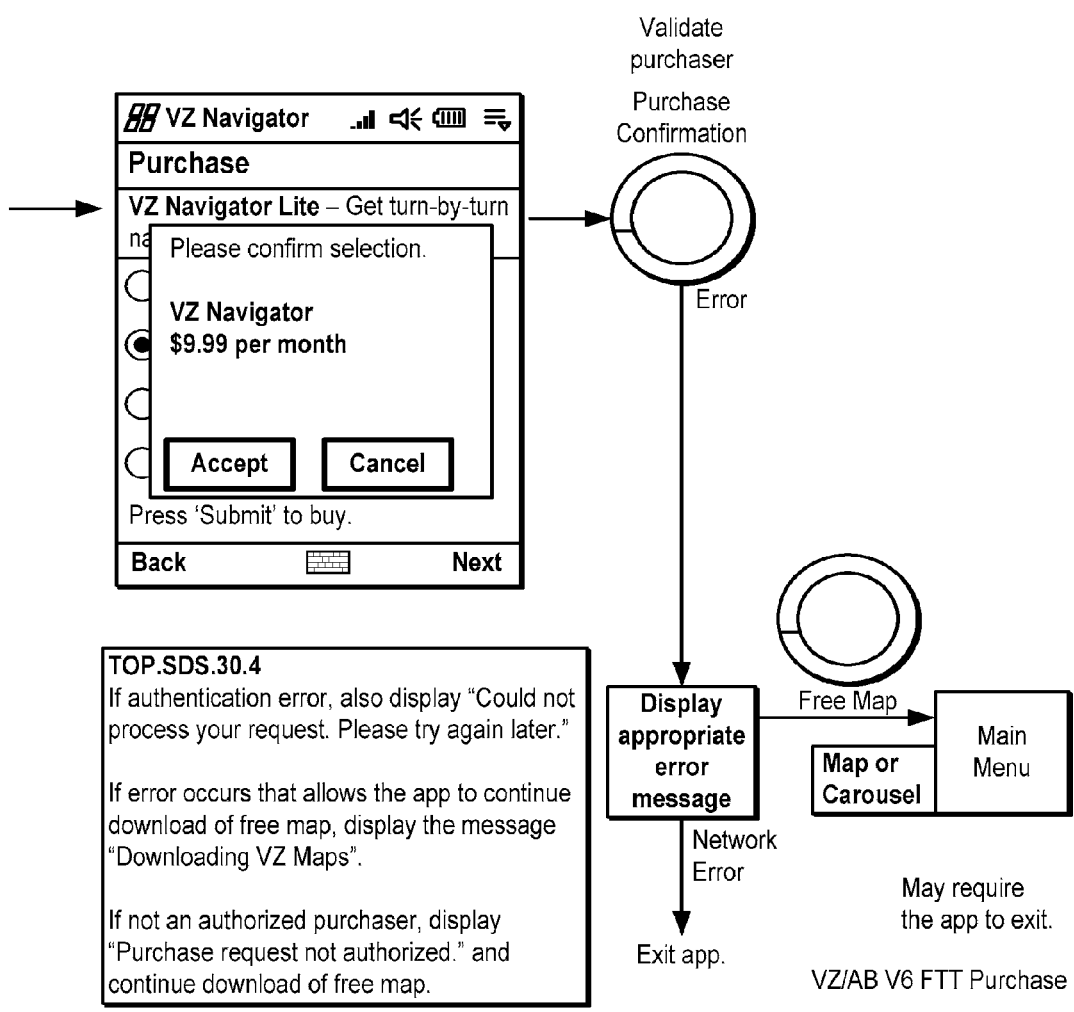

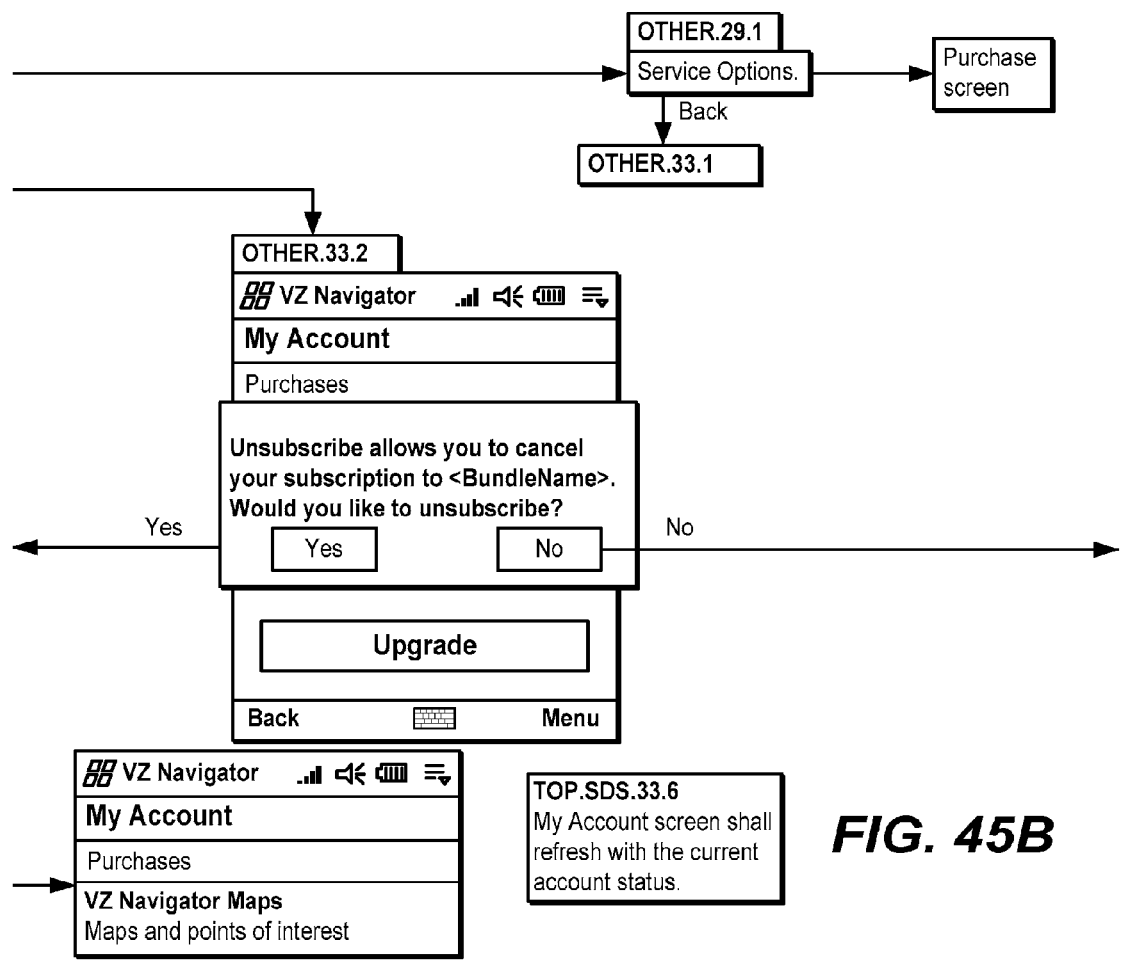

TOP.SDS.33.8
1) Purchases are displayed in List View.
2) Expiry only displays for non-recurring subscription.

TOP.SDS.33.7 Upgrade button for WM touch, Smartphone. Upgrade icon in toolbar for Storm Upgrade CSK on BREW

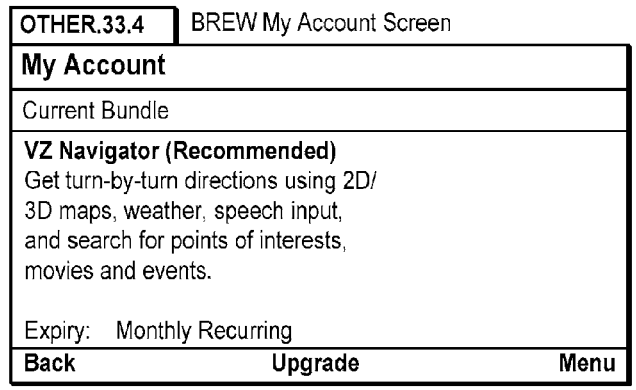

OTHER.33.4     BREW My Account Screen

| My Account |
| --- |
| Current Bundle |
| VZ Navigator (Recommended)<br>Get turn-by-turn directions using 2D/<br>3D maps, weather, speech input,<br>and search for points of interests,<br>movies and events.<br><br>Expiry:    Monthly Recurring |
| Back            Upgrade            Menu |

TOP.SDS.10.3
1) Unsubscribe only displays in menu for recurring subscription.
2) User can only unsubscribe to recurring subscription.
3) Expiry upgrades shall automatically revert to the recurring subscription, i.e. recurring VZN Lite user purchases a week of VZ Global. At end of week, app reverts to recurring VZN Lite. Both purchases shall display in the My Accounts screen.
4) Unsubcribe will not display in menu if there is a recurring and non-recurring purchase.

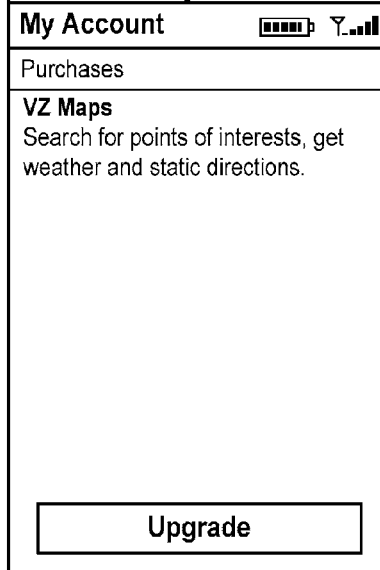

→ No = clear dialog box.

TOP.SDS.33.6
Error handling: Standard application error messages are displayed in the event of an error during unsubscribe process. If error occurs after user selects Other.33.3, subscription is cancelled.

V6 My Account

FIG. 45C

| Windows Mobile | HTC Cruise | HTC Diamond | HTC Tilt | Motorola Q9 |
| --- | --- | --- | --- | --- |
| BREW | LG 9700 | LG 9600 | LG 9100 | Motorola Vu204 |
| BlackBerry Java | Thunder | Bold (9000) | 88xx | 83xx |
| J2ME | Samsung Instinct | LG LX400 | SE W760 | Nokia N96 |

*FIG. 47*

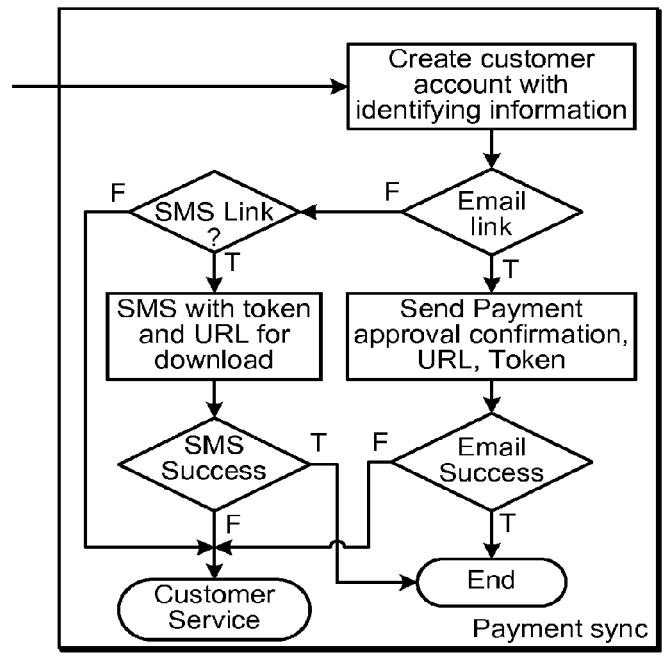
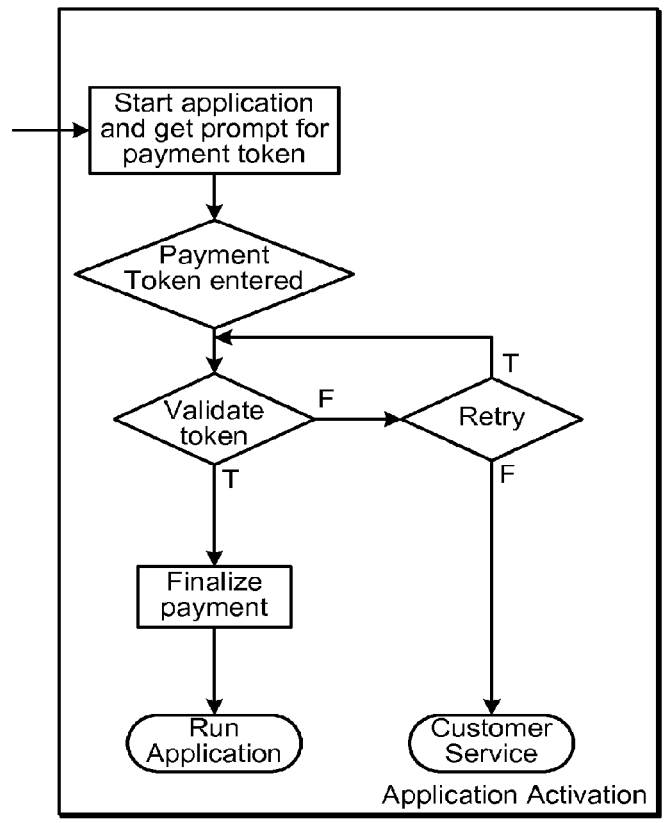
FIG. 49B
FIG. 49

*FIG. 59*

| Setting | Preferences | Menu/Options | Non-Sticky areas of the app |
|---|---|---|---|
| Speech Recognition | ✓ | | |
| Units of Measure | ✓ | X | Navigation Menu/Options, Trip Options |
| Heads Up in Follow... | ✓ | ✓ | Map Menu/Options |
| Show/Hide POI | ✓ | X | Map Menu/Options |
| Show Recent/Favor.. | ✓ | | |
| Show Place Coordin.. | ✓ | | |
| Message Volume | ✓ | ✓ | |
| Privacy Setting | ✓ | | |
| Share Traffic data | ✓ | ? | Navigation Menu/Options |
| History | ✓ | | |
| Navigation Preferences | ✓ | X | Navigation Menu/Options, Trip Options |
| Display Themes | ✓ | | |
| Language | ✓ | | |
| Country | ✓ | X | Address entry, Airport Selection, POI search, Map Location, Weather Location, Traffic Location |

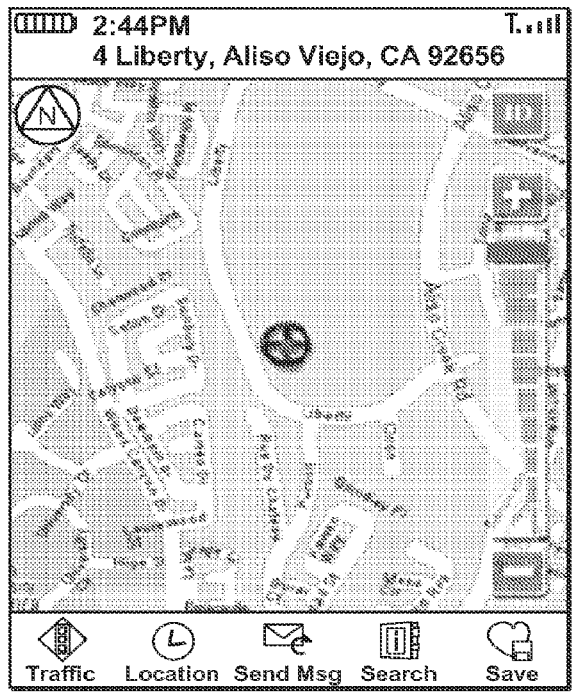

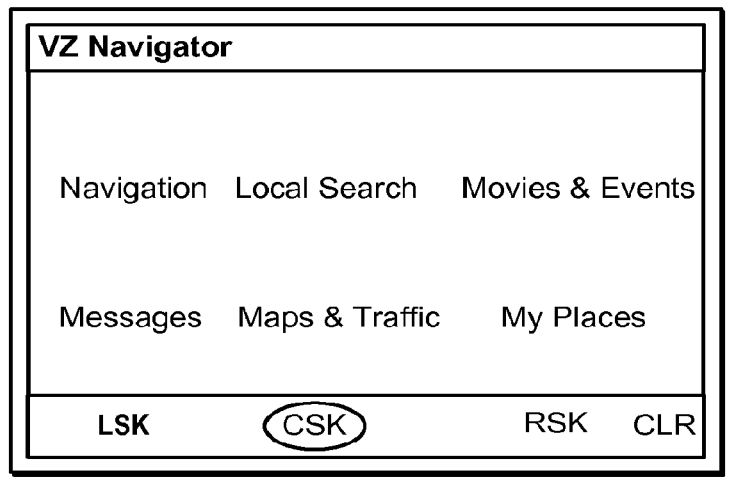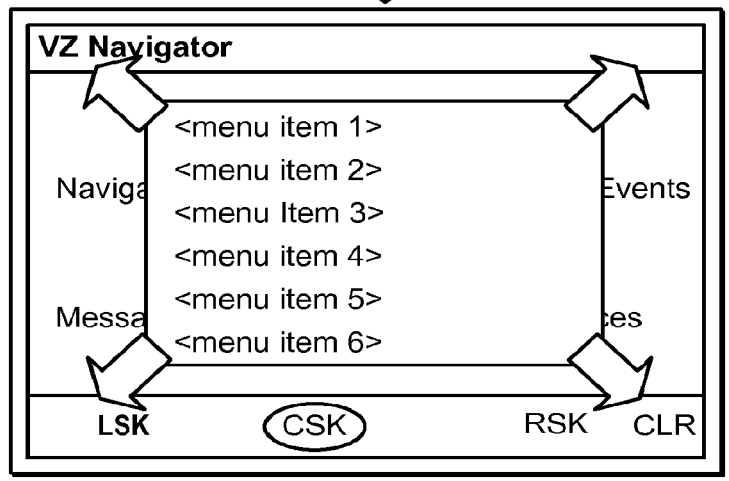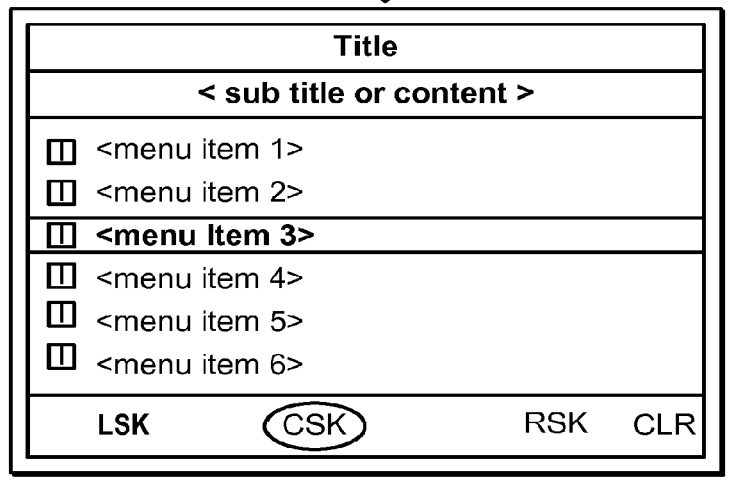
FIG. 63A

| Menu Option | Actions |
|---|---|
| Navigate to | Displays the 'Find Destination' Screen |
| Search | Prompts the Local Search Screen, where the current location is the center point. |
| Share | Prompts the Place Message Screen where the marked spot is the location |
| Add to Favorites | Geo codes the location, and pops up a screen for naming the favorite and saving it. |
| Location Information | Displays the latitude & longitude and other information about current location. |

*FIG. 67*

| Menu Option | Actions |
|---|---|
| Navigate to | Calculates TBT directions from current location to the marked spot. |
| Search | Prompts the Local Search Screen, where the marked spot is the center point. |
| Identify (ID) | Only geo codes the location, displays the latitude & longitude, and the best possible address. |
| Share | Prompts the Place Message Screen where the marked spot is the location |
| Add to Favorites | Geo codes the location, and pops up a screen for naming the favorite and saving it. |

*FIG. 68*

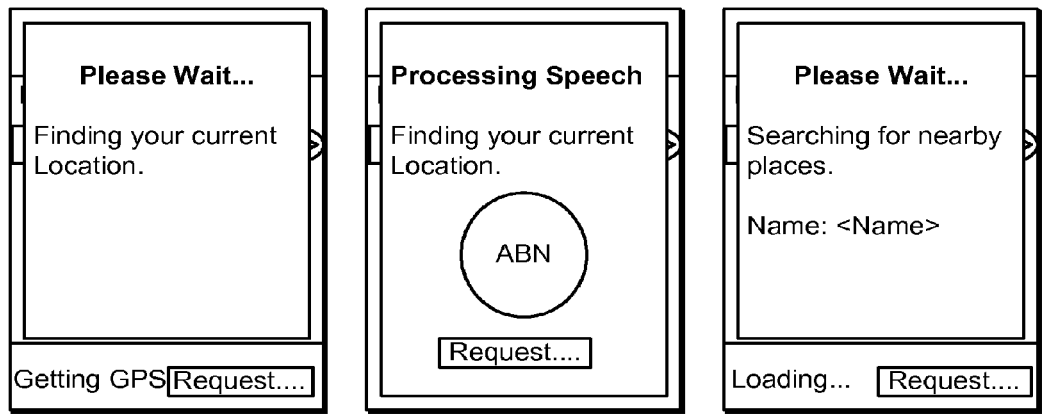
FIG. 69
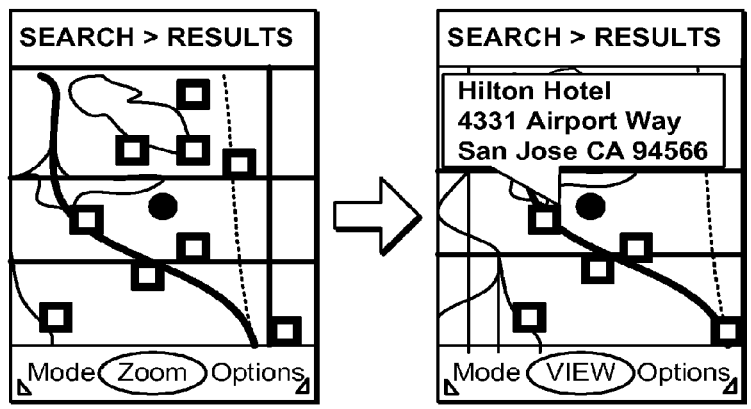
FIG. 70
FIG. 71
| V4 Zoom Level (V4ZL) | V5 Zoom Level (V5ZL) |
|---|---|
| -1 (Ped Nav) | 18 |
| 0 | 17 |
| 1 | 17 |
| 2 | 16 |
| 3 | 15 |
| 4 | 14 |
| 5 | 13 |
| 6 | 12 |
| 7 | 11 |
| 8 | 10 |
| 9 | 8 |
| 10 | 5 |

| | Contents to rotate in the Carousel | |
|---|---|---|
| ☐ | All | |
| ☑ | Local Weather | *Can not be deselected!* |
| ☑ | Local Gas Prices | |
| ☑ | Local Movies | ▶ |
| ☑ | Product Tips | |
| ☐ | Concerts | ▶ |
| ☐ | Dancing & Night life | ▶ |
| ☐ | Exhibits & Art Shows | ▶ |
| ☐ | Family | ▶ |
| ☐ | Special Events | ▶ |
| ☐ | Sport | ▶ |
| ☐ | Theater & Live Performances | ▶ |
| ☐ | Commuter Traffic Alerts | ▶ |
| ☐ | Local Traffic Alerts & Advisories | ▶ |
| ☐ | Next Meeting Time & Place | ▶ |
| ☐ | Flight Status | ▶ |
| ☐ | Partner Defined Events(e.g., VZW Promotions, USCC Street Festivals) | |
| ☐ | Coupons from Advertisers | |

*FIG. 91*

| <d.d> mi | △ Southbound 110 Fwy |
|---|---|
| <d.d> mi | △ Southbound I-5 Fwy |
| <d.d> mi | △ Eastbound I-10 Fwy |

FIG. 92

| | |
|---|---|
| Next Meeting or Event: | |
| What: | Drop samples to Mike Foster / Pep Boys |
| When: | 3:00 PM |
| Where: | PEP Boys-Costa Mesa Branch |
| | 2344 Alton Avenue |
| | Costa Mesa, CA 92661 |

FIG. 93

Defining support for company name and optional sub-categories.

PERSONAL WIRELESS NAVIGATION SYSTEM

The present application claims priority from U.S. Provisional No. 61/344,091, filed May 21, 2010 to Sheha et al., entitled "Personal Wireless Navigation System"; and from U.S. Provisional No. 61/344,245, filed Jun. 18, 2010 to Sheha et al., entitled "Personal Wireless Navigation System", the entirety of both of which are explicitly incorporated herein by reference.

BACKGROUND OF THE INVENTION

Field of the Invention

This invention concerns communication systems and methods, but more specifically, the invention relates to a server-based personal wireless navigation system with a user interface on a wireless phone.

SUMMARY OF THE INVENTION

In accordance with the principles of the present invention, a carousel user interface for a personal wireless device comprises a circular-depicted carousel comprising a plurality of carousel pages of information sources. The carousel is visually rotated about a center. The carousel continuously rotates sequentially the plurality of carousel pages of information sources, and repeats the rotation in a same order on subsequent full rotations of the carousel. The carousel further comprises at least one carousel page of changing information that changes upon each full rotation of the carousel.

A method of displaying a plurality of pages of information on a personal wireless device comprises assembling the plurality of carousel pages of information visually into a carousel that rotates about a center point. The plurality of carousel pages of information display information readable from a direction outside a perimeter of the carousel. A content of one of the plurality of carousel pages of information is changed after each rotation of the carousel beyond when the one of the plurality of carousel pages of information is displayed front and center. The carousel is rotated in a clockwise or counter-clockwise direction by hand gestures on a touch screen of the personal wireless device.

BRIEF DESCRIPTION OF THE DRAWINGS

Features and advantages of the present invention become apparent to those skilled in the art from the following description with reference to the drawings:

FIG. 47 shows a minimum device list for the form factors for AB and the personal wireless navigation system, in accordance with the principles of the present invention.

FIG. 59 shows a table identifying where in the application users can change specific options, and whether the change will be permanent (i.e., ✓ =Sticky) or temporary (X=non-sticky).

FIG. 60 shows the Zoom slider using a touch and drag gesture, in accordance with the principles of the present invention.

FIG. 61 shows the user interface (UI) flow for a MOVIE . . . RESULTS/MOVIE DETAILS. Horizontal Swipe sequence: DOWN, GESTURE sequence.

FIG. 63A shows a box-out transition, in accordance with the principles of the present invention.

FIG. 67 is a table showing a menu of options when the user taps on the marker for the current location.

FIG. 68 is a table showing a menu of options when a user double taps on the same spot on the map.

FIG. 69 shows a personal wireless navigation system expediting speech-to-text conversion by eliminating or reducing the wait time for a first screen when a user speaks a business type, in accordance with the principles of the present invention.

FIG. 70 shows a user can tap on any POI to see a brief description of the POI.

FIG. 71 shows exemplary zoom levels, in accordance with the principles of the present invention.

FIG. 91 shows an exemplary Carousel Setup Screen enabling users to add additional content in the Carousel, in accordance with the principles of the present invention.

FIG. 92 illustrates an exemplary model for displaying this content type, which is properly localized in accordance with the user's regional settings.

FIG. 93 shows an exemplary content screen displaying the name and location of the upcoming Next Meeting Alert (Time & Place) event that is on the user's calendar, such that the user can invoke an LBS action such as 'Go', 'Find', 'Share', or 'Map'.

DETAILED DESCRIPTION OF ILLUSTRATIVE EMBODIMENTS

A personal wireless navigation system is provided, branded AtlasBook Navigator (ABN) version 5 (v5). It is the core platform for products commercially available from Tele-Communication Systems, Inc. in Annapolis, Md., including Verizon (VZ) Navigator v5, Telus Navigator v5, Your Navigator v5, AAA Mobile v5, etc. The present inventors developed and launched the personal wireless navigation system on limited devices per each suitable available platform (Windows Mobile, blackberry Java, Brew, J2ME, etc), and then ported the application to device batches for each business partner.

AtlasBook (AB) v5 is the upgrade path for AtlasBook v4 North American, AtlasBook v4 European Edition, and AtlasBook v3 and v2.

A direct billing and distribution mechanism is also created for AtlasBook Navigator and selective brands independent of the carrier's application shops.

The AtlasBook (AB) v5 personal wireless navigation system is a core product that other brands are based on. The personal wireless navigation system is a platform for empowering a merchant-paid search.

Performance of a navigation functionality in the personal wireless navigation system is higher and more comparable and competitive with PND and in-car navigation systems, and the search capability is comparable and competitive with the most popular web search engines. A user interface (UI) and look and feel of the personal wireless navigation system is provided which is enhanced so that users do not simply want to use the product—they covet it.

Ideally the personal wireless navigation system is constructed such that a subset of it with fewer features and functions can be productized, marketed and deployed to users.

The general requirements of the AtlasBook v5 personal wireless navigation system include capacity planning, the available platforms that it needs to support, and the time frame for launching it.

NAVBuilder Platform Architecture

Figure 1:
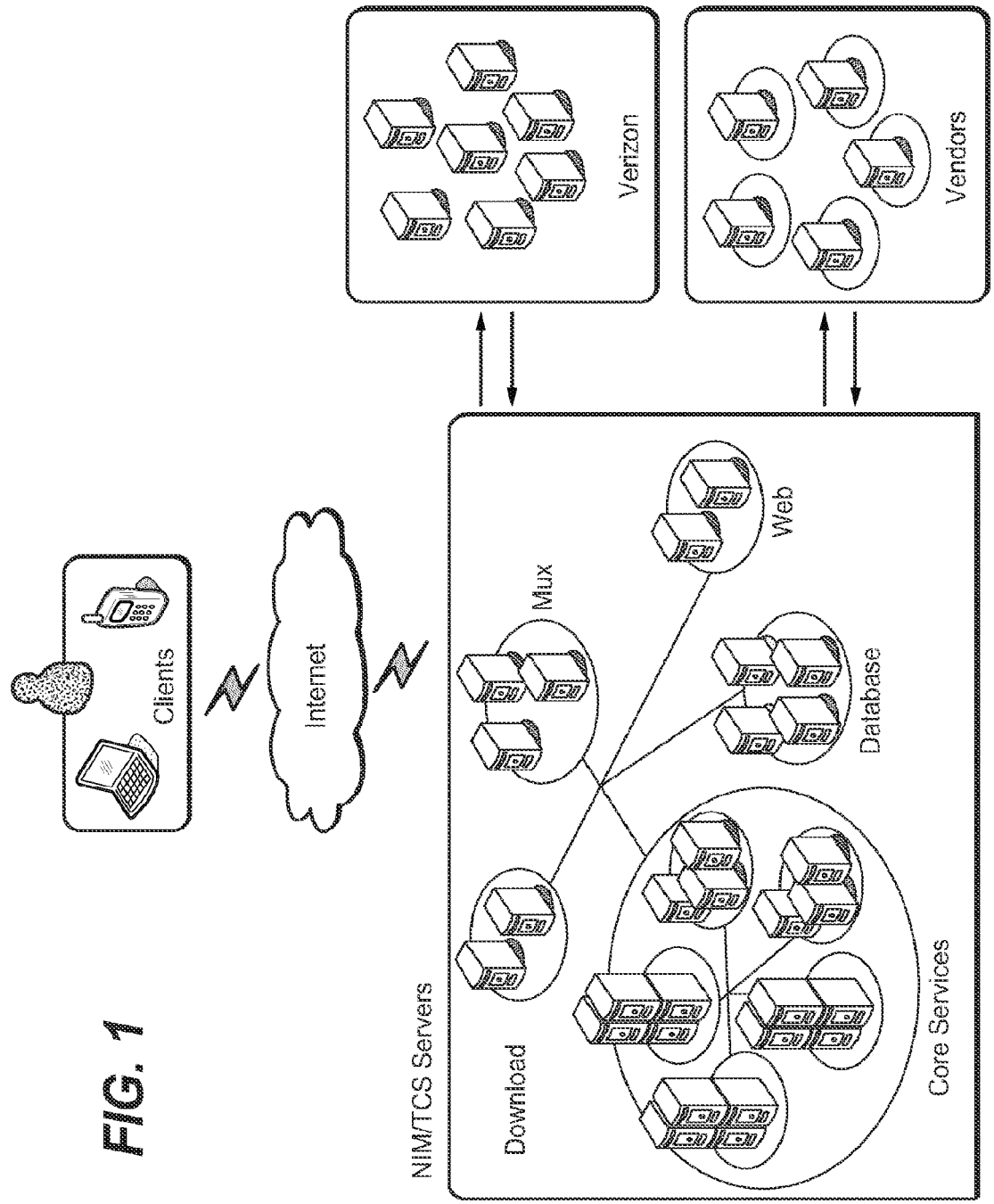
FIG. 1 shows an exemplary overall system architecture of a NAVBuilder platform, in accordance with the principles of the present invention.

FIG. 1 shows an exemplary overall system architecture of a NAVBuilder platform, in accordance with the principles of the present invention.

Figure 2:
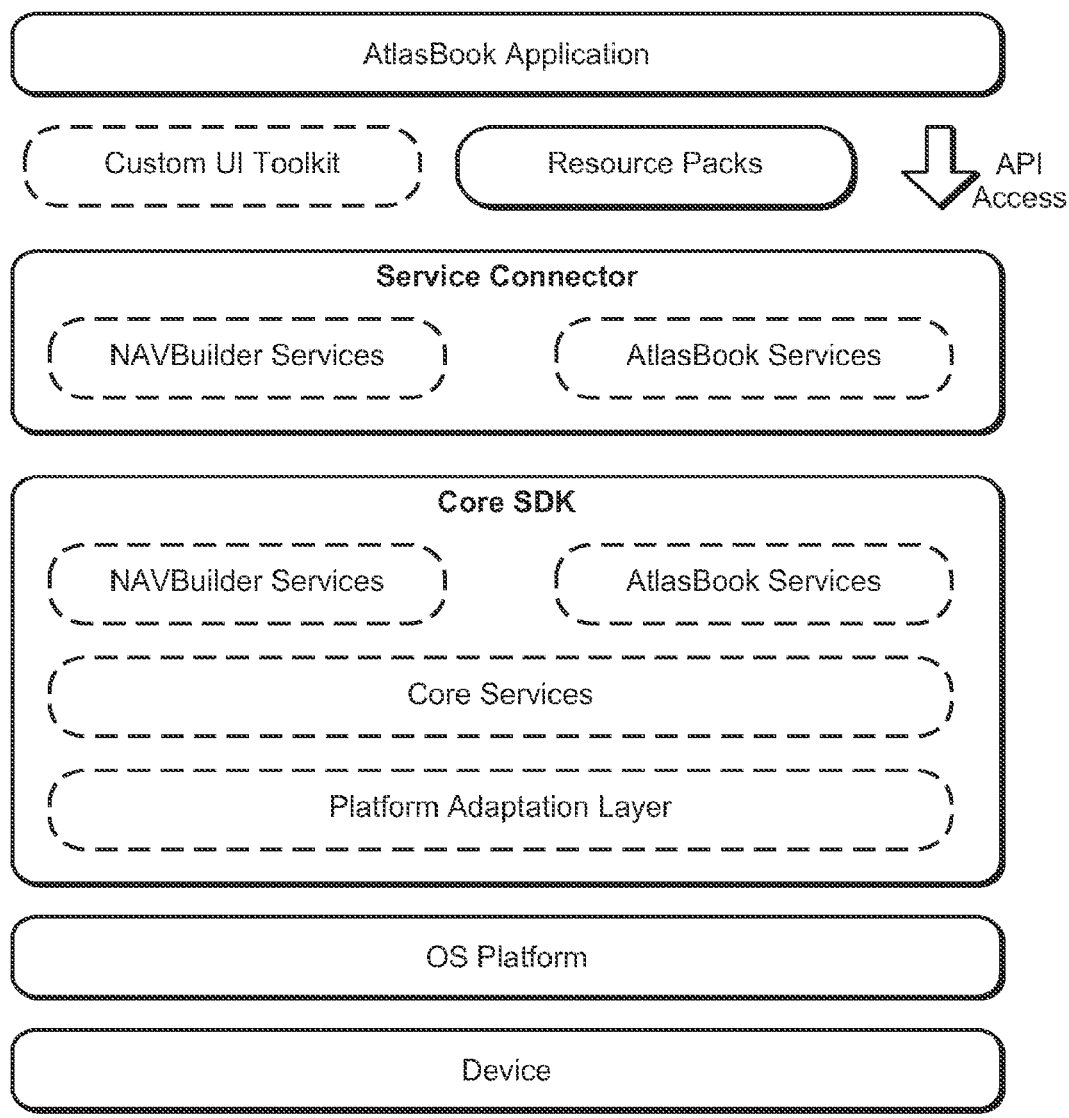
FIG. 2 shows an exemplary client architecture diagram of an AtlasBook application, in accordance with the principles of the present invention.

FIG. 2 shows an exemplary client architecture diagram of an AtlasBook application, in accordance with the principles of the present invention.

Figure 3B:
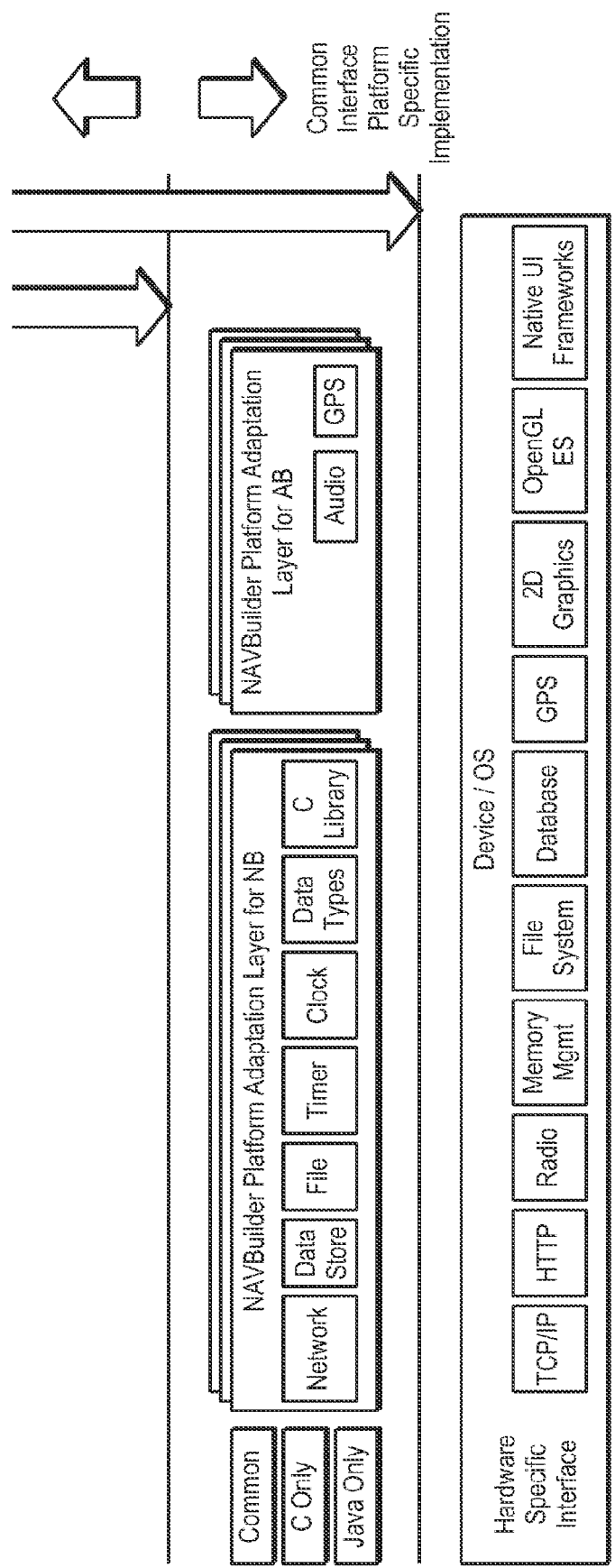
FIG. 3 shows exemplary NAVBuilder client architecture, in accordance with the principles of the present invention.

FIG. 3 shows exemplary NAVBuilder client architecture, in accordance with the principles of the present invention.

Figure 4B:
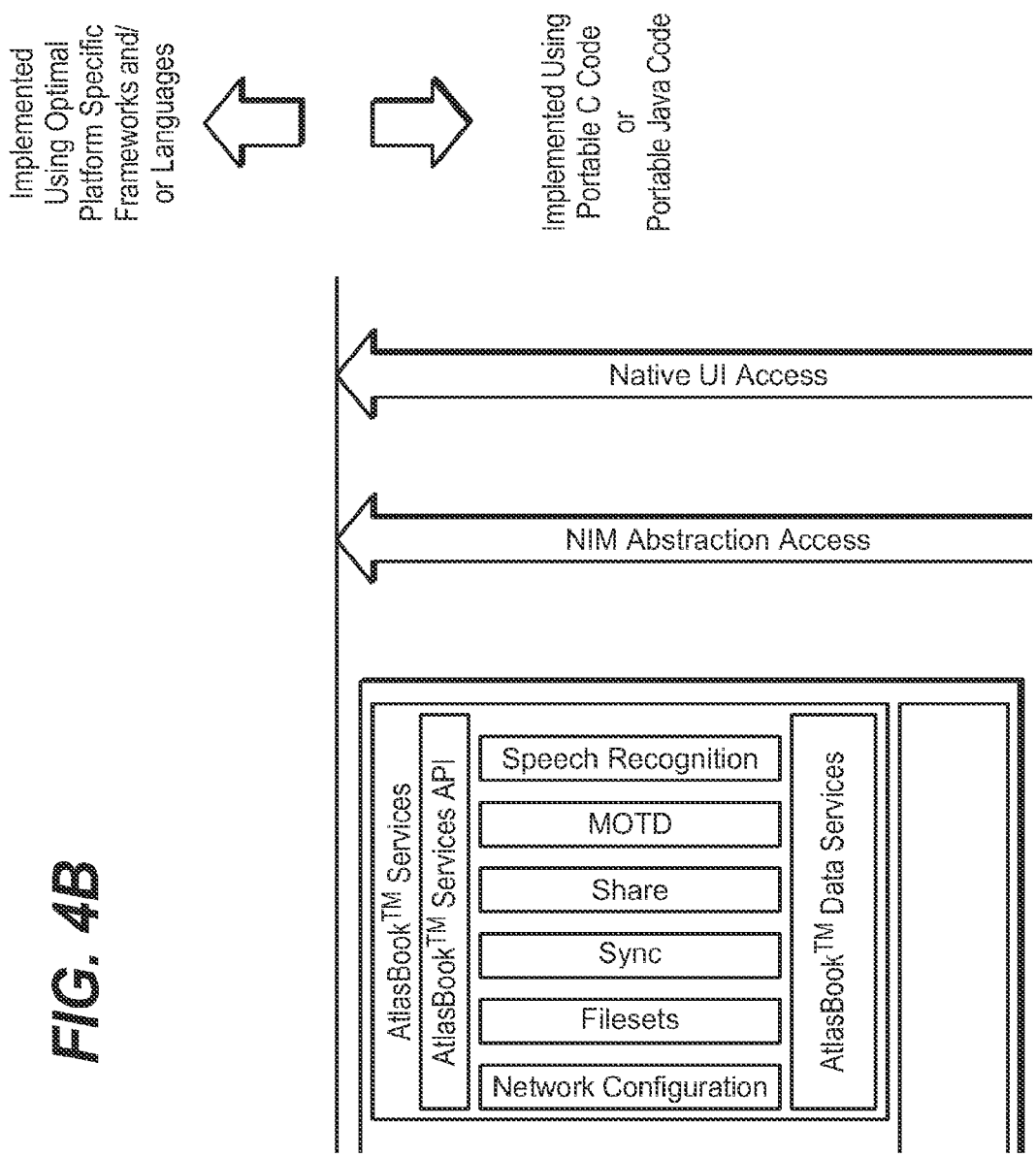
FIG. 4 shows exemplary NAVBuilder inside client architecture, in accordance with the principles of the present invention.
Figure 4C:
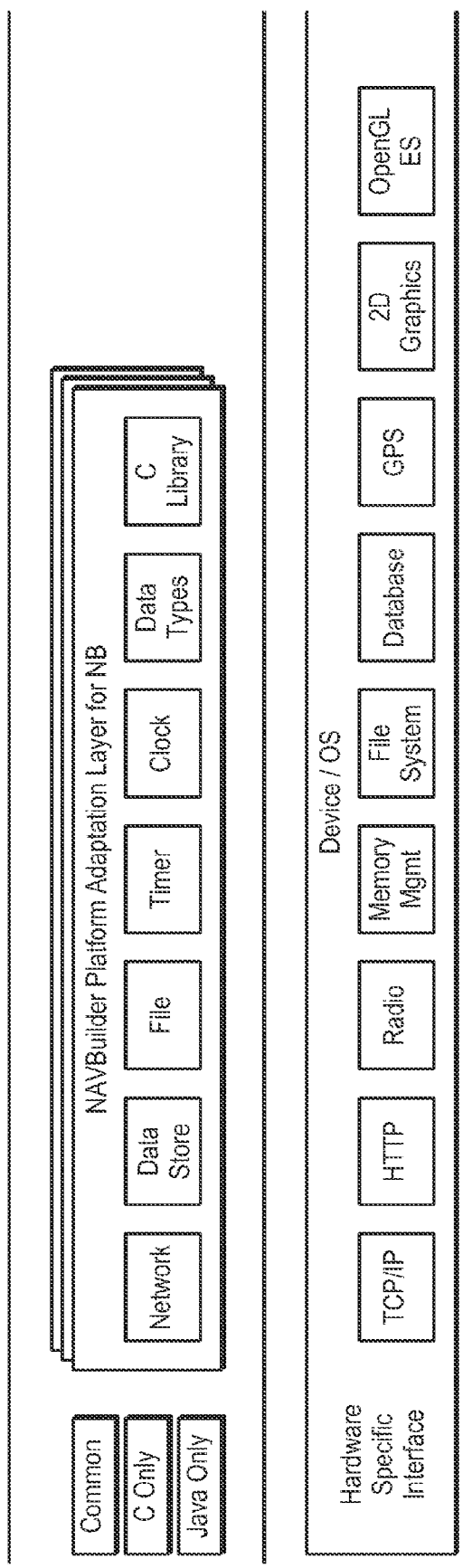
Figure 4D:
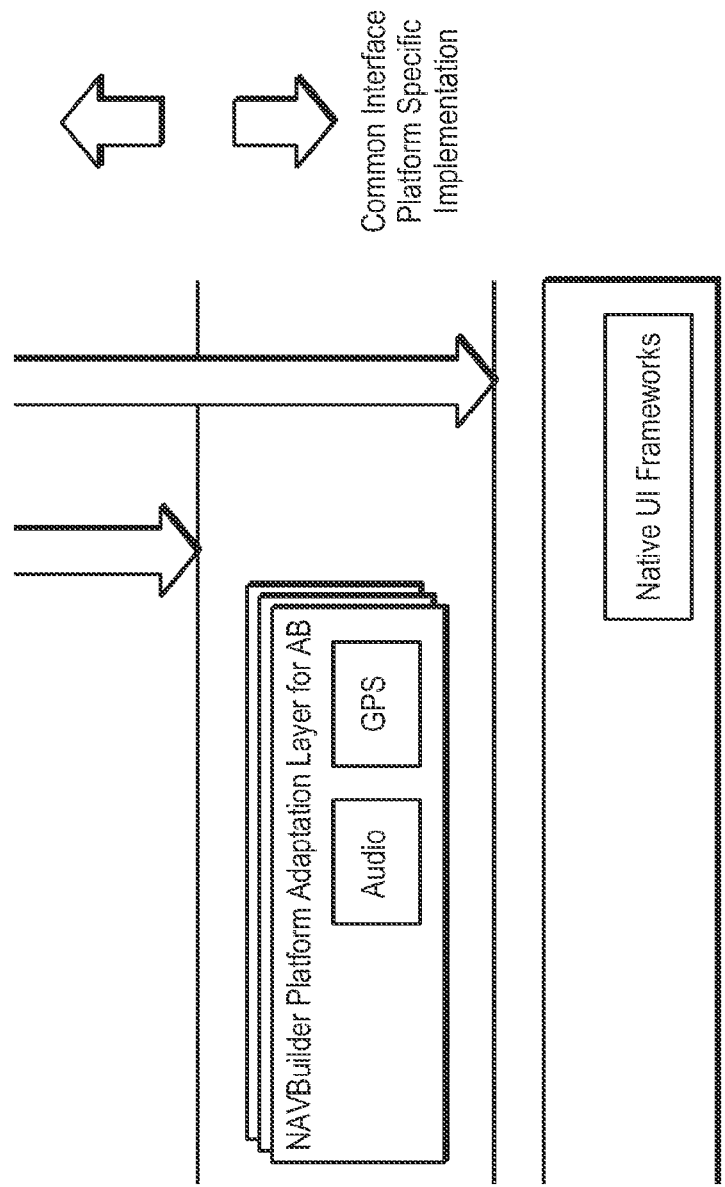

FIG. 4 shows exemplary NAVBuilder inside client architecture, in accordance with the principles of the present invention.

Figure 5B:
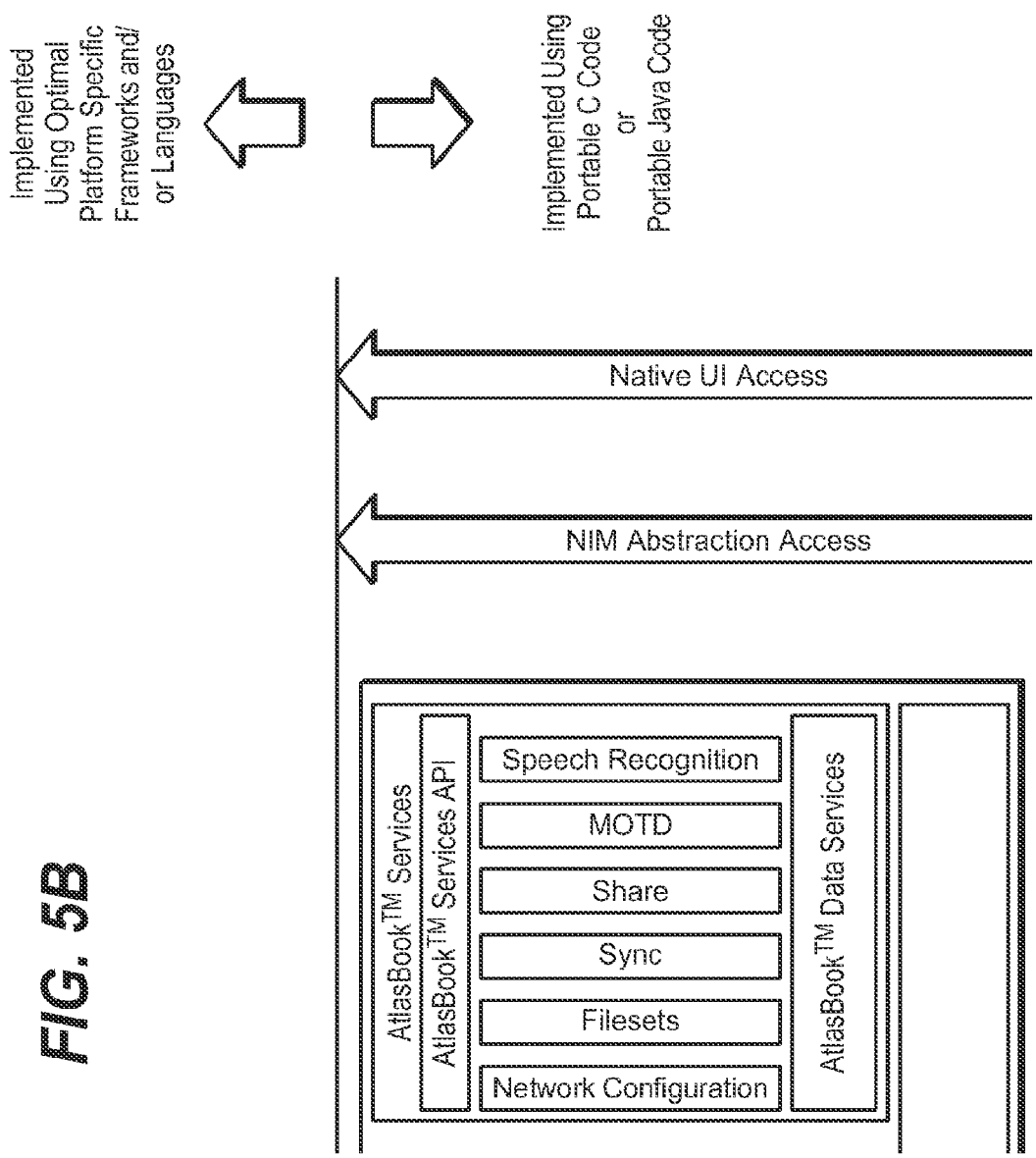
FIG. 5 shows another exemplary embodiment of NAVBuilder client architecture, in accordance with the principles of the present invention.
Figure 5C:
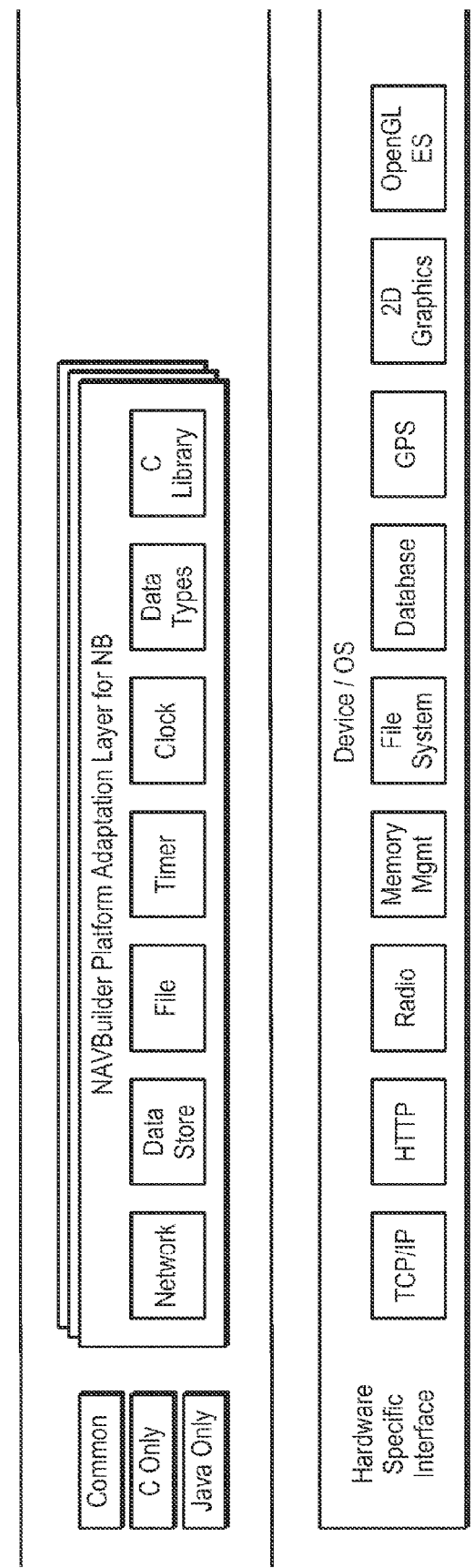
Figure 5D:
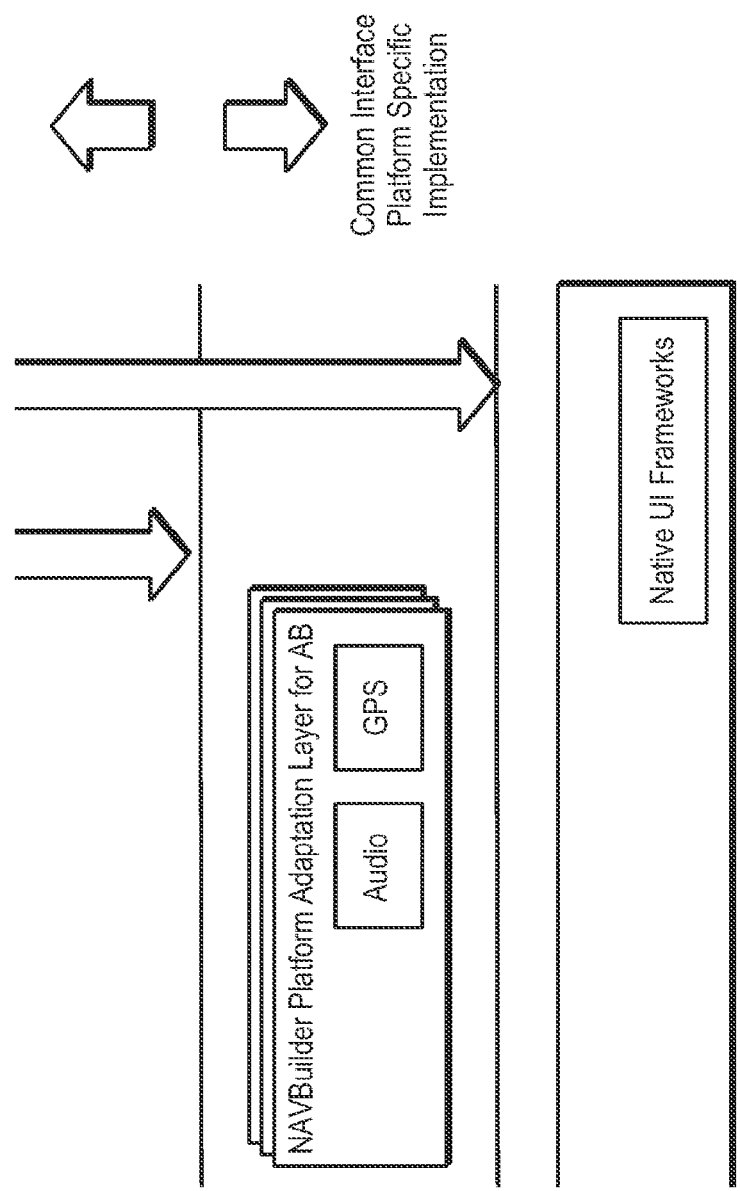

FIG. 5 shows another exemplary embodiment of NAVBuilder client architecture, in accordance with the principles of the present invention.

The purpose of the NAVBuilder client architecture is to provide a common interface for device and operating system (OS) services to enable cross-platform Core code. It is separated into three components: Core services, NAVBuilder services, and AtlasBook services. Preferably improper dependencies are controlled, with enforcement in the build. Preferably different packaging and distribution options are enabled.

All code is preferably cross-platform C or JAVA. Preferably only PAL abstractions are used, and does not call device or library APIs directly. No #ifdefs or conditional code based on platform.

Core services provide basic utilities and services, not specific to product or functionality. Network features include generic network request/reply handling, and protocol packing/unpacking (TPS).

NAVBuilder services provide application independent Geoservices. It features geocode, reverse geocode, local search (POI, movies, events, weather, traffic incidents). It also features map features such as static raster, raster tile, and vector tile. It includes static directions, optional navigation, and analytics.

AtlasBook services provide application specific services for the AtlasBook application. It preferably includes features such as subscription, filesets, synchronization, share, server message, ASR, profile (User Settings), and datastore.

Service Connector provides a thread-safe interface to NAVBuilder and AtlasBook services, and also provides support for cross-language marshalling.

The User Interface provides a consistent experience across all versions of the application. Unified User Interface (UI) flow is provided with touch and non-touch variations. The OS and platform specific variations provide pop-up menus, toolbars, footers and soft keys. The User Interface is integrated with device applications such as Contacts and Calendar, and provides App2App APIs to support integration with other applications.

Figure 6B:
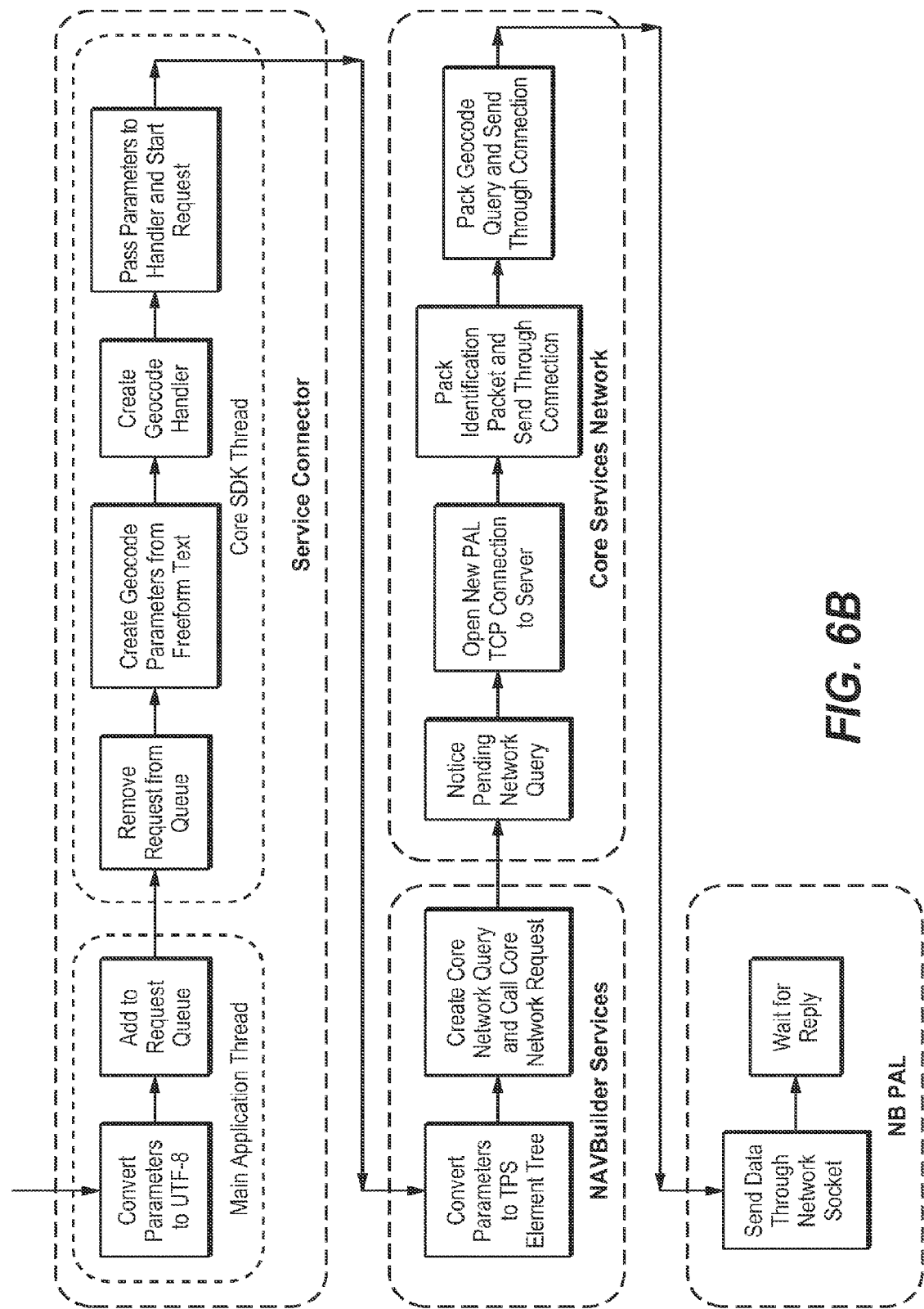
FIG. 6 shows an exemplary navigation interaction, in accordance with the principles of the present invention.

FIG. 6 shows an exemplary navigation interaction, in accordance with the principles of the present invention.

Figure 7:
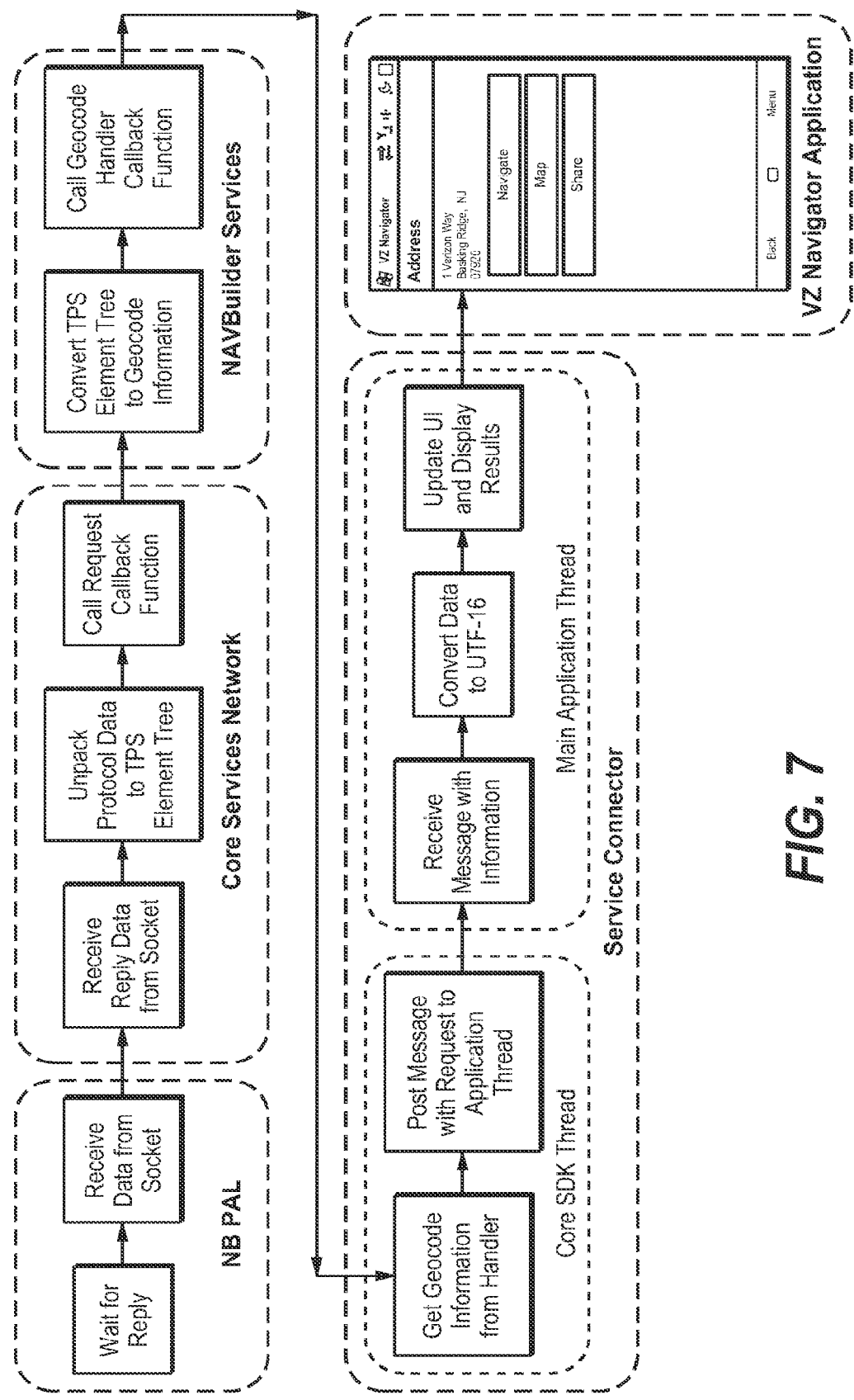
FIG. 7 shows additional sample navigation interaction, in accordance with the principles of the present invention.

FIG. 7 shows additional sample navigation interaction, in accordance with the principles of the present invention.

Figure 8B:
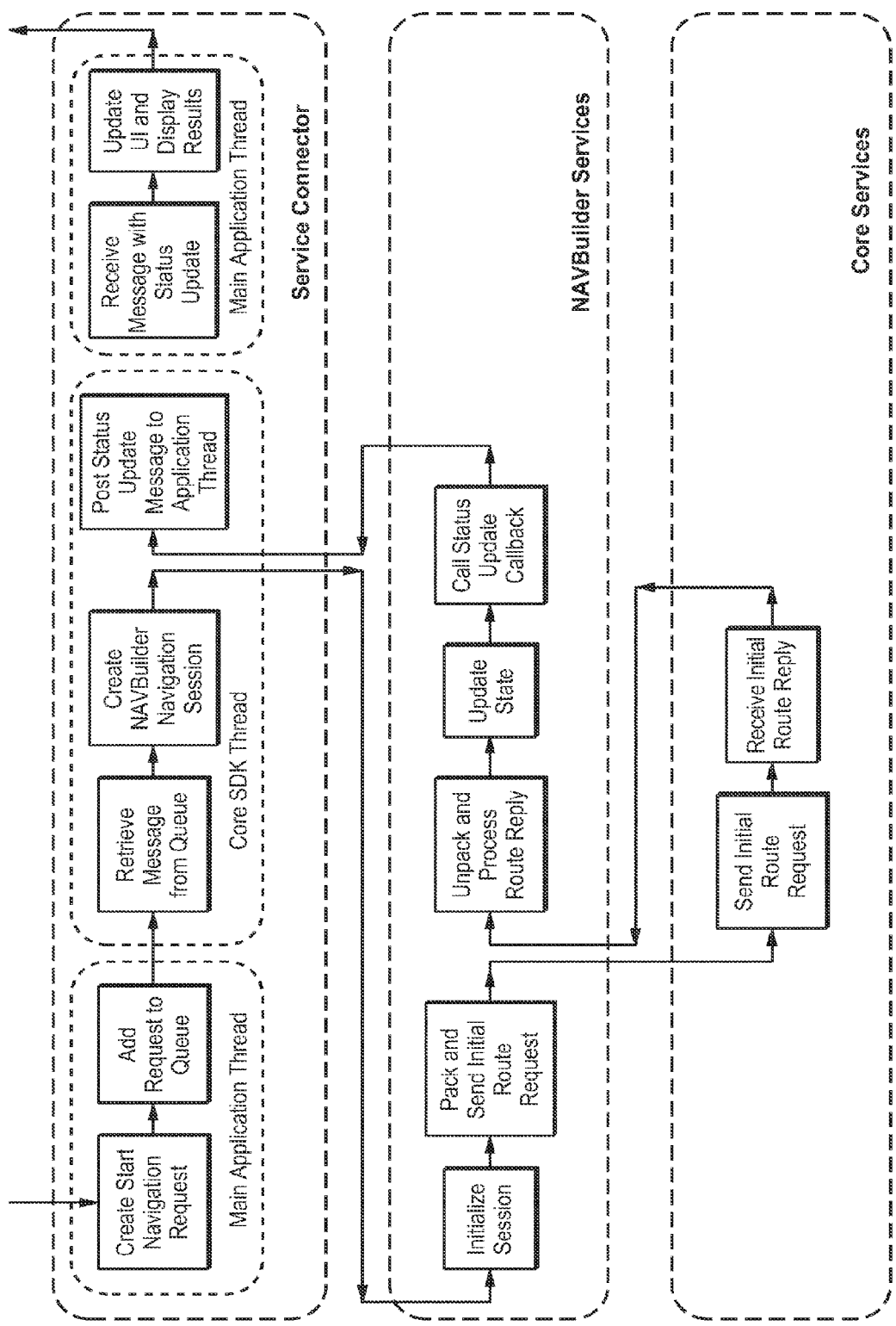
FIG. 8 shows yet additional sample navigation interaction, in accordance with the principles of the present invention.

FIG. 8 shows yet additional sample navigation interaction, in accordance with the principles of the present invention.

Figure 9:
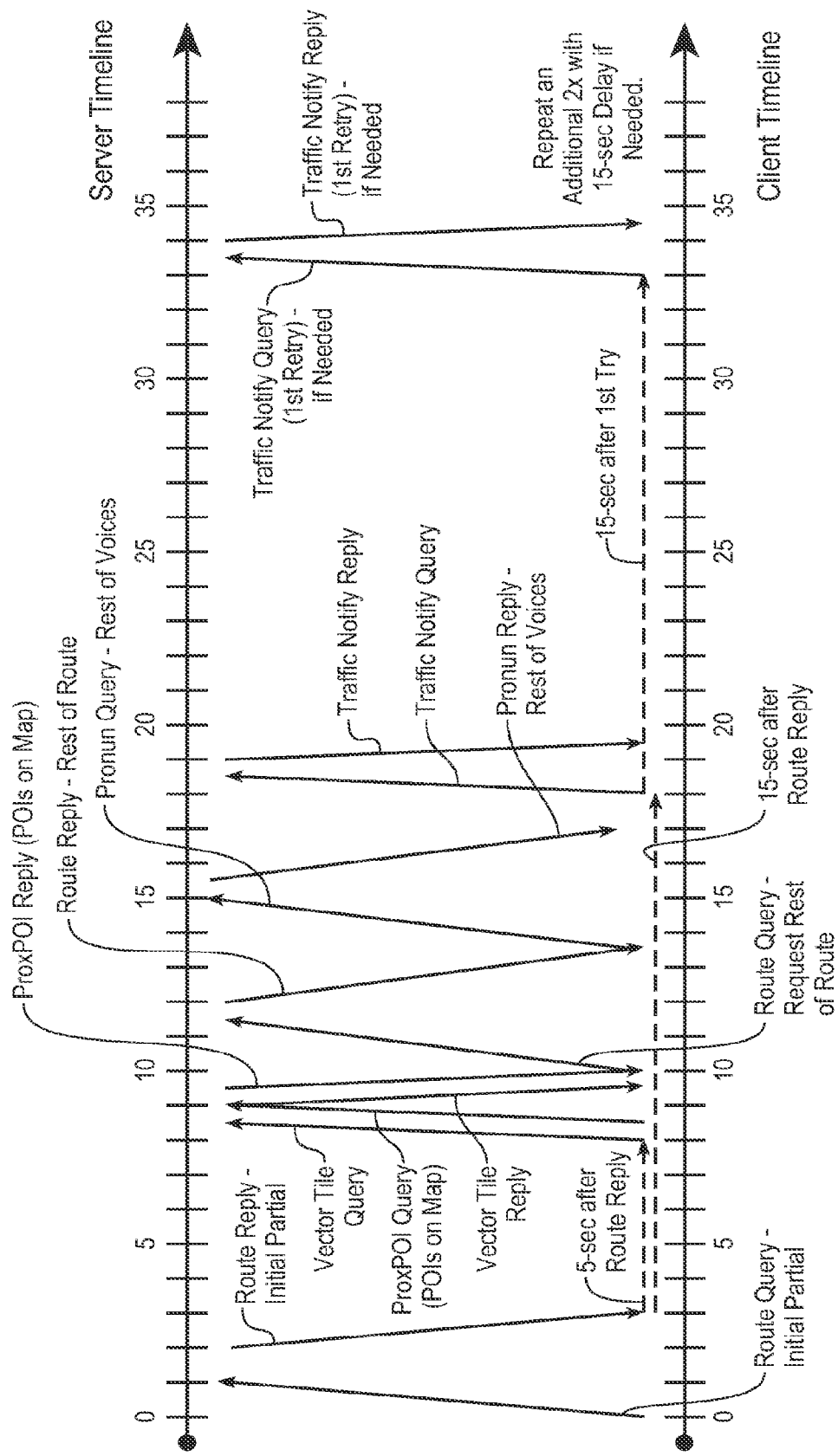
FIG. 9 shows an exemplary navigation session timeline, in accordance with the principles of the present invention.

FIG. 9 shows an exemplary navigation session timeline, in accordance with the principles of the present invention.

Figure 10A:
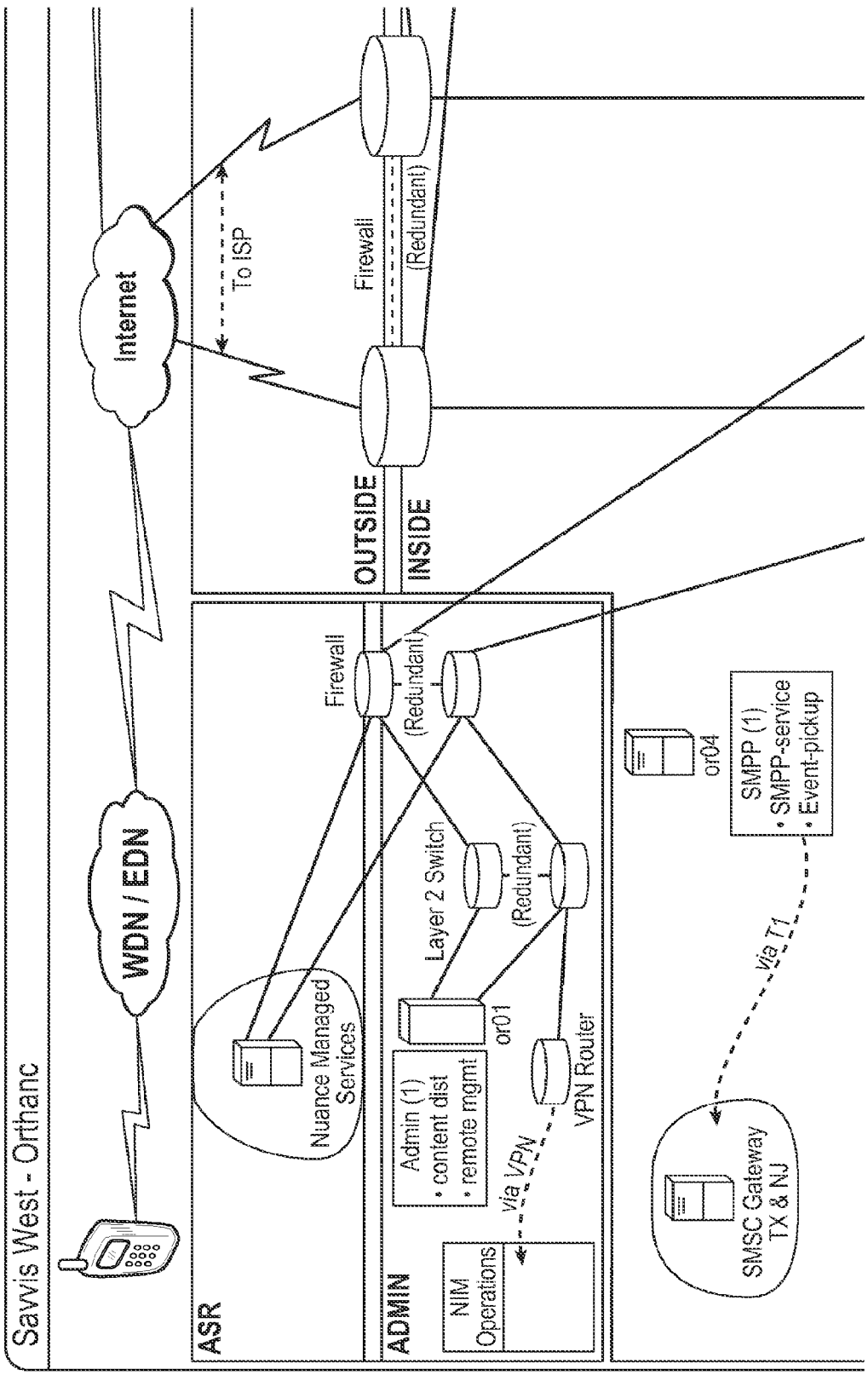
FIG. 10 shows a high level architecture diagram, in accordance with the principles of the present invention.
Figure 10C:
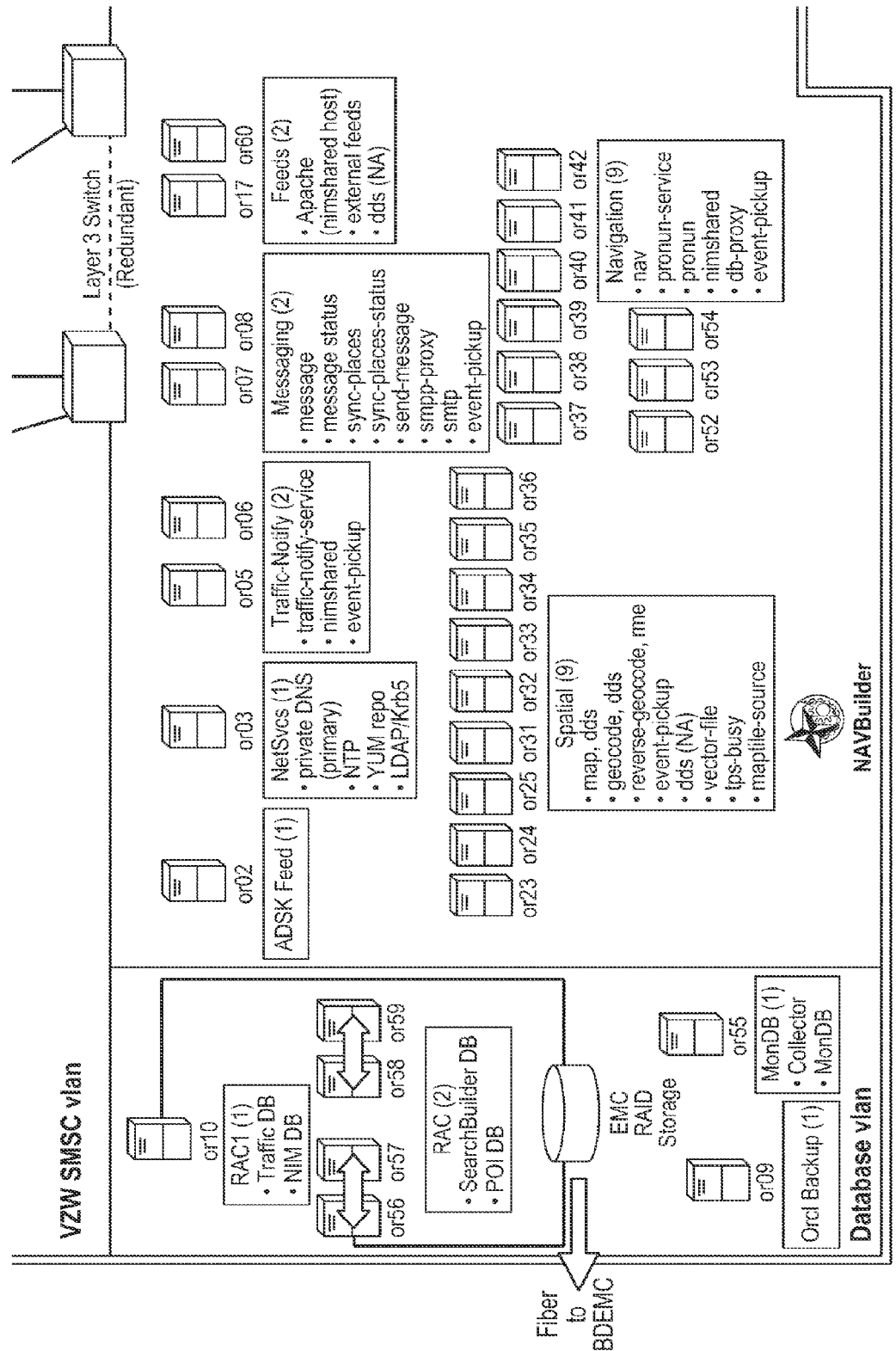
Figure 10D:
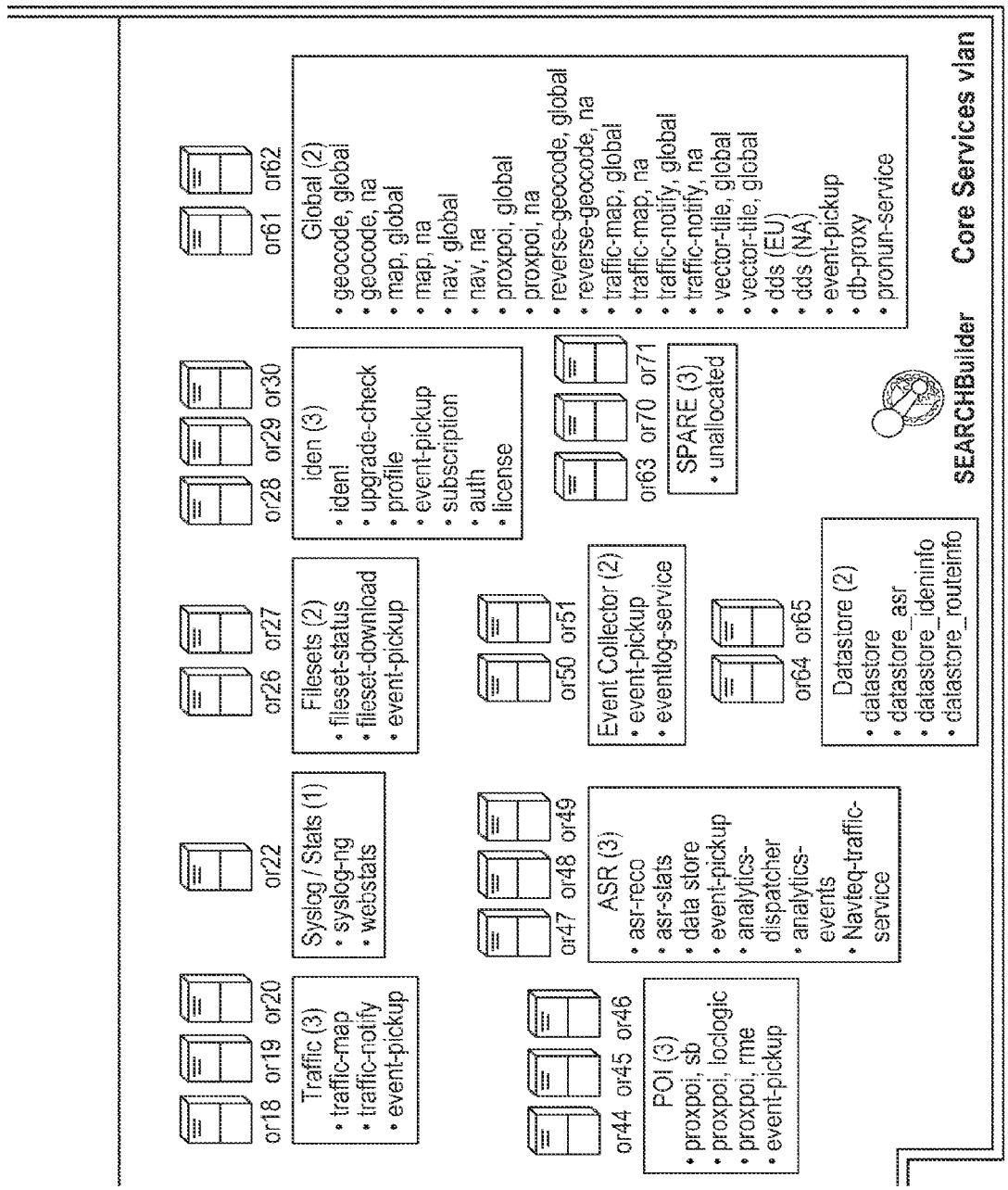

FIG. 10 shows a high level architecture diagram, in accordance with the principles of the present invention.

Figure 11:
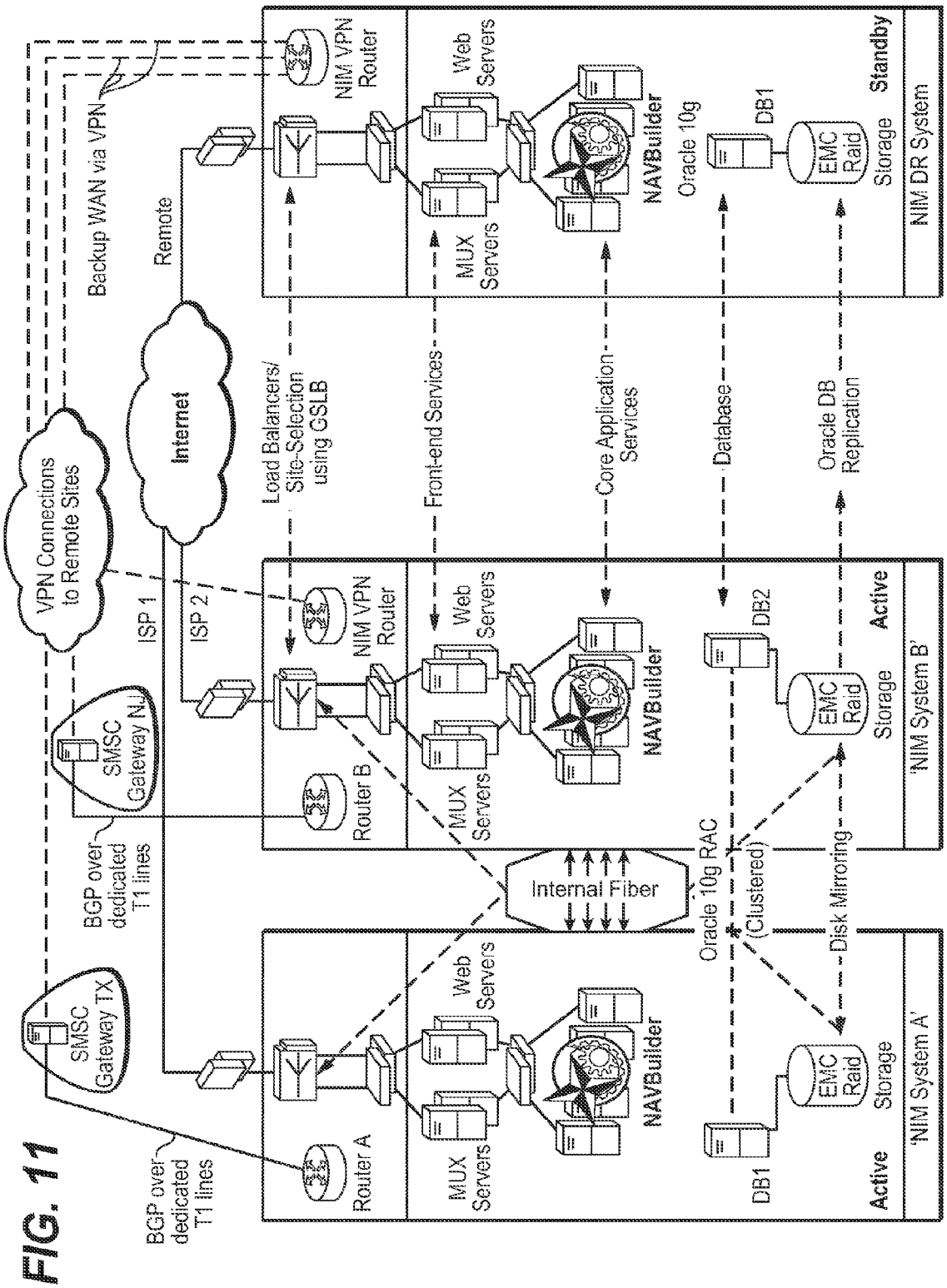
FIG. 11 depicts redundancy of the NAVBuilder, in accordance with the principles of the present invention.

FIG. 11 depicts redundancy of the NAVBuilder, in accordance with the principles of the present invention.

Figure 12:
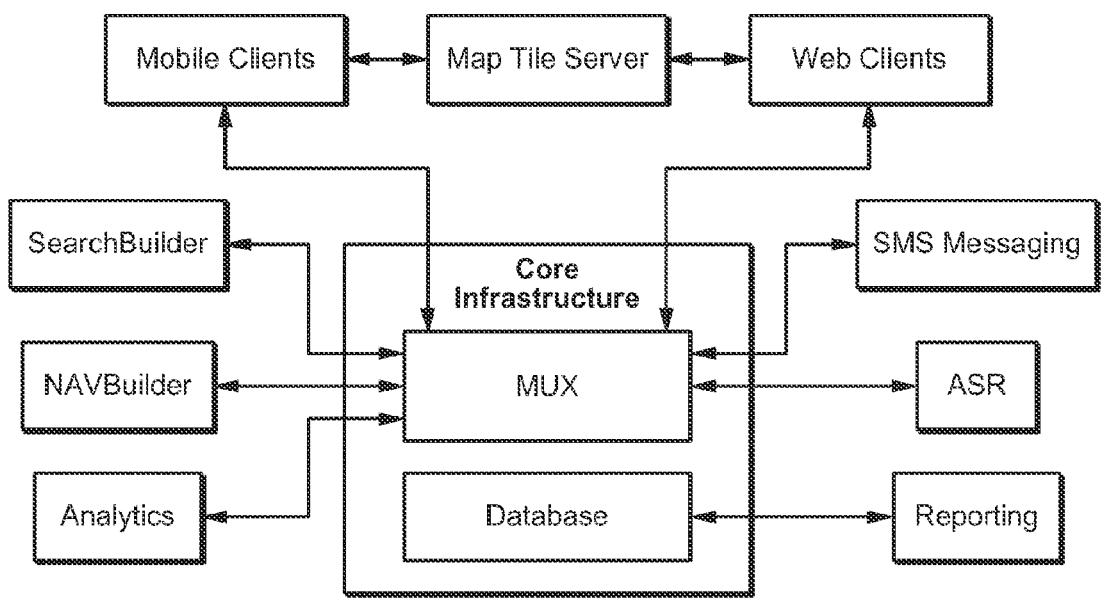
FIG. 12 shows another high level architecture diagram, in accordance with the principles of the present invention.

FIG. 12 shows another high level architecture diagram, in accordance with the principles of the present invention.

Figure 13:
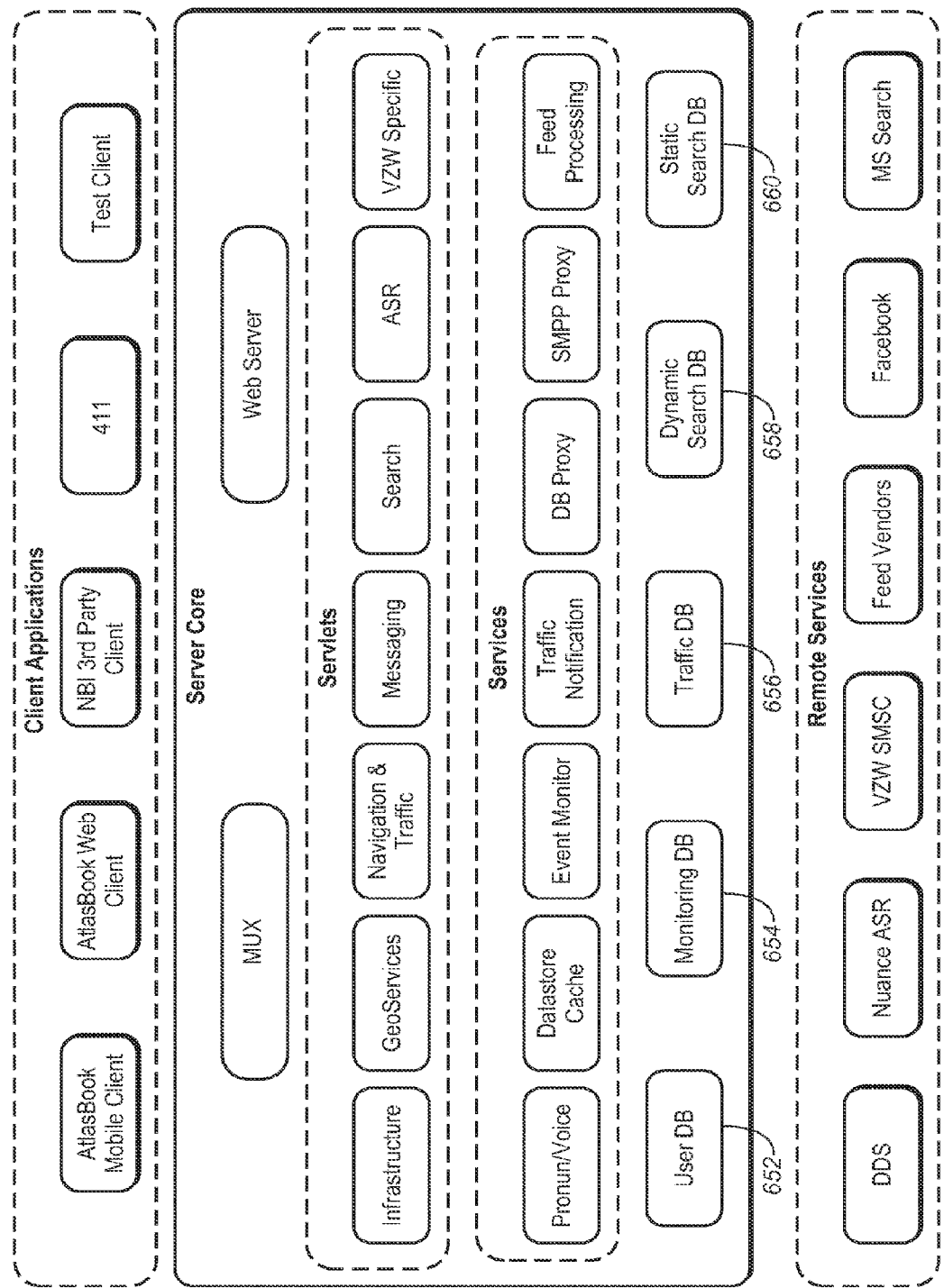
FIG. 13 shows exemplary server components, in accordance with the principles of the present invention.

FIG. 13 shows exemplary server components, in accordance with the principles of the present invention.

Server components include Servlets, Master Servlet, Mux, and Service. The servlets are stateless worker processes that handle a single client request. The master servlet spawns worker processes to handle a specific type of client request (e.g., geocode). It manages servlet workers, providing both request queuing and flow-control. The Mux is an Edge gateway that manages client connections on a public listening port. It is responsible for routing messages between servlets and clients: 'target name'|<message payload>. It provides a simple round-robin load balancing for distributed servlet workers. Service is any program running on the server that is not a servlet or mux.

Multiple database schemas use an assortment of technologies, including Oracle Real Application Clusters (RAC), PostgreSQL, and SQLite. Caching is distributed to reduce load to the backend databases. A DB-proxy decouples critical features from potential database latency. A "DB Bypass Mode" provides fault-tolerance.

The user database 652 shown in FIG. 13 maps client devices to user preferences; supports recent/favorite places, messaging (e.g., Place Messages and MotD/OTA/EULA), and subscriptions.

The monitoring database 654 shown in FIG. 13 uses PostgreSQL. Every client transaction is recorded. Server metrics are recorded, and it is used for business intelligence. It preferably has operational alerting capabilities, and permits non-intrusive debugging of run-time anomalies.

The traffic database 656 shown in FIG. 13 tracks in-progress client navigations for notification. In the disclosed embodiment the traffic database 656 contains no traffic flow data, or traffic incident data.

A SearchBuilder database 658 shown in FIG. 13 stores dynamic search data, e.g., movies, events, weather, gas prices, traffic incident data, etc. It is used for a combination of spatial and temporal-spatial searches.

The points-of-interest database 660 shown in FIG. 13 stores point-of-interest search data. It uses stored-procedures for executing complex query logic. It supports queries that have both spatial and non-spatial criteria, and preferably supports customer-provided content (e.g., "custom-poi"). Some services may use a subset of this data via SQLite.

With respect to the databases 652-660, some data is accessible from any cluster running core services. Some data is read-only. This is generated by offline processes, such as vendor feeds or quarterly NAVTEQ updates. It can be stored as one copy per cluster or one copy per machine for reliability and performance. On the other hand, some data is write-only. This is transient, replaceable data, and 'precious' data that cannot be (easily) regenerated.

Figure 14:
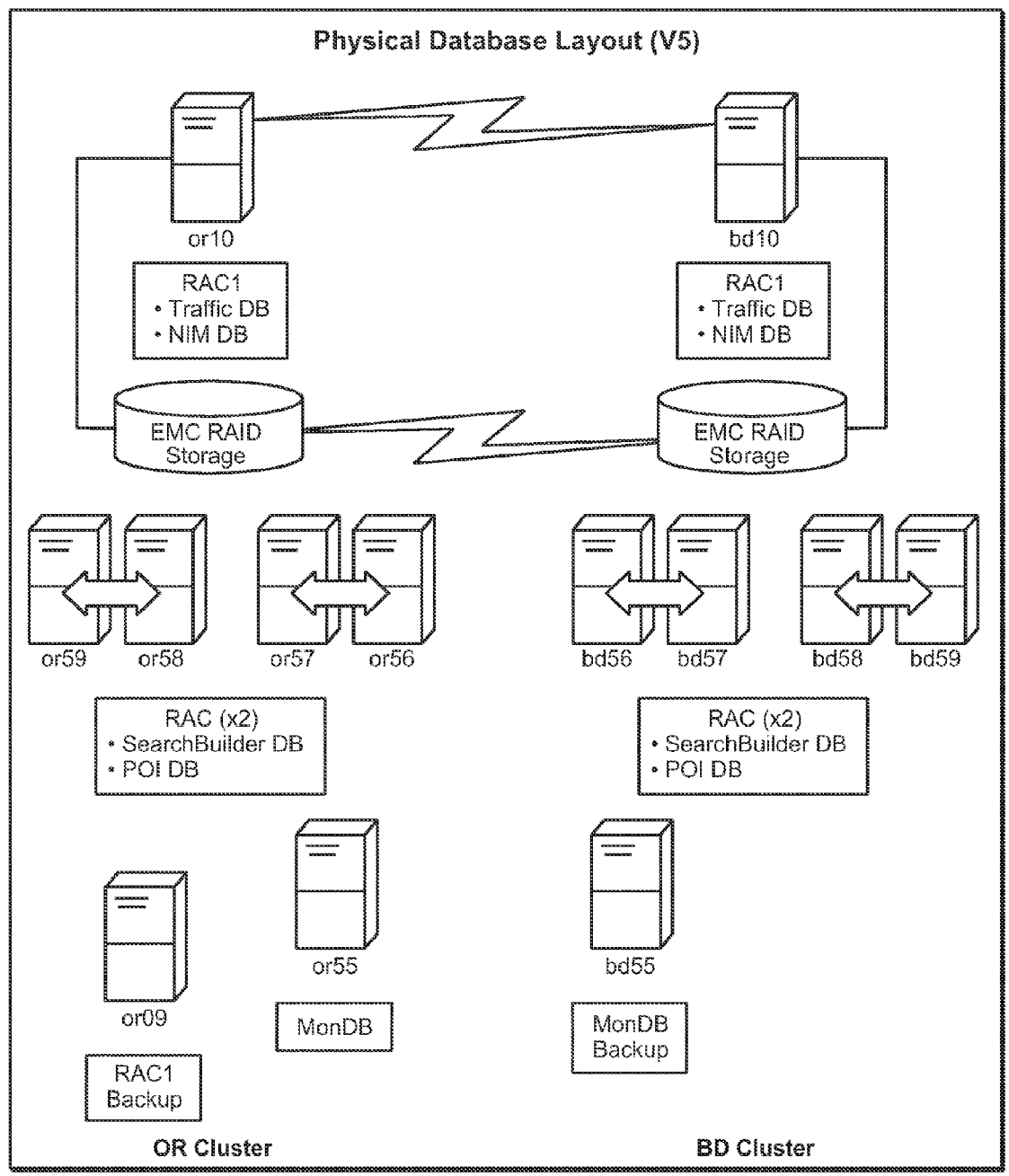
FIG. 14 shows an exemplary physical database layout, in accordance with the principles of the present invention.

FIG. 14 shows an exemplary physical database layout, in accordance with the principles of the present invention.

The databases include global data, e.g., the User DB 652 and the Traffic DB 656. The databases use Oracle 10g RAC for fault-tolerance, and EMC storage (RAID10).

Read-only databases include, e.g., the SearchBuilder DB 658, and the POI DB 660. Read-only databases use multiple instances of Oracle 10g, each one a copy of the others. SQLite uses one instance per machine that runs services using the read-only data.

Write-only databases include, e.g., the Monitoring DB 654. They use PostgreSQL. They store precious data immediately, from the service in which it was generated. For example, first time user, billing events, etc. It can be aggregated later via offline processes. For heavy data loads, write throughput is critical. They reduce disk I/O and apply 'best-effort' semantics for non-critical data.

Figure 15:
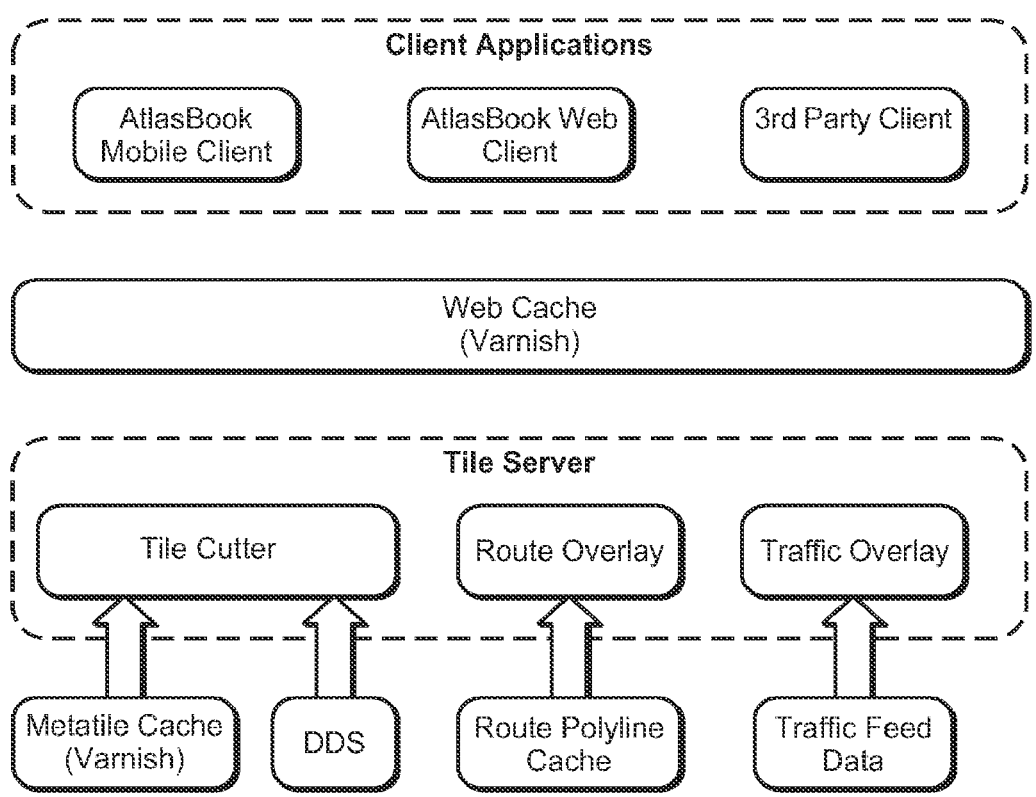
FIG. 15 shows a Map Tile Server, in accordance with the principles of the present invention.

FIG. 15 shows a Map Tile Server, in accordance with the principles of the present invention.

Dynamic map tile generation functions with no pre-rendered web tiles. It uses multi-tiered caching. Tiles are served immediately from front-end cache (if implemented). Metatile caching increases reusability of tiles without having to redraw the map. A Pre-caching tool loads popular areas during service initialization. A RESTful web-based interface increases accessibility.

Figures 16, 16A:
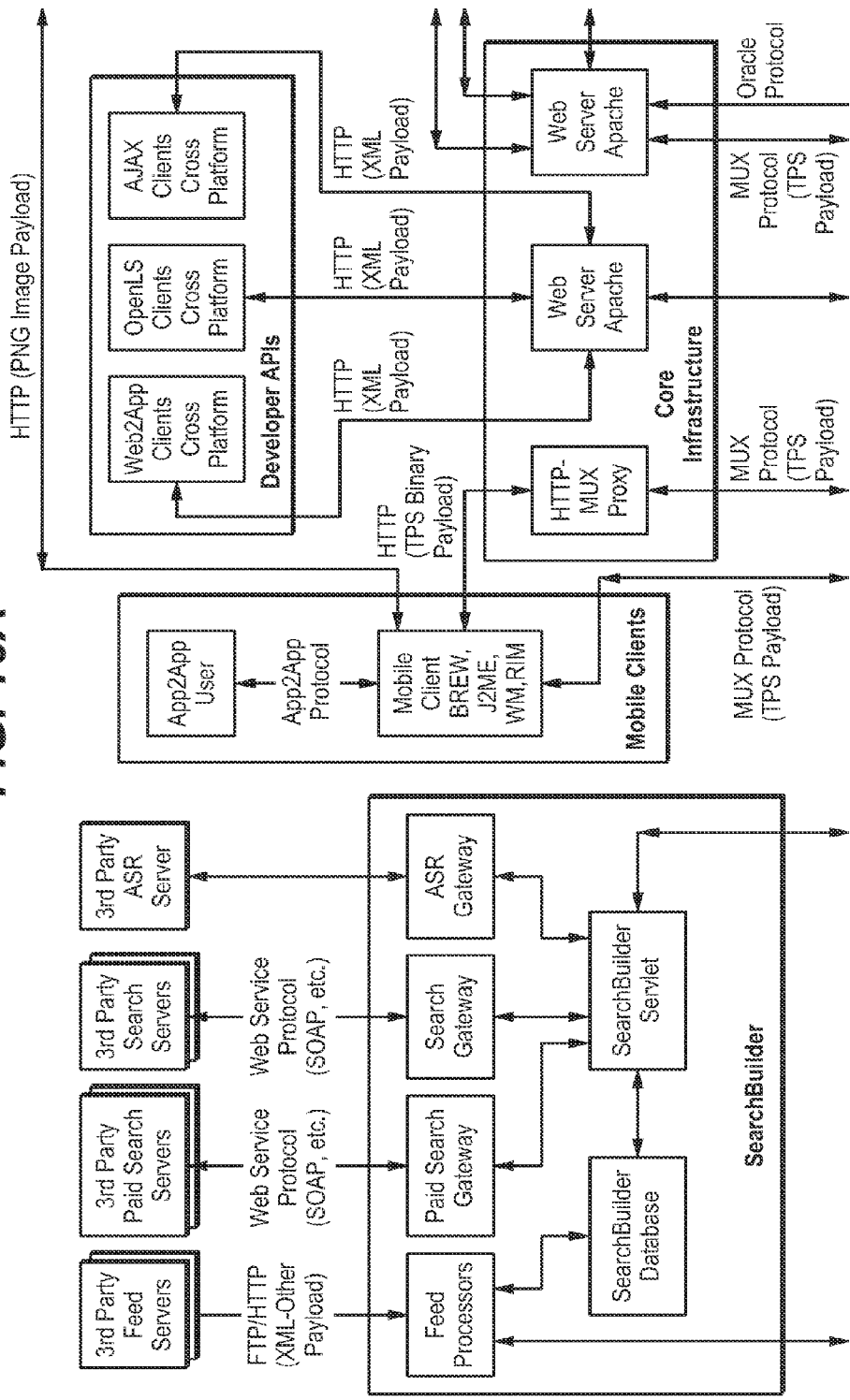
FIG. 16 shows detailed architecture, in accordance with the principles of the present invention.
Figure 16B:
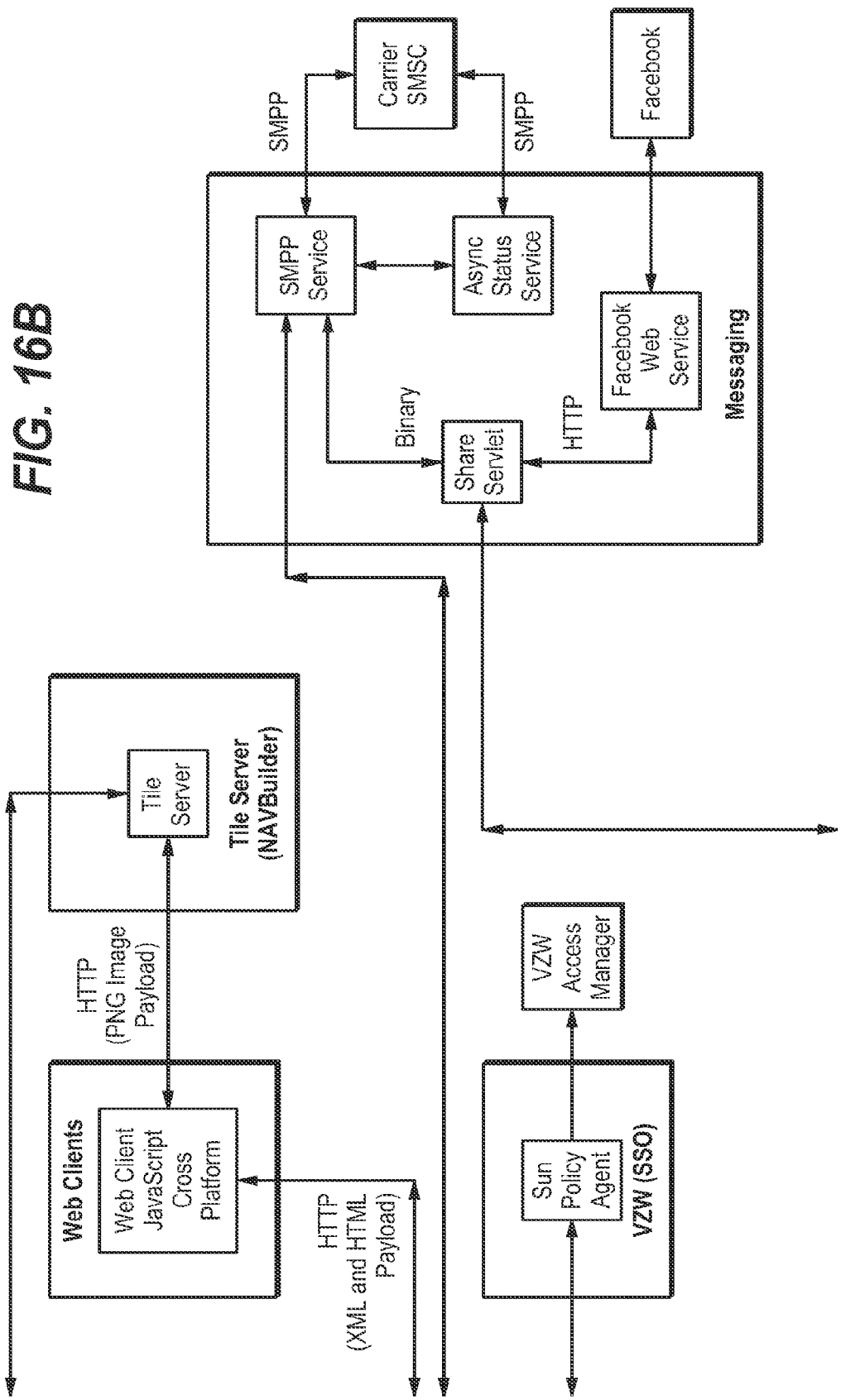
Figure 16C:
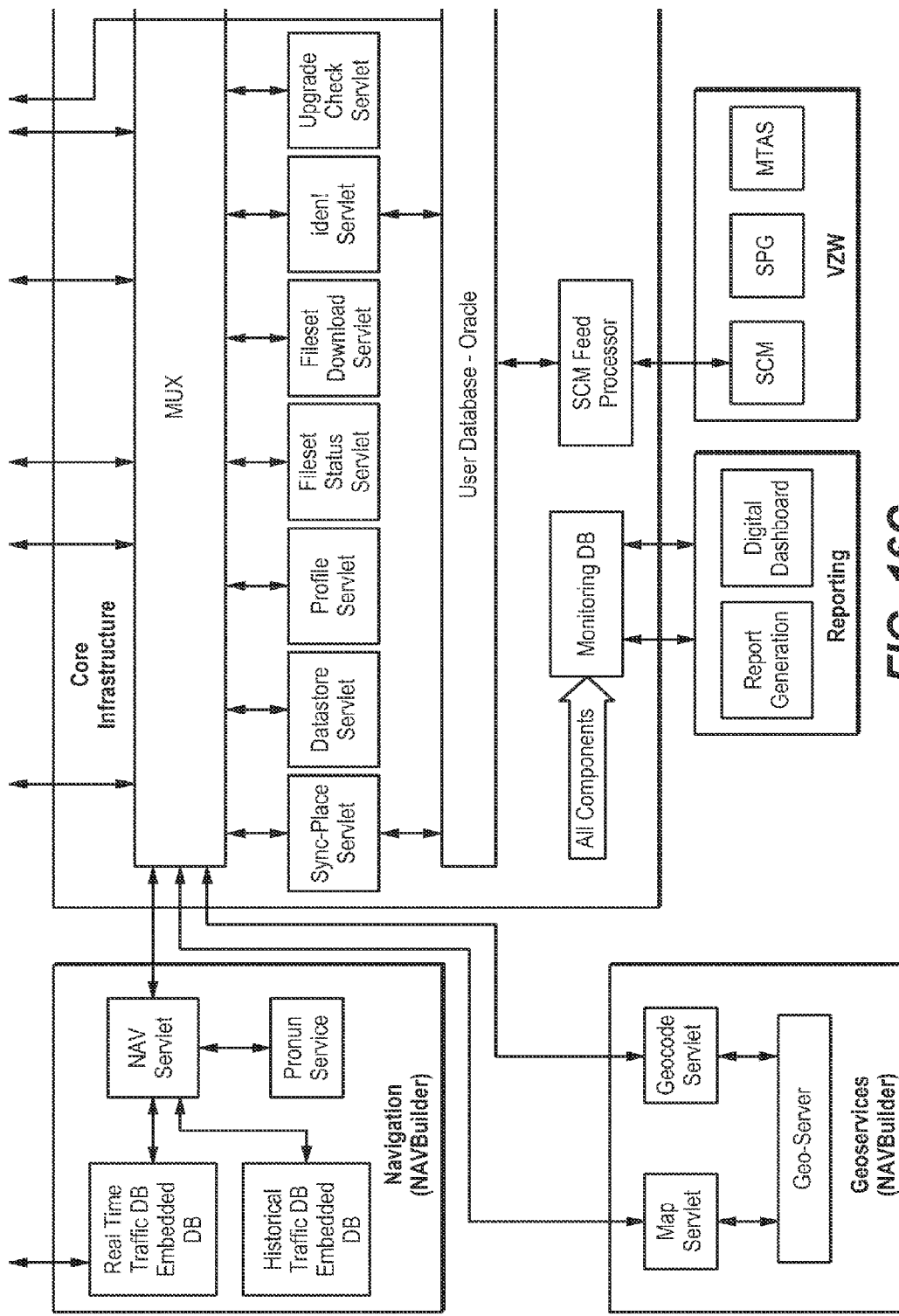
Figure 16D:
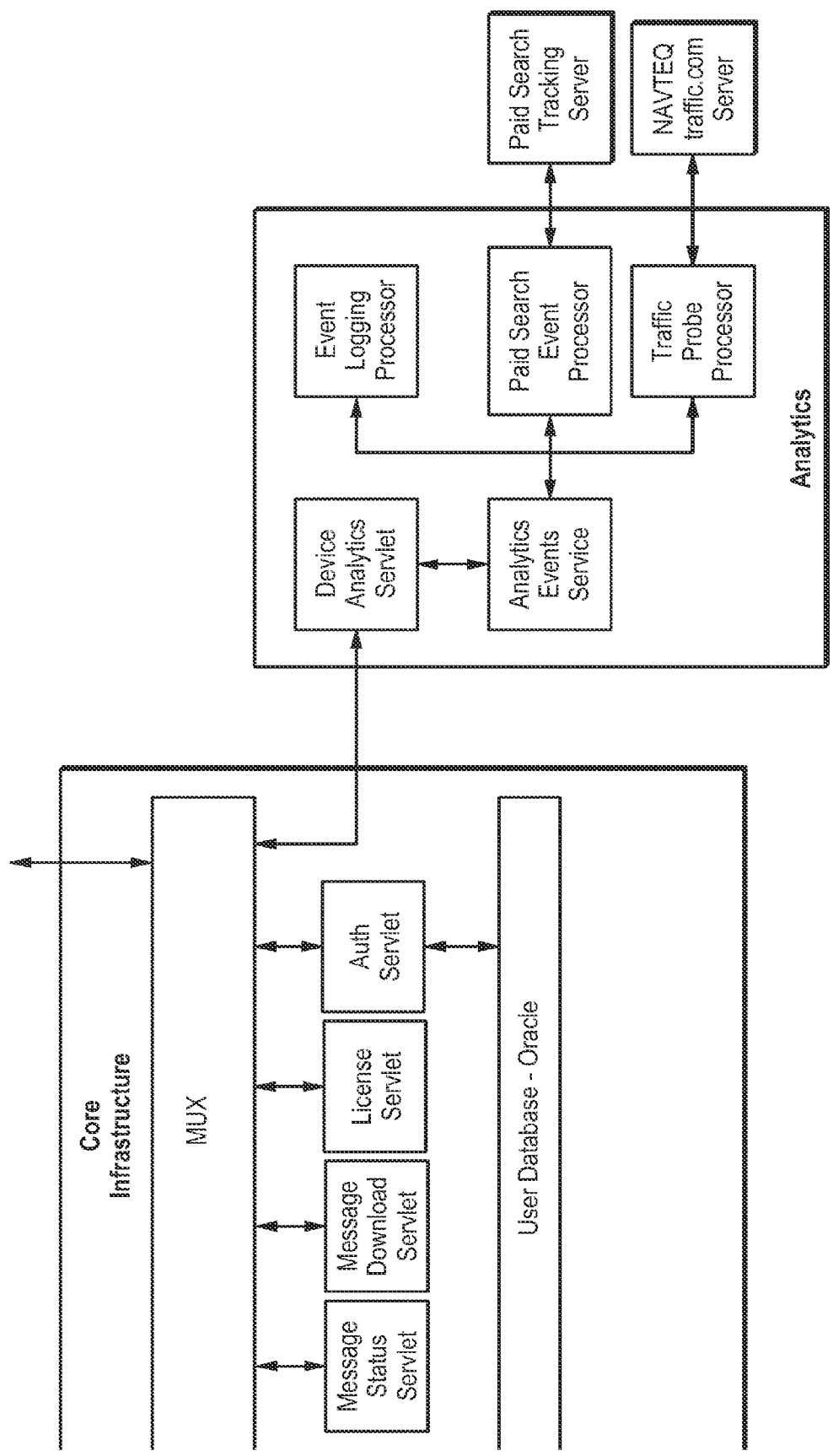

FIG. 16 shows detailed architecture, in accordance with the principles of the present invention.

AtlasBook User Interface (UI) FLOW

Figure 17:
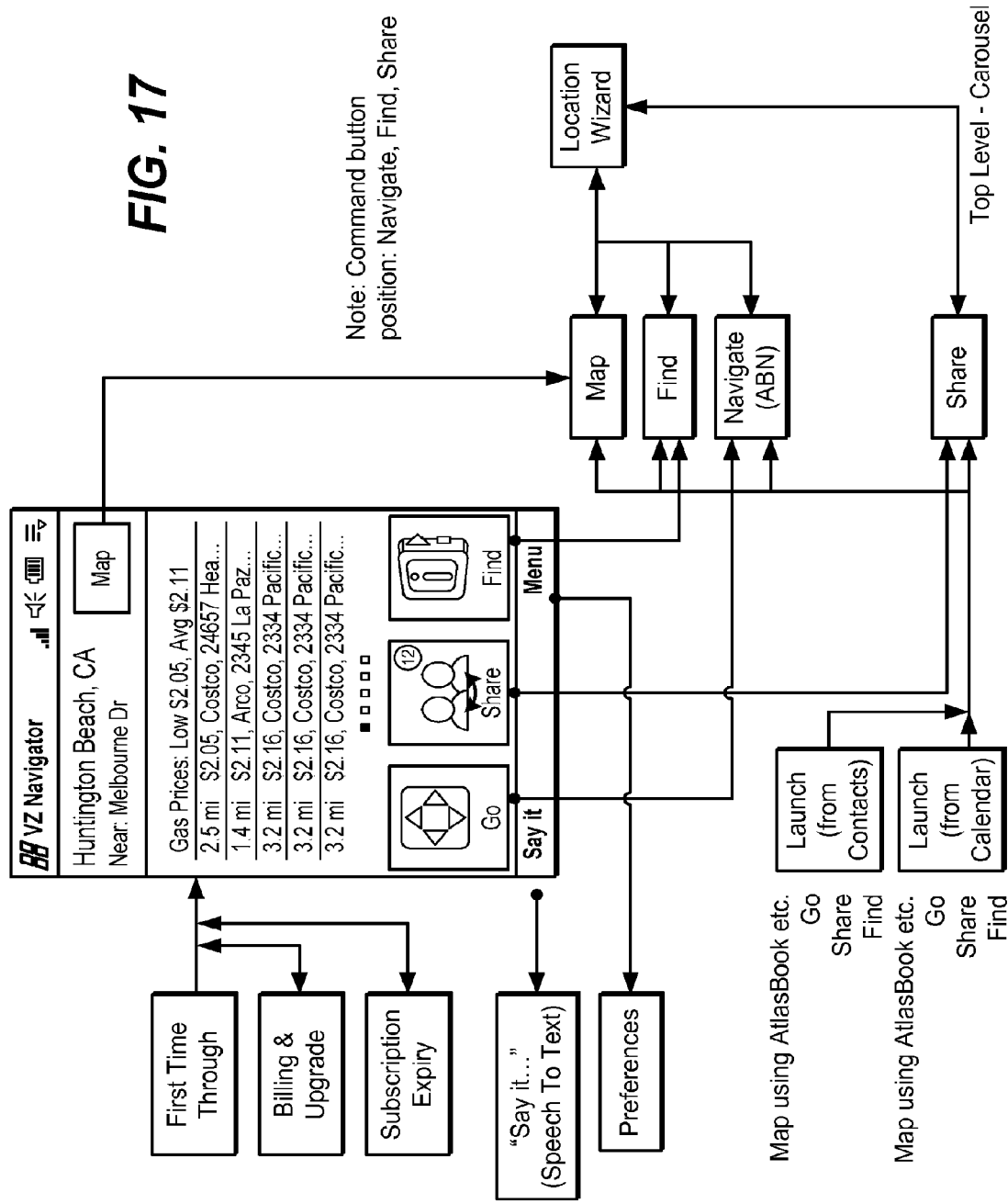
FIG. 17 shows a top level user interface flow for the carousel, in accordance with the principles of the present invention.

FIG. 17 shows a top level user interface flow for the carousel, in accordance with the principles of the present invention.

Figures 18, 18A:
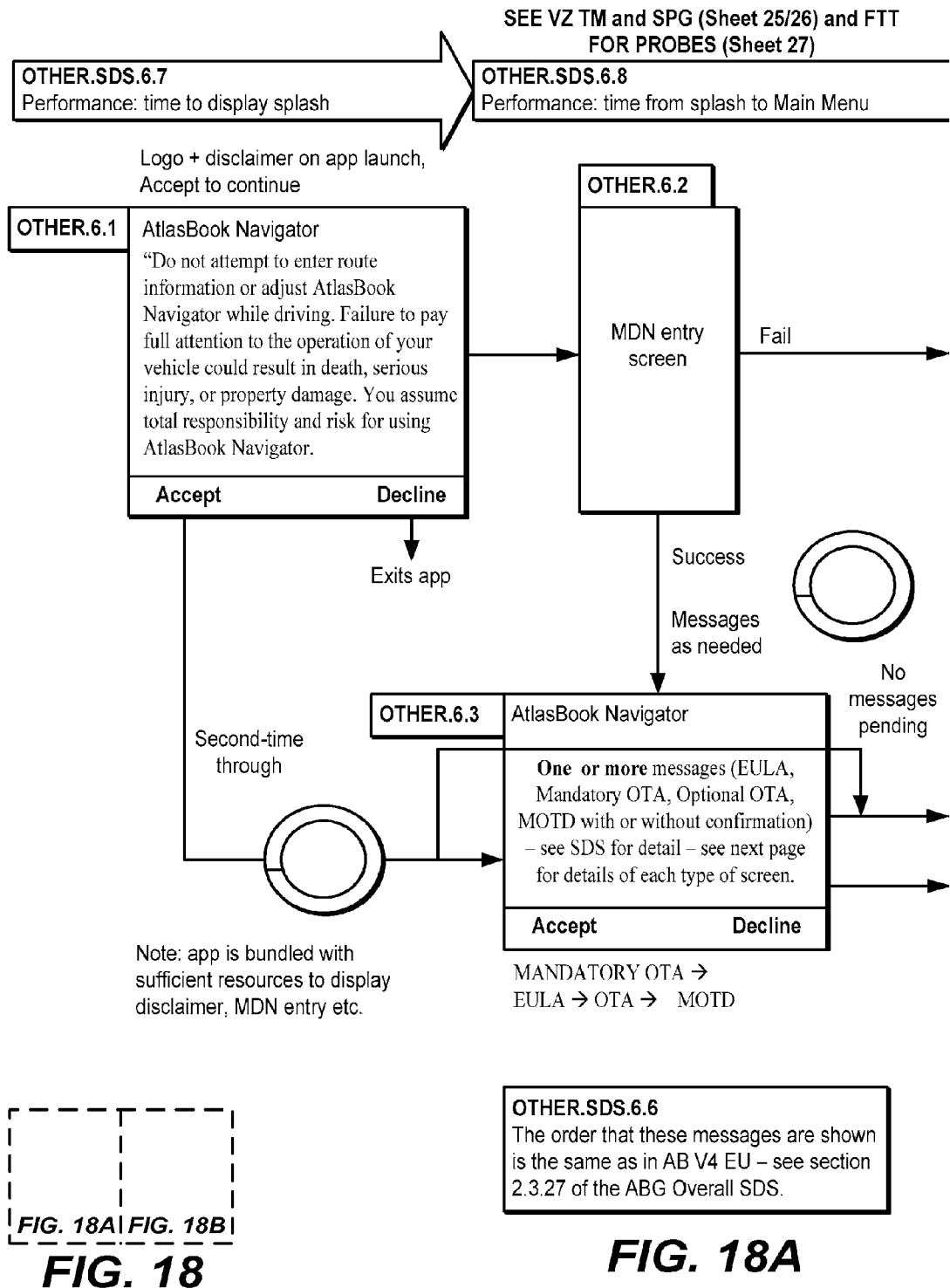
FIG. 18 shows exemplary user interface flow for application launch of the AtlasBook Navigator, in accordance with the principles of the present invention.
Figure 18B:
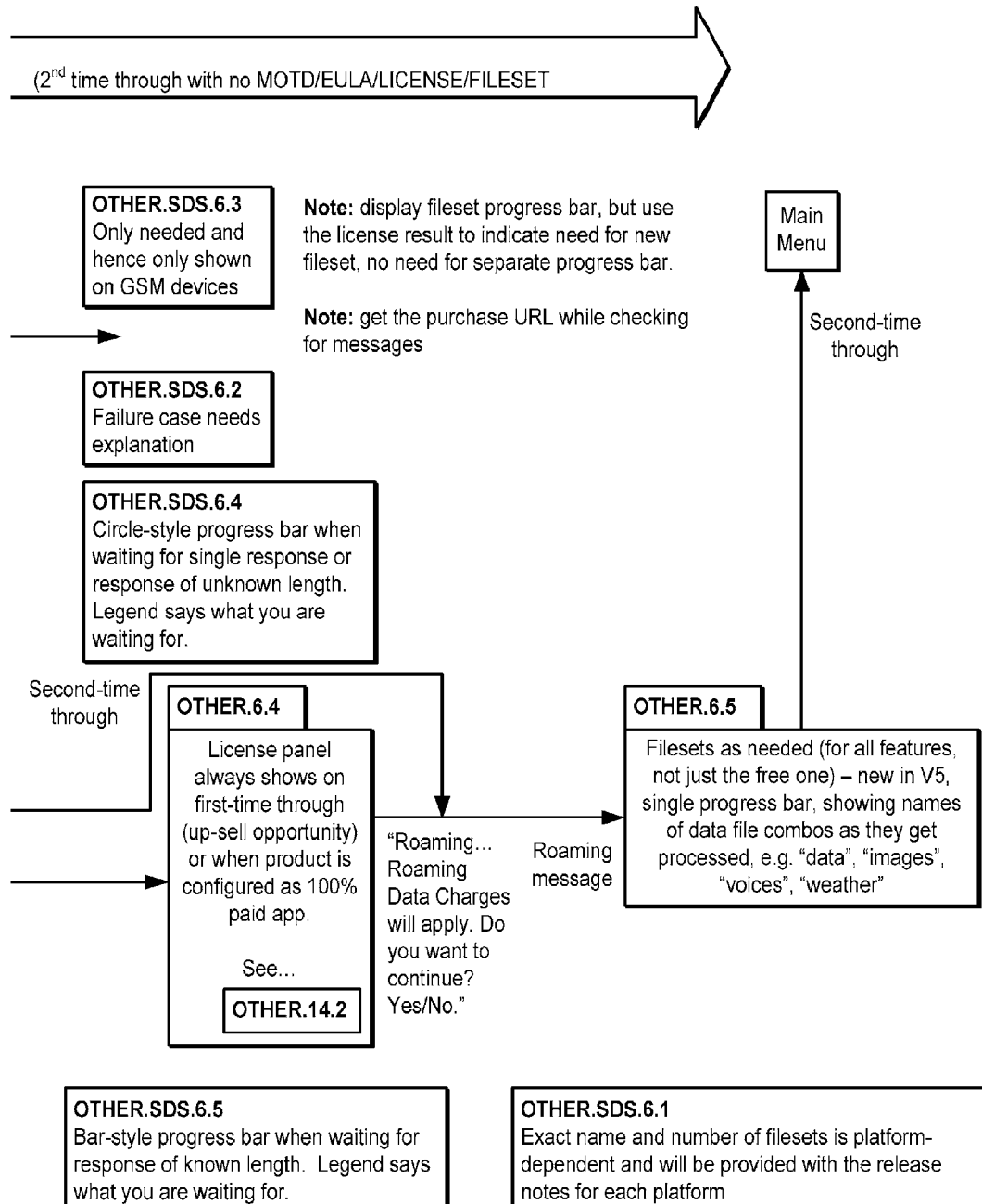

FIG. 18 shows exemplary user interface flow for application launch of the AtlasBook Navigator, in accordance with the principles of the present invention.

Figure 19A:
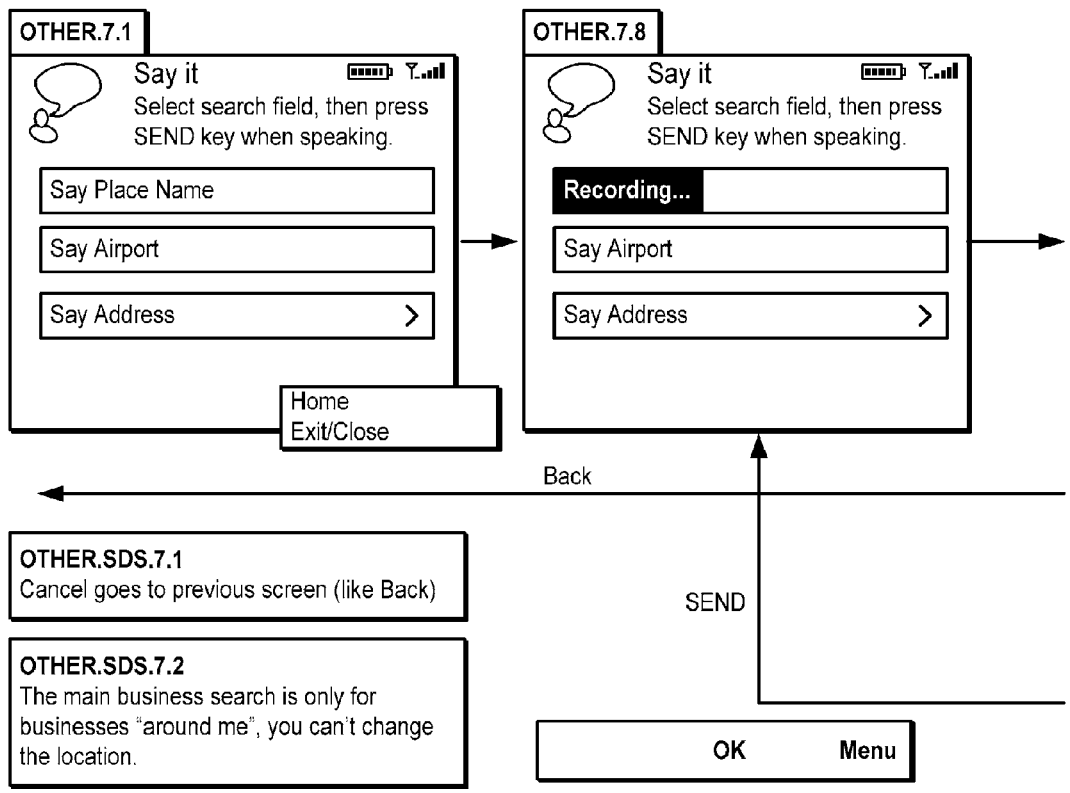
FIG. 19 shows exemplary user interface flow for voice recognition for Say Business, in accordance with the principles of the present invention.
Figure 19:
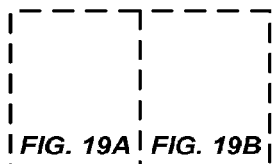
Figure 19B:
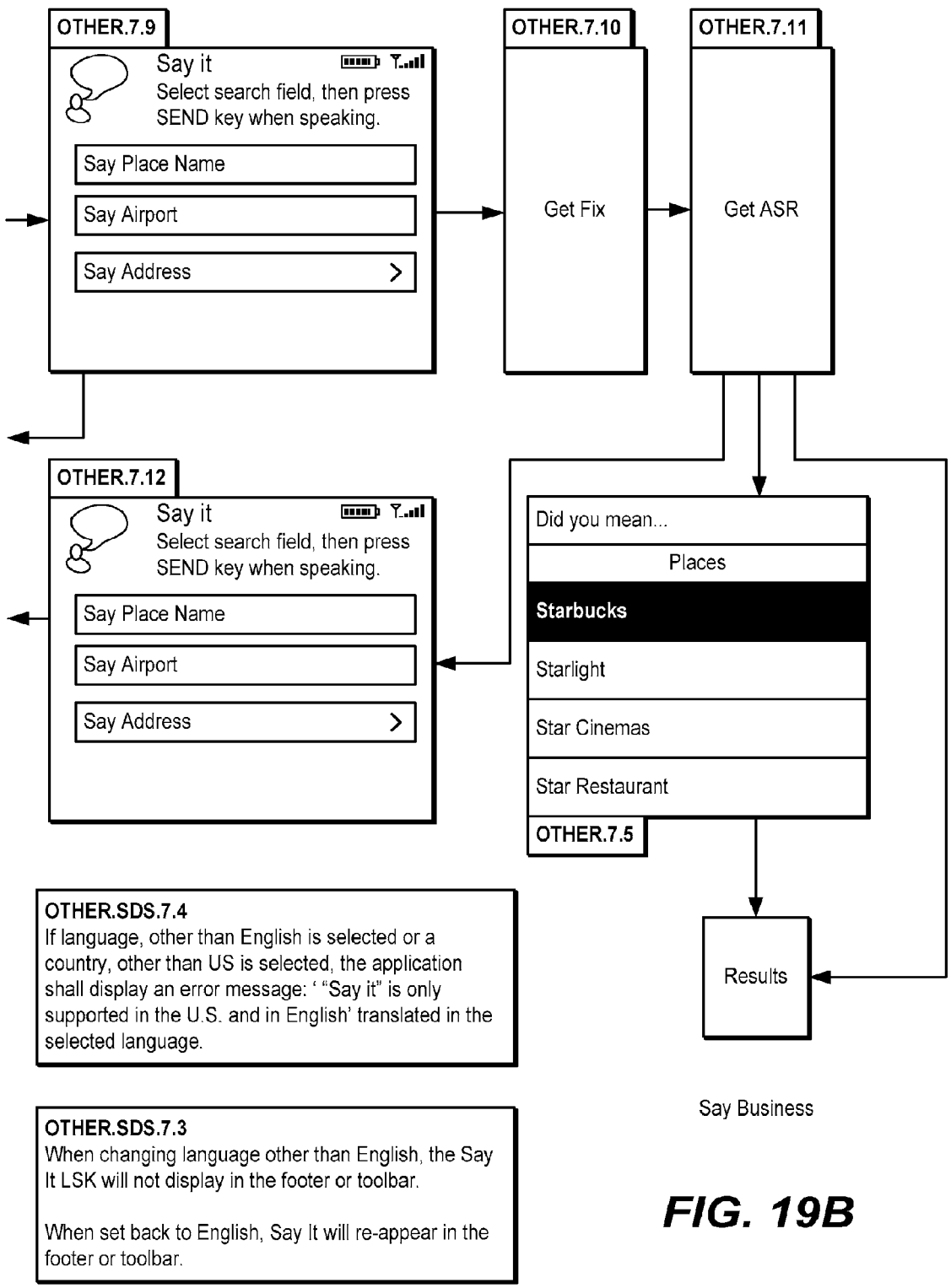

FIG. 19 shows exemplary user interface flow for voice recognition for Say Business, in accordance with the principles of the present invention.

Figure 20B:
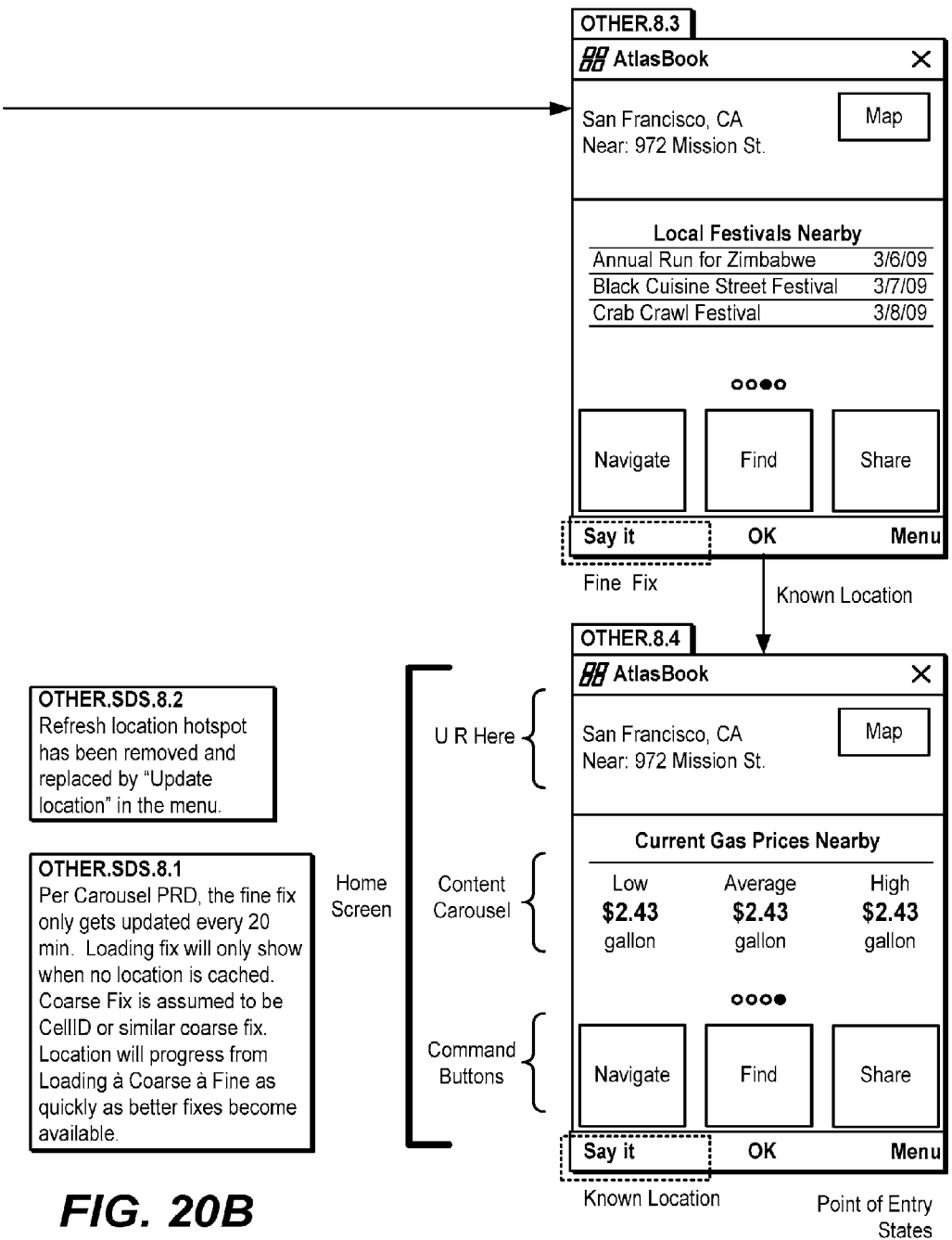
FIG. 20 shows point of entry states, in accordance with the principles of the present invention.

FIG. 20 shows point of entry states, in accordance with the principles of the present invention.

Figure 21:
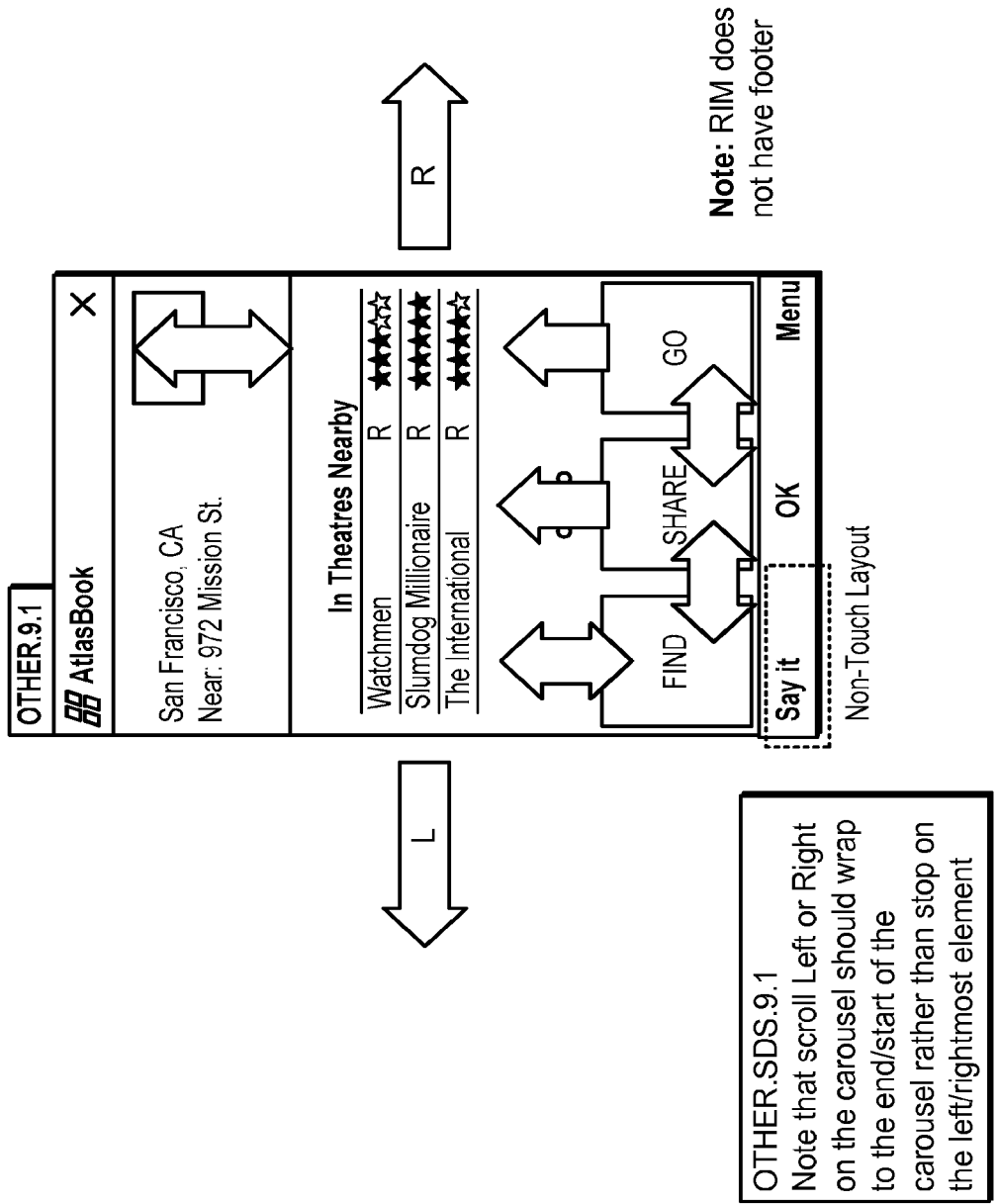
FIG. 21 shows point of entry states for non-touch screen embodiments, in accordance with the principles of the present invention.

FIG. 21 shows point of entry states for non-touch screen embodiments, in accordance with the principles of the present invention.

Figures 22, 22A:
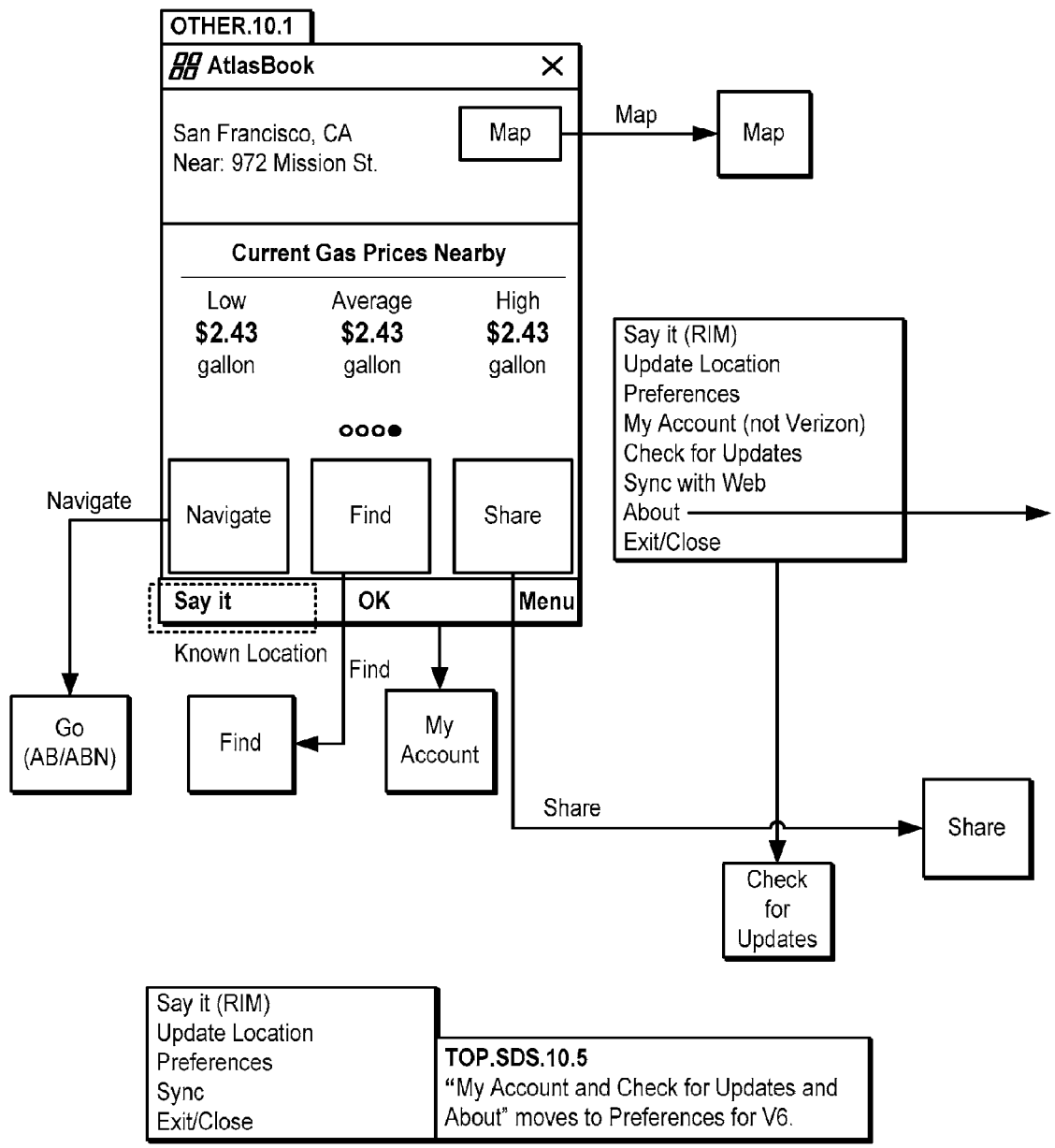
FIG. 22 shows exemplary user interface flow for landing zones, in accordance with the principles of the present invention.
Figure 22B:
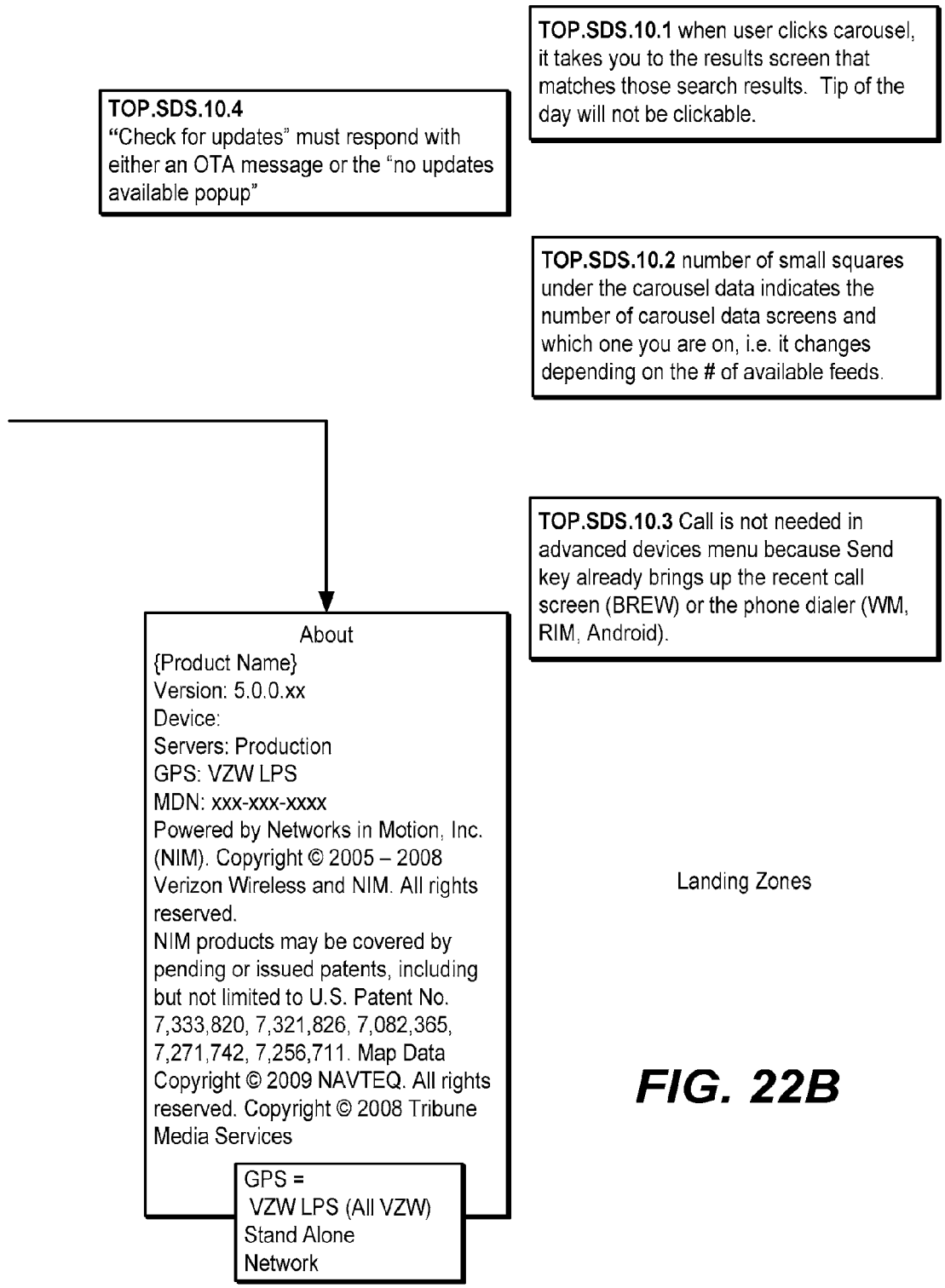

FIG. 22 shows exemplary user interface flow for landing zones, in accordance with the principles of the present invention.

Figure 23A:
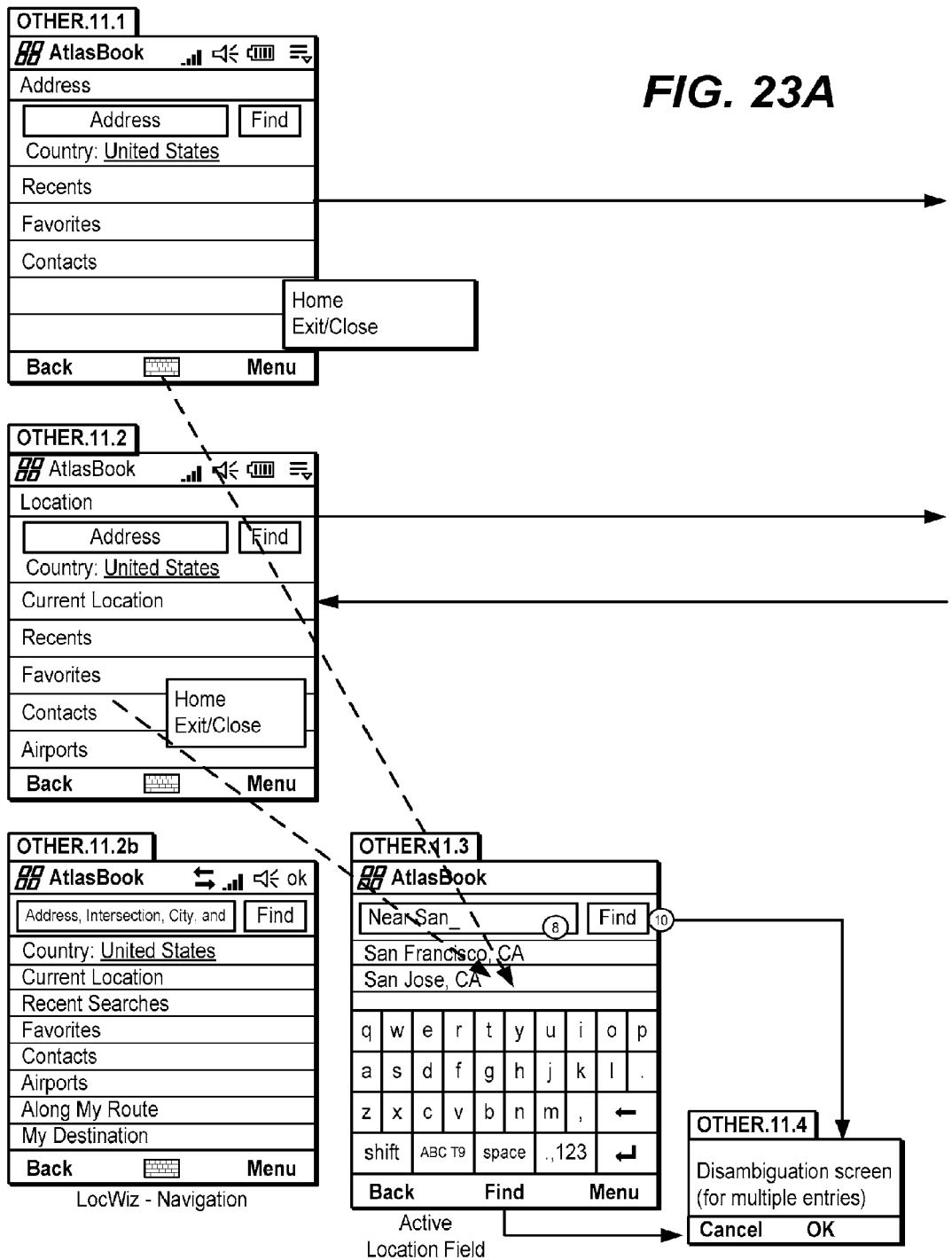
FIG. 23 shows exemplary user interface top level flow for location selection, in accordance with the principles of the present invention.

FIG. 23 shows exemplary user interface top level flow for location selection, in accordance with the principles of the present invention.

Figure 24A:
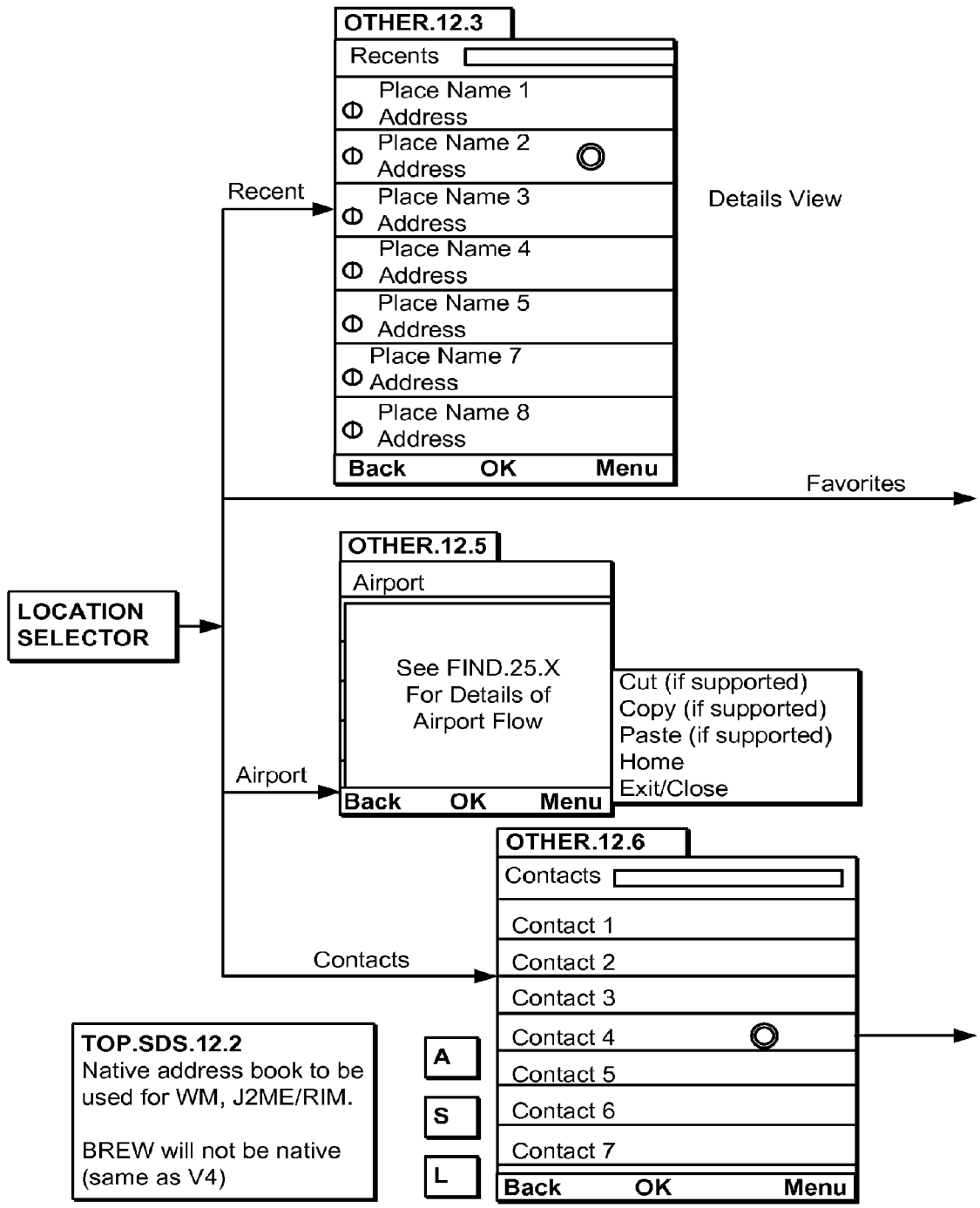
FIG. 24 shows exemplary user interface flow for non-touch screen location wizard operation, in accordance with the principles of the present invention.

FIG. 24 shows exemplary user interface flow for non-touch screen location wizard operation, in accordance with the principles of the present invention.

Figure 25A:
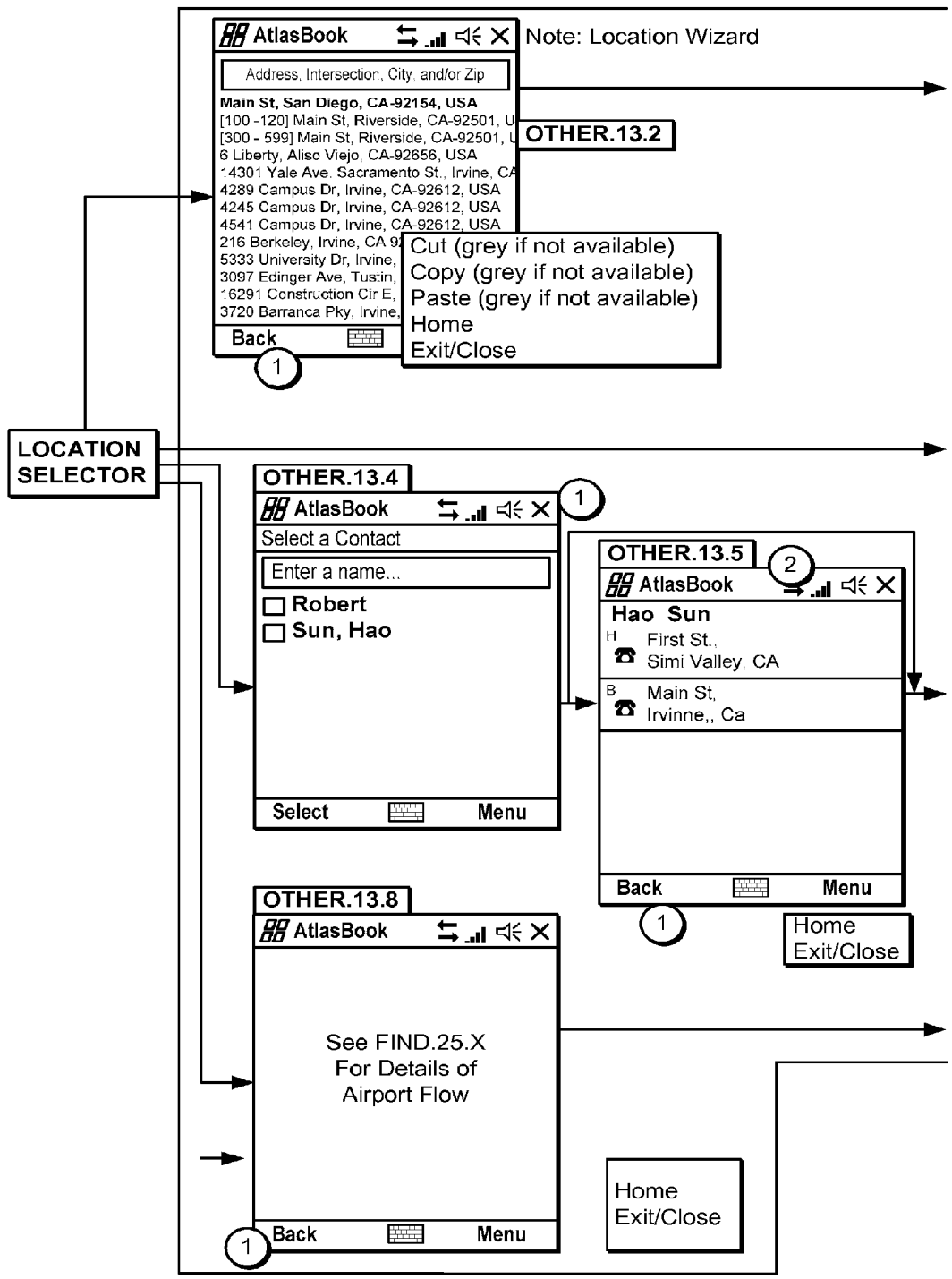
FIG. 25 shows exemplary user interface flow for touch screen location wizard operation, in accordance with the principles of the present invention.
Figures 25, 25B:
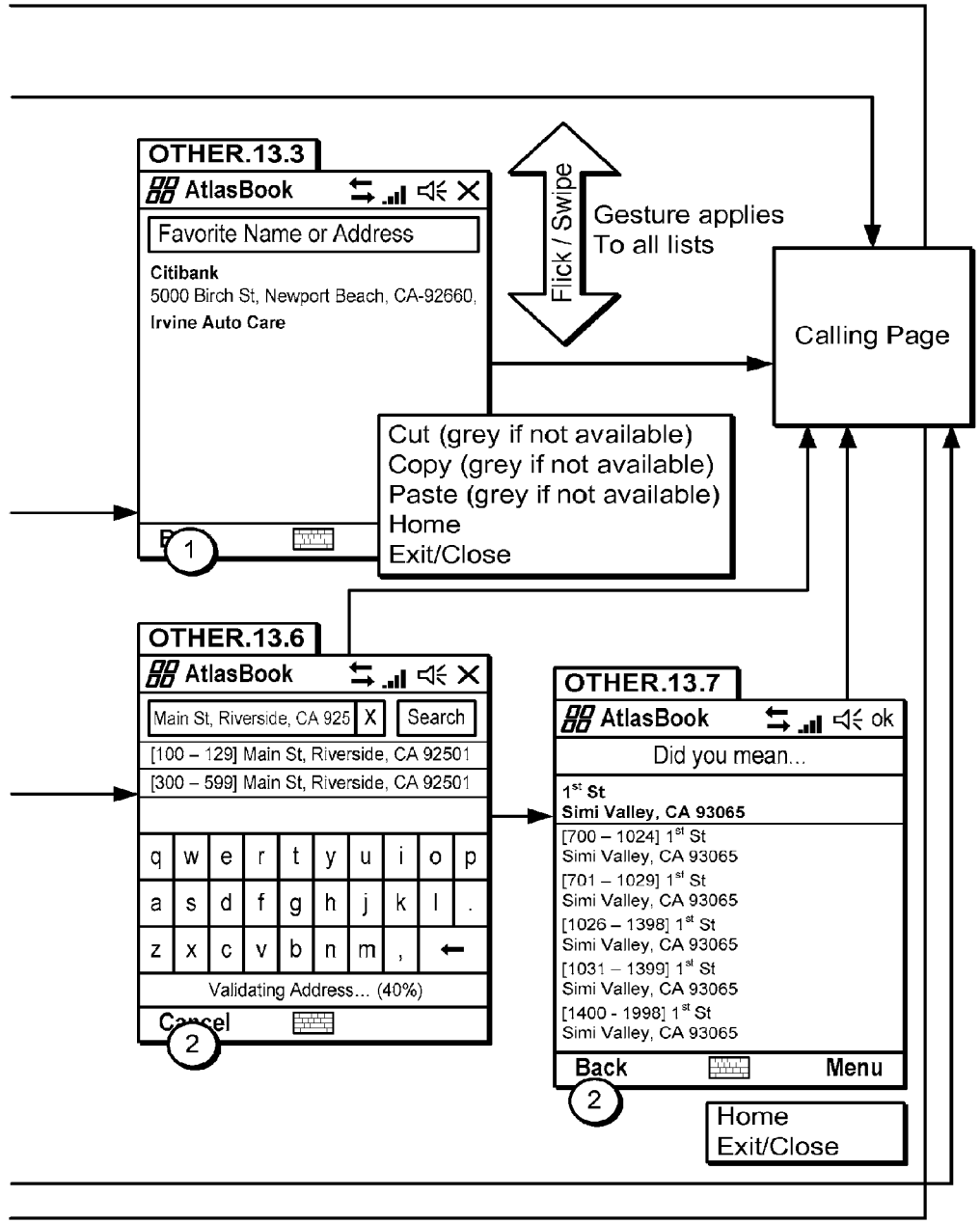

FIG. 25 shows exemplary user interface flow for touch screen location wizard operation, in accordance with the principles of the present invention.

Figure 26A:
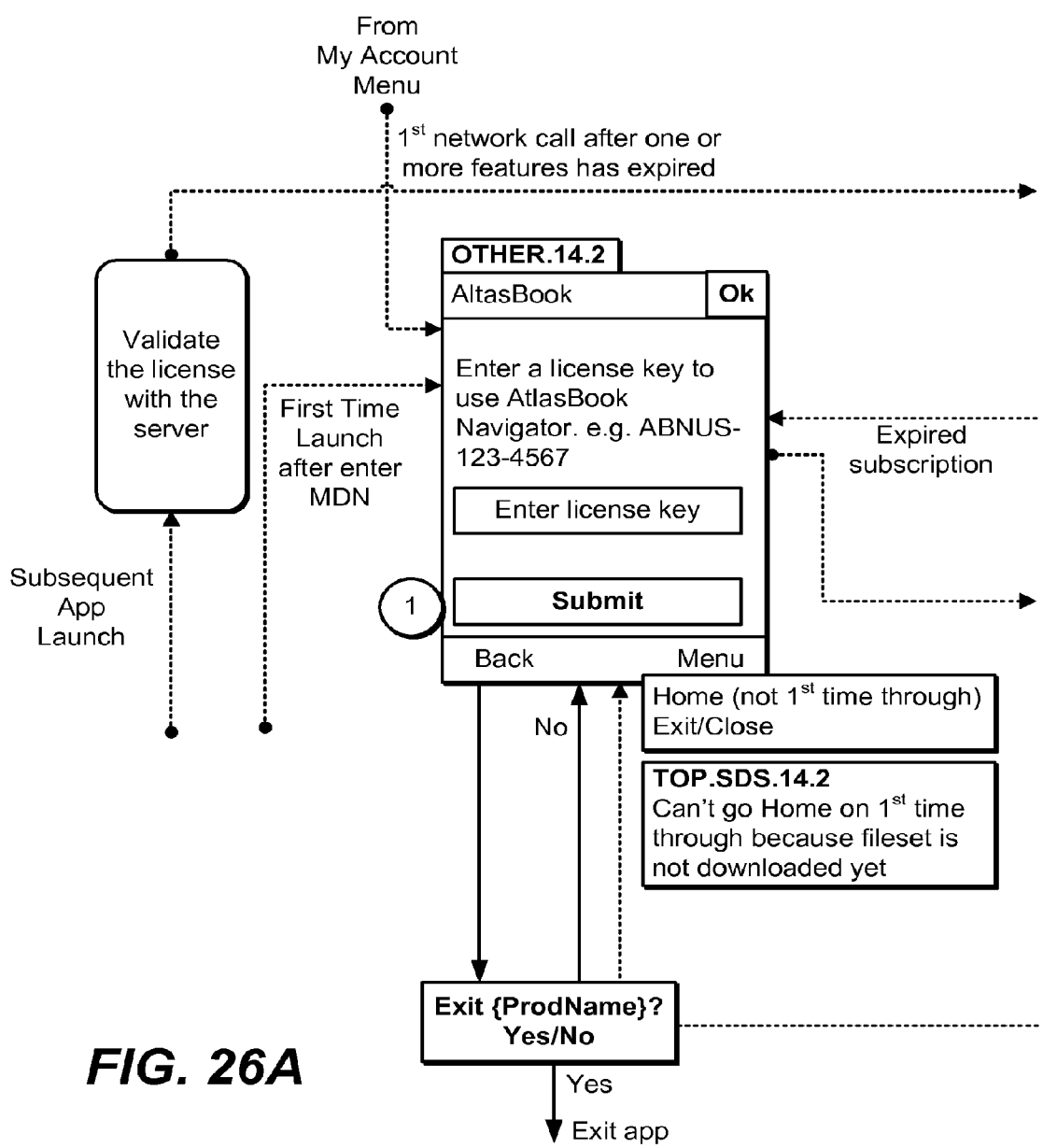
FIG. 26 shows exemplary user interface flow for entry and acceptance of a license key, in accordance with the principles of the present invention.
Figure 26B:
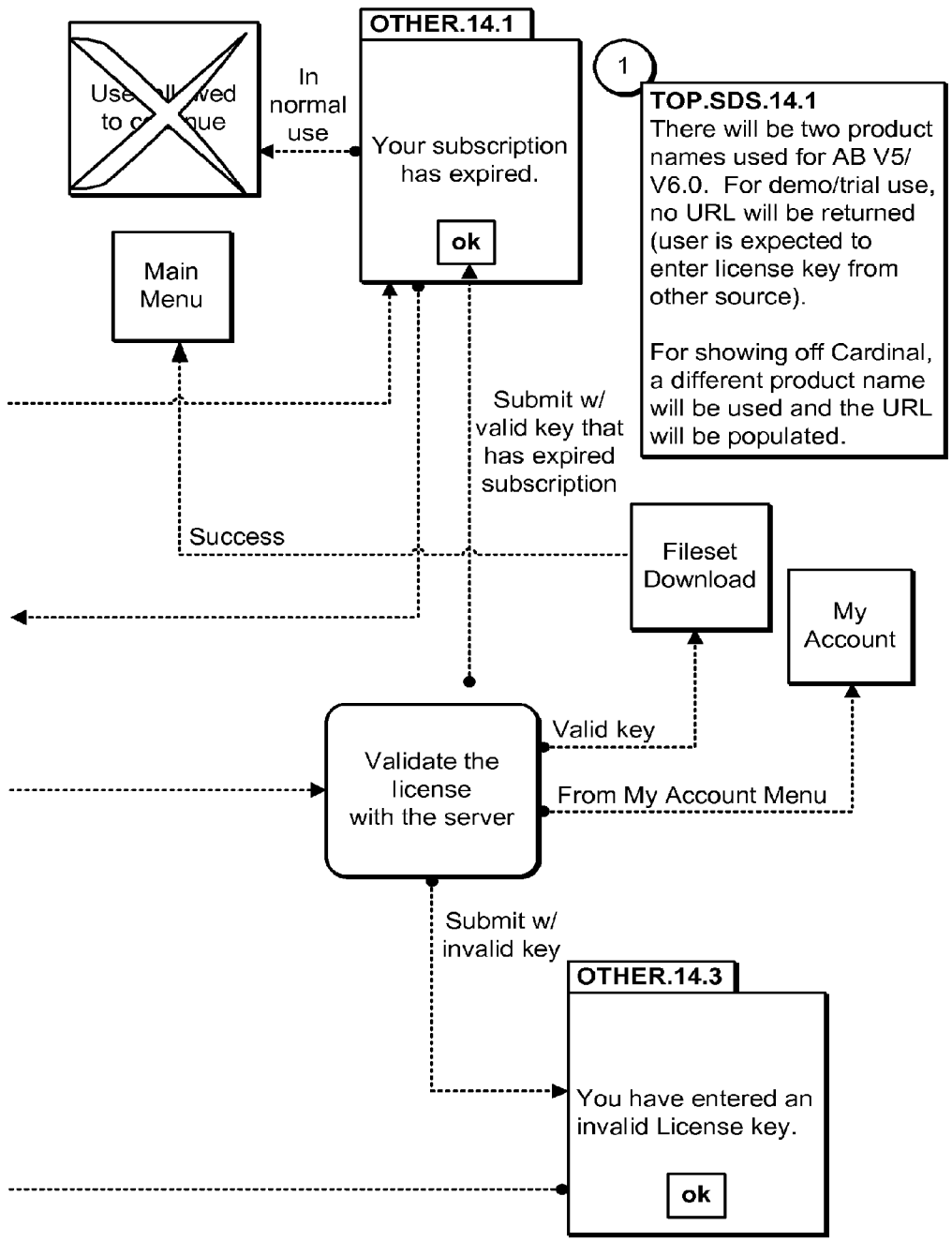

FIG. 26 shows exemplary user interface flow for entry and acceptance of a license key, in accordance with the principles of the present invention.

Figure 27:
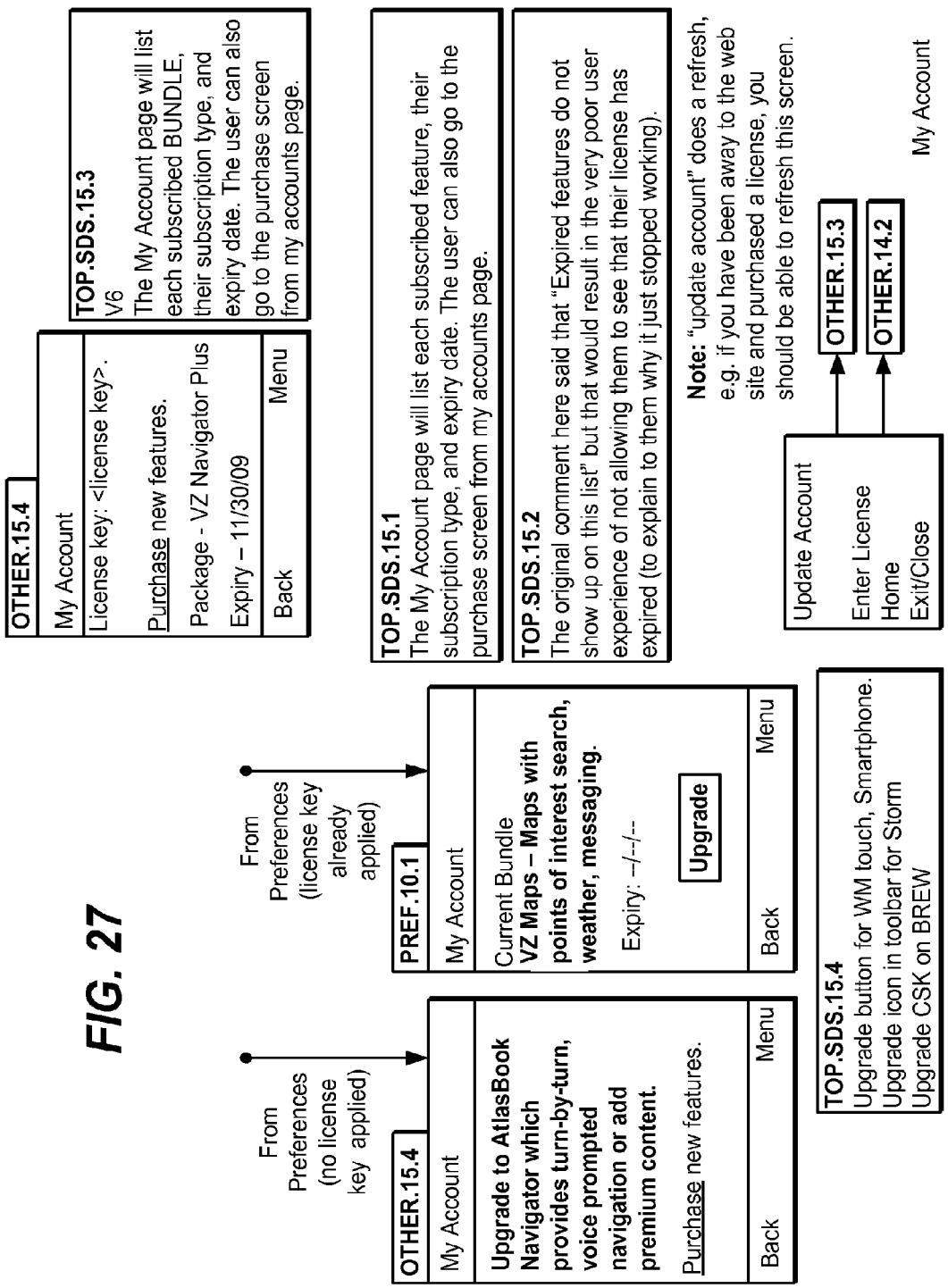
FIG. 27 shows exemplary user interface flow relating to a user's account information, in accordance with the principles of the present invention.

FIG. 27 shows exemplary user interface flow relating to a user's account information, in accordance with the principles of the present invention.

Figure 28A:
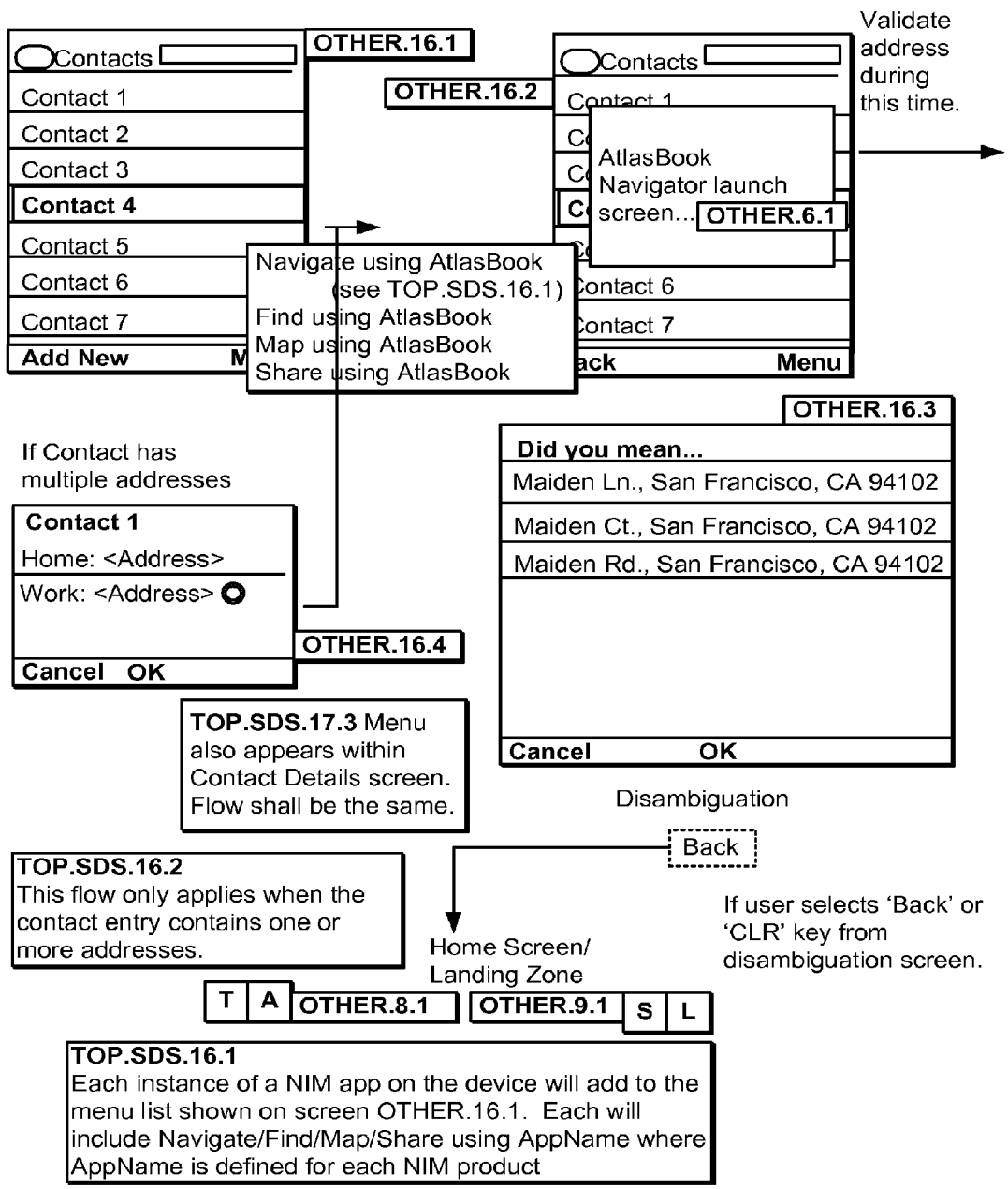
FIG. 28 shows exemplary user interface flow relating to launch of AtlasBook Navigator from Contacts, in accordance with the principles of the present invention.

FIG. 28 shows exemplary user interface flow relating to launch of AtlasBook Navigator from Contacts, in accordance with the principles of the present invention.

Figure 29A:
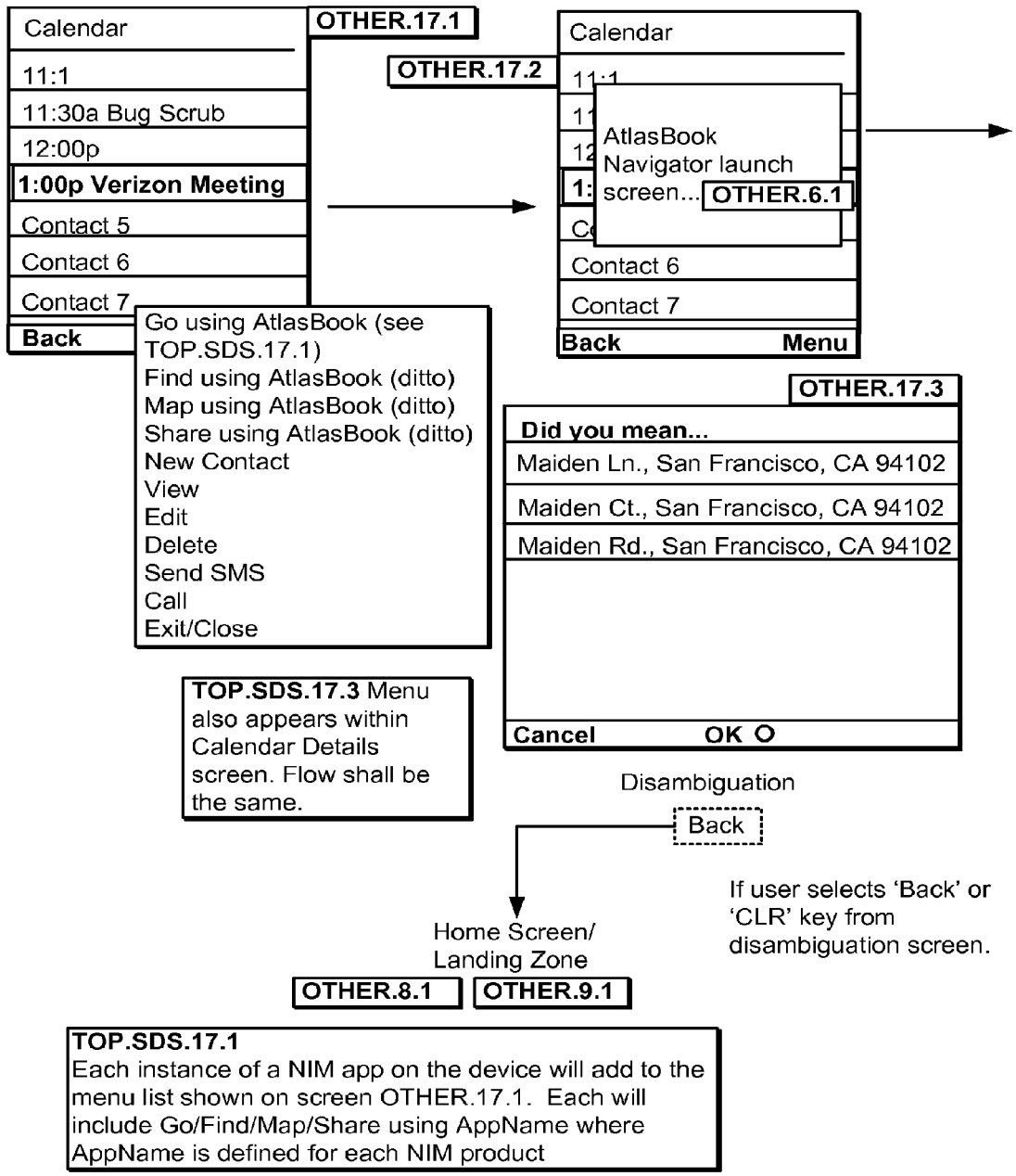
FIG. 29 shows exemplary user interface flow relating to launch of AtlasBook Navigator from Calendar, in accordance with the principles of the present invention.
Figure 29B:
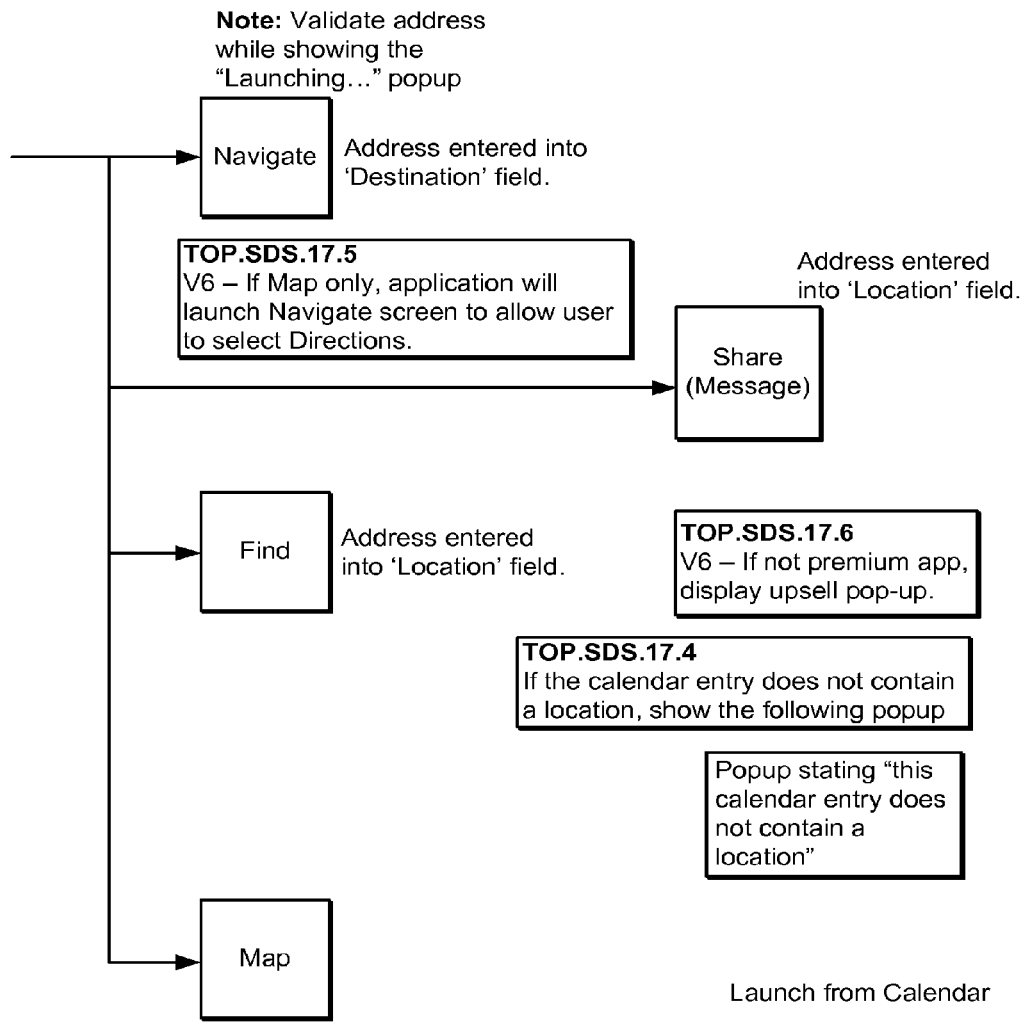
Figure 29:

FIG. 29 shows exemplary user interface flow relating to launch of AtlasBook Navigator from Calendar, in accordance with the principles of the present invention.

Figure 30:
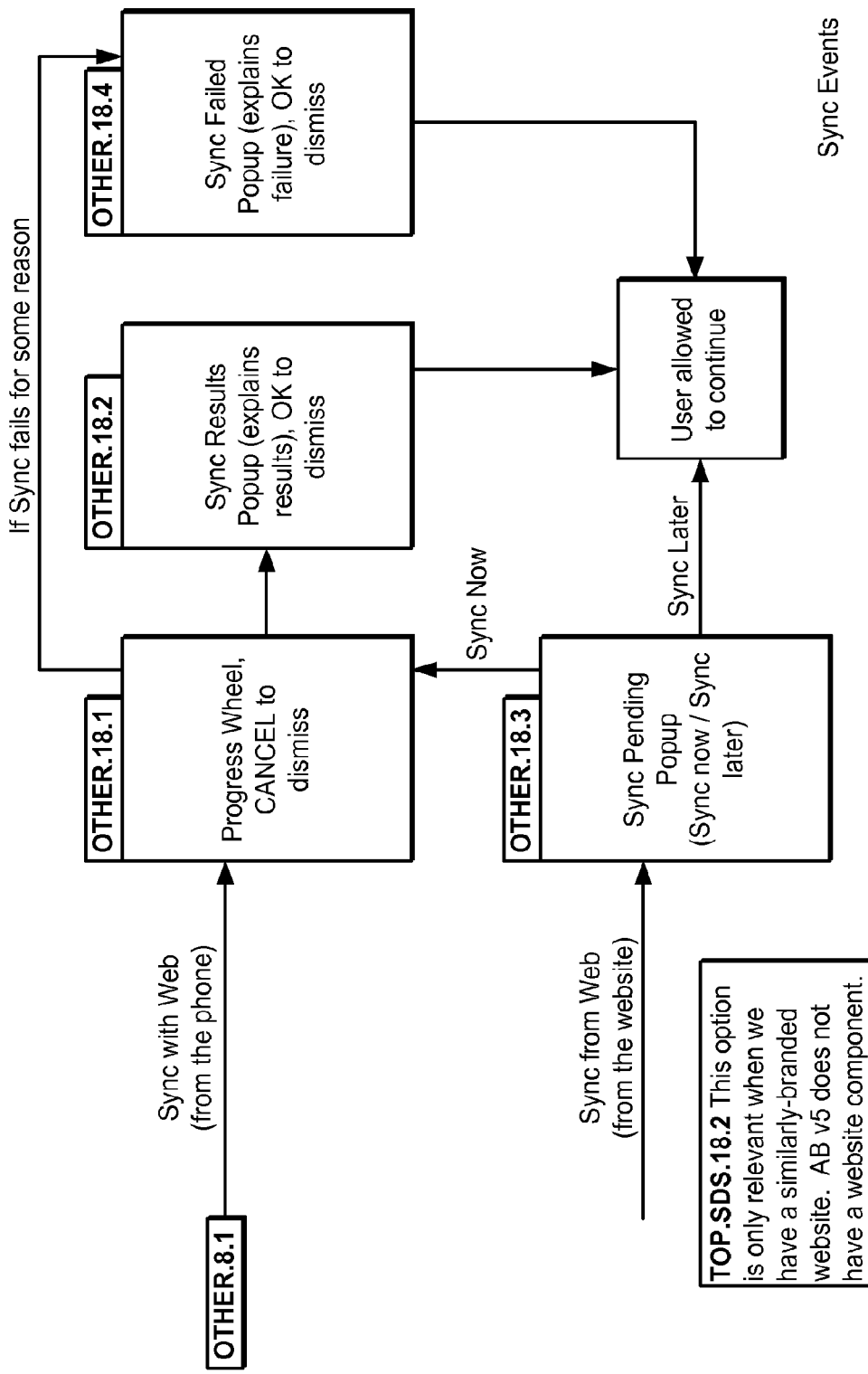
FIG. 30 shows exemplary user interface flow relating to synchronization of Events, in accordance with the principles of the present invention.

FIG. 30 shows exemplary user interface flow relating to synchronization of Events, in accordance with the principles of the present invention.

Figure 31:
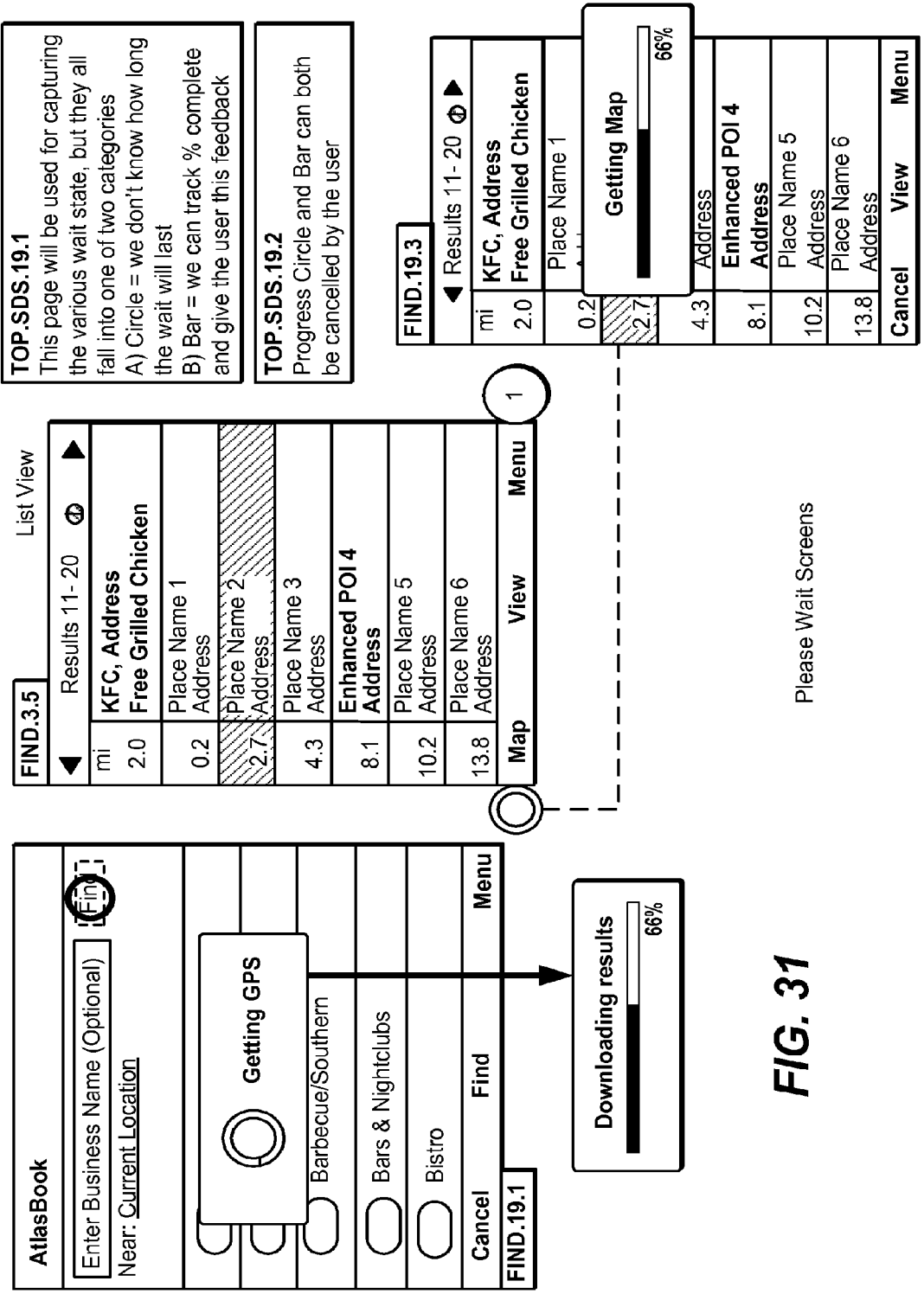
FIG. 31 shows exemplary user interface flow relating to please wait screens, in accordance with the principles of the present invention.

FIG. 31 shows exemplary user interface flow relating to please wait screens, in accordance with the principles of the present invention.

Figure 32:
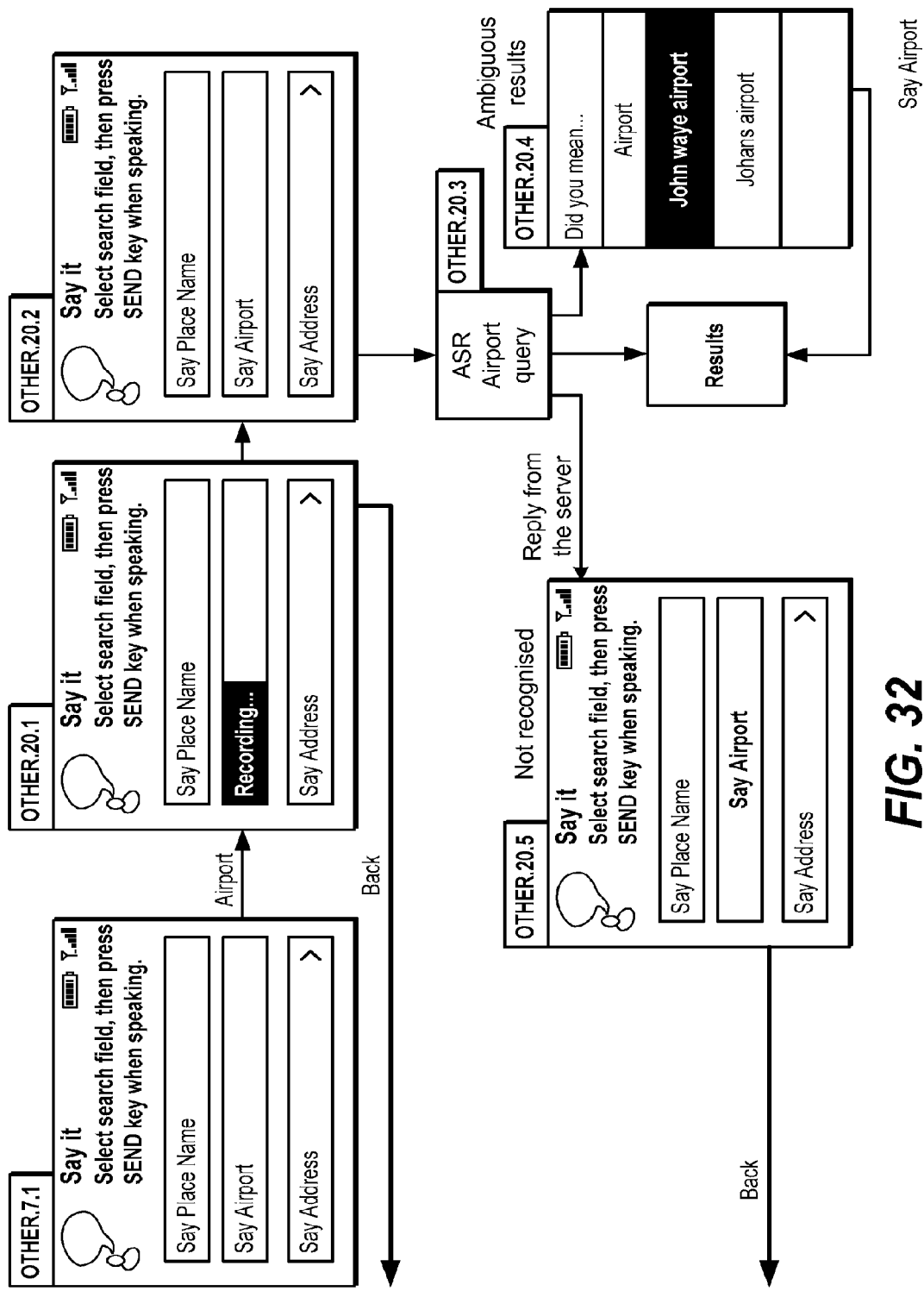
FIG. 32 shows exemplary user interface flow relating to voice navigation for the feature Say Airport, in accordance with the principles of the present invention.

FIG. 32 shows exemplary user interface flow relating to voice navigation for the feature Say Airport, in accordance with the principles of the present invention.

Figure 33:
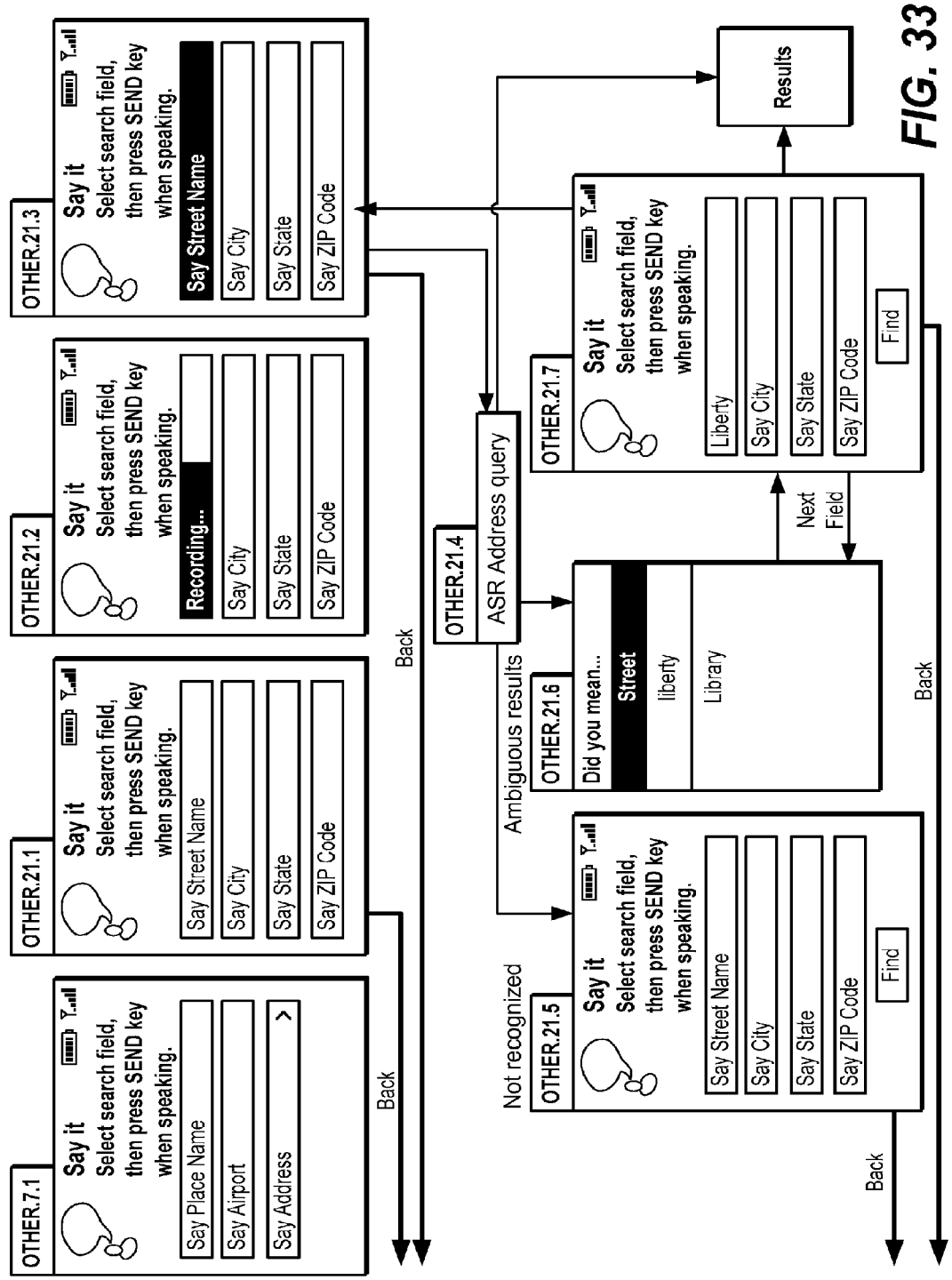
FIG. 33 shows exemplary user interface flow relating to voice navigation for the feature Say Address—Nuance, in accordance with the principles of the present invention.

FIG. 33 shows exemplary user interface flow relating to voice navigation for the feature Say Address—Nuance, in accordance with the principles of the present invention.

Figure 34:
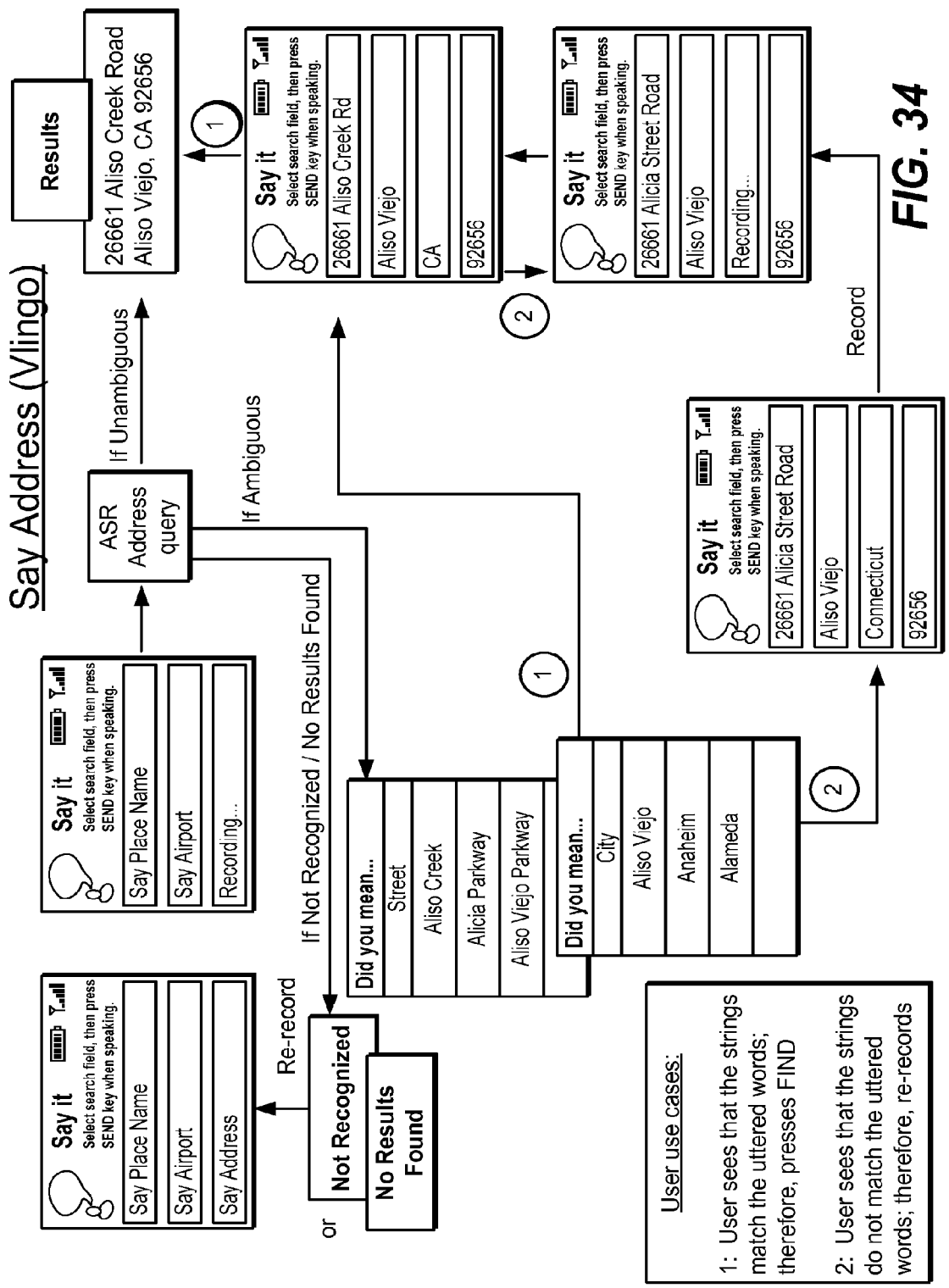
FIG. 34 shows exemplary user interface flow relating to voice navigation for the feature Say Address(Vlingo), in accordance with the principles of the present invention.

FIG. 34 shows exemplary user interface flow relating to voice navigation for the feature Say Address(Vlingo), in accordance with the principles of the present invention.

Figure 35:
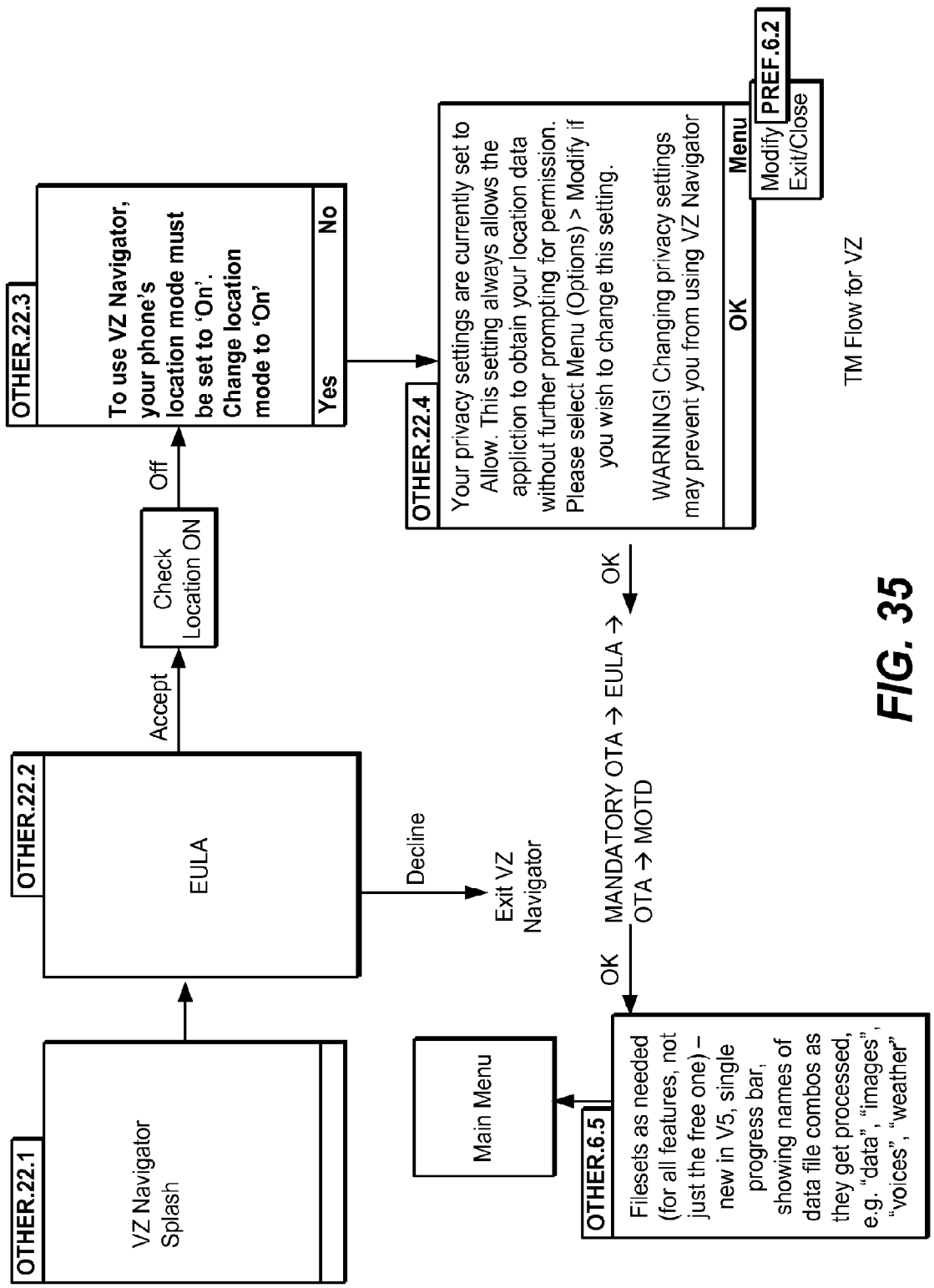
FIG. 35 shows exemplary user interface flow relating to launch of AtlasBook Navigator under a third party's trademark, in accordance with the principles of the present invention.

FIG. 35 shows exemplary user interface flow relating to launch of AtlasBook Navigator under a third party's trademark, in accordance with the principles of the present invention.

Figure 36:
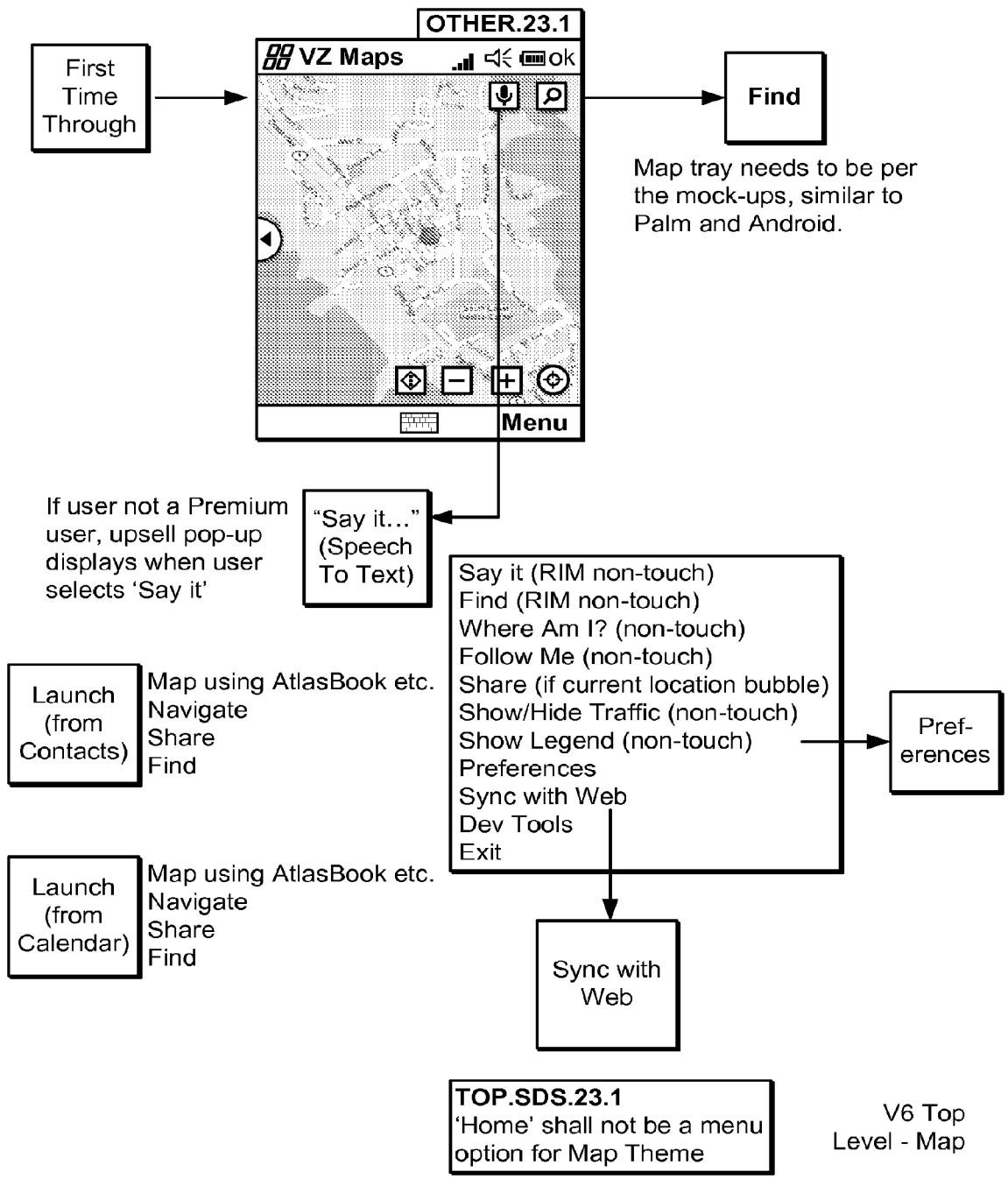
FIG. 36 shows exemplary user interface flow relating to launch of another embodiment of AtlasBook Navigator, in accordance with the principles of the present invention.

FIG. 36 shows exemplary user interface flow relating to launch of another embodiment of AtlasBook Navigator, in accordance with the principles of the present invention.

Figure 37:
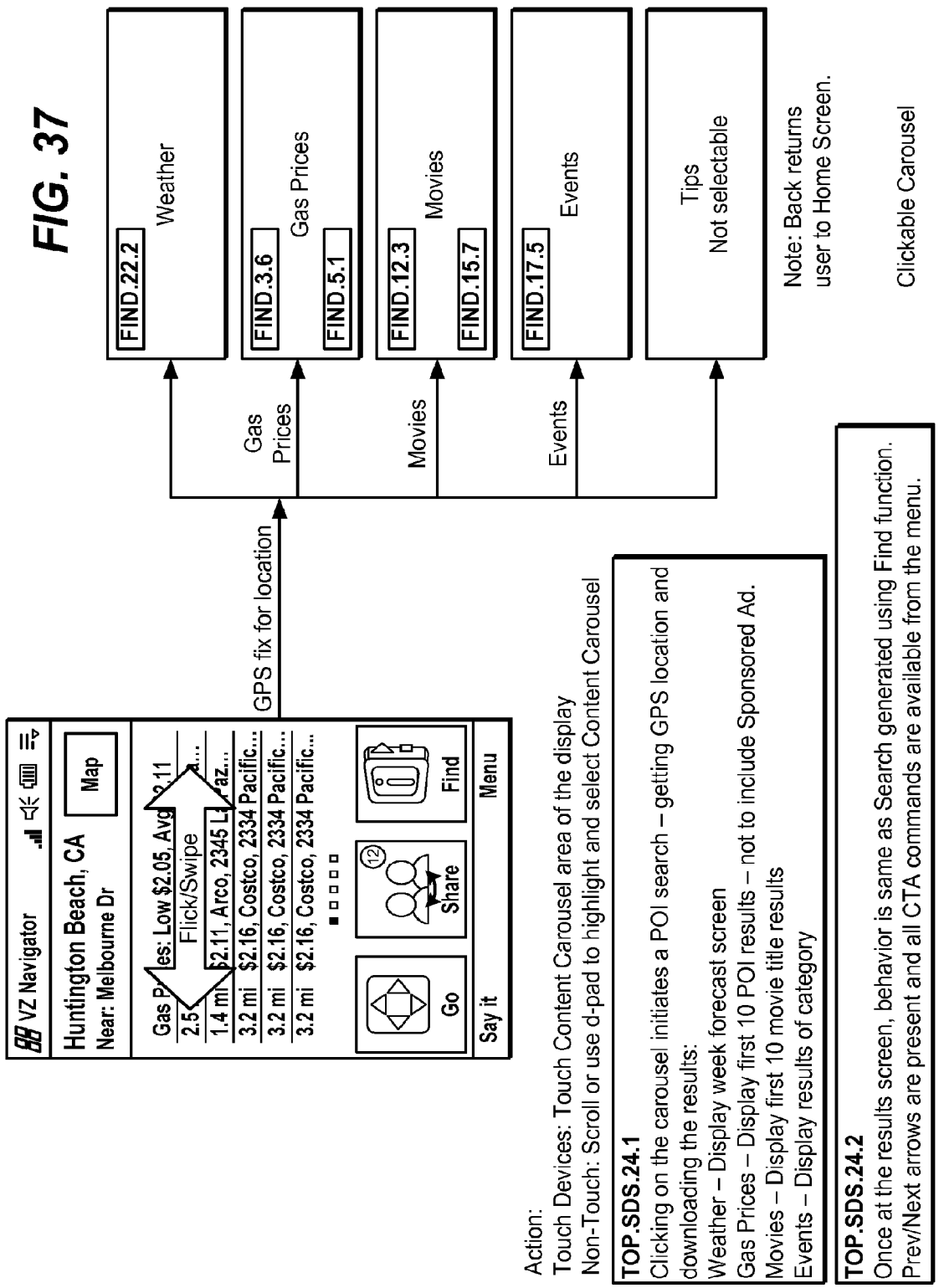
FIG. 37 shows exemplary user interface flow relating to a clickable embodiment of the Carousel, in accordance with the principles of the present invention.

FIG. 37 shows exemplary user interface flow relating to a clickable embodiment of the Carousel, in accordance with the principles of the present invention.

Figure 38B:
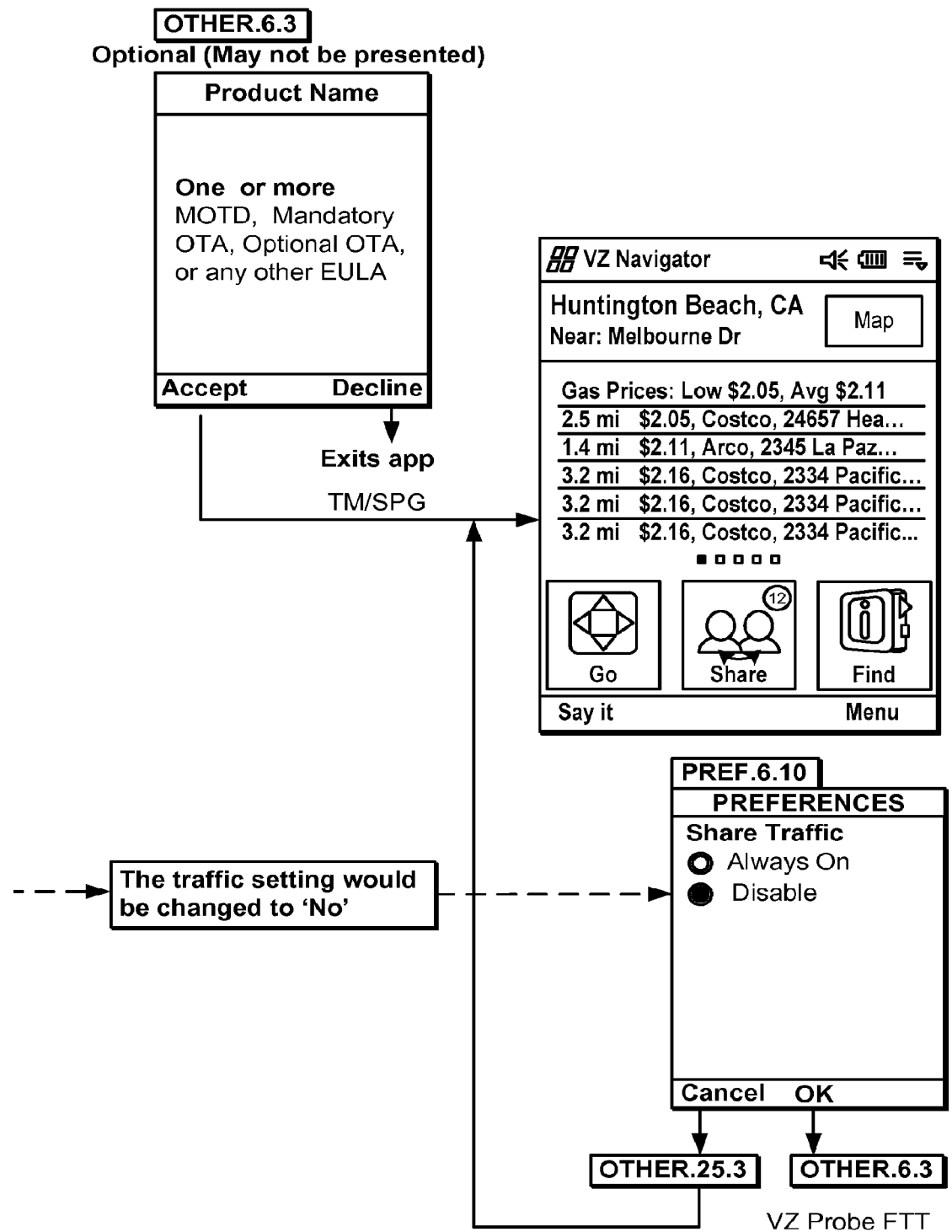
FIG. 38 shows exemplary user interface flow for first time through (FTT) provisioning of the AtlasBook Navigator, in accordance with the principles of the present invention.

FIG. 38 shows exemplary user interface flow for first time through (FTT) provisioning of the AtlasBook Navigator, in accordance with the principles of the present invention.

In particular, as shown in FIG. 38, PROBES_EULA is shown during FTT. In a first case scenario, the user accepts launch of AtlasBook Navigator, the decision is remembered and the user is never required to read the EULA (license agreement) again. They can turn Share Traffic on and off at will. There is a small amount of non-EULA text added to the preferences screen, in a similar manner as for the traffic preferences.

In a second case scenario, the user declines launch of AtlasBook Navigator during FTT. In this scenario the Share Traffic preferences is not set to FALSE, there is the same small amount of text explaining the feature, written directly on the preferences screen. If and when the second case scenario user changes the preferences to Traffic ON, the PROBES_EULA is re-downloaded and presented with Accept/Decline buttons just as per FTT. If they accept, they will never see the EULA again and become like a first case scenario user. If on the other hand they decline, they will see the PROBES_EULA each time they try and turn traffic sharing ON until they eventually accept.

Figure 39A:
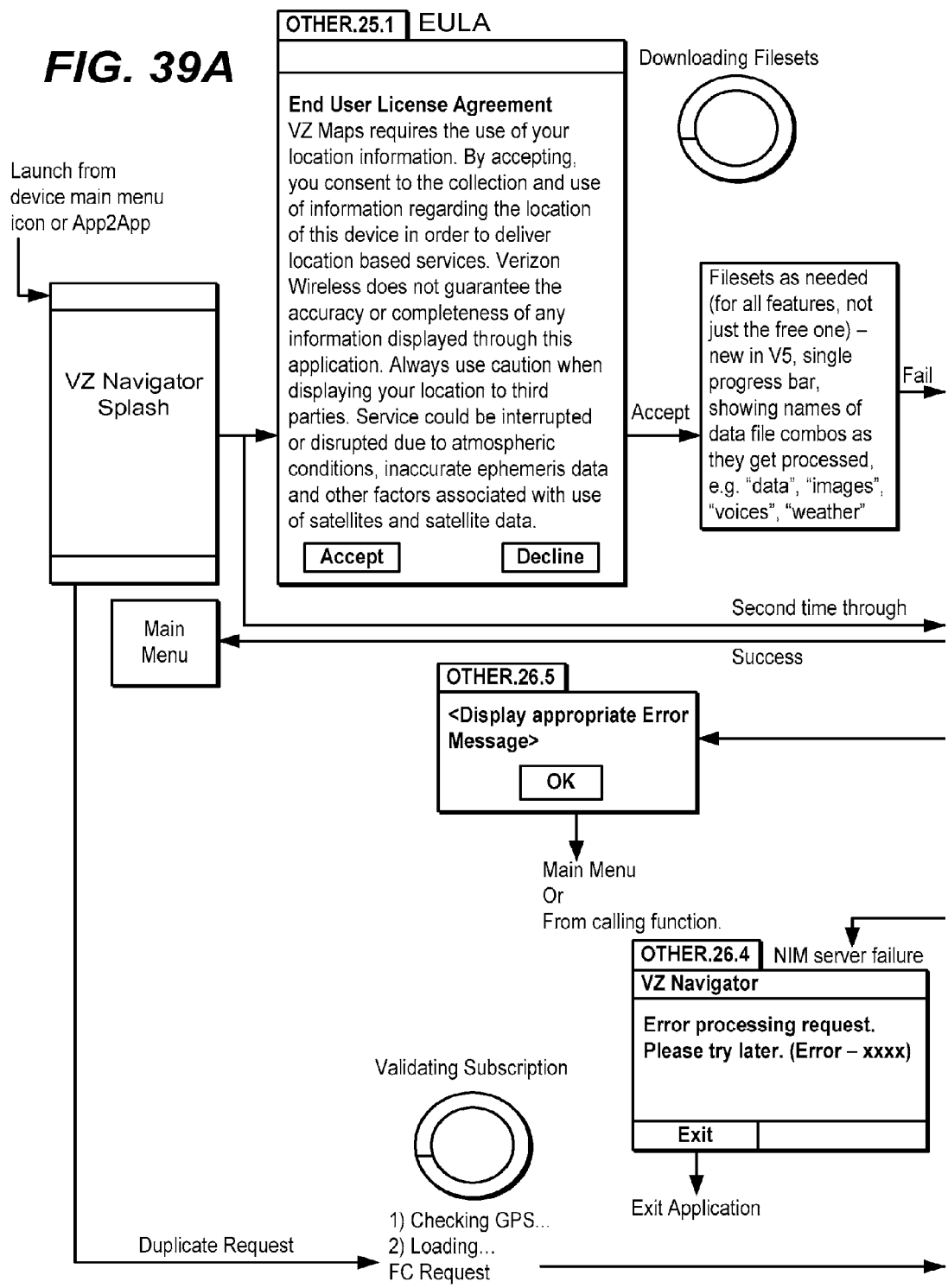
FIG. 39 shows exemplary user interface flow for SPG Storm/Curve2 type devices, in accordance with the principles of the present invention.
Figure 39B:
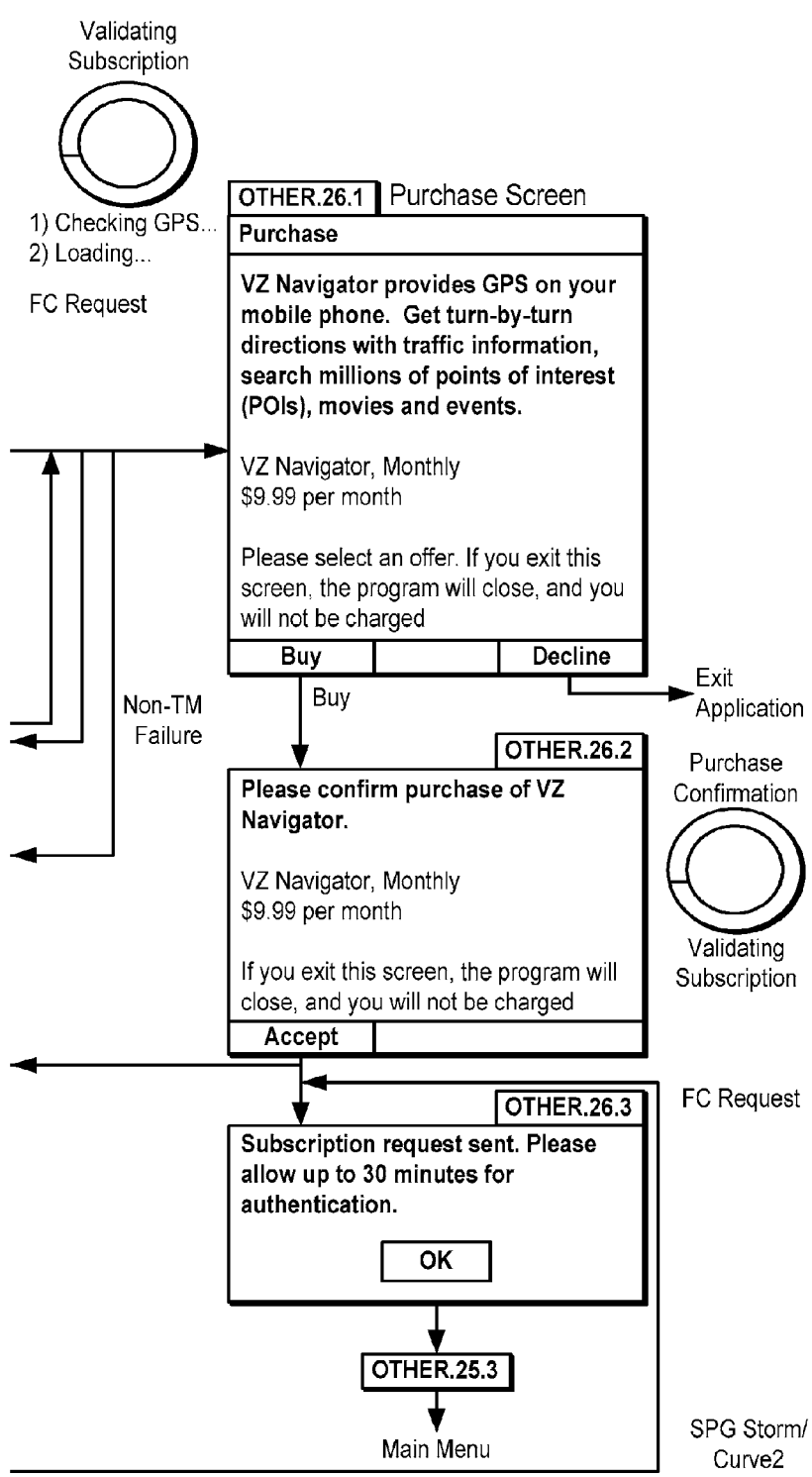

FIG. 39 shows exemplary user interface flow for SPG Storm/Curve2 type devices, in accordance with the principles of the present invention.

Figure 40A:
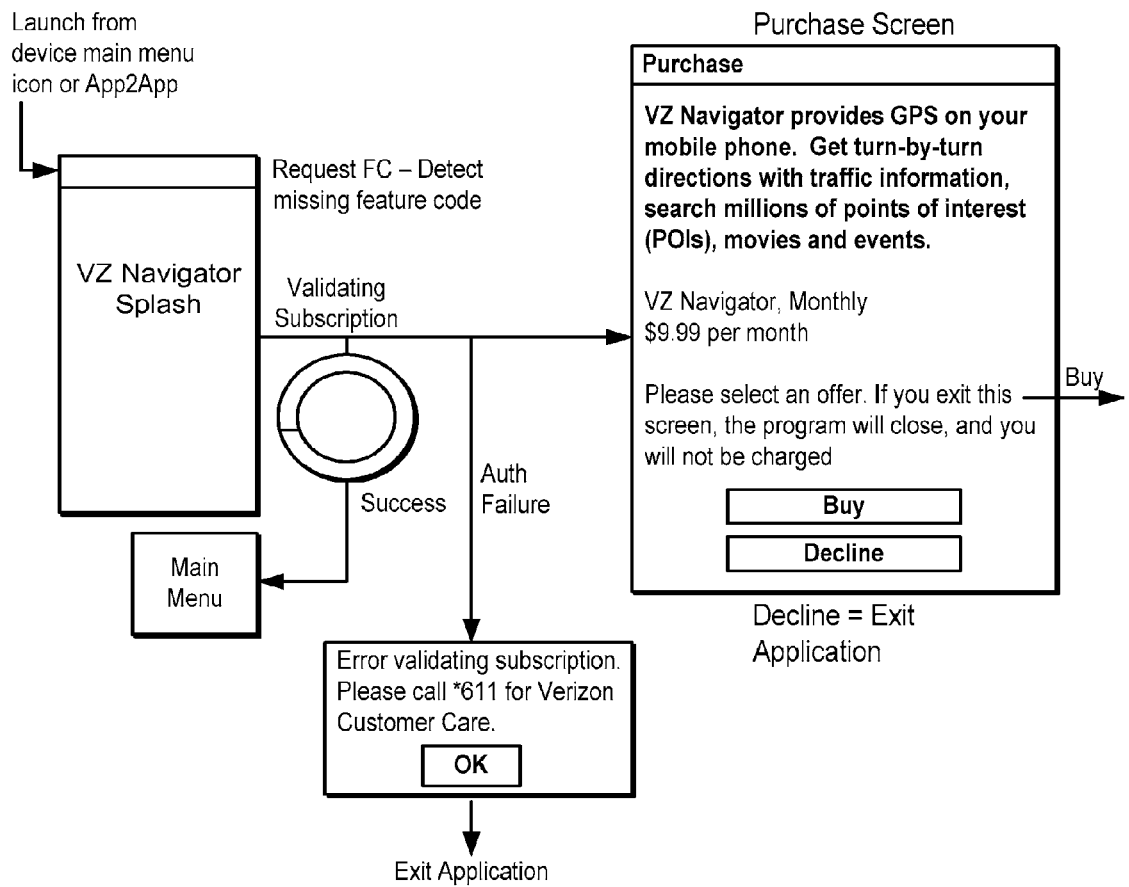
FIG. 40 shows exemplary user interface flow for SPG Calgary/Palm type devices, in accordance with the principles of the present invention.
Figure 40:
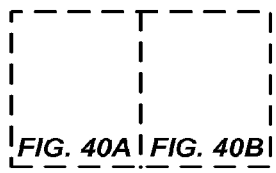
Figure 40B:
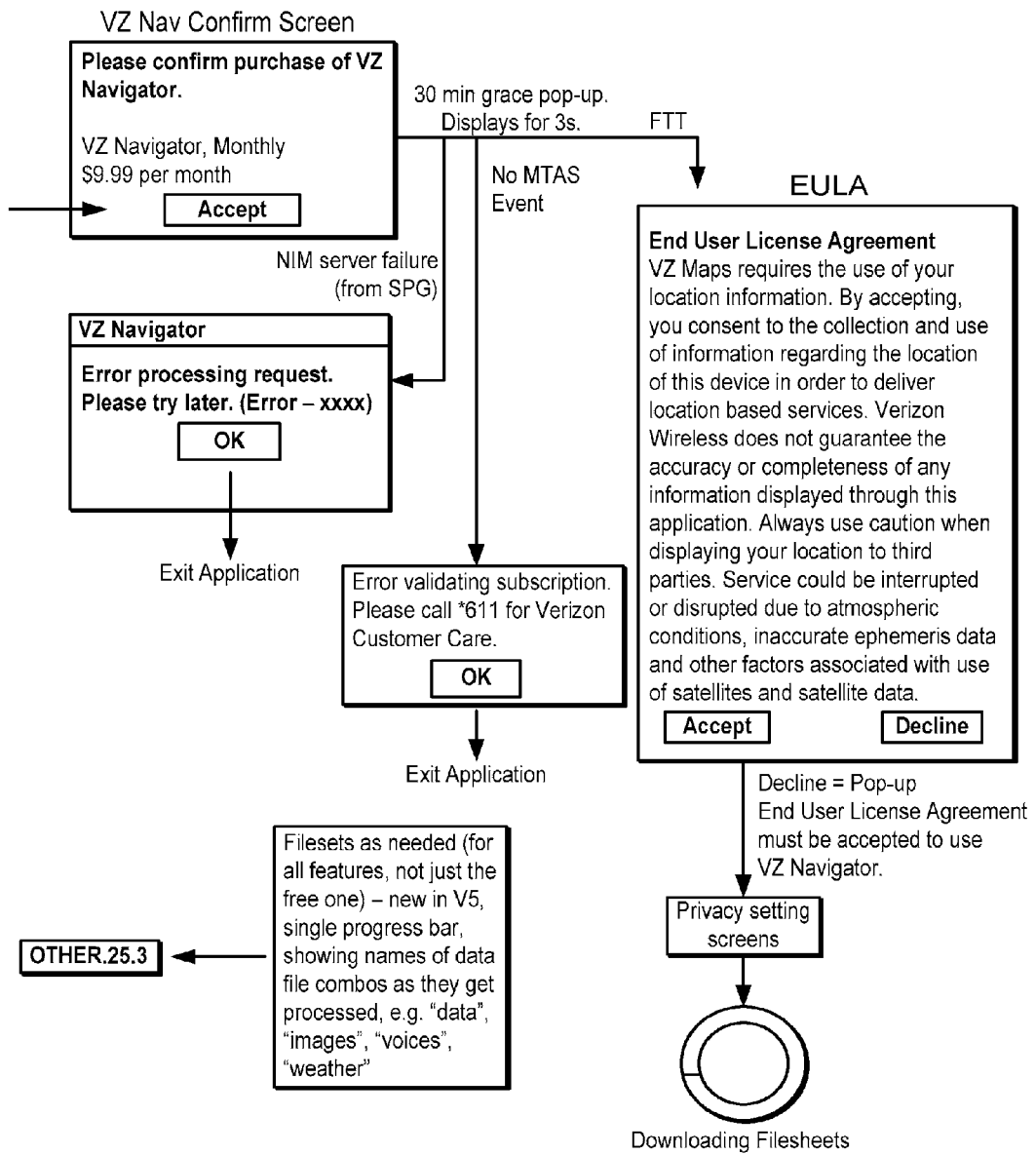

FIG. 40 shows exemplary user interface flow for SPG Calgary/Palm type devices, in accordance with the principles of the present invention.

Figures 41, 41A:
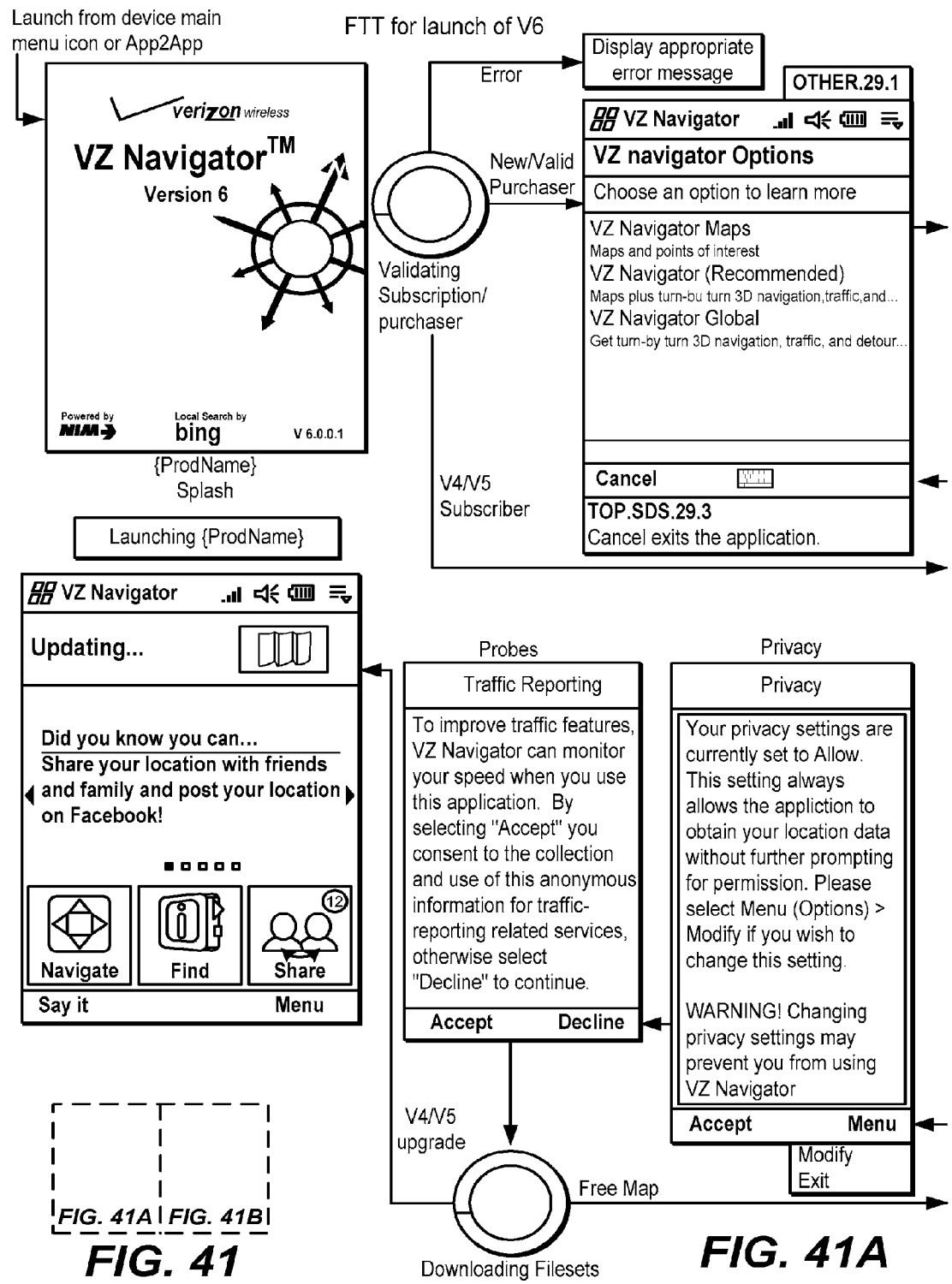
FIG. 41 shows exemplary user interface flow for launch of an alternate embodiment of the AtlasBook Navigator, in accordance with the principles of the present invention.

FIG. 41 shows exemplary user interface flow for launch of an alternate embodiment of the AtlasBook Navigator, in accordance with the principles of the present invention.

Figure 42A:
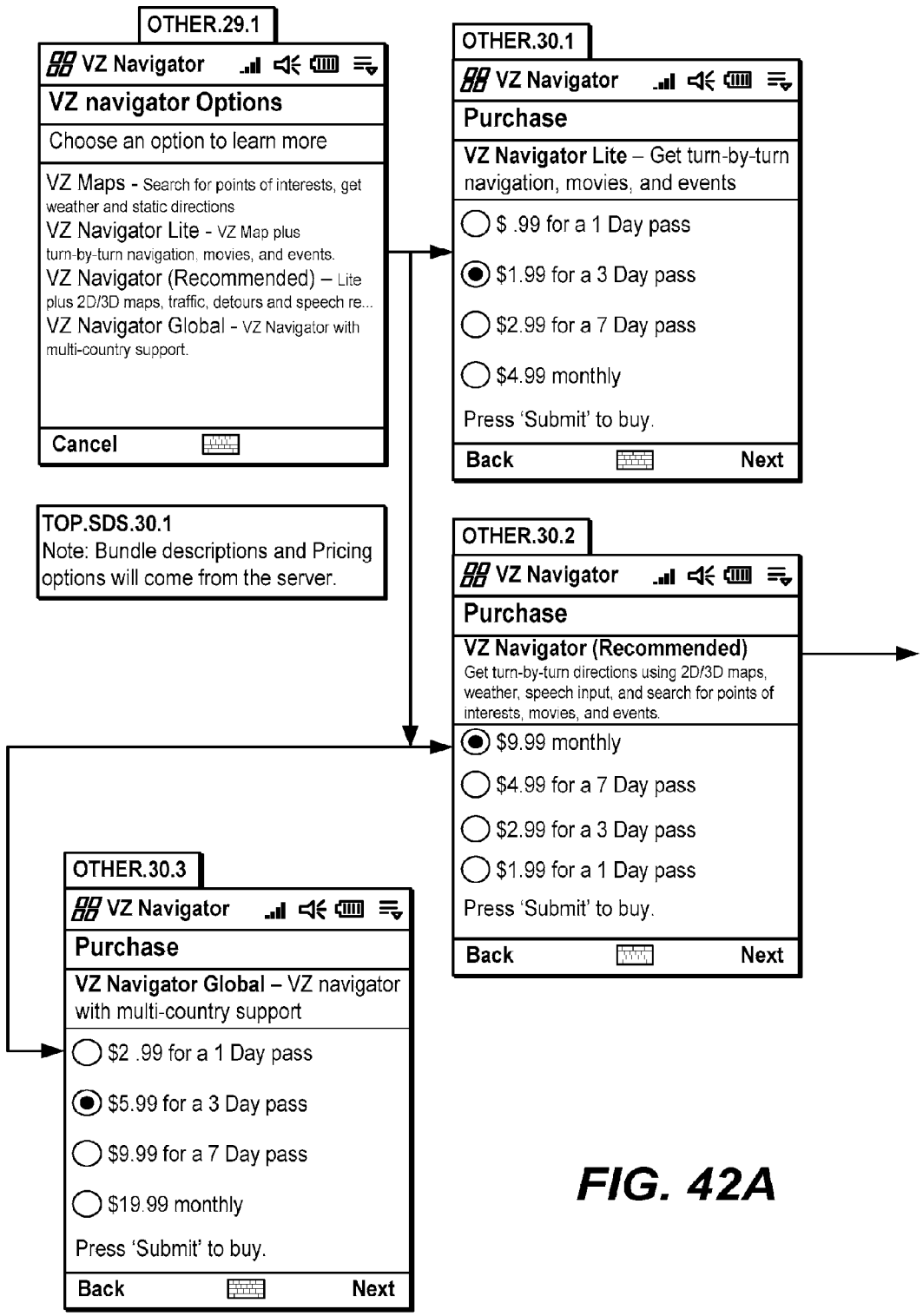
FIG. 42 shows exemplary user interface flow for first time through (FTT) purchase of a license for use of an AtlasBook Navigator product, in accordance with the principles of the present invention.

FIG. 42 shows exemplary user interface flow for first time through (FTT) purchase of a license for use of an AtlasBook Navigator product, in accordance with the principles of the present invention.

Figure 43A:
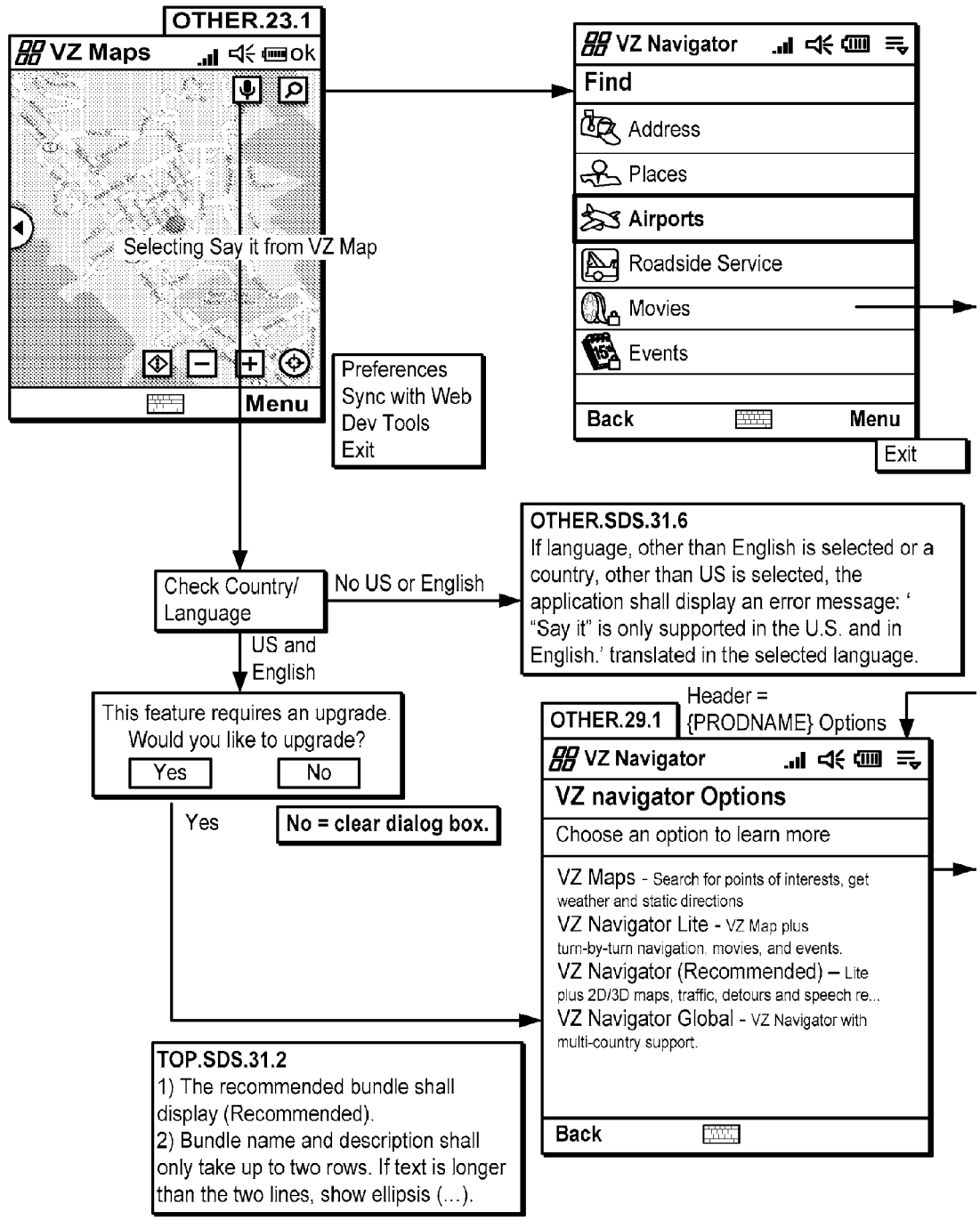
FIG. 43 shows exemplary user interface flow for upgrade of the AtlasBook Navigator product & services from a map view, in accordance with the principles of the present invention.
Figure 43B:
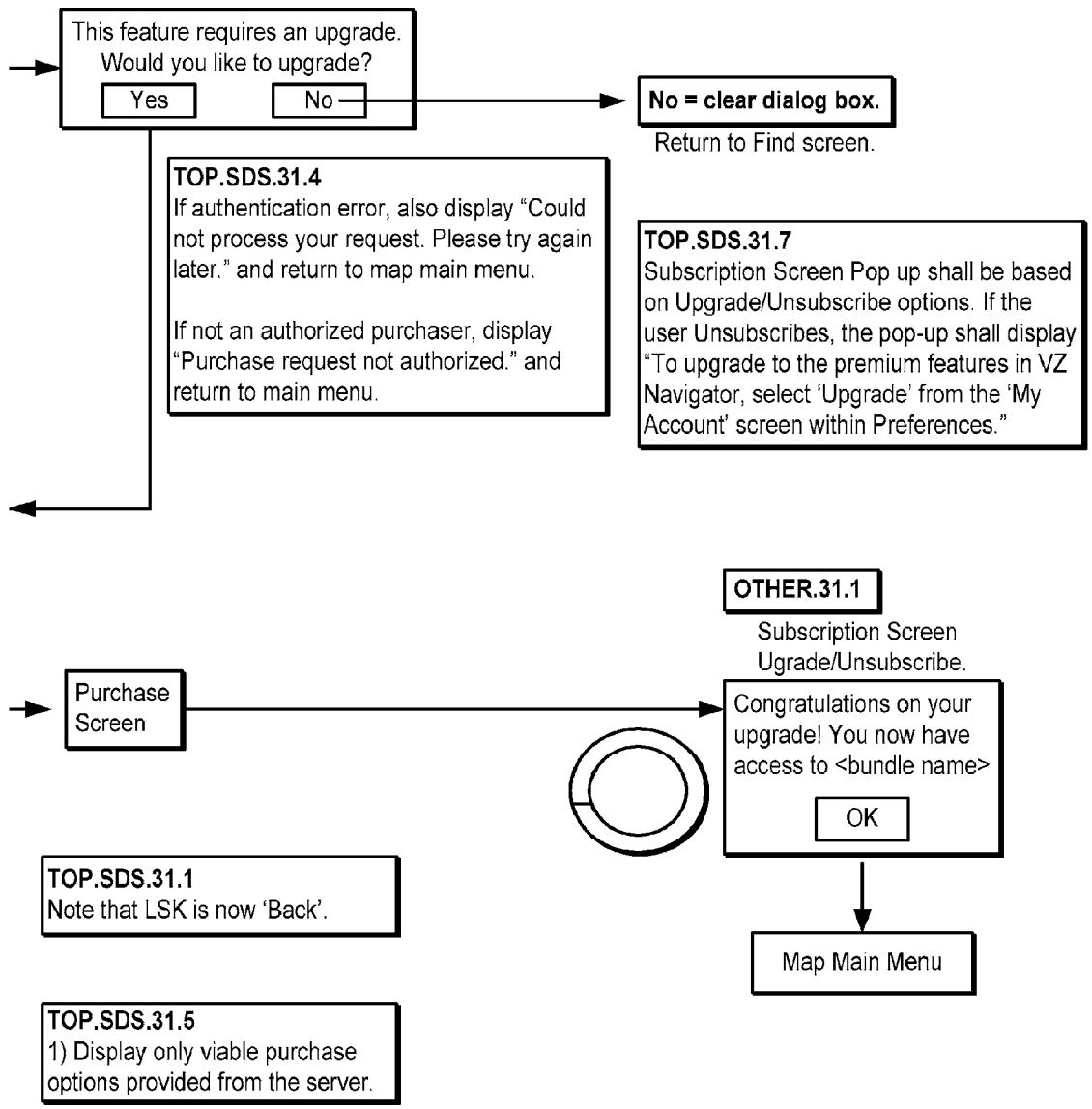

FIG. 43 shows exemplary user interface flow for upgrade of the AtlasBook Navigator product & services from a map view, in accordance with the principles of the present invention.

Figure 44A:
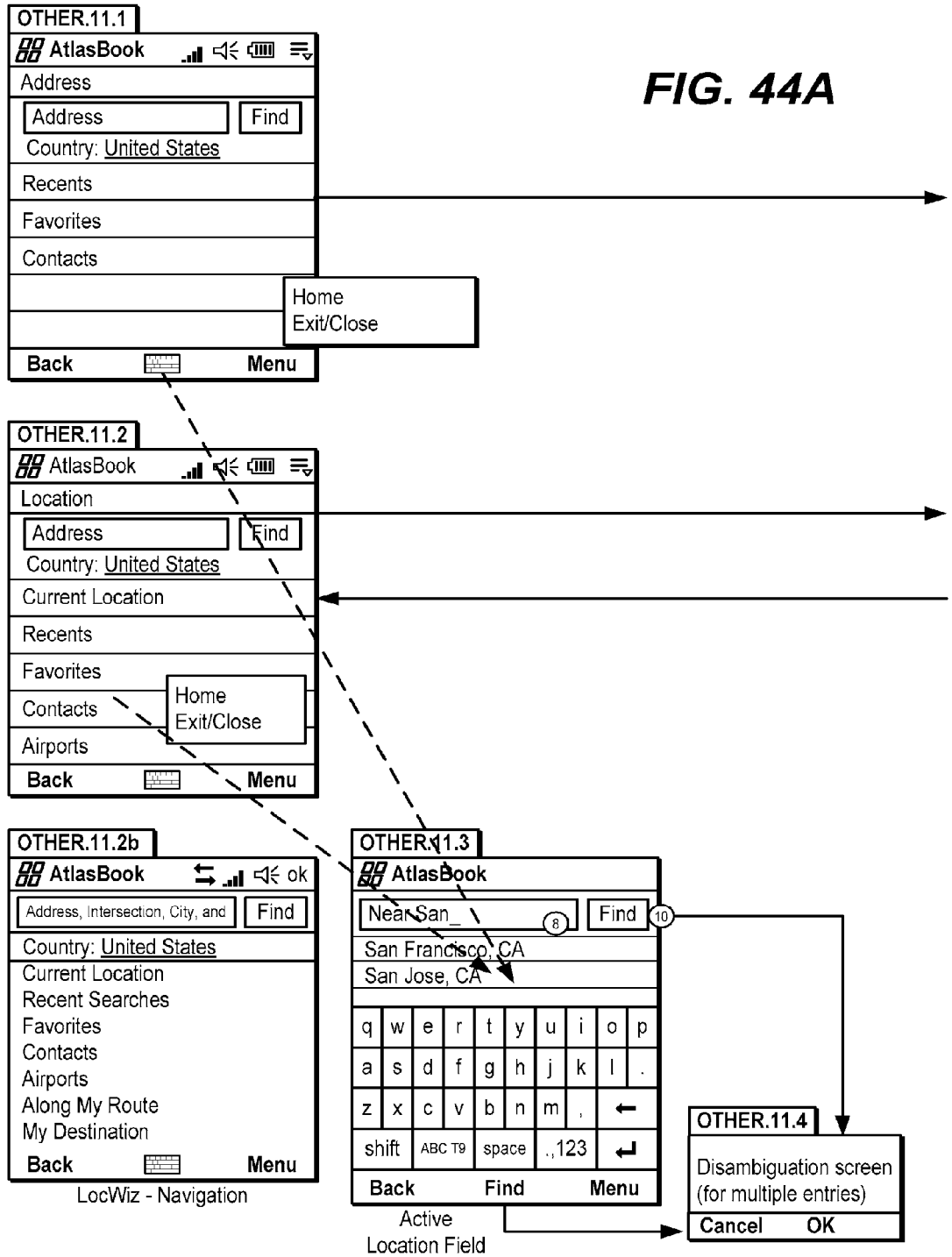
FIG. 44 shows exemplary user interface flow for operation of a location wizard for selecting location, in accordance with the principles of the present invention.
Figure 44B:
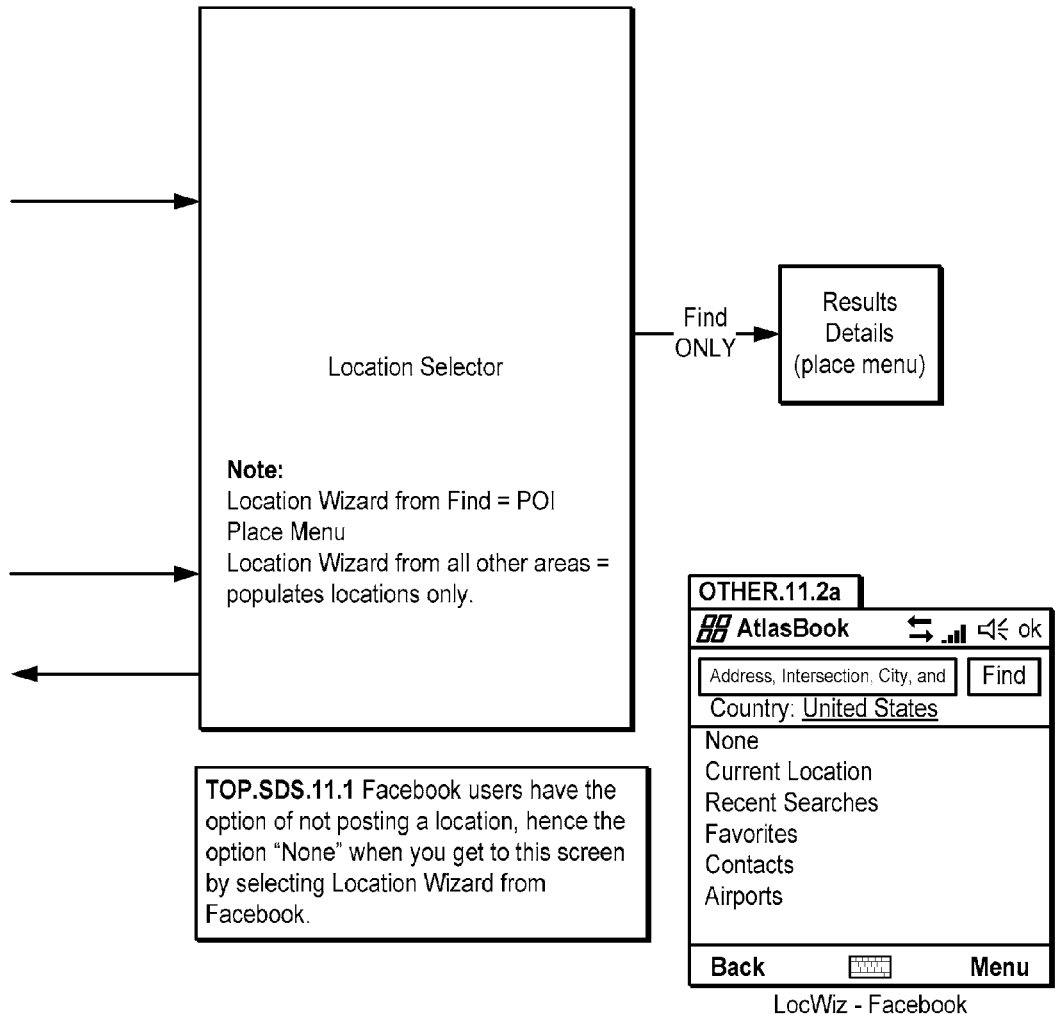

FIG. 44 shows exemplary user interface flow for operation of a location wizard for selecting location, in accordance with the principles of the present invention.

Figure 45A:
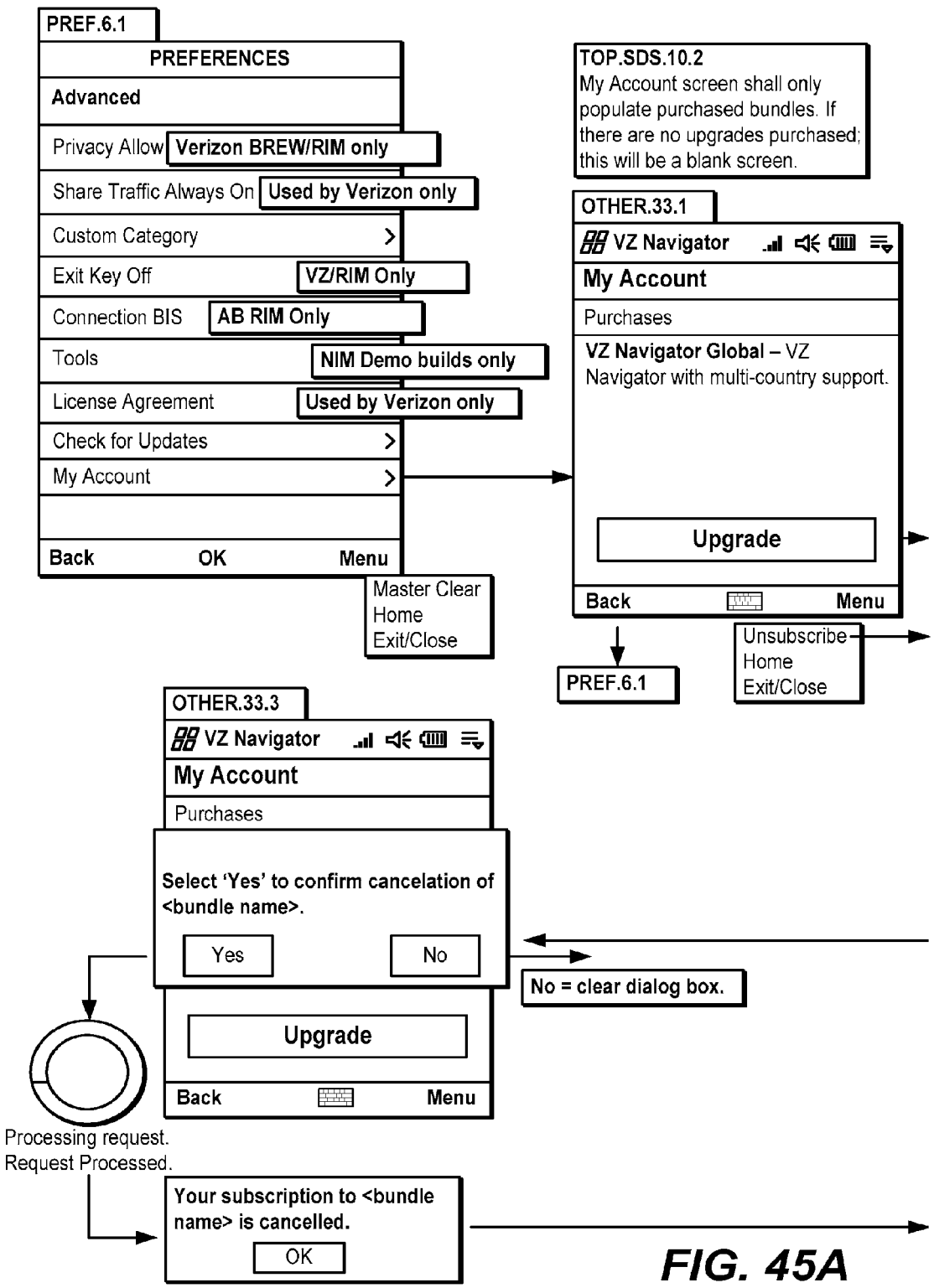
FIG. 45 shows exemplary user interface flow for working through a user's account information, in accordance with the principles of the present invention.

FIG. 45 shows exemplary user interface flow for working through a user's account information, in accordance with the principles of the present invention.

Figure 46A:
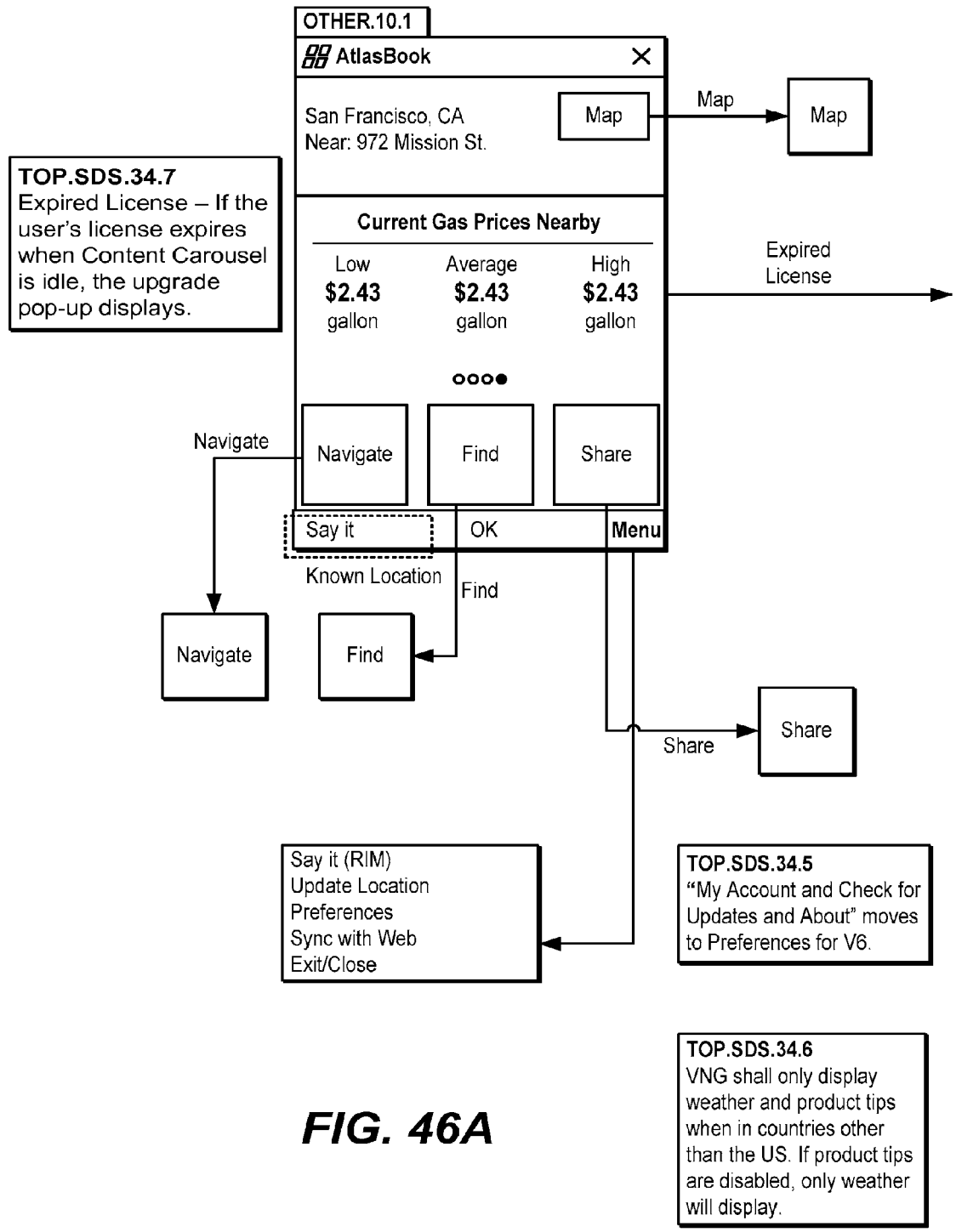
FIG. 46 shows exemplary user interface flow in a Carousel view of the AtlasBook Navigator, in accordance with the principles of the present invention.
Figure 46B:
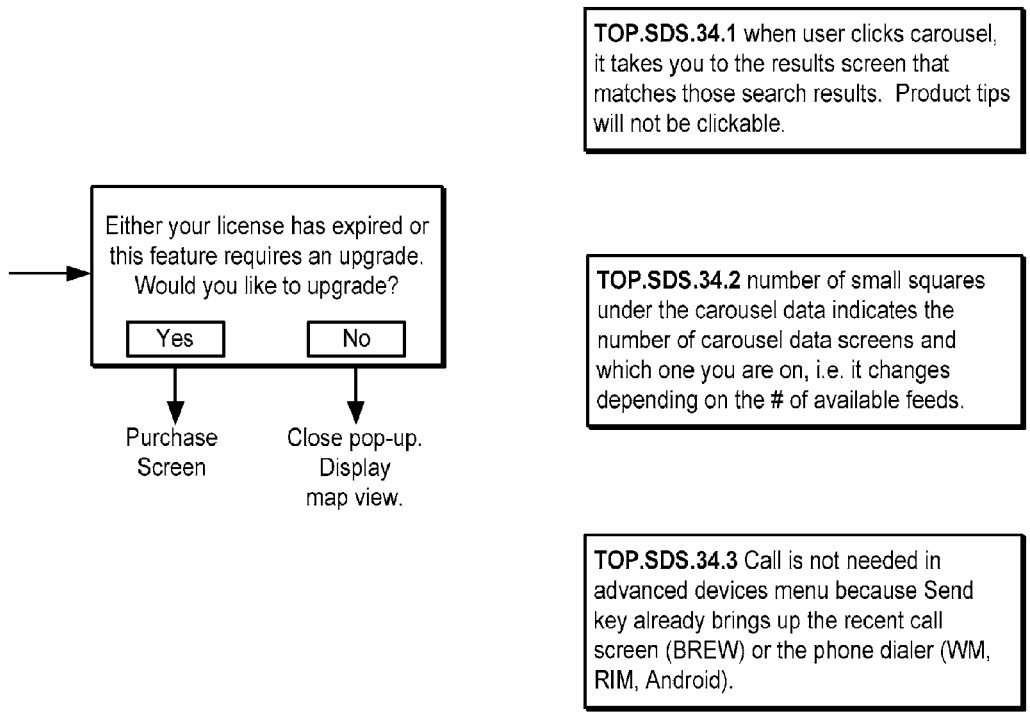
Figure 46:
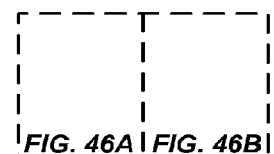

FIG. 46 shows exemplary user interface flow in a Carousel view of the AtlasBook Navigator, in accordance with the principles of the present invention.

The personal wireless navigation system is preferably compatible with the following operating environments: J2ME, Blackberry Java (native), Windows Mobile 6—Professional (Pocket PC) and Standard (Smartphone) Editions, Brew 2.1.3, Brew 3.1.4, Mac OS X (iPhone), Android, Symbian (UIQ and S60), Linux, and Windows Mobile 7.

FIG. 47 shows a minimum device list for the form factors for AB and the personal wireless navigation system, in accordance with the principles of the present invention.

The personal wireless navigation system is provided as two LBS applications—AtlasBook (AB) v5 and AtlasBook Navigator (ABN) v5, permitting a user to upgrade to or opt in/opt out from AB v5 to ABN v5. AtlasBook v5 and AtlasBook Navigator v5 are two distinct products that are launched simultaneously as part of the total LBS eco-system. Atlas- Book v5 provides flexibility for partners that continue to have non-GPS devices, as well as an economical and competitive solution to all mobile LBS applications.

The AtlasBook v5 (AB v5) personal wireless navigation system is marketed as a low price or even as a free application that is either preloaded or downloaded from a suitable server supporting the TeleCommunication Systems/NIM website or other web shop. AB v5 provides local search including search for POI, weather, movies, events, traffic; plus mapping and static directions with tracking, but without 'guidance'.

The AtlasBook Navigator v5 (ABN v5) personal wireless navigation system provides all the capabilities of AB v5 plus real time turn-by-turn 'Navigation', including 'guidance' (recalculations, maneuver announcements unrelated to turns). Only ABN v5 provides traffic enabled navigation and offers the option for detour.

For a price AB v5 users may upgrade from AB v5 to ABN v5, for a single use, a day, for a month, per month, per year, etc.

"Initial Activation" refers to the first time AB is downloaded or activated (if preloaded). This refers to both scenarios where a branded version of AB is free or available for a fee.

A "purchase" is defined as activating idle functions of AB to provide full ABN functionality, without necessarily having to download any resource files or application files.

An "upgrade" is defined as downloading an additional application or files to the standard ABN that either provides users with additional functions or content.

In selected areas of the personal wireless navigation system, AB v5 notifies users about the benefits of purchasing the personal wireless navigation system and invites them to choose from a list of purchase options, such as: Purchase ABN for this one time; Purchase the personal wireless navigation system for a day; Purchase the personal wireless navigation system on a monthly subscription basis; Purchase the personal wireless navigation system for life of the device; or Purchase ABN for a 'custom defined period' (typically only used for sales demo and trial opportunities.)

AB v5 preferably includes all the application files for the full version of the personal wireless navigation system. When users purchase navigation and other functions of ABN v5, those functions are unlocked and any necessary resource files are downloaded from the TeleCommunication Systems/NIM server as part of upgrading to the ABN v5 personal wireless navigation system. This allows the purchase process to be quicker than in the scenario where all the application files and resource files need to be downloaded.

Figure 48:
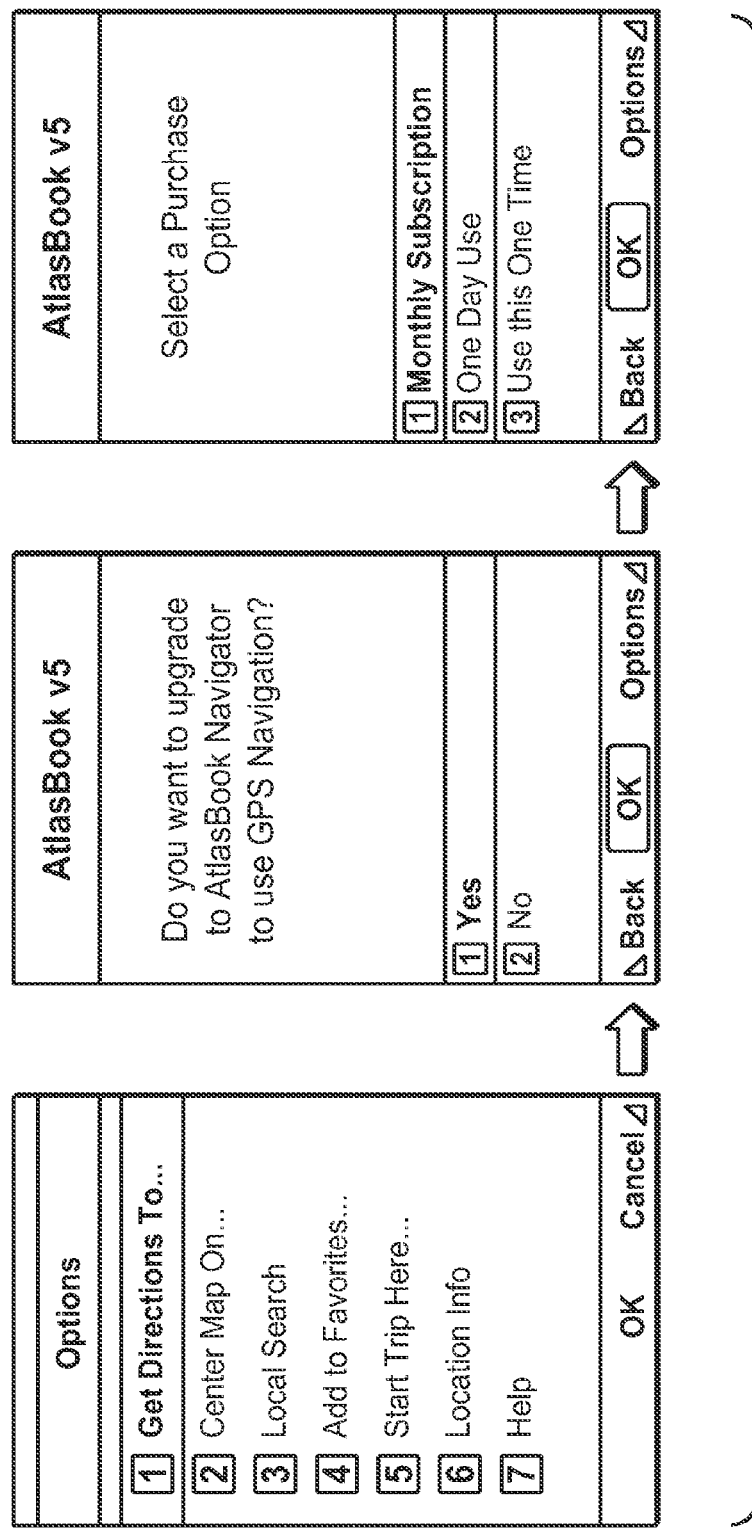
FIG. 48 illustrates one avenue for purchasing the personal wireless navigation system, in accordance with the principles of the present invention.

FIG. 48 illustrates one avenue for purchasing the personal wireless navigation system, in accordance with the principles of the present invention.

If a user chooses to terminate using navigation, those additional functionalities are once again locked, and users may continue using AB v5.

A user may upgrade their personal wireless navigation system to include premium functions and content. For instance, the personal wireless navigation system is designed such that either TeleCommunication Systems/NIM or its partners can offer certain functions and content as premium functions and content for an additional fee, in one or more countries, where the data is available. Premium functions and content include (but are not limited to), for instance, traffic information used for navigation and mapping, 2D and 3D sliding maps, movies & events, weather, other?

To support the above, certain functionalities are configurable.

For instance, billing flexibility is provided. Today, "carrier" billing options (example BREW) are supported. In these models, users pay the carrier, either directly or indirectly, and billing issues are handled either by the carrier or a third party. The personal wireless navigation system includes support for several new billing requirements, including support for the sale of products that may be sold in any of the following scenarios: monthly recurring, daily (24 hour), or "session"—used for one navigation. In each of these scenarios, users have various options, including: pay by credit card or other billing service, add purchase to an existing mobile account, or purchase through a premium SMS message (in some situations). Billing also preferably supports demo capabilities, test accounts, and other no charge options.

The AB v5 personal wireless navigation system preferably includes options for potential users to perform the following:

Discover the application on a web site(s).

Use the site to determine whether the application is available to work on a specific device/network combination.

Link to a service to set up payment options.

Receive confirmation that the payment is accepted (email or SMS) along with a means to access an appropriate download of the application (suitable for the identified device).

Download the application automatically.

Easily access and start the downloaded application and link a proof of payment.

Figure 49A:
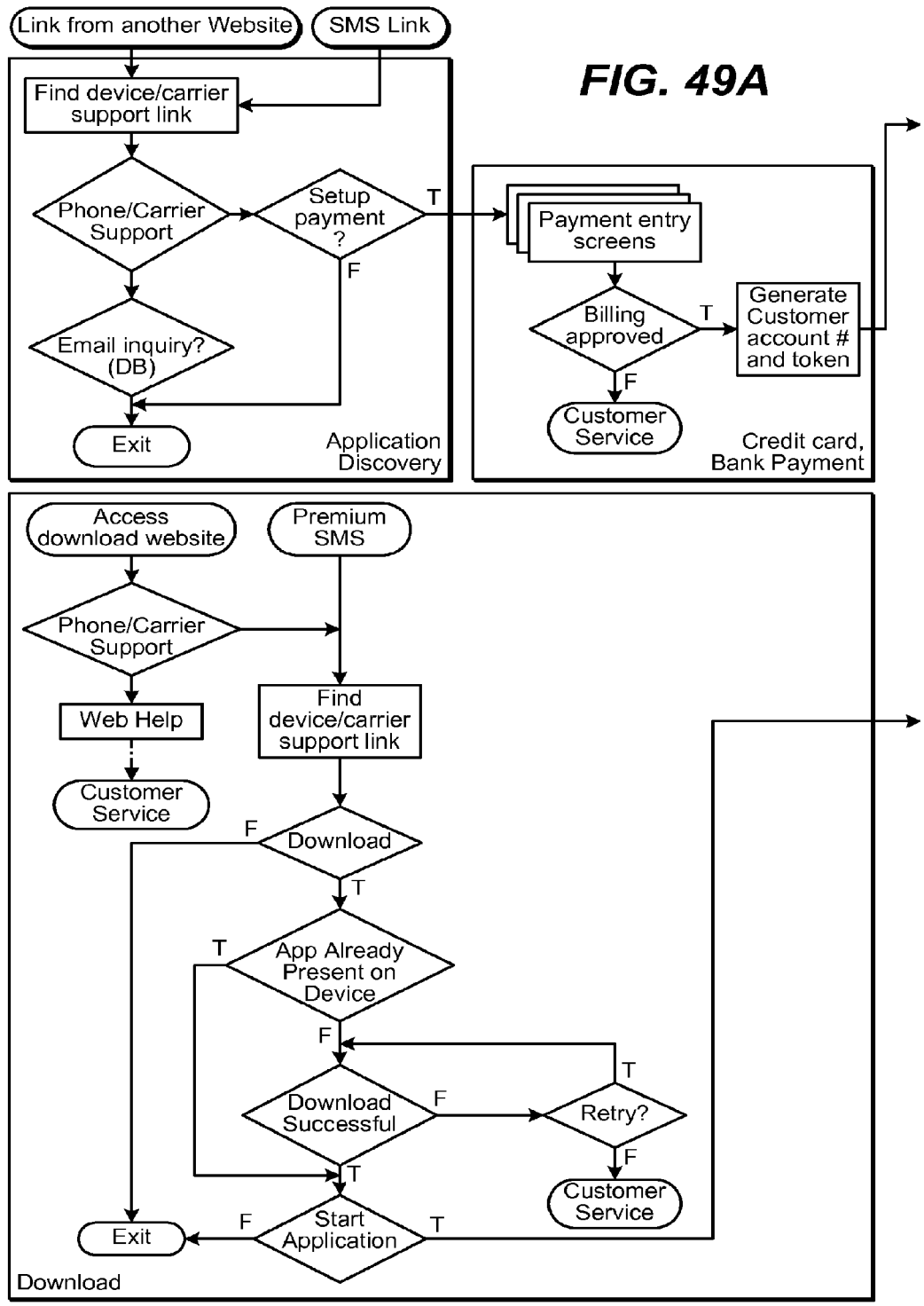
FIG. 49 illustrates an exemplary flow chart for a billing process, in accordance with the principles of the present invention.

FIG. 49 illustrates an exemplary flow chart for a billing process, in accordance with the principles of the present invention.

Upgradable Location Based Services (LBS) Website

The personal wireless navigation system LBS website companion preferably includes the following new functionalities and enhancements to support and compliment the personal wireless navigation system mobile application:

In general, the AtlasBook personal wireless navigation system branded website is open to the public for:

1. POI mapping and search including gas prices.
2. Movies and events search.
3. View traffic on maps including incident data.
4. View and print static directions.
5. Place sharing to email addresses and any mobile phone (received as text).

For users who do a have an AtlasBook Navigator personal wireless navigation system on their wireless phone, once they log in they preferably can do all the above plus:

6. Send place messages to all users with the personal wireless navigation system running on their wireless phone.
7. Synchronize recent searches and favorites between mobile and website.
8. Add their own POI categories.
9. Map a friend's response(s) to a GeoPoke(s) on a website.

Store Front for Purchasing and Downloading the Personal Wireless Navigation System—Website The personal wireless navigation system website provides a page dedicated to purchasing and downloading the personal wireless navigation system (e.g., AB v5).

During the purchase process for the personal wireless navigation system, log-in accounts are preferably created for the users.

The personal wireless navigation system users have the option to individually sign on to the website using an account that was created for them during the purchase and download of the personal wireless navigation system. Certain capabilities such as mapping and POI search are available without purchase of ABN. Other capabilities such as synchronization are available to the valid ABN users only after they log-in.

The personal wireless navigation system preferably includes automatic speech recognition (ASR). The ASR solution includes the ability to speak addresses or ask for a POI, in a single utterance. The ASR capability uses vlingo as the primary provider. A generic solution that can be used by either vlingo, Nuance, etc. is more desirable, but the priority is for an ASR solution that supports vlingo.

ASR (automatic speech recognition) reduces the frequency that the user needs to touch the device, which is extremely useful to drivers. Speaking addresses or long words is easier than typing them on a handheld device. In operation, the user speaks the address, business name or category, and the spoken words are converted to text before the personal wireless navigation system conducts the search. If there is more than one match, preferably all possible matches are displayed so that the user can disambiguate.

The ASR powered by vlingo includes a very flexible "single utterance" type solution that enables a subscriber to speak an utterance on the top menu and either navigate to an address or select a POI from a list (category or name).

The ASR replaces the current top "local business" only ASR collection box on the top screen with a more generic capability that enables any address, airport name, or POI name or category to be spoken and appropriately decoded. It also creates a "disambiguation" option to enable the user to define the type of input, if the result of speech recognition could be more than one thing (most likely either an address or a location). An example of the earlier concept for disambiguation is attached, though a command option is possible.

Figure 50A:
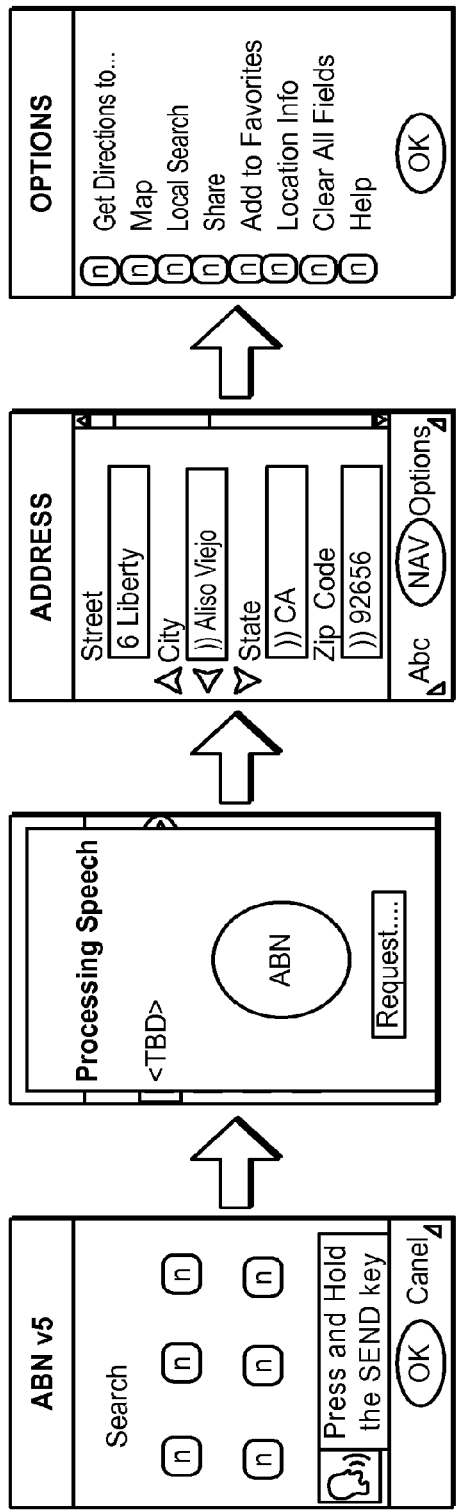
FIGS. 50A and 50B show an exemplary sequence when a user speaks a complete or partial address, the personal wireless navigation system processes the single utterance as a destination, and displays the processed text in the appropriate address fields, in accordance with the principles of the present invention.
Figure 50B:
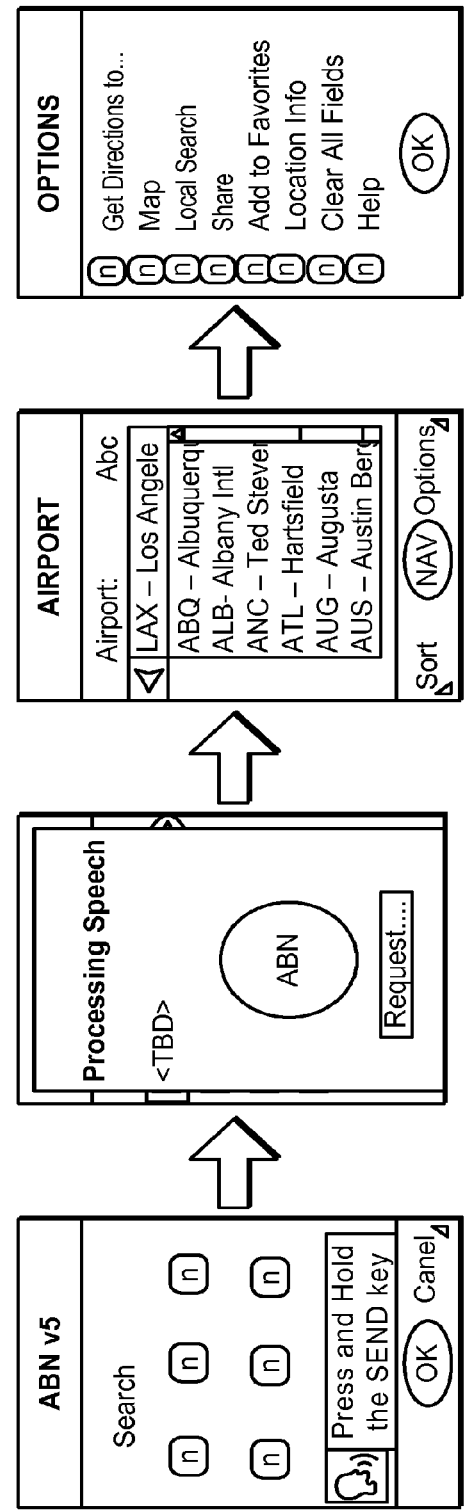

FIGS. 50A and 50B show an exemplary sequence when a user speaks a complete or partial address, the personal wireless navigation system processes the single utterance as a destination, and displays the processed text in the appropriate address fields, in accordance with the principles of the present invention.

As shown in FIGS. 50A-50B, the user can type or speak the values, if any of them were processed incorrectly. The user then may press NAV or go to an options menu to perform another function.

Figure 51:
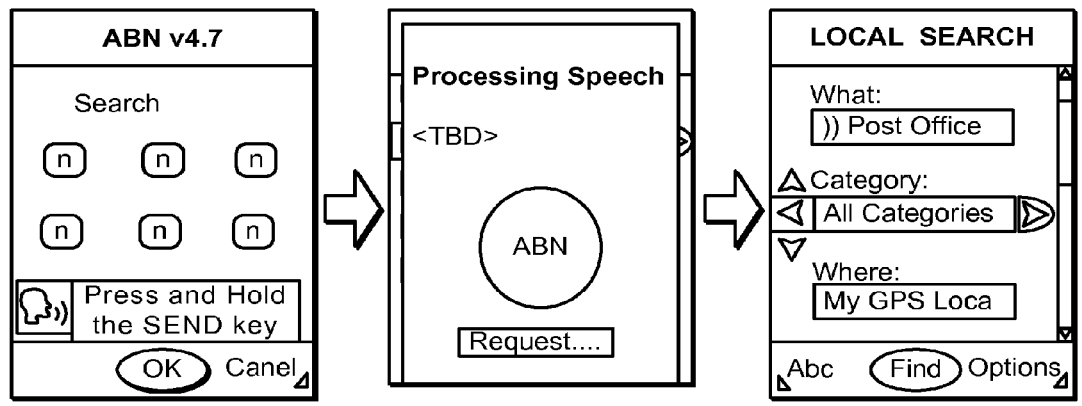
FIG. 51 shows when the user speaks a POI category or name, the personal wireless navigation system processes the spoken word and displays the processed text in a 'What' field.

FIG. 51 shows when the user speaks a POI category or name, the personal wireless navigation system processes the spoken word and displays the processed text in a 'What' field. The user can type or speak the term, if it was processed incorrectly, and then may press FIND to get an options menu to perform another function.

When the user speaks a POI category or name at an address or airport, the personal wireless navigation system first displays the spoken POI category or name, and then processes the spoken address or airport, and then displays the processed text in the 'What' field. The user may type or speak the term, if it was processed incorrectly. The user can then press FIND to get an options menu to perform another function.

The personal wireless navigation system also allows users to speak a movie title, event type such as 'Concerts' or event name such as 'Pageants of the Masters', and the personal wireless navigation system processes the spoken words similar to how it would process POI categories or names.

A merchant paid search functionality provides the ability to cover some data costs, and helps wireless operators and partners to potentially lower the subscription prices as price erosion catches up with mobile GPS Navigation. There are also benefits to the end users, as they see more relevant information about the POI and businesses that they are searching for.

In a given embodiment, it is recognized that some subscribers who search for a certain type POI, e.g., hotels, may be enrolled in several hotel rewards program and would find it useful to see only those brands. Likewise, some POIs and businesses would pay to present certain marketing or other retail information to a user requesting the POS. In one example, user generated reviews and/or ratings about the POIs may be presented to the user.

The personal wireless navigation system may also show coupon information offered by the merchants.

Figure 52A:
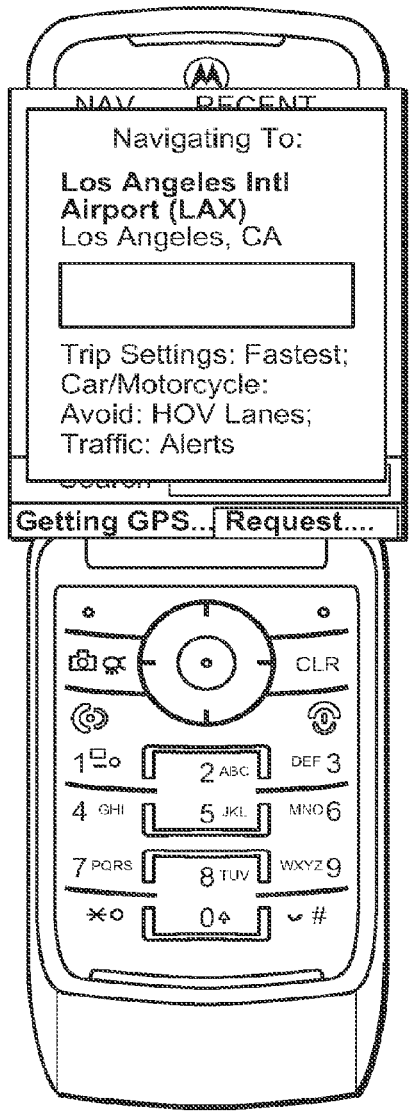
FIGS. 52A and 52B show an exemplary "please wait" display area, in the given embodiment a gray area in the screen, recognized by the inventors herein to be a preferred area where an advertisement or other paid-for information may be placed within the screen.
Figure 52B:
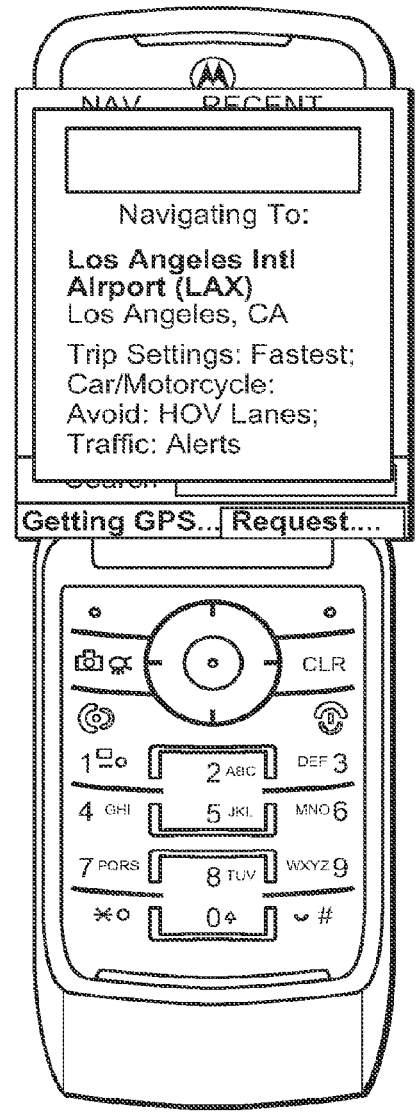

FIGS. 52A and 52B show an exemplary "please wait" display area, in the given embodiment a gray area in the screen, recognized by the inventors herein to be a preferred area where an advertisement or other paid-for information may be placed within the screen.

As an example, the dimensions associated with the "please wait" gray area shown above in a PQVGA display are 176 px wide by 40 px high. In this given example, the user launches their application on their wireless device and selects execution of the navigation program. The user then selects a location they would like to navigate to. As soon as they select Nav, an integrated "Please Wait" screen is displayed with no visible delay. Since this is a navigation "Please Wait," the client preferably integrates a run of a paid-for network banner into the area otherwise normally comprising a "Please Wait" information screen.

When local search is performed using one of eight predetermined premium categories (traffic, restaurant, hotels, ATM, gas, weather, movies, events), the user launches the personal wireless navigation application and selects operation of the navigation application. The user then selects a location that they would like to navigate to. As soon as they select "Nav," the integrated "Please wait" screen is displayed without significant or visible delay. Because this is a specific category of the "Please wait" screen, the client may integrate paid-for information in a suitable banner appropriate to the keyword (category) into the area of the display previously displaying "Please wait.".

As an example, when Local Search is performed using one of the other categories, the user launches the personal wireless navigation application and selects navigation. The user then selects a location that they would like to navigate to. As soon as they select Nav, the integrated "Please Wait" screen is displayed with no visible delay. Since this is a non-specified category "Please Wait," the client integrates a run of the network into the "Please Wait" screen.

In a given embodiment, premium placement advertising is displayed or otherwise appears only when a local search is performed, whether for a specific category or for all categories around a specific geographical location. The TeleCommunication Systems/NIM server preferably passes as much information as possible to an Idearc server to get the most relevant advertisement response for the user's search criteria including location information, plus the category and/or sub category and/or any key words.

Figure 53:
FIG. 53 shows an exemplary "Please Wait" screen with premium placement advertising.

FIG. 53 shows an exemplary "Please Wait" screen with premium placement advertising.

In a preferred embodiment, the user has the ability to click on the display to see additional information as well as initiate a call to the location by pressing the call key on the handset.

In an example showing a premium placement local search use case, when Local Search is performed specifying a category and sub-category, the following occurs:

The user launches application and selects local search. Then the user selects a category (e.g., eating and drinking). The user then specifies a sub-category (e.g., Italian). Both eating and drinking as well as Italian are sent to the Idearc server along with the location. Thus, while Search Builder performs the POI results, all of this information is sent to Idearc's server and relevant or desired advertising results are obtained back by the personal wireless navigation system.

Continuing on, the geo information is provided back in the ad results and this information is used to calculate the Premium Placement ad's distance from the user. The search results are returned to the client and the first line item displayed is, e.g., "0.8 ml Olive Garden, <address>, <etc.>".

Other search results display in the standard distance order including Italian restaurants that are closer than the Olive Garden in this example. While distance is included in the banner, it is preferably not used to determine the placement within the display. In the preferred embodiment, the ad always appears in the same location, e.g., at the top.

Preferably the personal wireless navigation system website also provides paid merchant information including banner advertisement and premium placements, similar to how it is deployed on the mobile application.

The messaging capability of the personal wireless navigation system allows users to poke, referred to herein as "GeoPoke", their friends and request their location. Users are able to request friends' locations by composing and sending a place message that has the default greeting, e.g., "Where are you?" The recipient or recipients can respond with their GPS location. In this way, the messaging capability enhances social networking capabilities of the personal wireless navigation system.

Figure 54A:
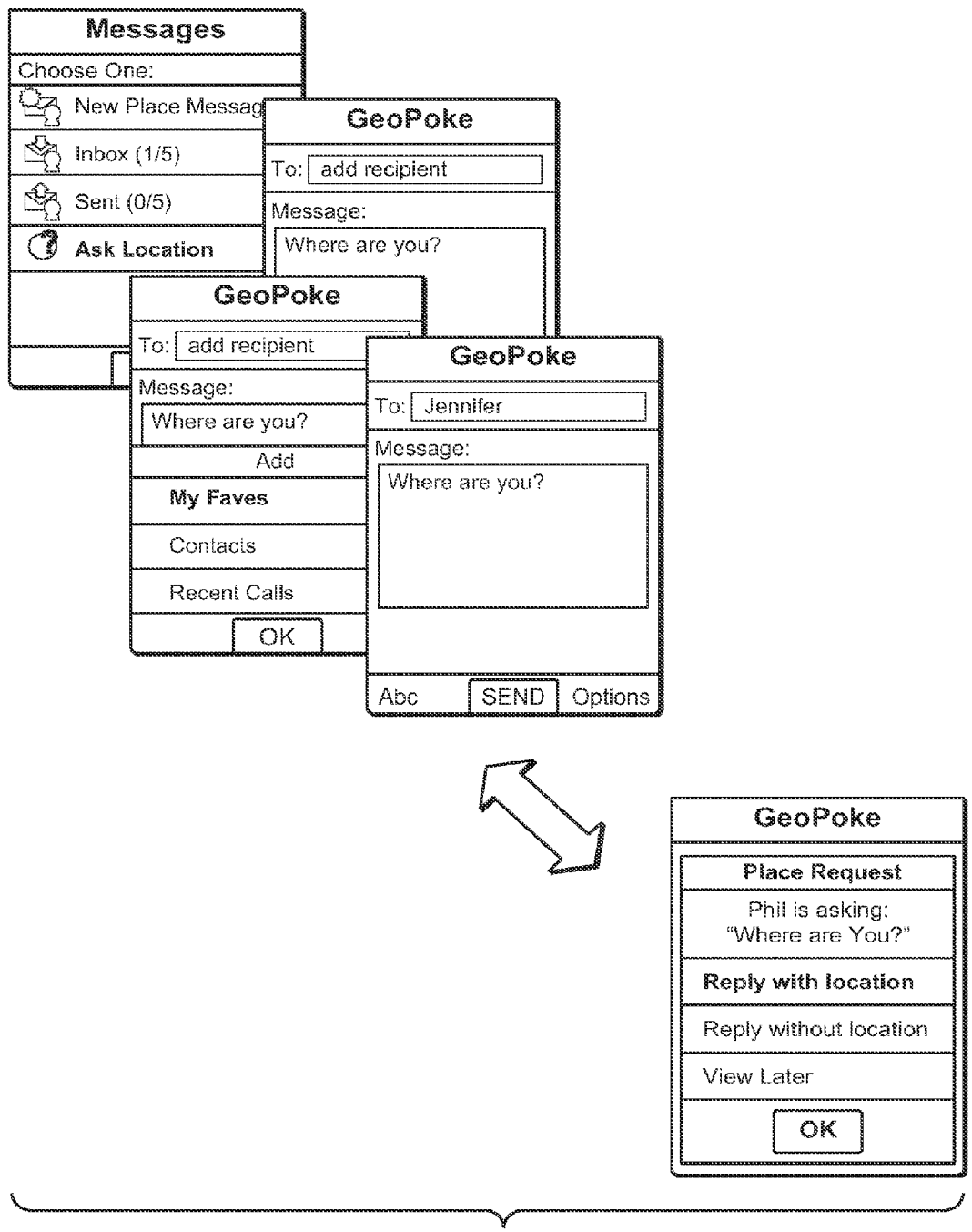
FIGS. 54A and 54B show when a geo poke or response to a geo-poke is received, it preferably includes brief information or a flag identifying the brand of the personal wireless navigation system to the receiver, such that the receiver knows that they are getting poked by someone who has a branded version of the personal wireless navigation system on their phone.
Figure 54B:
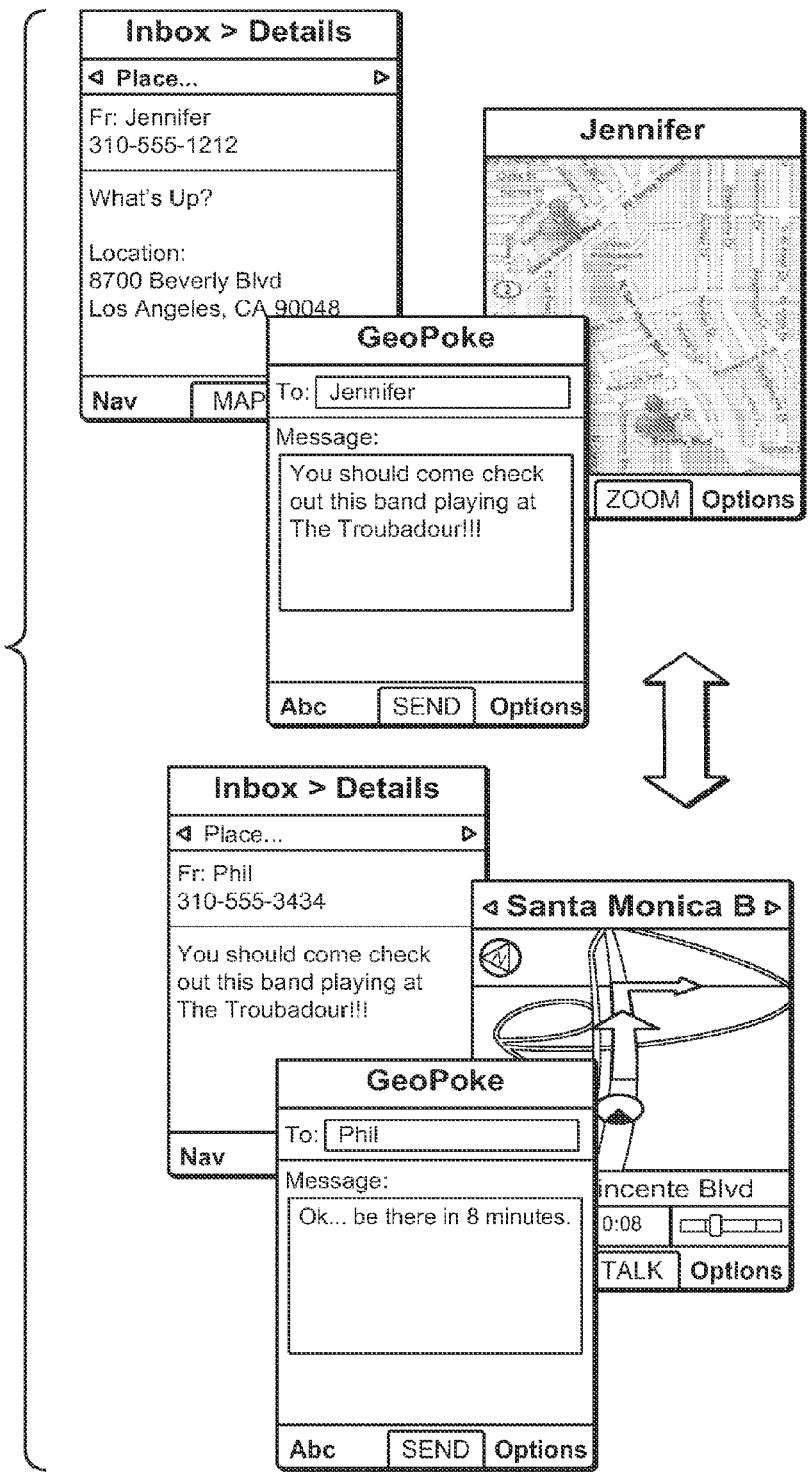

FIGS. 54A and 54B show when a geo poke or response to a geo-poke is received, it preferably includes brief information or a flag identifying the brand of the personal wireless navigation system to the receiver, such that the receiver knows that they are getting poked by someone who has a branded version of the personal wireless navigation system on their phone.

The same is supported via the website. In particular, the personal wireless navigation system users who sign in and had GeoPoked their friends from either the website or mobile application are able to get the response on the website, such that the location of the response (friend's location) is displayed on the map, as well as any text responses that the friend appended to the GeoPoke response.

Figure 55:
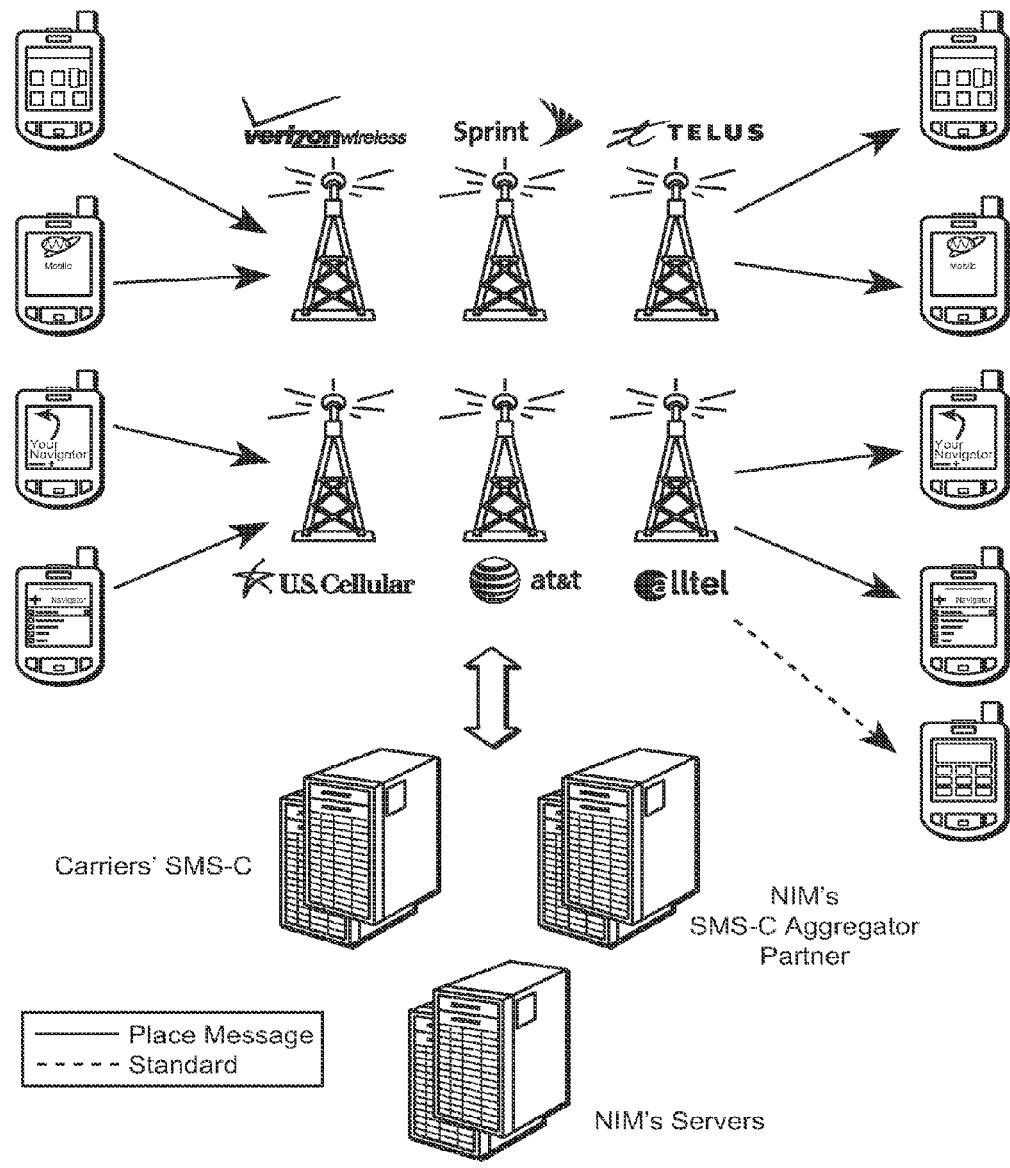
FIG. 55 shows that when a geo poke or response to a geo-poke is received, it includes brief information or a flag identifying the brand of the personal wireless navigation system to the receiver; such that the receiver knows that they are getting poked by someone who has a branded version of the personal wireless navigation system on their phone.

FIG. 55 shows that when a geo poke or response to a geo-poke is received, it includes brief information or a flag identifying the brand of the personal wireless navigation system to the receiver; such that the receiver knows that they are getting poked by someone who has a branded version of the personal wireless navigation system on their phone.

Conventional place messaging and GeoPoking is only possible within the same brand of personal wireless navigation system, e.g., within AtlasBook v4. In accordance with the invention, place messaging in the personal wireless navigation system is enabled cross brand/cross platform, cross carrier. This is because competitive mobile LBS applications including Telmap and telenav enable users on different carriers to share locations. In the personal wireless navigation system, place messaging capability is extended to enable cross branded products to be able to send and receive place messages cross platforms (WM, Brew, J2ME, BB-J2ME, etc.,), cross carriers.

FIG. 55 shows an example where a AAA Mobile user on an AT&T network receives a place message from a Your Navigator user on the US Cellular network, in accordance with the principles of the present invention.

Traffic Probes

The personal wireless navigation system uploads the speed of its users to TeleCommunication System/NIM servers, and the information is processed and made available as real time traffic data. The personal wireless navigation system samples and logs the speed of the user based on traffic partner requirements and uploads them to optimize the usage of network resources. In this way near-real-time GPS traffic probe data may be achieved.

Users of the personal wireless navigation system may be prompted with the option to provide their speed information and other information while they drive to enhance traffic based navigation. This may be accomplished via pop up as a new EULA extension. This option may be accepted or modified by each carrier as required to meet user privacy requirements.

For "approved" users, during operation, the system collects information on actual travel speeds for road segments. These speeds are stored in a file for transmission to TeleCommunication Systems/NIM servers at points during product operation. The transmission of this information Is preferably automatic, requiring no user intervention. At a minimum the information preferably comprises: LAT/LON, plus direction of travel and speed, and the date/time for each collection. Preferably, to ensure privacy of users, no information that could identify the user is transmitted in this regard.

The number of samples is determined based on traffic partner requirements. The primary goal is not to impact perceived system performance for the user. An ancillary goal is not to burden the network with extraneous data transmission.

Particular NAVTEQ Requirements are met based on "hard" probe data, with fixed devices in commercial vehicles. Particular NAVTEQ information collected by the Traffic probe includes:

The handle remains anonymous.
Latitude (5 decimal place precision).
Longitude (5 decimal place precision).
Speed (e.g., in kilometers per hour).
Heading (in degrees, 0 degrees=North).
Timestamp of observation (year, month, date, hour, minute, second, (e.g., in GMT)).
Timing.
Frequency of collection. In the preferred embodiment, each data point is collected once every 15 seconds and stored on the device until transmission back to a central server.
Transmission periodicity. In the preferred embodiment, the collected data is transmitted back to a central server on a 15 minute interval (or shorter interval to the extent the carrier infrastructure can support a higher frequency of transmission). At each 15 minute interval (or shorter interval to the extent the infrastructure can support a higher frequency of transmission), the saved data points are placed into a single packet and transmitted back to a central server.

A traffic probe web service allows Traffic.com to collect and manage anonymous probe related data. Preferably a single anonymous handle, or reference string, is associated with each point within a single packet, though it need not be the same from one packet to the next. Anonymous reference strings are unique for every packet. There is thus no persistent link between data points and the device from which they originate. An exemplary method is sendProbeData, which is an asynchronous method which accepts multiple, anonymous probe data readings for Traffic.com's consumption.

The Authentication Web Service provides access to user and web service client login using a method called authenticateWebServiceClient. authenticateWebServiceClient authenticates the web service client and returns a client context.

The schema represents the structure of the data in the traffic probe web services. The scheme WebServiceClientContext.xsd is used for web service client authentication, and enables Traffic.com to secure access to web services based on the client making the calls.

Probe.xsd represents the probe related data types.

ProbeData represents anonymous probe device, location, heading and speed data.

GlobalPosition represents the global positioning data.

GeoLocation represents latitude and longitude.

An application tray is established on the wireless device to conveniently permit selection of various location based programs. In the present invention the branding is called "NAVBuilder version 5" or "NAVBuilder v5." NAVBuilder v5 version is for the same platforms, from which device specific extensions can be derived, for $3^{rd}$ party application development targeting multiple carriers. Additionally, App2App and Web2App APIs are supported.

Other device applications support LBS functionality, and thus the same navigation application is leveraged whether integrated or invoked by the application. App2App and Web2App APIs enable $3^{rd}$ party developers to invoke AtlasBook Navigator v5 from other device applications, WAP application, or Web application.

NAVBuilder for v5 is preferably delivered as an SDK, supporting multiple platforms and carriers without modification to the core architecture. If there are limitations to delivering a single SDK, it is necessary to support SDKs for the following platforms: C-based (Windows Mobile, iPhone, BREW, Linux, Symbian) and Java (Blackberry, J2ME).

The NAVBuilder APIs support allowing the user to create a user interface (UI) that conforms to the graphical user interface (GUI) of the parent application, as well as, offer $3^{rd}$ parties the capability to use the existing graphical user interface (GUI).

As an example, one $3^{rd}$ party has an application that does not use text boxes, as shown in the example below. NAVBuilder for v5 allows the developer to create a GUI that has a similar look and feel to the parent application. The NavBuilder, App2App, and Web2App is delivered as four components: libraries supported by APIs in core platform, internal specifications, $3^{rd}$ party documentation, and sample code.

NAVBuilder preferably supports multiple APIs, such as: Navigation; Plan Trip; Localization Preferences; Address Lookup; and Preferences.

The exemplary Navigation API supports all features of AtlasBook Navigator 5 including: Real-time, turn-by-turn driving directions; Support for resuming an interrupted navigation session; Automatic re-routing; GPS-based navigation; Voice prompts; display of traffic information; and detour options including trip update and trip summary using traffic data.

The Plan Trip API supports all features of AtlasBook Navigator 5 including: user input to select start and destination locations, trip settings, and how they use traffic; and user capability to reverse trip.

The Local Search API supports all features of AtlasBook Navigator 5 to search for POIs by name or by category around a specific point, along a route, or in a certain direction.

The Maps API supports all features of AtlasBook Navigator 5 for downloading and rendering, both 2D and 3D sliding vector maps, 3D Perspective View, Sliding vector maps, and support for Traffic alerts overlay.

The Localization Preferences API supports user options to select languages and maps, as specified in country support for AtlasBook Navigator 5.

The Address Lookup API supports all features of AtlasBook Navigator 5 for finding the address or intersection of given coordinates or finding the coordinates of a given address or intersection. The following information is supported: Street name and number in any sequence, city, state, zip code, and country.

The Preferences API supports all features of AtlasBook Navigator 5 for enabling user preferences for Navigation options, Map options, Language, Trip Settings, Country selection.

App2App supports all features supported for the conventional version 4 plus new features supported in AtlasBook V5 Navigator including Internationalization and new route types (e.g., pedestrian).

WebApp supports all features supported for V4 plus new features supported in AtlasBook V5 Navigator including Internationalization.

When users run the navigation program, they always have the ability to benefit from the program's primary purpose, providing route guidance, the product's primary purpose. Thus, through NAVBuilder, other functions run without suspension of navigation on the mobile device providing the personal wireless navigation system. For instance, if a navigation session is running, and if a user views a traffic summary including any traffic incidents, map of route, etc., the navigation session continues to run.

It is preferable, though not absolutely required, to perform some functions such as POI search and sharing without suspending navigation. For instance, if a user decides to search for POI, or view the traffic summary, maneuver announcements continue to play, and once the user returns to any of the three navigation view modes, the information on the screen is maintained up to date.

As another example, if a user is navigating and then decides to do any of the actions (such as viewing traffic summary; viewing an incident detail; viewing a map of the route, map of incident, or map of a step along the route; conducting a local search; or composing and sending a place message), the navigation continues to run, to play maneuver announcements, recalculate an announcement if necessary, and/or adjust the trip parameters in the background until the user returns to the navigation screen.

The personal wireless navigation system preferably displays an immediately required section of the route quickly by utilizing 'data streaming' to illustrate the first few segments of the route. For example, if the navigation system starts up while the personal wireless navigation system is "on-route," the first maneuver map and announcement is preferably displayed quickly, e.g., within 3 seconds after the user presses NAV. If the personal wireless navigation system starts up while the mobile device is "off-route," the first maneuver map and announcement is also preferably displayed quickly, e.g., within 3 seconds after the user presses NAV.

Thereafter, the personal wireless navigation system continues to download the remaining portion of the route in the background—regardless of whether it is a short route or long route. If it's a longer route, it takes a while for the first announcement to play as the mobile application waits until the entire route is downloaded, before the first maneuver announcement is played. But the personal wireless navigation system displays the start of the route quicker, e.g. within a maximum of 3 to 5 seconds, depending on an on-route versus off-route condition.

The personal wireless navigation system uses similar techniques to streaming video download, by displaying and playing the first few maneuver announcements and displaying the first few maneuvers while the application downloads the information necessary to render the rest of the route which includes segments that users will not encounter for some time.

If a user decides to look ahead while the personal wireless navigation system displays the first few segments of the route and is in process of downloading the remaining segments, the look-ahead screen informs users that the information is being retrieved.

Similarly, if a user decides to view a trip summary or a traffic summary, the personal wireless navigation system displays a screen indicating that the information is being retrieved.

The personal wireless navigation system uses better position estimation between fixes and in poor coverage areas (tunnels & building canyons) in deterministic areas, with simple cases. In this way the user experience is enhanced in poor coverage areas so that the personal wireless navigation system becomes more competitive with on-board solutions.

In doing this, the personal wireless navigation system uses current speed to estimate upcoming position and cache the parameters in the event that the driver enters areas with poor coverage. The personal wireless navigation system also utilizes secondary sensors, if available.

For instance, if a driver enters a tunnel, the personal wireless navigation system is unable to get a GPS fix. Nevertheless, based on sampled speed values, the personal wireless navigation system estimates the driver's position, and preferably any maneuver announcement that needs to be played, including announcement of any impending exit inside the tunnel or immediately after the tunnel, as the device may not have ample time to get a fix and update the information on the screen in time for the driver to prepare for the maneuver.

Preferably the distance to the maneuver is counted down (e.g., with a background in color yellow instead of color teal).

For an off-route start up case, the personal wireless navigation system provides enhanced navigation by guiding the user without recalculation, in the event that the user takes a different exit or driveway to get towards the main route, while continuing to show the user's progress towards the start of the suggested route.

Users in an off-route start up case may not always take the suggested driveway or exit to get to the main road. To reduce the necessary number of recalculations, the personal wireless navigation system has more information about the start up location and guides the user toward the start of the route. The inventive personal wireless navigation system uses maps to guide the user toward the start of the route without the need to recalculate a new route. Thus, e.g., if a user exits a plaza from a different road that that which was expected, the personal wireless navigation system does not recalculate, but instead guides the user toward the suggested route.

With the underlying assumption that 3D-Perspective view is the default navigation view mode, for an off-route start up case, the personal wireless navigation system displays 3D perspective view of the user's position oriented such that the start of the route is located at the top of the screen. As the user (which is represented by an avatar on the display) moves toward the start of the route, and eventually gets on the route, the 3D perspective maps is oriented and slides accordingly. The screen also displays all residual information, i.e., total travel time, total distance, traffic gauge, as well as distance to the start of the route, compass heading, GPS availability, and the upcoming maneuver type (left turn versus right turn).

If the '2D-Top View' is set as the navigation view mode, then the off-route start up case is also displayed in '2D-Top View' mode. If "Dashboard" is the navigation view mode, then the start up case will be a 2D map, and as soon as the user gets to the start of the route, the screen switches to dashboard view mode.

The vector maps during navigation displays the point of interest (POI) icons of the most relevant POIs along the route on a sliding navigation map.

For the 3D and 2D navigation view modes, the personal wireless navigation system downloads the POI information and displays their respective icons for the most relevant POIs along the route, e.g., food, gas, lodging, and rest areas. Each time the personal wireless navigation system mobile application downloads new vector information for rendering, it downloads the POI details for these categories as well.

Figure 56:
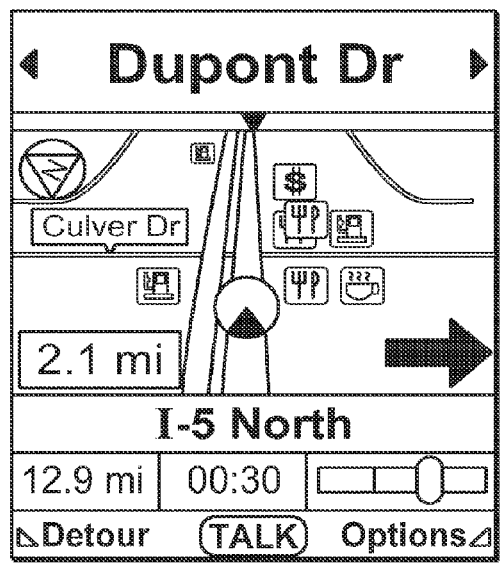
FIG. 56 shows an exemplary touch screen device where a user can click on an icon, and details relating to the clicked-on POI are displayed, in accordance with the principles of the present invention.

FIG. 56 shows an exemplary touch screen device where a user can click on an icon, and details relating to the clicked-on POI are displayed, in accordance with the principles of the present invention.

The following POI categories are displayed on 3D or 2D modes for car navigation: Eating & drinking; gas stations, lodging, public parking, and rest stops. In other modes, e.g., in Pedestrian mode, the displayed POI categories are different, e.g., restaurants; coffee shops; bars; public restrooms, and ATM's.

The preferred POI for display may be changed. In particular, a setting may be added under 'Preferences' to either allow users their desired (5) POI categories, or allow users to select from a predefined theme of categories, each encompassing the most relevant POI category for the respective theme. As examples, a "Business Travel" POI category includes: car rental return; train/shuttle/bus stops; gas stations; copy/mailing centers; and hotels. a "Tourist—Pedestrian" POI category includes: shopping centers; coffee shops; train/bus stops; restaurants & bars; museums, galleries and historical sites; public restrooms; and ATMs. A "Road Travel" category includes: gas stations; rest areas; auto repair; restaurants; historical sites, museums and vista points; and hotels & motels. A "Weekend On The Town" category includes: weekend specials—stores with discounts, blow out sale (merchant paid search); eating & drinking (specializing in new openings); street festivals & fairs; public parking; and ATMs. A "Commuter" category includes: gas stations; coffee shops; restaurants; fast food; and ATMs. (Note the possibility to overlap POIs within multiple categories.)

A user is able to remove and thus disable any or all POI categories from showing on the navigation maps or screens. The capability to display specific POI categories is also available via Follow Me Map, and Map of Route, and Map of Step.

The personal wireless navigation system preferably supports time based turn restrictions for all road types including HOV lanes. For instance, whenever the personal wireless navigation system calculates a route, it uses the time tables attached to each segment with turn restriction, and returns a route that avoids all segments that the user will not be able to traverse, given the expected travel time window.

Time-based high occupancy vehicle (HOV) lane support is also preferably provided. For instance, if a user has explicitly chosen to avoid HOV lanes, the personal wireless navigation system will honor this user preference setting when the HOV rules are enforced. Otherwise they are ignored and such lanes may be part of the route if it yields the optimal route given the remaining rules and/or restrictions.

Time-based turn restriction is supported by the personal wireless navigation system in consideration of all route segments that qualify during the expected time of travel therethrough.

The personal wireless navigation system provides real time notification for other road attributes as drivers approach, e.g., toll plazas, areas where cameras are installed, tunnels, and ferry docks.

The attribute icon displays the speed limit for the segment, so that the driver can compare it to the actual speed on the odometer at a glance.

The personal wireless navigation system displays an icon representing each attribute type on each navigation or look-ahead screen, e.g., speed limit, camera zone, tunnels, or ferry docks. Preferably the personal wireless navigation system provides distinct audible and/or visual notification for each such attribute type.

For instance, the personal wireless navigation system may also be configured to notify the driver if they are sensed to be going faster than the posted speed limit. Alternatively a compliance buffer of, e.g., specified as a percentage such as 14%, or as a mph such as 9 miles per hour, may be configured so that the driver is not notified unless exceeding the posted speed limit plus a given compliance buffer for that speed.

Drivers and their passengers may require extra time to prepare as they approach areas with attributes requiring potential action by the driver, for instance camera zones in which the driver should become more attentive to their surroundings. In such a case, the personal wireless navigation system provides notification of a given camera zone. For instance, the personal wireless navigation system notifies drivers with a suitable announcement such as "Warning! Traffic camera ahead!" in advance, as they approach a traffic camera zone (or a stop light camera, or speed camera, etc.): The rules for timing of this announcement are similar to the rules for announcing an upcoming maneuver.

The notification also sets an expectation for the driver that the application may behave differently based on the attribute that they are about to encounter, e.g., an impending tunnel requiring potential action by the driver. The timing of a maneuver announcement relating to the impending tunnel may be different in anticipation of areas with poor coverage.

As another example, the personal wireless navigation system may notify a driver with a suitable audio announcement such as "Approaching Tunnel in <X> miles (yards or feet)!" in advance, as they approach the relevant tunnel. Rules for timing of this announcement are similar to the rules for announcing an upcoming maneuver. These rules are augmented by enhancement requirements to navigation in areas with poor coverage.

In a similar vein, if there is toll plaza at a tunnel entrance, then the personal wireless navigation system uses a toll plaza notification announcement followed by the tunnel notification announcement, and the attribute icon toggles back and forth in intervals of, e.g., 3 seconds or more.

These features increase the usefulness of the personal wireless navigation system, particularly as it offers some basic features found in conventional portable navigation devices (PNDs) and in-car navigation systems, but adds significantly thereto. Some early features of the personal wireless navigation system were deployed in earlier versions in Nordisk Navigator in Europe.

For 3D and 2D, an attribute icon is displayed at the top center portion of the screen so that it does not interfere with the rules for displaying the other indicators—compass, GPS availability, and traffic alerts.

Finally, the personal wireless navigation system provides a configurable setting to disable/enable any or all of the alert types.

Ferry docks may require certain functions of the application such as TBT navigation to not be available while the user is on the ferry. The personal wireless navigation system includes a ferry dock notification that notifies a driver with a suitable announcement such as the following announcement in advance, as they approach a given ferry dock: "Approaching Ferry Dock, in <X> miles (yards or feet)! The rules for the timing of this announcement are similar to the rules for announcing an upcoming maneuver.

The personal wireless navigation system provides users the option to view follow me maps in 3D perspective or 2D top view, similar to a user experience found in conventional portable navigation devices and in-car navigation systems. The options menu for the Follow me map includes the option for changing view mode from 3D (default) to 2D. The default setting for the follow me map may be 3D for some branded versions of the personal wireless navigation system, in order to be consistent with expected user experience, and provider requirements. On the other hand, the default setting for the Follow me map may be 2D for other branded versions of the personal wireless navigation system, particularly if users explicitly select 'Pedestrian' mode.

The personal wireless navigation system includes an enhanced pedestrian navigation function which provides a top view mode, similar to 'Follow Me Map' behavior, higher zoom levels, and bread crumbs, just to name a few examples. To provide good pedestrian navigation, the pedestrian navigation of the personal wireless navigation system meets the requirements of a typical pedestrian, which is different from a driver. Therefore, the pedestrian navigation behavior and use cases are significantly different from those for automobile navigation.

Conventional portable and in-car navigation products provide a traffic alert announcement just once for any given incident or congestion. The personal wireless navigation system uses a rule to re-announce a past traffic alert announcement at least one more time. This re-announcement rule is based on several conditions, including: the distance traveled from the point when the first announcement was played; the distance to the location of traffic alert; the time that has elapsed since the first announcement was played; and/or a logical combination of above.

Conventional portable and in-car navigation products use the same announcement for alerts regardless of which side of the road the incident or congestion is at. The personal wireless navigation system uses a distinct, unique announcement type for a reported incident or congestion that is on the opposite side or direction of the road on the users' route. Example unique announcement types for an alert relating to the opposite direction of the road includes:

"Traffic congestion ahead in X miles on eastbound <road name>", used when the user is approaching congestion from a westbound direction.

"Traffic incident ahead in X miles on westbound <road name>", used when the user is approaching congestion from an eastbound direction.

"Traffic congestion ahead for the next X miles on northbound <road name>", used when the user is approaching congestion from a southbound direction, etc.

Wherever necessary, the personal wireless navigation system uses the 3D engines of the hardware such as OpenGL ES 1.0 to support 3D graphics with improved performance—if and only if the architecture for the personal wireless navigation system mobile application can benefit from them.

Enhanced Trip Summary Screen

On selected devices with larger screens, an enhanced trip summary screen is used to provide trip summary information illustrated such that it looks more like an automobile dashboard rather than a page full of text.

Figure 57:
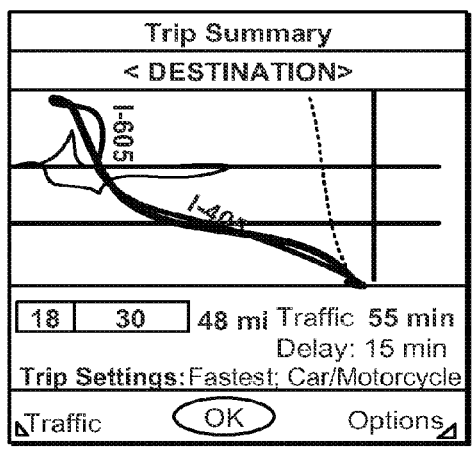
FIG. 57 shows an exemplary enhanced trip summary screen, in accordance with the principles of the present invention.

FIG. 57 shows an exemplary enhanced trip summary screen, in accordance with the principles of the present invention.

Faster Rendering of Maps

In the personal wireless navigation system, when a user pans the map, the application responds quickly by panning the map instantly, and getting or drawing the new areas of the map. In conventional portable or in-car navigation systems, the application waits before the complete display area is rendered or downloaded, before it shows the result to the user. Also, when the user pans, the screen does not refresh instantly and waits until the new map is loaded. The present inventors have realized that this is not an optimum user experience as people in general expect immediate response to panning.

Figure 58:
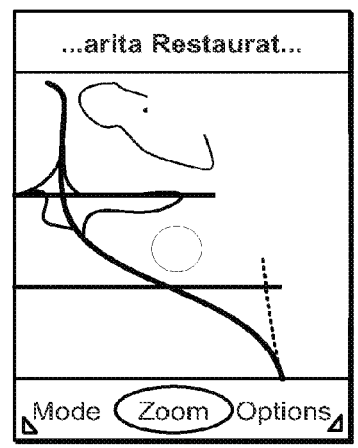
FIG. 58 shows a personal wireless navigation system displaying new map information as it becomes available, in accordance with the principles of the present invention.

The personal wireless navigation system in accordance with the principles of the present invention provides immediate response on the map. As soon as the user input requests moving the map, the map pans in the respective direction (pressing a button, tapping on screen, or dragging on screen). Thereafter, as shown in FIG. 58, the personal wireless navigation system displays new map information, as it becomes available.

The personal wireless navigation system leverages the native controls of the device platform, and integrates with native applications and services, including Windows Mobile platforms. Supported native features include: Menu, Cut, copy and paste, Combo boxes with pull down menus, Buttons, Messaging APIs, List view, Scroll bar enable/disable, Month calendar, Progress/Status Bar, Tool Bar Controls, Contacts API, and Calendar API. This applies as well to UI enhancements including the use of combo boxes with pull down menus, buttons, list view, scroll bar, tool bar controls.

The personal wireless navigation system implements scalable graphics. For instance, icon size, fonts and text spacing is designed for scalability to reduce porting time. The Icon size, fonts and text spacing is determined based on the design guidelines of each device or defined as a percentage of the screen size and dimensions used for spacing.

The personal wireless navigation system preferably meets requirements of the Windows Hopper test. The personal wireless navigation system implemented in a Windows Mobile environment meets requirements of Microsoft Logo Certification.

The personal wireless navigation system handles selection and/or switching between portrait and landscape display modes for all target platforms, taking into consideration accelerometer values and/or other hardware settings. Some mobile devices require the application to function only in portrait or landscape mode. All features and functions of the personal wireless navigation system application operate seamlessly in both orientations.

Landscape only mode orientation supports buttons or keys on the left edge or right edge. The default in the preferred embodiment supports buttons or keys on the right edge.

When changing orientation in a map screen, the displayed map redraws without sending a request to the server.

All settings and configuration information resides within Preferences.

FIG. 59 shows a table identifying where in the application users can change specific options, and whether the change will be permanent (i.e., ✓ =Sticky) or temporary (X=nonsticky).

User selection controls have a similar look and feel regardless of the platform. The user selection controls provide a good user experience whether on touch screen or non-touch devices. For non-touch screen devices, user input controls are accomplished through use of a trackball, D-Pad, or rocker and LSK and RSK.

User selection controls are easily identifiable, meaning that the user implicitly knows what the function of the control. For example, a shortcut key identified as Map indicates to the user that upon selection, the application downloads a map of the selected item.

For touch screen devices, there is preferably enough spacing between controls to prevent users from accidentally selecting unintended items.

Lines is used in lists (contact list, call list, etc) to separate rows if list items contain more than one line. For example, category lists and airport lists do not have line separators. Rather, results screens containing the name on one line and details on a second line has line separators.

The graphics for a footer toolbar/shortcut keys/commands in the personal wireless navigation system are preferably similar to the toolbar footer used throughout the device. It is preferred that numbering of menu lists and options lists be omitted in the personal wireless navigation system for touch screen devices and smartphone devices. Instead, either a small icon representing the function replaces what would otherwise be numbering, or no bulleting is used at all.

The width of each row or field (text entry field and drill own field) is the same as the pixel width implemented by the OEM device manufacturer in given OEM screens.

For personal wireless navigation system devices with touch screen support, the personal wireless navigation system utilizes a touch interface throughout the application for selecting functions, executing commands and The personal wireless navigation system supports larger fingertip targets for user interface controls. The layout of the application is modified to accommodate larger icons and list text to prevent accidental activation of the wrong control. The application has greater spacing between menu and list items. This spacing is typically defined by the OEM, carrier, or as a percentage of the display area of the device. Preferably there are no highlighted states when the application launches its home page.

The personal wireless navigation system uses single gestures such as swipe, drag, click, flick as appropriate to provide functions such as scrolling up and down and panning left and right through the entire list on the screen.

Gestures are specific movements performed by users to get specific results. Gestures are used to mimic actions typically used with a mouse or keyboard. Gestures can be used to navigate through the application, change screens, drill down to detailed information, zoom, panning, etc. The personal wireless navigation system supports the native gestures of the platform. Supported gestures include: touch/tap; touch and hold; and touch and drag.

Touch/Tap—Touch or tap requires the user to briefly contact the screen in one location. A touch/tap selects an item or invokes an action. It is also preferably used to position the cursor for text entry. Touch sequence: DOWN, UP for 250 ms-500 ms. The screen types and the action associated with a Touch/Tap include: main menu icons; second layer list or icons; search results; and shortcut keys.

Main menu icons perform a drill down action to the next layer. Second layer list or icons perform a drill down action to the next layer. Search Results highlights the item, and shortcut keys invoke the action, i.e. navigates, maps, displays local search options, displays place message options, etc.

If the user touches or taps an inactive area of the display, there is no action.

Touch and Hold—A touch and hold is a touch that lasts more than, e.g., 500 ms. The screen types and the action associated with a touch and hold includes: main menu icons; second layer list or icons; search results; and shortcut keys.

Touch and Drag—The user touches, holds, and moves their finger without losing contact with the screen. The item touched moves in the direction of the motion of the finger. A touch and drag gesture is used to scroll a list of items either up or down. The screen will move in the direction of the drag. Exemplary types of screens using a touch and drag gesture include: a 'Category' list; 'Recent Searches'; 'Favorites'; 'Airport'; 'Address Book' list; 'Messaging—Inbox' list; 'Messaging—Outbox' list; 'Movies— . . . '; 'Events— . . . ; and 'Preferences—Country'.

FIG. 60 shows the Zoom slider using a touch and drag gesture, in accordance with the principles of the present invention.

As shown in FIG. 60, a user touches, holds, and moves their finger without losing contact with the screen. In response, the zoom slider moves up or down in the direction of the motion of their finger.

The map display uses a touch and drag gesture (panning) to enable the user to change the viewing area of the map. To accomplish this a user touches and holds; and moves their finger in any direction, without losing contact with the screen. In response, the map moves in the direction of the motion of their finger.

A zoom bar displays on the right side of the map on all non-navigation maps. The user can change the zoom level by touching and dragging the zoom slider, or by selecting the +/– icons above and below the zoom bar.

Swipe/Flick—A swipe or flick is a unidirectional gesture used to contact the screen in a quick swiping or flicking motion. The screen scrolls in direct response to the swipe or flick of the finger in the same direction with speed based on the speed of motion before release. The screen movement continues until speed decelerates or the user touches the screen to stop the motion.

Horizontal Swipe/Flick—A horizontal swipe is used for navigating to the next or previous item of detail screens. The current screen will move in the direction of the swipe, and the next screen will appear one at a time. The motion will continue until the next screen is fully visible. This feature is used to 'page' through "details" screens of the application.

Figure 61:
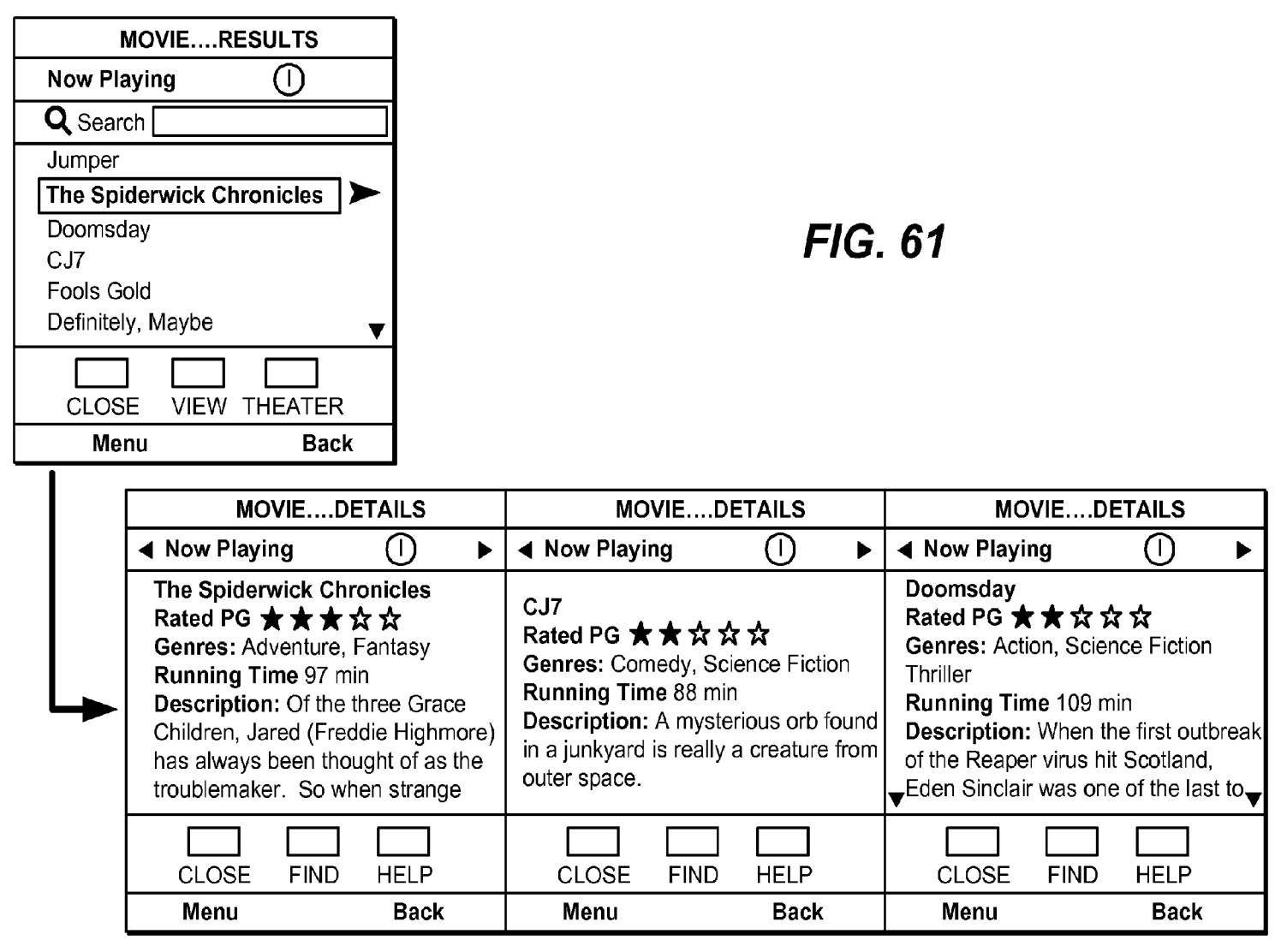

FIG. 61 shows the user interface (UI) flow for a MOVIE . . . RESULTS/MOVIE DETAILS. Horizontal Swipe sequence: DOWN, GESTURE sequence.

Vertical Swipe/Flick—A vertical swipe is used for a fast inertia-based scroll such as quickly scrolling up or down a screen or list. The screen moves quickly in the direction of the swipe and eventually slows down and stops. This gesture is used in the application to scroll up or down list items. An exemplary vertical swipe sequence: DOWN, GESTURE. When the user gets to the top or the bottom of the list, their screen displays a 'bouncing' animation that signals to the user that they are at the top or bottom of the list. Screens supporting the vertical swipe gesture are classified by 'search results' or lists. Exemplary screens include: a 'Category' list; 'Recent Searches' Results; 'Favorites' Results; 'Airport' List; 'Address Book'/Contacts list; 'Messaging—Inbox' list; 'Messaging—Outbox' list; 'Movies—Now Playing, Coming Soon, In Theaters, Theaters, Search Results List; and 'Events Results List.

In general the elements used on the screen to illustrate gestures mimic the native illustrations gestures as much as possible.

Figure 62:
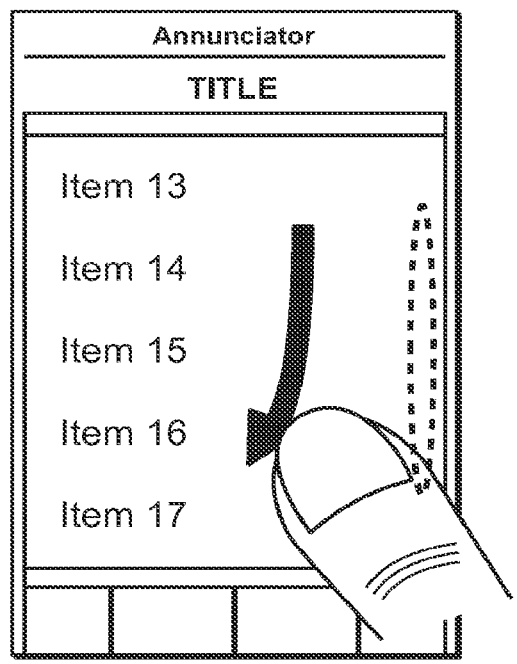
FIG. 62 shows dragging up and down support use instead of a scroll bar. The personal wireless navigation system uses a floating bar (with no track and no arrows at the top or bottom of the track) that illustrates proximity to either end of any list; e.g., search result list, Recent Searches list, etc.

FIG. 62 shows dragging up and down support use instead of a scroll bar. The personal wireless navigation system uses a floating bar (with no track and no arrows at the top or bottom of the track) that illustrates proximity to either end of any list; e.g., search result list, Recent Searches list, etc.

When in the navigation screen, the user is able to drag up and down to switch between the navigation view and the upcoming turn view.

If drag support is not available in the particular host device for the personal wireless navigation system then the scroll bar is present at a width of, e.g., 24 pixels.

The swiping gesture is used to support scrolling back and forth through: details screens; POI search results; movie search results; event search results; recent searches and favorites; weather for each day; navigation screens; look ahead screens; trip summary screen; and traffic summary screens.

The navigation application supports box-out/box-in and slide-in/slide-out transitions.

A box-out/box-in transition is used in response to leaving the main menu and going back to the main menu.

Leaving the main menu (box-out) to any of the immediate landing screens: navigation, local search, movies & events, messages, maps & traffic, and my places.

FIG. 63A shows a box-out transition, in accordance with the principles of the present invention.

Figure 63B:
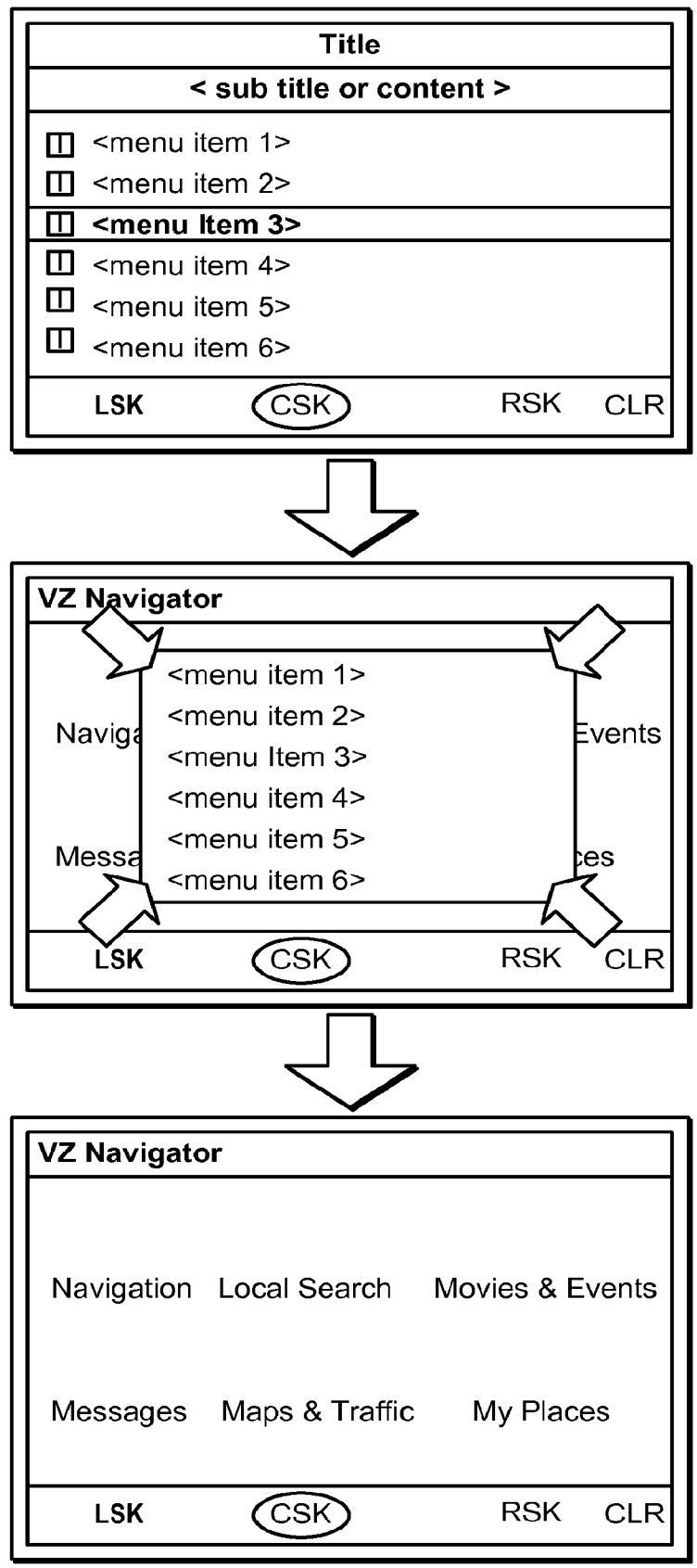
FIG. 63B shows a box-in transition, in accordance with the principles of the present invention.

FIG. 63B shows a box-in transition, in accordance with the principles of the present invention.

Figure 63C:
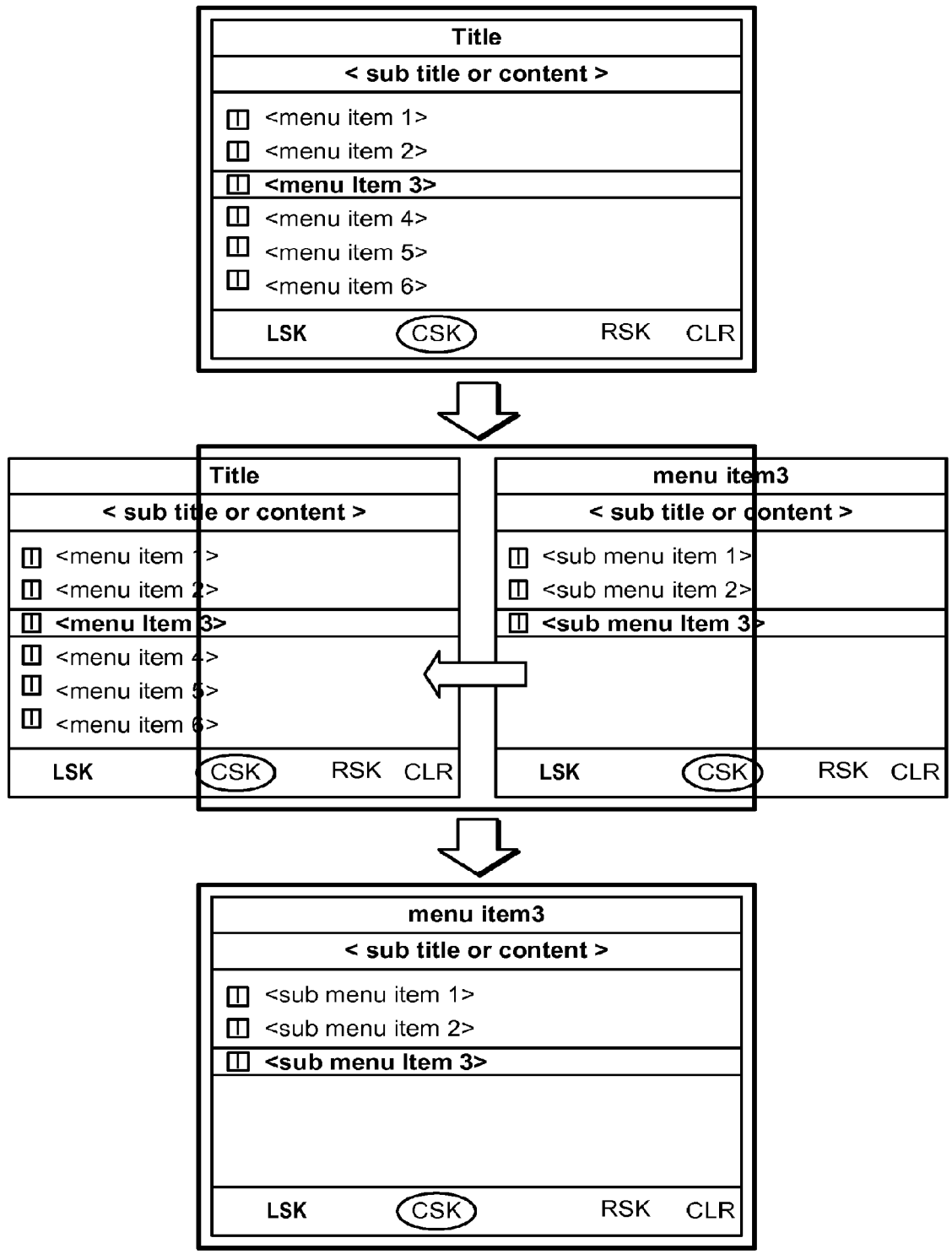
FIG. 63C shows a slide-in/slide-out transition, e.g., used in response to moving from one screen and moving from search details, in accordance with the principles of the present invention.

FIG. 63C shows a slide-in/slide-out transition, e.g., used in response to moving from one screen and moving from search details, in accordance with the principles of the present invention.

In particular a slide-in/slide-out transition is used when moving from one screen with menu list to the subsequent screen if the landing screen is a screen with: menu; text entry and/or category selection fields; radio buttons; and check boxes. In the given example the transition is from left to right as one drills down, and from right to left as one goes back.

A slide-in/slide-out transition is used when moving from a search details screen to the next, if the next is, e.g.: POI search details; favorites and recent searches; movie details; weather details; and navigation screen. A slide-in/slide-out transition is also used if moving from a traffic screen to look ahead screen.

There may be transition exclusions. For instance, in the exemplary embodiment there are no transition requirements for pop ups, wait screens, display of maps, zooming in or out, or panning.

Help text is simplified and applied to areas of the application that may not be intuitive to the user. Examples of these screens include: plan trip; movie search; event search; new message; and detour options The personal wireless navigation system implements a device menu feature that launches whether using the device soft 'Menu' key or device hardware 'Menu' key. Specific elements of the device menu include the ability to switch application, and show symbols (RIM devices); and the ability to exit the personal wireless navigation system application (Windows Mobile).

Selecting an item from the Menu invokes the action in the Menu. For example, selecting 'Navigate' starts a navigation session, selecting 'Map' downloads a map centered on the specified location, selecting 'Add to Favorites' saves the location information to Favorites. and selecting 'Close' takes the user to the previous screen. If the user selects 'Close' after entering text in a text entry screen, the application prompts an appropriate message, e.g., "Changes will be lost. Go back anyway?"

The personal wireless navigation system enables users to cut, copy and paste text from other applications into the Navigator text entry fields and vice versa. The options for cut, copy and paste are available in the application 'Menu'.

To copy or cut, the user is able to select the item by touching and highlighting the selected text, selecting the menu, and selecting copy or cut. For Windows Mobile devices, the user touches and holds on the text area to launch the cut, copy, paste dialog box.

To paste, the user touches the text entry field, selects menu, then selects paste.

The following areas of the personal wireless navigation system support cut, copy, and paste:
Navigation
Address
Intersection
Home/Edit
Work/Edit
Local Search
What
Movie Search
What
Event Search
What
Messaging
New Message/To
Place/Address
Place/Intersection
Message
Search
Maps & Traffic
Map Location/Address
Map Location/Intersection
Traffic/Address
Traffic/Intersection
Weather/Address
Weather/Intersection
My Places
Favorites/Add/Address
Favorites/Add/Intersection
Home/Edit
Work/Edit Windows Mobile and Blackberry devices support multi-tasking, meaning that when other applications are used, the Navigator application on the personal wireless navigation system continues to operate on the device. For Windows Mobile users, the application icon appears in the task manager. For Blackberry devices, the application icon appears in the switch applications menu.

If the personal wireless navigation system receives a voice call during a navigation or follow-me map session, Navigation continues to run in the background, unless it is not supported by hardware or its carrier. If not supported by the device, if the user answers the call, the navigation session is suspended until the voice call ends. Once the voice call ends, the navigation session resumes (preferably by forcing a recalculate) including recalculating the route.

If the personal wireless navigation system is downloading a map when a voice call is received, the map download is terminated. When the user ends the call, the user receives an appropriate pop-up message, e.g., "Could not process your request due to voice call. Please try again", along with the appropriate error code. When the user presses 'OK', the map downloading is retried.

When using a media player, the navigation or follow me map continues to update GPS. Voice prompts continue. However, the media player may be paused for navigation announcements. This is dependent on the priority settings of the OEM. Alternatively, it may be a configurable feature of the personal wireless navigation system.

For all other applications, the navigator runs in the background, until the user exits the application running in foreground, or pulls the personal wireless navigation system to the foreground. Voice prompts are heard upon upcoming maneuvers or announcements.

The personal wireless navigation system provides an alarm clock. In operation, when the navigator application is in the foreground, upon receipt of an alarm event, the alarm event goes to the foreground and the navigator application runs in the background, providing voice prompts until the user takes action to dismiss the alarm event. Upon dismissal of the alarm event, the navigator application returns to the foreground.

If during a navigation session the personal wireless navigation system goes outside a service area, as long as the user does not go off route, the application continues to provide turn-by turn voice prompts. If the user goes off route, the application tries to recalculate, but pops up an error message.

The personal wireless navigation system application terminates upon an insufficient memory event. For instance, a pop-up error message is displayed indicating "insufficient system memory or resources" or the like.

A low battery event may impact GPS capability. In such a situation, the personal wireless navigation system may not be able to get a fix, impacting searching, mapping, and navigation based on GPS location. The personal wireless navigation system displays a low battery event to the user and preferably informs them of the impact to the GPS capability.

The personal wireless navigation system application terminates upon device power off, device reset, or factory reset.

The navigation application continues to operate when a universal serial bus (USB) device is connected or disconnected.

The personal wireless navigation system application detects when a hardware keyboard is open. If the hardware keyboard is open, the software keyboard does not launch when the text entry field is selected. Instead, the user is permitted to enter text with the hardware keyboard. On the other hand, when the personal wireless navigation system application detects that the hardware keyboard is closed, the software keyboard launches when the text entry field is selected, permitting the user to enter text with the soft keyboard.

When the navigator application of the personal wireless navigation system is in the foreground, upon receipt of an incoming e-mail event, the user has the option to immediately respond to the event. If the user does not immediately respond, the navigator application continues to run in foreground, providing voice prompts. If the user opts to view the incoming e-mail, the navigation application continues to run but in background, continuing to provide voice prompts as required. Once the user dismisses the e-mail application, the navigation application returns to the foreground.

When the navigator application of the personal wireless navigation system is in the foreground, upon receipt of a short messaging system (SMS) event, the user has the option to immediately respond to the SMS event. If the user does not immediately respond, the navigator application continues to run in the foreground, providing voice prompts. If the user opts to view the incoming SMS message, the navigation application continues to run in the background, continuing to provide voice prompts as required. Once the user dismisses the SMS application, the navigation application returns to the foreground.

The navigation application of the personal wireless navigation system continues to operate when ActiveSync starts or stops.

During a navigation session, if the user selects the 'Back' softkey or hardware key and selects 'Yes' when receiving the pop-up "Stop Navigation? Are you sure you want to stop navigation?" Navigation stops, and no GPS fixes are taken. Navigation also stops when the personal wireless navigation system reaches the navigated destination and remains at the destination for more than a given significant amount of time typically unrelated to traffic, e.g., for more than 10 minutes.

If the navigation application is running in back-ground, and the location information has not changed for a given significant amount of time, e.g., 10 minutes, the application invokes a pop-up message "Do you want to end Follow-Me mode? Yes/No"; user selects Yes. Once the pop-up is displayed, and the user has not selected, navigation is suspended.

The personal wireless navigation system Navigator application intergrates with an 'AddressBook' or 'Contacts' application of the device. 'AddressBook' or 'Contacts' is a menu item within the application. When the application prompts the user to select a location as a starting point, destination, or center point for a local search or map, the personal wireless navigation system enables users to select a location from the device 'AddressBook' or 'Contacts' from the LocWiz.

The personal wireless navigation system has the capability to launch from the 'AddressBook' or 'Contacts' application. If the user selects a contact within the 'AddressBook' application, the LBS functions are available as a menu option. If more than one Navigation application is present on the personal wireless navigation system device, the Navigator location based system (LBS) functions take priority within the menu.

Figure 64:
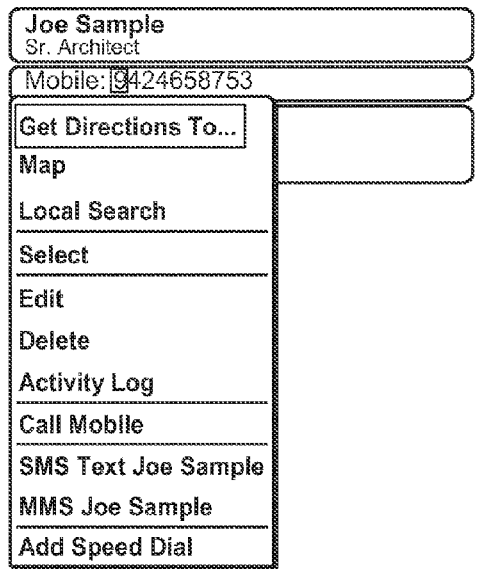
FIG. 64 shows an example of LBS functions available as a menu option when a user selects a contact within the 'AddressBook' application, in accordance with the principles of the present invention.

FIG. 64 shows an example of LBS functions available as a menu option when a user selects a contact within the 'AddressBook' application, in accordance with the principles of the present invention.

Figure 65:
FIG. 65 shows a pop-up displaying address fields for a contact.

When selecting AddressBook within the Navigator application, the application searches all address fields within AddressBook for all available addresses for the contact. Priority to first search Home, then Work addresses. If only one address is available when the user selects the contact, 'selecting' initiates the action (Navigate, Map, etc.) If both address fields are available, a pop-up displays both addresses for the contact, as shown in FIG. 65. Selecting the option initiates the action (Navigate, Map, etc.)

When selecting 'AddressBook' within the Navigator application for sending a 'Place Message,' the application displays the contact list, allowing the user to select multiple entries. If multiple phone numbers are available for a contact, the application displays all available phone numbers.

The personal wireless navigation system interoperates with a 'Calendar' application of the device when a 'Calendar Location' field contains an address or general information. If the location field of 'Calendar' contains an address or general information, the user has the following options available in the 'Calendar' application menu: Get Directions To . . . , Map, and Local Search. If more than one Navigation application is present on the device, the personal wireless navigation system's Navigator LBS functions take priority within the menu.

If the address information is available in the Calendar location field, the personal wireless navigation system parses the address data and maps it appropriately to the Get Directions To . . . (Navigation UI Flow), Map (Map UI Flow), or Local Search (Local Search UI Flow) functions. The application launches, finds the address, and either starts the Navigation session, maps the location, or goes to the Local Search screen to select a category. For Local Search, the address or location appears in the "Where" field.

If general information such as "Starbucks" or "TeleCommunication Systems" is stored in the Calendar location field, the user has the option to Get Directions To . . . (Navigation UI Flow), Map (Map UI Flow), and Local Search (Local Search UI Flow) functions. However, if address information is not available, the application launches the Local Search screen with the general information in the "What" field.

If no information is available in the location field and the user selects one of the options: Get Directions To . . . ; Map; or Local Search, the application launches to the main menu of the personal wireless navigation system.

The 'Back' hardware key returns the user to the previous screen or hides the keyboard. If the user has entered text within a screen and selects the 'Back' key, the personal wireless navigation system displays the message "Changes will be lost. Go back anyway?"

The 'Send' hardware key initiates a 'call' function. If the user is in a 'Detail' screen, and the phone number information is provided, selecting 'Call' or the 'Send' hardware key initiates a call to that location. If the user is in a results screen the results item is highlighted. If the 'Call' or the 'Send' hardware key is selected, the Navigation application displays a pop-up to either call the location or another number. If the user is in any screen having no item highlighted, yet selects the 'Call' or 'Send' hardware key, the phone dialer of the personal wireless navigation system is invoked.

Selecting the 'End' key places the Navigation application in the background and appropriately multi-tasks. For low tier devices, selection of the "End" key ungracefully exits the Navigation application.

Selecting and holding a 'Power' key (if separate from the device's 'End' key) suspends navigation and closes the Navigation application.

Selecting a 'Home' hardware key places the Navigation application of the personal wireless navigation system device into the background, and takes the user to the device's main menu (for Windows Mobile devices.)

Selecting volume keys while in the Navigation application of the personal wireless navigation system launches the Navigation volume screen, allowing the user to change navigation volume settings.

Touching in the text entry field invokes the keyboard. When the user touches a text string, the cursor is positioned behind the character or at the blank space that the user touched. If the user touches the text entry field outside of the text, the cursor is positioned behind the last character. The proper keyboard is displayed based on the contents of the text entry field.

Search/Find fields (qwerty or alpha numeric) include: Address/Street (qwerty or alpha numeric); Address/City (qwerty or alpha); Address/State (qwerty or alpha); Zip/postal code (qwerty or alpha numeric); and Phone number (numeric), The 'Return' key moves the user to the next text entry field. Selection of 'Return' at the last text field produces no action. In the Place Messaging 'Message' field, selecting 'Return' moves the user to the next line in the field.

The personal wireless navigation system Starts-Up instantly, launching the main menu. In particular, the splash screen is presented immediately, followed quickly by the main menu, providing the perception of an instant start-up.

Each time the personal wireless navigation system is started, the Navigation application does a "Follow Me Map"—the result being the new main menu look which shows users where they are. At the same time the main menu functions are displayed (minimum set is Navigation icon, Local Search icon, plus search box).

The personal wireless navigation system acquires real time local traffic information and weather conditions. This is particularly important for users with advanced devices and high tier devices, where the personal wireless navigation system takes advantage of a large screen size and better resolution. Thus, the personal wireless navigation system:

Displays users' current location to help them get oriented.

Provides current weather conditions, average gas price for regular gas in the local area, and provides an option for overlaying traffic. These features take advantage of a presumption that the user launched the Navigation application of the personal wireless navigation system to search for a place or event and to be guided accordingly.

Provides a search box where users type or speak what they are looking for.

Provides icons/buttons for all relevant functions.

This main menu layout makes the personal wireless navigation system more functional, appealing, and therefore more useful than Google Maps™, which only shows a map of the user's current location, and better than conventional portable navigation devices (PNDs) and some in-car navigation systems, which typically show the map of users' last destination. The main menu layout helps users access some local point-of-interest (POI) information, traffic information, gas prices and locations, and weather information, faster than conventional techniques.

Figure 66:
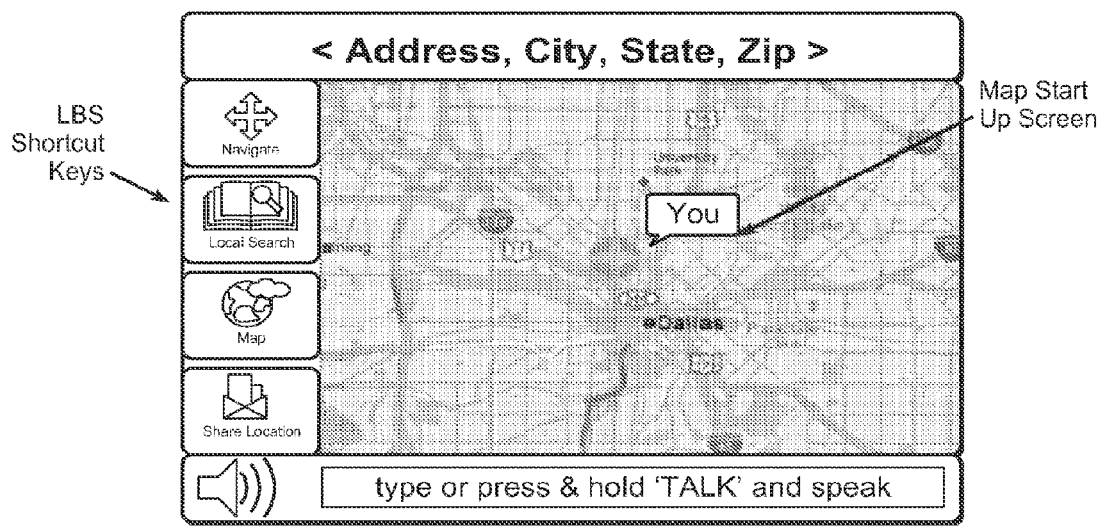
FIG. 66 shows a main menu comprising four general frames, in accordance with the principles of the present invention.

Preferably the main menu is displayed within 5 seconds or less from the time that users launch the application; regardless of whether there are splash screen requirements or not. The main menu comprises four general frames as illustrated in FIG. 66.

In under 10 seconds after launch of the Navigation application of the personal wireless navigation system, a map of the area around the users' current location is presented. If longer than 10 seconds, launch displays a map of the last GPS location until the location is updated. Address information does not display in the header.

Within 5 seconds (or less) after launch of the Navigation application of the personal wireless navigation system, buttons/icons are displayed for all major functions: NAV, Search, Place Messaging, etc.

In under 15 seconds after launch of the Navigation application of the personal wireless navigation system, a header showing relevant current information, e.g., weather, gas prices, etc., is displayed.

In under 5 seconds after launch, a search box is presented where the user can enter text or speak the term.

Shortcut keys are configurable for presentation on the left or right edge of the display.

In under 5 seconds, to accommodate small tier devices (e.g., standard phones), as soon as the Navigation application is launched, the map of "You Are here" shows on the screen. A push button at the bottom saying 'Press Down for Functions', displays a 3×2 grid icon main menu. Users can press up to return to the map of where they are.

When the user launches the Navigation application, the personal wireless navigation system gets a fix for the current location under 10 seconds. The map of current location is displayed with user's current location in under 15 seconds after launch and upon successful location fix. Current weather conditions, and/or average local regular gas price around the users' current location, is obtained and displayed in under 15 seconds after launch and upon a successful location fix.

When the user taps on the marker for the current location, the screen displays a menu of options as shown in the table of FIG. 67.

The user zooms in and out or snaps to the appropriate zoom level by using the zoom toolbar on the map. The user pans by tapping on a different area on the map, flicking or dragging on the map, or using the scroll buttons/trackball.

When the user double taps on the same spot on the map (within 500 milliseconds of one another) the screen displays a menu of options as shown in the table of FIG. 68.

When the user selects/taps the 'Traffic' button to hide/show real time traffic flow and incidents (if any) that are overlaid on the map, by default, traffic is always shown.

When the user selects/taps the 'Gas' Button displaying local average, and the personal wireless navigation system conducts a local search for gas stations around the current locations, a list of gas stations around the current location is displayed.

When the user selects/taps the 'Weather' button, the screen obtains and displays the current and forecast weather (e.g., a 6 day forecast) for relevant local areas.

When the user selects/taps the search box, types or speaks the business name or category, search results are listed after the necessary transition screens are displayed.

When the user selects/taps 'Map', the location of the first 10 (or 20) search results are displayed on the map.

When the user selects/taps one of the search results, a POI details screen is displayed.

When the user selects/taps the 'Search' button, the personal wireless navigation system prompts the user to select from POI search, movie search, or event search.

When the user selects/taps the 'Navigation' button, the personal wireless navigation system prompts the user to select a destination from: Recent Places, Favorites, Address Book (high end phones), Address, Airport, Home, Work, or Plan Trip.

After the route has been calculated and the transitions screen(s) have been displayed, the Map automatically zooms in (or snaps to) the default zoom level for displaying the start of the route.

For car navigation, the personal wireless navigation system also switches from top view to perspective view after it zooms in (or switches to perspective view if the 'zoom in' effect is patent protected by a $3^{rd}$ party). For Pedestrian navigation, the view mode stays at 2D after the personal wireless navigation system zooms in.

For the reduced feature version of the personal wireless navigation system (e.g., "AB v5"), when the user selects/taps the 'Navigation' button, AB v5 prompts the user with information for purchasing (unlocking) a full featured version of the personal wireless navigation system (e.g., including GPS navigation).

If the personal wireless navigation system cannot fix a location, the personal wireless navigation system displays a map of the United States (or Europe).

The personal wireless navigation system supports night mode. Some colors make it difficult for drivers to see the details of the 3D and 2D at night time, where the dark background makes the screen relatively brighter. In particular, the personal wireless navigation system uses a different set of color palettes at night time to make the vector maps more legible at night time. Moreover, the personal wireless navigation system uses a table of sunset and sunrise times to switch to night mode whenever the 3D and 2D navigation maps are rendered.

Alternatively, the night mode features may be activated only through a manual setting under configurable navigation options, including an option for changing from Day Mode to Night Mode. This setting is a sticky setting. Each time a route is calculated, the application will look up a time table and based on the current time either render the vector maps in day or night mode. Moreover, the personal wireless navigation system provides users with a configurable time table and based on the current time as compared to the configurable time table, either render the vector maps in day or night mode.

Each time the personal wireless navigation system is started the application does a "Follow Me Map" which achieves two things: First, it gives the personal wireless navigation system the main menu look; and Second, it obtains the users' current location to support other product functionality and usability requirements. The location acquisition process is performed in under 10 seconds after launch, if the user launches the application in a new area.

The personal wireless navigation system automatically completes the 'State' portion of the address as soon as possible, when possible, as the user enters a street address. Moreover, local airports are provided first if a user is designating an airport as a destination, starting point, or center point for a map or search.

The personal wireless navigation system uses any one or combination of services such as Cell towers, PDE, GPS, Wi-Fi, etc., to determine users' location once they start the application, in 10 seconds or less.

When a user speaks a business type, the personal wireless navigation system expedites the speech-to-text conversion process by eliminating or reducing the wait time for the first screen, as shown in FIG. 69.

If none of the above services are available, an error message is logged/reported back to the personal wireless navigation system server. No error message need be displayed on the device screen unless the user explicitly initiates an LBS request that requires getting a location fix.

The personal wireless navigation system provides international localization support by enabling a user to enter addresses in the appropriate format for a given country. Each time the personal wireless navigation system is launched, if its user is in a different country, the address entry fields are listed and ordered based on how addresses are entered in the current country. The country and state (province, region) fields are populated in the event that users choose to navigate to, search around, or map a location in that country/state (as that has a higher degree of probability). The personal wireless navigation system may obfuscate certain POI category names, or access to event search and movie search in each country. Each time a user starts the personal wireless navigation system and the application detects that the location is outside the "home" country, the personal wireless navigation system checks to see if country support is available. If it is, it uses the coordinates to automatically change the country profile used for that session (if not changed since last time), and to format the address entry field for that country. The appropriate set of navigation features available to users, such as 'traffic' menu settings, or traffic gauge, are determined for the new country.

Some functionalities of the personal wireless navigation system are configurable, such as traffic, navigation view, movies and events, weather and languages. Thus, for certain brandings of the personal wireless navigation system, the functionalities may not be exposed to the user.

For instance, there is no need to display traffic enabled navigation if the branded version of the personal wireless navigation system does not have access to real time or historical traffic. Configurable show/no show parameters of traffic include: traffic setting field; traffic setting screen; traffic gauge bar in navigation screen and look ahead screen; Traffic delay column with or without value; Traffic summary screen; Access to traffic summary screen via LSK on Trip Summary or options menu in the navigation screen; Menu option for listing traffic incidents, details; Delay time per segment in detour around segment landing screen; 'Incident' and 'Congestion' choices in the Detour type selection screen; and Traffic Alert icon. With respect to Traffic overlay on maps, the following parameters are configurable to show/no show in any given branded implementation of the personal wireless navigation system: Traffic as an option under Maps; Menu option for hiding and un-hiding traffic; and Menu option for listing traffic incidents, details.

For some brands of the personal wireless navigation system, 2D and 3D views with sliding maps may not be optionally included, depending up whether or not its users have to pay per Mb for data access.

The navigation view setting field and/or the navigation view mode selection screen may also be a carrier, OEM and/or provider configurable parameter to be shown to the user.

With respect to movies and events screens that may be configurably shown to a user, the following screens are configurable by the carrier, OEM and/or provider to be shown to the user: Movies & Events main menu selection; All sub menus related to movies; All sub menus related to events; Access to movie search from the options menu of a POI detail, Favorite, or Recent Search; and Access to event search from the options menu of a POI detail, Favorite, or Recent Search.

Regarding weather screens: Weather as an option under Maps may be shown or not shown based on the configurable status set by the carrier, OEM and/or provider. Similarly the Language of the personal wireless navigation system may be a configurable item.

If a user needs to enter an address in a different country, they may go to a 'Country Selection' field. The personal wireless navigation system preferably does not update parameters in the background, until the user's GPS location is indeed confirmed to be in that different country. A country list only includes supported countries. If a user types a country that is not in the list, then a pop up informs the user that 'No support is available for the selected country'. This includes all countries without map data. Countries are listed if map data is available but POI data is not, so that in special cases, the personal wireless navigation system can navigate users through such a country (Country B) in order to get them to a destination in another country (Country C), where the starting point was in yet different country (Country A).

If users are using the personal wireless navigation system to navigate through a country/region that ABN does not support, i.e., where no map data or route data is available, (and yet data roaming is available), then the personal wireless navigation system provides limited visual and audible support to guide the user to the destination.

The list of the countries includes the international country code as a prefix (one or two letters), followed by the spelling of each country as it is pronounced in the language setting of the application, followed by the spelling of that country, as it is done by local people. This last example is done to help familiarize users with the most likely spelling that they are about to encounter in airports, roads, etc.

Examples

If an English speaking American travels to Germany, the country field will show Germany as:

Germany

If a French speaking Canadian travels to Germany, the country field shows Germany as:

Aleman

The default value for what units of measure the personal wireless navigation system uses when users move to different countries is set as each brand of the personal wireless navigation system is prepared.

For some brands, the default is set to keep 'Use Current Units of Measure', such that when users select a different country where the units of measure of distance and/or date formats are different for displaying, e.g., movies and events, the results are displayed in the same units of measure. For example, an exit sign may state "1 kilometer ahead," but the navigation application would still display and announce "0.6 Miles" to help its user relate to it more effectively. The users can select 'Preferences' to change either to metric or British units.

For some brandings of the personal wireless navigation system, the default is set to keep 'Use Local Units of Measure', such that when users select a different country where the units of measure distance, and date formats for displaying movie and events are different, the results are displayed as they are in that country. For example, if an exit sign states "1 kilometer ahead," the navigation application would announce "1 Kilometer" to help its user relate to it more effectively.

The search engine searches for category names even if the user specifies a common name and search within 'All Categories'. The user is able to enter a common name in the "What" field while searching under "All categories", and the search engine returns all POIs that include the word that was entered in the 'What' as part of the POI's respective 'Category' description, regardless of whether the common name is part of the POI name or not. As an example, a user types 'Coffee' in the "What" parameter, and the search engine lists all "Starbucks" establishments, as the category for this POI is "Coffee Shops", even though the name 'coffee' is not part of the POI name (It is not listed as "Starbucks Coffee" in NAVTEQ Database—it is just listed as "Starbucks").

The personal wireless navigation system supports fuzzy and partial search. For instance, the personal wireless navigation system automatically disambiguate strings entered by a user and conducts a search in instances where the user types a partial string or makes slight spelling errors.

The search engine of the personal wireless navigation system intelligently guesses what the most popular terms that the user was intending to type in the event that the user made a spelling error or only entered partial text. The following table illustrates general examples of an input text string and how the personal wireless navigation system automatically disambiguates the same, without prompting the user to do so.

| Typed Word | Returned Options |
| --- | --- |
| Piz | Pizza Hut |
|  | Pan Pizzeria |
| PanPiz | Pan Pizzeria |
| Pan Piz | Pan Pizzeria |
| Pizzas | Pizza Hut |
|  | Pan Pizza |
| Pissa | Pizza |
| Oland | Öland |

The POI category and subcategory is preferably added on behalf of the relevant partner/operator/brand in real time. The customer partner or enterprise customer of partner supplies an electronic list of POI and category name, and it is incorporated into the appropriate Category/Sub category directory. The TeleCommunication Systems/NIM server provides the infrastructure to integrate and classify the supplied POI category/subcategory in real time with a frequency equal or less than once per day. The POI list is geo-coded if not already.

For instance, an operator supplies a list of authorized resellers electronically. The POI list, e.g., "XYZ authorized resellers" is uploaded, in the appropriate category/sub category list. The supplied POI list is then geo-coded, and then uploaded and classified in the database—preferably no more than once per day.

The personal wireless navigation system implements user defined tags of 'Favorites.' In particular, the user may tag one or more 'Favorites' so that they can enter the tag name in the search box for faster recall of favorites with the same tag. In this way, the personal wireless navigation system helps a user find a bookmarked 'Favorite' faster, as opposed to requiring them to recall the first few letters of the favorite POI that they are trying to locate in a favorites list.

A user can create a tag name and assign it to one or more favorites, such as 'favorite restaurants', 'favorite bars', etc., and organize their favorite POI in logical groups.

Whenever the user synchronizes 'My Places' with the navigation central server website, the 'Favorites' with tags is synchronized such that users can also search for favorites by entering the tag name.

Each time a user adds a favorite, the personal wireless navigation system gives them the option to select a tag name for that favorite place. Users can select from previously entered tag names or type a new one. Similarly, each time a user edits a favorite, the personal wireless navigation system gives them the option to edit the tag name. If a user views their list of favorites, the tag name for each favorite is listed in tandem. If the user sorts the list of favorites in alphabetical order, the favorites with the same tag name are sorted together. If the user views the place details of a favorite having a tag name, the tag name appears at the bottom, before the Category classification (if a POI).

The present invention appreciates that drivers with kids in the back seat might like to know how far the next rest stop is when traveling. Therefore, in the personal wireless navigation system, 'Rest Areas' is added as a distinct POI category. Furthermore, 'Rest Areas' is a default POI that shows along the route during navigation. For metro and urban areas, especially in Europe, display of public restrooms is as relevant to pedestrians as it is to 'Rest Areas' to drivers.

The present invention also appreciates that users of the personal wireless navigation system desire knowledge of the location of public Wi-Fi Hot Spots. This is particularly relevant as more complimentary and premium hot spots are rolled out. Also, as more phones support dual modes (3 G/2.5 G and Wi-Fi), more people can explicitly choose Wi-Fi to place a phone call via VoIP+Wi-Fi Solutions. Free Wi-Fi Hot Spots are rare in Europe, so users are more likely to want to find Hot Spots that are part of their wireless network account. To satisfy this unsolved need, the personal wireless navigation system includes a distinct category called Wi-Fi Hot Spots. A feed for Hot Spots is preferably obtained, where the Hot Spot locations are updated, e.g., monthly.

When searching for hotels, for each search result, the personal wireless navigation system obtains and provides pricing for the hotel POIs relevant to that evening, or when the navigation would bring the user to each particular hotel or other POI. The price is displayed as $NNN.NN and the results are listed similar to how gas prices are displayed. Hotels without an available price are listed similar to how gas stations without available price per grade are listed. Helpfully, the personal wireless navigation system displays 'Sold Out' instead of a price for hotels that it determines are sold out for that day or evening.

For J2ME devices where JSR-293 is available instead of JSR-179, the personal wireless navigation system utilizes JSR-293 Location API 2.0 to obtain location information and GPS fixes.

The personal wireless navigation system permits a user to search for movies and events, and once they found the desired movie or events, they are able to search for theaters and venues hosting them. The central server providing navigation services also preferably provides a link to the official movie poster and/or movie trailer.

The personal wireless navigation system provides phone numbers of the major roadside service providers, including the ability to find the nearest roadside service provider near to the current location. A user with a stranded vehicle is then able to either request access to desired service center if they are a member of one, or get fast access to a local roadside service providers. A fee may be associated with this service feature.

As an example, a user breaks down when traveling. The user wants to find someone nearby who can supply roadside service (may involve a tow). The personal wireless navigation system modifies the current "Emergency services" category search to display a phone number (and preferably connecting to the phone number) which provides a link to a suitable tow truck and/or other emergency services. The coordinates for the users current position (latitude, longitude) is also displayed on the screen enabling users to report the coordinates to the dispatch person. The personal wireless navigation system preferably includes a reverse geo-code to a closest street address of the current location coordinates.

Once the personal wireless navigation system displays POI search results, either the footer or options menu provides users with the option to map all search results.

The map is always centered on the location specified in 'Where'. As shown in FIG. 70, the user can tap on any POI to see a brief description of the POI. A second tap provides the user with the POI detail screen. If the user zooms out, the personal wireless navigation system displays additional POIs, and the personal wireless navigation system downloads the next batch, when necessary. This functionality may be excluded from use on devices with smaller screen sizes if desired.

A user may view a map of search results and friends together on a map, providing a visual reference for geo poking capabilities. Rather than be limited to only a map of the highlighted search result, the user is able to view their friends' location and relevant POIs on the same map. This functionality may be excluded from use on devices with smaller screen sizes if desired.

The personal wireless navigation system is able to read maps from either NAVTEQ or TeleAtlas. If an international edition of the personal wireless navigation system needs to provide maps for two bordering countries such that the map for one country is supplied by NAVTEQ while the other one is provide by TeleAtlas, the personal wireless navigation system continues to render maps with very little disruption on the display screen.

The personal wireless navigation system website provides users with the ability to report problems with maps, including wrong street names, wrong business name, etc., through the central server website.

Wherever necessary, the personal wireless navigation system uses the 3D engines of the hardware such as OpenGL ES 1.0 to support 3D graphics with improved performance—if and only if the architecture for the personal wireless navigation system mobile application can benefit from them.

Some features may be disabled by a non-full-featured edition of the personal wireless navigation system as compared to a full-featured product. For instance, a non-full-featured edition of the personal wireless navigation system may disable turn-by-turn guidance, rerouting guidance, detour features, and traffic aware routing. Other features may be enabled in both, e.g., Instant On, Map Main Menu, International Localization, POI Search, Movies & Events Search, Weather Search, Traffic Search, Synching with Website, Place Messaging (for both mobile & Web), GeoPoke, 411 Interface, App-to-App, Web-to-App, and Opt-in/Opt-out.

Up/Down Thermometer Cartography Detail Control

A visual thermometer or volume up/down type bar may be implemented to enable the user to control the level of detail displayed on the navigation map. As an example, when the control knob is visually placed all the way down, the most limited cartography would be displayed. Then, as the user increases the 'volume' of the up/down thermometer cartography detail control, the available levels of detail are incrementally displayed to the user, up to a maximum 'up' causing display of the most detailed information available (e.g., street view, 3D, etc.)

In the disclosed embodiment a mid-way position of the up/down thermometer-like cartography detail control, traffic may be displayed to the user on the navigation map. This provides instant flexibility to the user.

In an alternative embodiment, a user who might want a simpler visual may be presented with a one-touch control. And those users who might enjoy more detail may want to instantly see more detail (e.g., around a turn they may quickly want some greater detail displayed), then may dial the knob up to a maximum position for a brief time, gain knowledge from the additional detail shown on the navigation map, then dial the cartography detail control back down to cause display of less detail on the navigation map.

Faster Rendering of Maps

The system design of Tile Maps in AtlasBook v5 is now described.

AtlasBook products prior to v5 have relied on maps that were generated to fit the screen of a device for a particular coordinate and zoom level. This type of map works well for situations when user interaction is minimal and thus the central point and zoom level of the map is not expected to change often. However, this design does not work well on devices such as those with touch screens, causing more map render/download cycles as the user has an increased ability to interact with the map. These pan/wait/download cycles hinder the user experience. Version 5 addresses this issue by introducing a tile-based implementation for raster maps. This document details the system design for this solution, including the client- and server-side components.

The client-side component comprises two main layers: a graphical UI layer (orange box) and a data management layer (blue box). Both of these layers are described in full detail.

Faster rendering of maps is accomplished in v5 by the adoption of a Tile Maps architecture. The Tile Maps implementation comprises three sections: (1) App layer (how the user interacts with the new map controls from various parts of the application); (2) Platform-specific Tile Maps UI layer (the map control itself, providing a host of relevant map-related features); and (3) Platform-independent data management layer (the underlying Tile Maps architecture responsible for providing data to the Tile Maps UI layer).

The app layer is responsible for deciding how to use the map control to provide the user with all of the v5 features relating to Tile Maps. This includes the ability to display a map, center a map, pan/zoom, rotate, ID, show POI, show "Where Am I?", traffic and Follow Me. These are the functional requirements of the Tile Map system as seen from the user's perspective.

The UI layer comprises all the functionality associated with drawing map tiles and responding to user interaction.

This includes but is not limited to sending prioritized tile requests to the lower layer, drawing downloaded map tiles to the screen, user interaction with the map, and displaying place data on the map. This layer is implemented in a way that is customized to each platform in order to match the platform's look and feel/conventional user interaction as well as optimize drawing performance by making use of native platform features.

The client has a multi-level cache for the tiles, indexed using the tile's coordinates and ordered based on last use. This system allows for a more optimal experience by storing unused tiles in a file-based storage to reduce memory footprint, while keeping relevant tiles in memory for faster recall as the user pans the map. In addition, the client has an algorithm for determining the tiles to download as well as prioritizing the queue of tile requests. This is necessary due the fact that as the user pans the map, tile priority changes and some pending tile requests may need to be de-prioritized or thrown out altogether.

Previously, maps were rendered on the server, along with the time based information like traffic flow, upon request. Tile maps, in contrast, are rendered by a "dedicated" tile server and do not have time-based information such as traffic stored on them. To display this dynamic information, there is a need for overlays for features such as drawing traffic and navigation routes. These tile layers are drawn as a transparency over the map tiles. This way if the user were to disable an overlay, the base tiles would not need to be downloaded again. Currently the list of server-rendered overlays comprises traffic and route polylines.

The engine is able to select from any number of tile sources, either internal or from external vendors, such as Microsoft Virtual Earth (in V5, the only map source supported is the NIM Dynamic Tile Server (DTS)). This is controlled by retrieving a NIM Service URL on initialization which determines the URL and request format used for tile downloads.

The description of tile map rendering includes a description of functional requirements, which is where system-level test cases are derived. The overall system architecture is then described, as are various system analysis topics. Use cases and functional walkthroughs follow, and the specifications of various sub-systems are outlined.

The top-level functional requirements for Tile Maps are broken down by user-level function. Tile Maps is a very visual function and a screenshot or drawing is often the best way to convey detailed requirements. The Maps UI flow includes numbered screens.

Requirements for general map functionality for the server include: zoom level; tile size (for labeling); region (e.g., US, CAN, EU, etc.); various location densities (various location densities (e.g., metro areas vs. suburban vs. sparse); supported dot per inch (DPI) values (e.g., 96 or 192); and supported locales.

Map features that are displayed include, but are not limited to: road classes; road names; address ranges; railroads; ferry routes; building outlines; state borders; direction of traffic arrows; city center icons; city, state and country names; highway shields; area features like oceans, rivers, lakes, parks, airports, shopping malls; area names; Languages to be used in labels; Widths and borders of visible map features; Colors of map features; Stipples to be used for area features; Font sizes, colors, borders, and anti-aliasing; Highway shield density, colors, and sizes; Road, city, area label densities; Traffic flow colors, borders, and widths; and Route line colors, borders, and widths.

The Map Tile Server returns map tile images via HTTP GET request. The Map Tile Server returns transparent traffic overlay tile images via HTTP GET request. The Map Tile Server returns transparent route overlay tile images via HTTP GET request. The Map Tile Server supports an application name of "map" for map tile images, an application name of "traffic" for traffic overlay tile images, and an application name of "route" for route overlay tile images.

The Map Tile Server URL supports a locale in the query string specified by a field named "loc". The Map Tile Server only supports a locale value of "en-us", and may support other locale values. The Map Tile Server URL supports an image format to be requested in the query string specified by a field named "fmt". The Map Tile Server URL supports an image format value of "PNG", and may support other image format values. The Map Tile Server URL supports a specific resolution to be requested in the query string specified by a field named "res". The Map Tile Server URL supports resolution values of either "96" or "192", and may support other resolution values. The Map Tile Server URL supports a zoom level to be requested in the query string specified by a field named "z", and supports zoom level values of 2 through 18 for 256×256 map tiles. The Map Tile Server URL supports zoom level values of 3 through 19 for 128×128 map tiles, and zoom level values of 4 through 20 for 64×64 map tiles. The Map Tile Server URL supports a specific tile for a zoom level to be requested in the query string specified by the fields named "x" and "y". The Map Tile Server URL supports a tile size to be requested in the query string specified by a field named "sz". The Map Tile Server URL supports tile size values of "64", "128", and "256. The Map Tile Server URL supports a version to be requested in the query string specified by a field named "v". The Map Tile Server URL uses the version of the request and for cache invalidation. The Map Tile Server URL supports a route overlay tile for a given route ID to be requested in the query string specified by a field named "rid1" or "rid2" in the case of a second route ID being requested. The Map Tile Server URL supports route overlay tile route IDs as a base64 encoded string of the binary route ID returned in an NB Server navigation reply. The Map Tile Server URL supports route color to be specified by a field named "rc1" or "rc2" in the case a second route ID being requested.

The Map Tile Server URL supports route color values to be specified in the following format: "RRGGBB", where: (a) RR is an uppercase 2 character hex octet from 00-FF signifying the red channel, (b) GG is an uppercase 2 character hex octet from 00-FF signifying the green channel, and (c) BB is an uppercase 2 character hex octet from 00-FF signifying the blue channel. The Map Tile Server URL supports route color values to be specified in the following format: "RRGGBBAA", where: (a) RR is an uppercase 2 character hex octet from 00-FF signifying the red channel, (b) GG is an uppercase 2 character hex octet from 00-FF signifying the green channel, (c) BB is an uppercase 2 character hex octet from 00-FF signifying the blue channel, and (d) AA is an uppercase 2 character hex octet from 00-64 (decimal 0 to 100) signifying the alpha channel which controls transparency. A value of 0x00 (0%) signifies that the route is fully opaque (no transparency). A value of 0x64 (100%) means that the image is fully transparent (invisible!). The Map Tile Server URL returns a 204 (success—no content) status code for traffic overlay tile requests where there is no traffic info to be displayed in the map. The Map Tile Server URL returns a 204 (success—no content) status code for route overlay tile requests where there is no polyline to be displayed in the map. The Map Tile Server URL returns a 404 (page not found) status code for invalid or unsupported URLs based on the above requirements. The Map Tile Server supports detailed maps for all desired countries.

Different wireless devices each have their own device-specific functionality. Parameters which vary from device to device include: Height and Width of the relevant display (in mm); DPI of the relevant display; Tile size best suited to the relevant display; Resolution/DPI best suited to the relevant display; Keyboard type or types associated with the relevant device; and Keyboard shortcuts to be used for the relevant device.

The map supports fast display and panning of tiled maps. Tiled maps act on all types of inputs that a device is capable of for panning, zooming, tracking one's own position, and searching for POIs.

The map downloads tiles asynchronously and displays them as they become available. Downloading map tiles is done in the background and is not limited by the user's interaction with the map. Tiles are displayed as soon as they become available. This applies whenever the map is zoomed, panned or rotated. Upon zoom in/out existing map tiles are scaled and used as placeholders until the new map tiles are available. If a tile is not available then a placeholder graphic is displayed in the confines of the tile. This graphic MAY be specific to each product. Graphic should be non-obtrusive. The user is able to pan the map by dragging the stylus/finger (touch) or D-pad (non-touch) on the map. The user is able to zoom in and out, with a preconfigured minimum/maximum zoom level.

Preferably the map has a DEBUG user interface that takes the form of a live text overlay in the top corner of the map. The overlay shows the following data: (1) Number of tiles pending (Pending:#); (2) Number of tiles downloaded (D/L:#) cumulative; (3) Number of tiles loaded from the cache (Cache loads:#); (4) Number of tiles in the cache (Cache size:#); Number of tiles discarded by cache (Discards:#); and (5) Zoom level of the current screen (Z:#).

The user is not able to pan North of the North Pole (no wrap around to the South Pole), nor able to pan West of −180 or East of +180 degrees longitude. Map wraps in the horizontal direction.

The client expects to be able to request and receive any tile from the server. If the server returns an error, the client performs three (3) retries before leaving the tile background image in place and moving on. Map is centered at the last highlighted pin (user pin, gps location, or a POI/incident pin) (i.e last pin, may be user pin, gps location disc, or a POI/incident pin that shown with a detail balloon) when "Center Map" menu item is selected.

The map displays the buttons "traffic", "zoom out", "zoom in" and "locate me" on the screen. The zoom buttons are grayed out when the user cannot zoom in or out any further. The user is enabled to double click on a location. Doing so zooms in one level using the clicked location as the new center of the map. If a particular platform does not support a "double-click" gesture, then this is manually implemented by measuring the time and distance between the clicks. Regarding the screen size of a device, the number of possible buttons shown on the screen may differ. Buttons that are to be omitted on certain touch screen devices will have their functionality duplicated in the Menu. If functionality is present on a button, it is not repeated in the menu, as the menu is preferred to be as short as possible.

Shortcut keys are used to let the user interact with the map. Available shortcuts are shown as a legend on the map, which is displayed on initial map launch and hides with the first user interaction within the app. "Show Legend" in menu displays legend on the map screen. The legend is hidden with the next user interaction within the app. Legend shows all shortcuts regardless of the map mode. The shortcut key press is ignored by the application when the key has no valid function (e.g. pressing zoom in button at the highest zoom level.)

The user is enabled to perform general POI searches in AtlasBook v5. The results of these searches are displayed on the Tile Map. Clicking on the map menu entry from a UI Flow screen 3.2 displays a map showing entries from the results list. If present, a Premium POI is also displayed on the map.

POIs are represented by color pins. Different colored pins depict normal, premium, enhanced and user POIs. For example, a purple pin is used to show Regular/Custom POIs; an orange pin to show Premium POIs; and a light green pin to show Enhanced POIs.

The map "zooms-to-all" to show all POIs on the map. A dev tool is provided to allow experimentation between showing POI at a default zoom level vs. showing POI at "zoom-to-all." With the Zoom-to-all function, all POI results listed or returned by the server are shown on the map, the premium POI is shows on the map, "my location" does not have to be visible, and the balloon of the first POI is visible. The zoom level/position may be adjusted as required to make sure the balloon doesn't overlap the side or header.

The currently selected POI in the list view is shown a balloon showing information about the POI when map is selected from the list view or detail view. The map also shows the other 9 (10 when there is a premium POI result) POI results in the visible list. If the next/previous POI is selected and the POI is outside the visible area (e.g. after the user paned or zoomed in) then the map centers on the POI showing the balloon. If the next/previous POI is selected and the POI is on the map but showing the balloon would result in the balloon being partially outside the map, then the map pans so that the balloon is visible. The exact amount of padding depends on the screen size, i.e. the percentage of the screen filled by the balloon may be reviewed and adjusted on a per-device basis. For initial implementation, the amount of padding is 3 mm or greater from any edge. Balloons are drawn under the screen buttons should an overlap exist (they are part of the map layer and do not cover any other element or extend outside the map). Clicking the back/forward screen arrows moves the balloon to/from the next/previous POI. Clicking the back/forward screen arrows cycles through the POIs in the same order as the POIs in the list view. If the balloon for the last POI is shown and the forward button is pressed, then the app downloads the next set of POIs. The download of new POI blocks the map control. A progress bar is shown on top of the map while the download is in progress. The user has the option of cancelling the download using a device-dependent "Back", "Cancel" or "CLR" key. Once the download is complete, the map is updated with the new POIs. The old POIs are removed from the map and only the new set of POIs are shown. The map "zooms-to-all" after the download to show all the new POIs. The first POI in the list is shown with its balloon visible. If the map control shows the next slice of POIs, then the back button is not disabled if he/she views the first POI of this slice. If the user hits the back screen arrow button, then the previous set of POI results are shown. A blocking progress bar is not presented if the previous results are cached. "Clear Pins" menu item clears all the pins on the map. Selecting "List" menu item (or "List" soft-key) shows the list of the POI search results. Cycling through pins does not bring focus to any existing Traffic Incidents. When the user starts a search, the highlighted icon (blue disc, pin or incident etc which has the bubble) is in the search center. If no icon is highlighted, the center of the map is used as the search center. Map first reverse geocodes the map center and then starts the find module (aka find screen is shown). This address is shown on the find screens. When the user clicks back from any search related screen (a list view or a detail screen for POI, movies or events search), the search module updates the map with the latest result list. In most of the cases, POI results returned by the server include at most 10 (+1 premium) at a time, hence there are only 10(+1) pins at a time on the map. However, in some cases such as a search for events where the server may return more than 10 results at a time, all POI results (more than 10) are shown on the map via pins. Pins on the map always have the same number of entries as the list, and vice versa.

With respect to touch-specific POI functionality, back/forward buttons are shown in a device-specific location. Clicking the back/forward arrows moves the balloon to/from the next/previous POI. If the balloon for the first POI is shown and there is no previous POI results list, then the back button is shown disabled. If the balloon for the last POI is shown and there is no next POI results list, then the forward button is shown disabled. Clicking on a pin displays the balloon for that pin independent from the back/forward buttons. This presents the device to the user at a different point in the list should they now view the POI in list view. Any click outside a balloon and outside a pin hides the balloon. Clicking on a balloon displays the results detail screen. If pins are sufficiently overlapped to be considered co-located, then clicking on the top pin cycles through all balloons of the overlapping pins. If the balloon of the last pin is shown, then it restarts the cycle.

With respect to non-touch-specific POI functionality, shortcut keys are used for non-touch devices. If the balloon for the first POI is shown and there is no previous POI results list, then clicking on 1 has no response. If the balloon for the last POI is shown and the search is exhausted, then the shortcut key has no response. When the user either clicks on D-pad so that the map is panned, or picks ID Mode from the sidebar menu, the balloon is hidden. The user may see the balloon of a POI again, when they either click on 1 or 3. Pressing 1 shows the previous POI from the last shown POI, and pressing 3 shows the next POI after the last shown POI. When the user presses the select-key while a balloon is shown on the map screen, the POI detail screen is displayed.

The user can run an identification query on any arbitrary location on the map. A Reverse Geocode is used to convert any latitude/longitude into the most detailed address available for that point, and the result is then displayed on the screen using drop-pins (ID Mode).

In particular, the balloon is shown after dropping a pin. An indication is provided to the user that reverse geocoding is in progress immediately after dropping a pin. The balloon shows immediately with the text string " . . . " (ellipsis), which is replaced by reverse geocode result as soon as it is available. The latitude/longitude is reverse-geocoded in the background. Once the reverse-geocoded result is received, the balloon automatically updates the displayed information. Only one user pin is shown at any time. Dropping a new pin removes any old user pin. Toggling between Results Detail and map does not remove the user pin. Panning and zooming do not remove the user pin. Starting the Follow me routine does not remove a previous POI search result of user-dropped pins. Selecting "Clear pins" from the menu removes the user pin. A blue pin is used to display a user pin.

A touch and hold action drops a user pin on that location, and shows the balloon.

Regarding non-touch specific drop-pin functionality, the ID Mode is used to reverse geocode any point on the map screen. The user is able to select ID Mode via the sidebar menu. The ID cursor is always displayed in the center, and the map slides left/right/up or down when the user presses any arrow key or moves the trackball. When the user either clicks on the trackball or presses on "select", reverse geocoding of that point is started in the background. The map stays on ID mode until the user changes the mode of the map via the menu options, or presses any shortcut keys other than Zoom In and Zoom Out shortcut keys and Tray toggle keys. When the user starts a search by using the tray, ID mode is cancelled. The user pin is not removed when ID mode is ended.

Additional searches can be toggled on the map at any time with the use of the tray menu that appears on one edge of the map. These searches can be customized. The results are displayed on the map when activated. The map displays a tray handle on the left side. The tray handle has two states: An arrow pointing to the right if it is closed, and an arrow pointing to the left if the tray is open.

The tray displays exactly 4 icons, representing 4 shortcuts for POI searches. The icons and the searches they represent are changeable through the preferences. Selection of "Places Tray" from the sidebar menu calls up the preference page to allow you to select different shortcuts. The tray does not display any text underneath the tray icons. Performance of a tray search behaves as a regular POI search and zooms-to-all except that there is no need to reverse geocode the center of map when it is used as the search center. The first tray search does a zoom-to-all. "next 10" is at the same zoom level with a focus on the 11th POI, and need not show all POI. "prev 10" from this screen does not change the zoom level either. The icons may be same if the user picks them to be. For the purpose of feature discovery, the initial tray state is open at the first entry to map after application launch. The tray closes automatically after a system-configurable number of seconds (default is 3 s) only at the first entry to map after application launch.

Regarding touch specific tray functionality, clicking on the handle toggles the current tray state (open it if it is closed; close it if it is open). Clicking on the map or clicking any button closes the tray (if it is open), and clicking on a tray icon also closes the tray. Clicking on a tray icon performs the appropriate POI search and shows a blocking progress bar on the map. The user is able to cancel a search.

Regarding non-touch specific tray functionality, pressing the shortcut key for tray open/close toggles the current tray state (open it if it is closed; close it if it is open). When the user changes the mode of the map via the menu options, or presses any shortcut keys, the tray closes. Selection of a tray icon also closes the tray. The user is enabled to move through tray icons via arrow keys or a track ball. The currently selected tray icon is highlighted. A tray icon is selected via the "select" key or by clicking on the trackball. Selection of a tray icon performs the appropriate POI search and shows a progress bar on the map. The user is enabled to cancel a search.

Balloons are general pop-ups that appear on the map to label any object on the map which has focus. Its contents and actions vary on the object it identifies. The balloon has a minimum and maximum width. If the maximum width is exceeded, the ellipsis ( . . . ) is shown. The balloon displays one line only. The balloon has rounded corners, a shadow and an arrow behind the text. The balloon displays the name if available. If the name is not available then the balloon displays the street and city. If the street is not available only the city is displayed. Only one balloon is shown at any time.

Clicking on the balloon brings up the location detail screen for the selected pin. When a balloon is displayed on the map, pressing the "select" key or clicking on the trackball brings up the location detail screen for the selected pin.

Initial States—Pan/Zoom Mode

The preferred initial values and states for the map when a map is first launched in Pan/Zoom Mode are as follows:

default map mode is Pan mode; Minimum zoom level is 2, Maximum zoom level is 18; and the Minimum zoom level that traffic is available is 8. More details are shown on the map as the zoom level increases.

Default start-up zoom levels are as follows: Address=16 (used when showing map of full postal address, e.g. 6 Liberty, Aliso Viejo, Calif.); City=10 (e.g. Aliso Viejo, Calif.); State=8 (e.g. CA); and Postal=12 (e.g. 92656).

The user is enabled to move the map via arrow keys; hold and drag; and swipe. Shortcut keys are made available on a per-device basis.

FIG. 71 shows exemplary zoom levels, in accordance with the principles of the present invention.

The map has a Follow Me Mode similar to AtlasBook v4 which tracks the user's GPS position and follows it by re-centering until the user ends the tracking session, either implicitly or explicitly. Follow me mode is selected via a sidebar menu. The user location is always shown at the center, and the map under the user avatar slides. The user avatar is used to show the user's position and heading on the map. When the user's speed is below a threshold (i.e. no valid heading), a circle with a cross on it is displayed to represent the user's location. This icon rotates by 45 degrees with each new GPS fix. The speed threshold for heading is device-dependent and can be set in the fileset. The default value is 5.5 m/s (12.3 mph). The Follow Me remains active when the user selects: zoom in/out; or show traffic. The panning (Pan Mode), and the dropping a pin (ID Mode) is disabled when in Follow Me mode.

In the disclosed embodiments the maps do not handle Follow Me Mode and POI Search functionality simultaneously. Clicking on a tray icon to perform a new POI search deactivates the Follow Me mode. GPS tracking also stops when this happens. Activating Follow Me Mode does not affect any POI search that was previously executed. Pins shall remain present. Pressing a shortcut to cycle pins deactivate Follow Me Mode. Clicking on a pin from a previous search shows the balloon. The map does not re-center due to balloons which don't fit the screen. Clicking on the balloon shows the detail screen and deactivates Follow Me mode. Activation of the Follow Me mode does not change the zoom level.

Clicking on a Locate-Me/Where-Am-I button (if it is shown) has no effect in Follow Me mode. The where-am-I menu entry is disabled (or removed) from the menu when in Follow Me mode.

The map has a Where-Am-I Mode which gets the user's GPS position and displays it in the center of the map at an appropriate zoom level to present the user with their immediate whereabouts. The user's current location is shown with a blue disc on the map. The map is initially centered on the user's location. A balloon is used to show the details of the user's current location.

Current location is not updated automatically. Rather, the user must either click on the "Locate Me" button (for non-touch) or select the "Where Am I?" menu item to refresh their location.

The map has a general Traffic Overlay functionality which can be toggled at any time, comprising a tile overlay and a set of Traffic Incident POIs. The map has a traffic mode which can be either on or off. Toggling the traffic mode is different between touch and non-touch devices. The map displays a traffic overlay if the traffic mode is on. The text "Zoom in for traffic" is displayed if the traffic mode is on and the zoom level is above a set zoom level. The text "No traffic information available" is displayed if the traffic mode is on and the zoom level is below the set zoom level, but there is no traffic information available for this region. Traffic information is displayed as overlaid tiles from the server. The overlaid traffic tiles are displayed asynchronously as soon as they become available.

Regarding touch traffic overlay functionality, clicking on the traffic button toggles the traffic mode. The traffic button indicates the traffic mode (pressed/un-pressed button display).

Regarding non-touch traffic overlay functionality, a "Show/Hide Traffic" menu item is used to turn on/off traffic on the map.

The map has a general Traffic Overlay which can be toggled at any time, comprising a tile overlay and a set of Traffic Incident POIs.

When the user turns on the traffic feature, traffic incidents search is started in the background.

A traffic incident search may be performed in a bounding box centered at the map center, and the dimension of the bounding box is larger than the area covered by the visible map on the screen. A new search is started when the user pans out of the bounding box. There are three (3) different traffic icon levels to indicate severity: Yellow (Informational/Minor), Orange (Major), and Red (Severe). When the traffic feature is enabled, there is a menu item that shows a list of currently-visible incidents. The list only contains currently visible traffic incidents. Selection of a "Traffic Incidents" menu item shows the list of visible traffic incidents on the current screen. Only currently visible traffic incidents are shown so the list depends on the map center and zoom level.

Traffic incidents are clickable and show a balloon for it. The balloon is clickable and shows a detail screen for that traffic incident. The currently selected incident in the list view shows a balloon showing information about the incident. Balloons are drawn under the screen buttons should an overlap exist (they are part of the map layer and preferably do not cover any other element or extend outside the map). There are no forward/back shortcut keys to iterate through traffic incidents on the map screen.

Traffic incidents are reachable only through "Traffic incidents" menu item. There is no shortcut key to see the detail of the incidents through the map screen.

The raster map is a user interface (UI) element. A Trip Summary screen, Detour screen and pedestrian navigation uses raster map as part of the screen. The map features may or may not be available in these screens.

A trip summary screen is included. The Map is not intractable with the user except zooming in/out and panning. Only zoom in/out shortcut buttons are shown for touch devices. A show legend on map option is available in menu options for non-touch devices. Legend only shows zoom in/out shortcut keys for non-touch devices. Route layer is shown. Route color is set by the navigation module. User position is shown and updated with GPS fixes sent by the navigation module to the map component. Traffic layer is available. The user toggles the state of traffic layer through menu options. Traffic incidents are not selectable. The traffic incidents list is available through menu options.

A detour screen is provided. The Map is not intractable with the user except zooming in/out and panning. Only zoom in/out shortcut buttons are shown for touch devices. A show legend on map option is available in menu options for non-touch devices. Legend only shows zoom in/out shortcut keys for non-touch devices.

Route layer is shown. Route colors (current and detour) are set by the navigation module. Traffic layer is available. The user toggles the state of traffic layer through menu options. Traffic incidents are not selectable. Traffic incidents list is available through menu options. Detour route is selected through menu options for non-touch devices.

Pedestrian navigation is provided. The Map is not intractable with the user except zooming. The route layer is shown, and the route color is set by the navigation module. User position is shown and updated with GPS fixes sent by the navigation module to the map component. Bread crumbs are shown to indicate the last 10 positions of the user. POI icons are shown along the route. Tray and shortcut buttons aren't shown except for zoom buttons.

Map tile expectations were derived by taking the peak number of map queries we see today on our largest customer deployment, multiplying that by average number of tiles per screen, then multiplying that by four as a result of extra usage from end users due to the improved feature. Testing of these requirements is performed using well known HTTP load test tools, such as Seige. The input data for load testing is derived from actual map queries taken from production. The queries span at least 1 week of usage.

For the requirements below, a load test that successfully supports peak load is defined as meeting all of the following requirements: Runs for at least 1 hour; Uses URLs based on real world queries captured from production; URLs cover all possible device specific combinations (that is, it tests all tile sizes, dpi values, and regions); URLs have a regional distribution based on actual subscribers (that is, 99.99 of the queries will be based in NA); URLs used cover at least 1 week of real world data; Returns proper images for at least 99.999% of the requests; Processes 99% of tile images (3 standard deviations) within 333 ms; and All tile queries are performed simultaneously.

A Map Tile Cluster supports, at minimum, a peak load of 1553 transactions per second for map tiles. A Map Tile Cluster supports, at minimum, a peak load of 469 transactions per second for traffic tiles. A Map Tile Cluster supports, at minimum, a peak load of 777 transactions per second for route overlay tiles. A Map Tile Cluster supports, at minimum, the peak loads for map tiles, traffic tiles, and route tiles simultaneously, for a grand total of 2799 (1553+469+777) transactions per second.

A Map Tile Cluster capacity increases by adding more instances of any given component. Thus, cache capacity may be increased by adding another cache; DTS capacity may be increased by adding another DTS, etc.

QA logging records are used to record tile requests and tile receipts.

The following log files are kept on the tile server (Nginx): "error.log", which logs any information about errors encountered by the server; and "access.log", which logs access URLs requested by the client, and if or not the requests succeeded.

It is important that client maps redraw at a usable speed. On platforms where this is possible, threading is used to allow the cache to load with minimal impact to the drawing. Due to the large variety of device performance expectations, different pass/fail thresholds are used for the various metrics. Exemplary pass/fail thresholds include "CLIENT-METRIC-1", which is an average time to show the first tile from map request; and "CLIENT-METRIC-2", which is an average time to fill screen with tiles from map request.

Server performance is measured through the use of an HTTP load test tool. Cached and non-cached tests are performed.

Tile download bandwidth on the network is determined per client in terms of the number of concurrent downloads. All devices support tile maps. The Map Tile Server supports the "en-us" locale, and preferably does not support any locale settings other than "en-us". Tiles are localized based on the Locale setting, controlled by the tile retrieval URL. The localization applies to the label text seen on every tile.

A Map Tile Server system comprises 3 services: Cache (Varnish), Web server (DTS), and Map Renderer (DDS). While all 3 services can run on a single box, it is strongly suggested that they run on a 3-box cluster: a 64-bit box for Varnish Cache, a 32-bit box for DTS Web Server, and a 32-bit box for DDS.

As for route tiles, information within a route tile request is specific to the NB Server system that generated the route. Therefore, a separate route tile server is required for every NB Server system.

Traffic tiles require traffic flow information. For the North American region, this is provided by NAVTEQ's Realtime Traffic Feed. For the European Union region, traffic information is provided by ARC.

The map data is the same as for all of ABv5: NAVTEQ 2009.Q2 UTF-8 Discover Cities.

Figure 72:
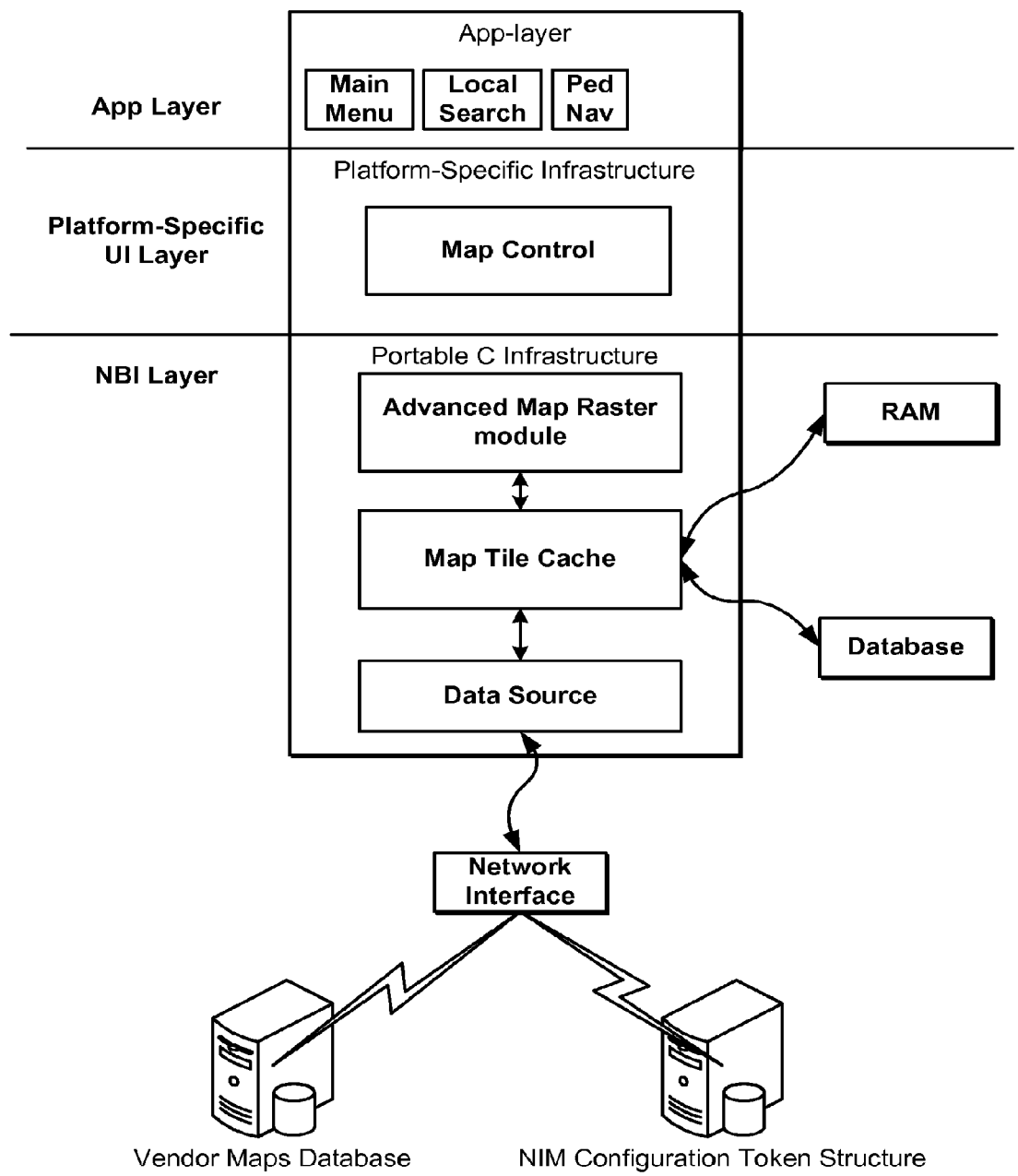
FIG. 72 shows an exemplary Tile Map architecture, in accordance with the principles of the present invention.

FIG. 72 shows an exemplary Tile Map architecture, in accordance with the principles of the present invention.

In particular, as shown in FIG. 72, the user-accessible functions listed in section Error! Reference source not found. are provided by the App Layer. The platform-specific Map Control user interface is shown in the center of the figure, and the platform-independent external lower-level APIs are shown at the bottom of FIG. 72.

Figure 73:
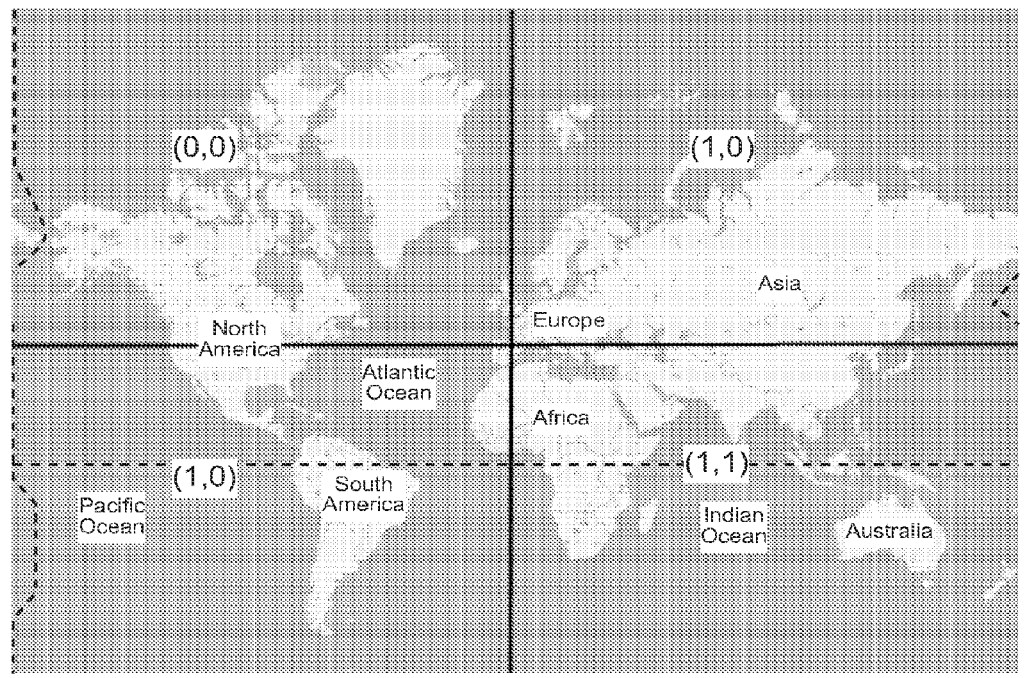
FIG. 73 shows a tile coordinate system dividing the map of the world into $2^z$ tiles where, z is zoom level, in accordance with the principles of the present invention.

As shown in FIG. 73, the tile coordinate system divides the map of the world into $2^z$ tiles where, z is zoom level. So for zoom level '0' there is one map tile with 'entire' world in it. For zoom level '1', there are four tiles as shown in the figure below.

As shown in the figure above, the indexing starts from the top left corner (0,0) of the tile system. The indexing scheme used by the exemplary embodiments is the same as that used by Google map tiles.

The scale (meters/pixels) of a particular map tile at a given zoom level is given by the following equation.

$$\omega = \frac{2\pi r_e \cos\varphi_Y}{2^z}$$

Where 'r' is the radius of the earth (6378137 meters), $\varphi_Y$ is the latitude of the centre of the tile and 'z' the zoom level. From the above equation, the scale for a particular tile is calculated as follows;

$$\text{Scale} = \frac{\omega}{tileSize}$$

Different map tile sizes are supported. A reference map tile serves the purpose of comparing the scale of the map tiles for different map tile sizes. The tile size '256×256' has been chosen as the reference map tile size. However, other tile sizes are envisioned within the principles of the invention (assuming that all map tiles have the same width and height), e.g., the NIM DTS supports map tiles of sizes 64×64, 128×128 and 256×256.

The concept of a 'meta tile' is used to speed up map tile creation at the server side. Though this is hidden from the client, the 'scale' used at each zoom level varies depending on whether or not meta tiles are used.

A meta tile is a 'larger' tile created to avoid hitting the DDS (Map Server) on a per request basis. Map creation by DDS can be a very time consuming process, depending on the region from where the maps are requested. For example creating map tiles for the European region is considerably slower than (×1000) creating maps for the 'US' region. Therefore, when the client requests a tile, a meta tile is basically created and 'cuts' the appropriate region from the meta tile. This meta tile is cached to avoid DDS access for the tiles falling under the meta tile.

Meta tiles are turned on/off on per zoom level. When using meta tiles, the 'new' x, y coordinates and zoom level and tile sizes are calculated as follows:

$$X=x/m$$

$$Y=y/m$$

$$Z=z-(m/2)$$

Tile Size=tile size*$m$ where 'm' is the meta tile factor. Meta tile factors have the following values 2, 4, etc., though a meta tile factor of '2' has been preferred.

Figure 74:
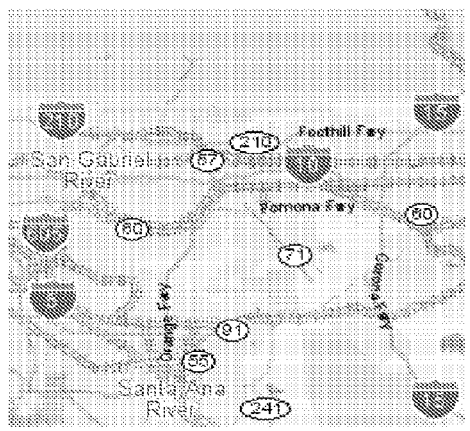
FIG. 74 shows a map tile for z=9, x=88, y=204, size=256 (reference tile).

When creating a meta tile, one zoom level down is used (i.e., z to z-1) to create the meta tile. This process is show in the example of FIG. 74, which shows a map tile for z=9, x=88, y=204, size=256 (reference tile).

Figure 75:
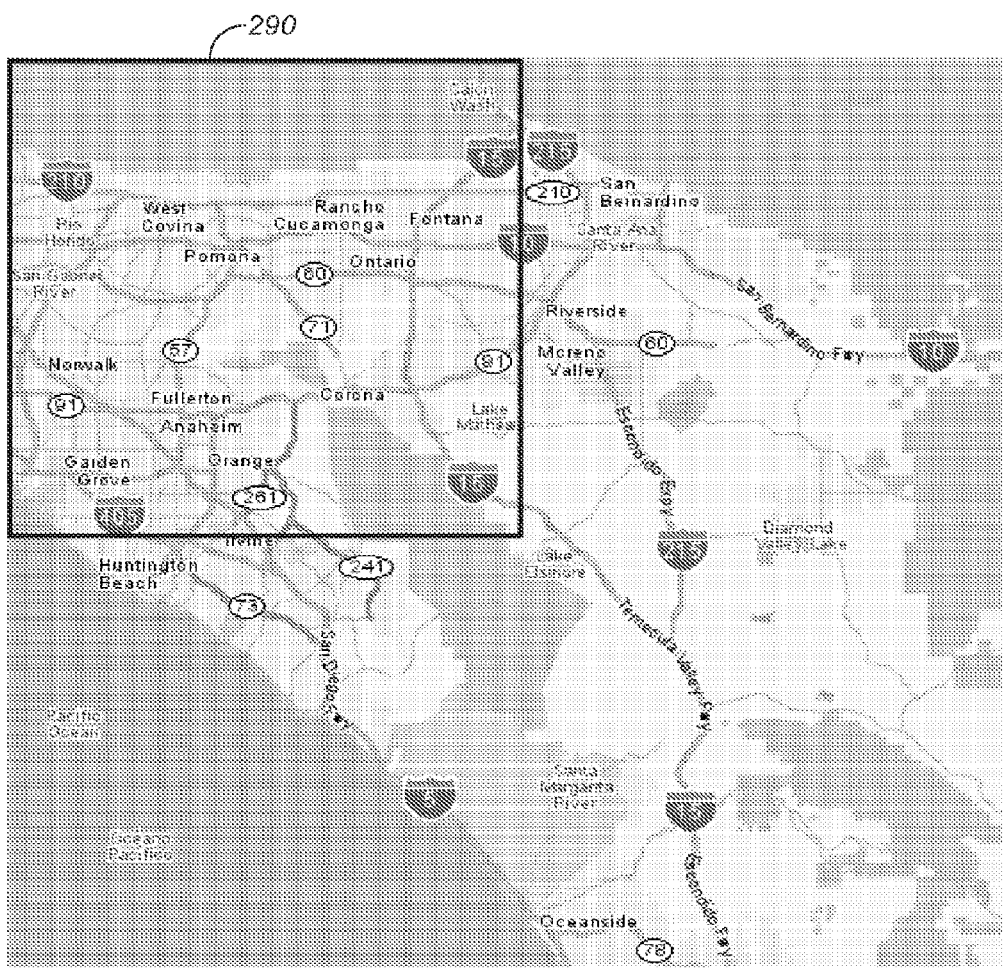
FIG. 75 shows Metatile enabled, x=88, y=204, z=8, size=256, with a region to be cut from this meta tile to satisfy the request z=9, x=88, y=204, in accordance with the principles of the present invention.

FIG. 75 shows Metatile enabled, x=88, y=204, z=8, size=256, with a region 290 to be cut from this meta tile to satisfy the request z=9, x=88, y=204, in accordance with the principles of the present invention.

In addition to the DTS external vendors or services may be used for fetching map tiles either as a backup or for displaying different kinds of maps.

The possible 'types' of maps supported include basic maps, satellite maps, hybrid maps, and terrain maps. Basic map types may be obtained from DTS, Google Maps™, Microsoft Virtual Earth™

The different map sources listed above can use different map projections. The client module that requests the tile must perform the necessary conversions between different coordinate systems, before it makes a request for the map tile.

Exemplary call flows and call sequences in the implementation of the tiled maps will now be described.

Figure 76:
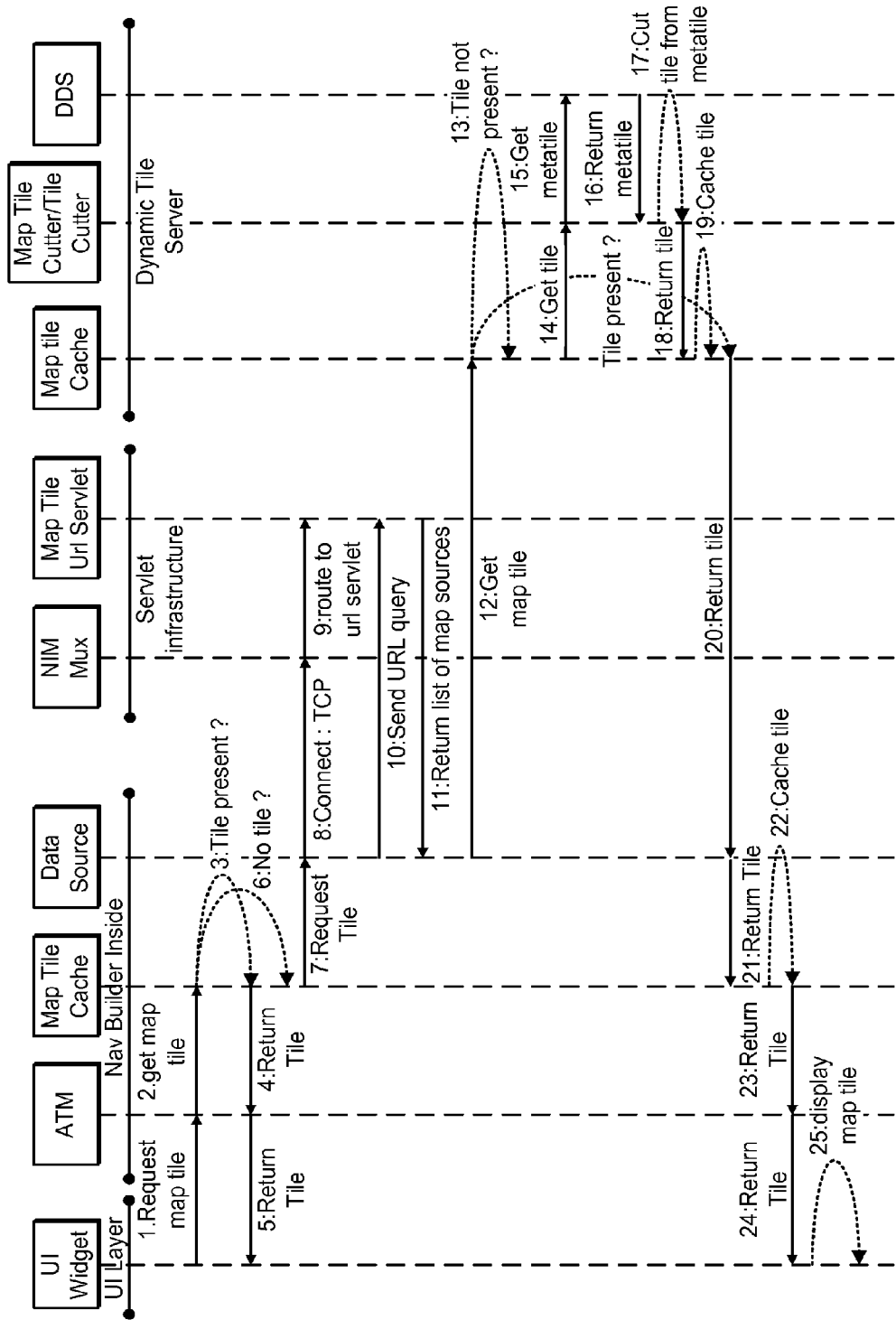
FIG. 76 shows an exemplary call flow sequence to obtain the map from the tiled maps server.

FIG. 76 shows an exemplary call flow sequence to obtain the map from the tiled maps server.

In particular, interactions are shown in FIG. 76 between the client platform layer and the server side components, such as servlets, the dynamic tile server, and the drill down server. The call depicts the retrieval of a map tile from the NIM DTS.

As shown in FIG. 76, call flow steps to obtain map tiles are as follows:

In step 1, the UI Widget requests a map tile from the Advance Tile manager (Advanced Tile Manager (ATM)). This is usually in response to an action taken by the user.

In step 2, the Advanced Tile Manager (ATM) module requests the map tile from the cache maintained at the client side.

In step 3, a check is performed to determine if the requested tile is in the caches (RAM cache and DB cache).

In step 4, if the requested map tile is present in the cache, the tile is returned to the Advanced Tile Manager (ATM) module.

In step 5, the Advanced Tile Manager (ATM) module returns the map tile to the UI widget which then draws the map tile on the display.

In step 6, if the map tile is not present in the caches maintained at the client side . . . .

In step 7, the map tile is requested from the data source module.

In step 8, the data source module opens a TCS connection and connects to the NIM mux.

In step 9, the mux routes the query to the appropriate servlet.

In step 10, the data source sends the query to retrieve the list of map sources.

In step 11, the servlet returns the list of map sources.

In step 12, the data source gets information about the map sources and sends a request to the dynamic tile server, requesting the map tile.

In step 13, the cache server (which is part of the dynamic tile server) checks if the requested tile is already cached in the server.

In step 14, if the requested tile is not present in the cache server, the cache server routes the request to the upstream server.

In step 15, the upstream server (Nginx) requests the metatile corresponding to the requested tile from the DDS.

In step 16, the DDS creates the image and returns the image to Nginx.

In step 17, the Nginx tile cutter module cuts the required tile from the meta-tile returned by DDS.

In step 18, the tile cutter returns the tile to the cache server.

In step 19, the cache server caches the tile.

In step 20, the tile is returned to the client (data source module).

In step 21, the data source module returns the tile to the map tile cache.

In step 22, the map tile cache stores the newly fetched tile in the cache.

In step 23, the tile is returned to the Advanced Tile Manager (ATM) module.

In step 24, the Advanced Tile Manager (ATM) module returns the module to the UI.

In step 25, the UI Widget draws the image on the UI.

The following is a sequence diagram depicts the sequence of operations involved in retrieving and displaying overlay (traffic) tiles on the client UI. The overlay tiles are created by the server upon the client request.

In particular, in a step 1, the user enters a raster map screen from any point in the application. (i.e. Maps->Where am I?, Maps->Follow me Map)

In step 2, the map is drawn as quickly as possible.

In step 3, the user's GPS position is drawn on top of the map when provided.

In step 4, the user controls the cursor using the arrow keys to operate the panning/selection on the map for non-touch-screen devices.

The user may continue to interact with the map if they want while the map tiles are downloaded (i.e., there is no lockout of the UI flow during the download.)

In an alternate scenario, if there are missing tiles in the ClientApp, placeholder images are drawn instead of the missing map tiles. Then the missing map tiles are redrawn when appropriate after they are downloaded.

In another alternate scenario, the user pans to any edge of the map. Then the user may experience some parts of the map screen in lower resolution. This happens when there are missing tiles. These areas are covered by tiles from a lower zoom level until they are downloaded, hence will look blurry for a while.

The route highlight and the traffic information are sent as overlay tiles separately instead of a sent together with map on the same tile. Relevant devices are the 'User' (the actual device using the application); the 'ClientApp' (the client application); and 'NIMServer' (the provider's server). To achieve this, first the user enters a raster map screen from any point in the application (e.g., Navigation->Map of Route). Then the user asks for traffic information. Lastly, the traffic information is drawn on top of the current map.

In one alternative example, the user pans the map. Traffic incidents on the new map are then shown on the map, if traffic incidents are enabled for the previous map.

In another alternate embodiment, the route is shown on top of the map when in 'map of route' mode, or any screen that route information is available on. In yet another alternate embodiment, placemarks (POIs) are shown on the map when provided. "Ballons" are used to show the captions or details for that POI. Lastly, when the user pans the map, a new search for new POIs is not performed automatically. Only the previous existing POIs are shown.

In still one more alternative example, the user selects disablement of the traffic information, in which case the traffic information is instantly erased from the map.

To perform zoom, the 'User', 'ClientApp', and 'NIMServer' elements are involved. Described as a process, the user first enters a raster map screen from any point in the application (e.g., Maps->Where am I?, Maps->Follow me Map). The user then zooms in via any available zoom-in option. The zoomed-in map screen is drawn (possibly at a lower resolution in an initial drawing).

In an alternative embodiment, the user zooms out via any available zoom option. The zoomed-out map screen is drawn quickly, initially at a lower resolution, but eventually getting sharper.

When the user clicks on a POI, a balloon is shown, using the scaled down or up version of previous map tiles until the map tiles for the current map are downloaded.

The user is presented with friendly shortcuts to zoom in or out and pan quickly for touch screen phones. In particular, the user enters a raster map screen from any point in the application (e.g., Maps->Where am I?, Maps->Follow me Map). The user then enters an input through an arrow key or a trackball or any other appropriate directional key. The map screen or the cursor is panned in the direction of the input.

For touch screen devices, the user double taps the screen, and the map screen zooms in one level. In an alternative embodiment, the user DRAGs the screen by either finger or stylus. Newly-revealed tiles are downloaded when the user releases the finger/stylus. In yet another scenario, the user FLICKs the screen by dragging with sufficient velocity. In response, the map pans on its own in the direction of the flick until it decelerates to a stop. Newly-revealed tiles are downloaded when the map stops moving.

For multi-touch input screen devices, in an exemplary case the user two-finger double taps the screen, and the map screen zooms out one level. In an alternative embodiment the user does a pinch-in gesture on the screen. The map screen then zooms out based on the pinch. The center of the map then moves along with the center of the pinch, and the map sets its new zoom level upon completion of the gesture.

In still another case scenario, the user does a pinch-out gesture on the screen. In response, the map screen zooms in based on the pinch. The center of the map moves along with the center of the pinch. The map sets its new zoom level upon completion of the gesture.

Auto pan of the map, i.e., movement of the center of the map changed appropriately by user actions, is now described.

In particular, the user first enters a raster map screen from any points in the application. (i.e. Maps->Where am I?, Maps->Follow me Map). The user enables POIs on the map. The user clicks on a POI at the any edge of the map. The center of the map is then set to the location of the selected POI. Note that the selected POI need not necessarily be set to the center, but rather to somewhere that feels best for the user experience.

The user can change the tile modes for the raster maps. Available options include map, bird's eye, satellite, etc. To do this, the user is enabled to enter a raster map screen from any point in the application (e.g., Maps->Where am I?, Maps->Follow me Map). The user then changes the tile map mode from maps to satellite, and then the satellite version of the current map is displayed.

These options will only be valid when the ClientApp has a URL to a server capable of different tiles. The ClientApp has built in flags to support this use-case when required.

The map data is updated automatically with every draw if there are any changes to layers, etc. that have been made since the last draw. TO accomplish this, the user is enabled to enter a raster map screen from any point in the application (e.g., Maps->Where am I?, Maps->Follow me Map). The map data cached in the ClientApp is updated if necessary. The latest version of the map is then drawn on the screen.

Maps are preloaded as much as possible to provide faster rendering of map tiles. The user enters a raster map screen from any point in the application. The user flicks on the map, and the map moves via animation. As a variation of this scenario, a popup enters the screen while animation is in progress, causing the animation to stop. The map is moved to its final location instantly without animation.

The MAP Tile UI component draws tiles in their appropriate positions on the screen, or draws placeholder images when tiles are not yet present. Rout overlays are drawn over map, as are traffic overlays. PLacemark icons are drawn on top of the map when provided. 'Balloons' are drawn for placement icons to show captions or details for that placemark. The user's GPS position is drawn on top of the map when provided. Upon zooming in or out, the Map Tile UI component draws the previous zoom's tiles scaled to cover the area until the new tiles are loaded. When panning, the Map Tile UI component attempts to cover any areas still needing to be downloaded with tiles from a lower zoom level until these new tiles are downloaded. A cursor is provided to operate the panning/selection on the map for non-touch-screen devices, controllable using arrow keys. The Map Tile UI component provides controls for buttons to change between different base/overlay tiles, whenever present. Upon being notified of receipt of tiles, the Map Tile UI component redraws itself when appropriate.

The Map Tile UI component handles events from arrow keys, trackballs, other appropriate directional keys, etc. for panning the map and/or moving a cursor. Drag events are handled if the map is panned with the user's finger or stylus. Newly-revealed tiles are downloaded when the user releases the finger/stylus. Flick events are handled if the user drags with sufficient velocity. This causes the map to pan on its own in the direction of the flick until it decelerates to a stop. Newly-revealed tiles are downloaded when the map stops moving. Two-finger double tap gestures on multi-touch input screens zoom out one level on the map.

The Map Tile UI provides an API to set the center position of the map in lat/lon, an API to change zoom level, an API for the application to change the tile mode (e.g., between map mode, bird's eye mode, satellite mode, etc.) An API toggles the viewing of traffic data, and sets the map viewing size. An API queries the available features of the UI component, and specifies a route overlay on the map. An API passes a list of placemark icons and callbacks used for user interaction with them, and redraws the map and updates it with any changes to layers, etc. that have been made since the last draw. The tiles necessary to display the current map are pre-loaded, and the available map tile types (e.g., road, satellite, bird's eye view, etc.) are enumerated. An API selects from the available map tile types, and an API enumerates the available map overlay types (e.g., traffic, route). An API selects from the available map overlay types, and an API translates between lat/lon and pixel. coordinates of the map view. An API retrieves the center of the map in lat/lon, and one obtains the bounding box of the map view in lat/lon. An API obtains the lat/lon for any map view pixel coordinate, and one obtains the map view coordinate for any lat/lon. The Map Tile UI component includes an API to let the application choose whether to show controls to allow the user to manipulate the map view. This includes buttons for showing map tile types and overlay types. An API programmatically manipulates the map view, and an API sets the center point of the current map view to a specific latitude and longitude. This API includes an option to animate this transition, and a callback function to be called when the animation is complete. An API sets the zoom level of the current map view, this API including an option to animate this transition, and a callback function to be called when the animation is complete. An API zooms to a specific bounding box, this API including an option to animate this transition, and a callback function to be called when the animation is complete. An API determines if an animation is currently in progress, and an API cancels the current animation. An API jumps to the final position of the current animation. Another API allows the implementation of Custom Map Overlays, using a specific set of callback functions or interfaces. One API supports multiple custom map overlays, and another allows a custom overlay to draw its content into the map view while allowing for multiple drawing layers (drop shadows, main content, labels, etc.) An API allows a custom overlay to handle key events, and another API allows a custom overlay to handle touch events.

The following are means by which the App Layer makes use of the Map Tile UI component.

An API sets the center position of the map in lat/lon.
An API changes zoom level.
An API toggles the viewing of traffic data.
An API sets the map viewing size.
An API queries the available features of the UI component.
An API specifies a route overlay on the map.
An API passes a list of placemark icons and callbacks used for user interaction with them.
An API passes a list of placemark icons and callbacks used for user interaction with them.
An API redraws the map and update it with any changes to layers, etc. that have been made since the last draw.
An API pre-loads the tiles necessary to display the current map.
An API enumerates the available map tile types (road, satellite, bird's eye view, etc.)
An API selects from the available map tile types, and an API enumerates the available map overlay types (e.g., traffic, route).
An API selects from the available map overlay types.
An API translates between lat/lon and pixel coordinates of the map view.
An API retrieves the center of the map in lat/lon.
An API obtains the bounding box of the map view in lat/lon.
An API obtains the lat/lon for any map view pixel coordinate.
An API obtains the map view coordinate for any lat/lon.

An API lets the application choose whether to show controls to allow the user to manipulate the map view. This includes buttons for showing map tile types and overlay types.
An API programmatically manipulates the map view.
An API sets the center point of the current map view to a specific latitude and longitude. This API includes an option to animate this transition, and a callback function to be called when the animation is complete.
An API sets the zoom level of the current map view. This API includes an option to animate this transition, and a callback function to be called when the animation is complete.
An API zooms to a specific bounding box. This API includes an option to animate this transition, and a callback function to be called when the animation is complete.
An API determines if an animation is currently in progress.
An API cancels the current animation.
An API jumps to the final position of the current animation.
An API allows the implementation of Custom Map Overlays. This would normally be accomplished by allowing the developer to implement a specific set of callback functions or interfaces.
A Custom Overlay API supports multiple custom map overlays, and allows a custom overlay to draw its content into the map view while allowing for multiple drawing layers (drop shadows, main content, labels, etc.) The Custom Overlay API allows a custom overlay to handle key events, and to handle touch events.
An API notifies the application if a touch and hold operation occurs for the application to perform a custom operation such as dropping a new pin at the lat/lon.

The Map Tile UI component resides in the NavBuilder UI component of the platform-specific app layer. Its purpose is to retrieve tiles from the NavBuilder™ Inside (NBI) layer, draw tiles to the screen, and handle user input events. It is implemented natively to maximize access to native interaction controls.

The Map Tile UI component draws tiles in their appropriate positions on the screen, or draws placeholder images when tiles are not yet present, it draws route overlays over map, and traffic overlays over map. The Map Tile UI component draws placement icons on top of the map when provided, and "balloons" for placemark icons for the purpose of showing captions or details for that placemark. The user's GPS position is drawn on top of the map when provided, and draws the previous zoom's tiles scaled to cover the area until the new tiles are loaded. When panning, the Map Tile UI component attempts to cover any areas needing to be downloaded with tiles from a lower zoom level until these new tiles are downloaded. The Map Tile UI component provides a cursor to operate the panning/selection on the map for non-touch-screen devices, controllable using the arrow keys. The Map Tile UI component provides controls for buttons to change between different bases/overlay tiles, whenever present.

The Map Tile UI component also handles input events. For instance, the Map Tile UI component handles events from arrow keys, trackballs, other appropriate directional keys, etc. for panning the map and/or moving a cursor. Double-tap gestures for zooming in one level on the map are handled, as are drag events to pan the map with the user's finger or stylus. Newly revealed tiles are downloaded when the user releases the finger/stylus. Flick events are handled if the user drags with sufficient velocity. This causes the map to pan on its own in the direction of the flick until it decelerates to a stop. Newly-revealed tiles are downloaded when the map stops moving. Two-finger double tap gestures are handled on multi-touch input screens to zoom out one level on the map. Pinch-in gestures are handled on multi-touch input screens to zoom out based on the pinch. The center of the map moves along with the center of the pinch. The map sets its new zoom level upon completion of the gesture. Pinch-out gestures are handled on multi-touch input screens to zoom in based on the pinch. The center of the map moves along with the center of the pinch. The map sets its new zoom level upon completion of the gesture. Touch and hold gestures are handled to drop a pin placemark at the relevant location for reverse-geocoding and thereby obtain an address for the pinned location.

The following are ways that the Map Tile UI component interacts with the NavBuilder™ Inside (NBI) Layer portion of Tile Maps. The Map Tile UI component requests tiles by coordinate from the Advanced Tile Manager using the universal <tx, ty, tz> coordinates, plus a priority parameter based on the tile's position relative to the screen center. The Map Tile UI component registers to be notified upon receipt of requested tiles.

The Tile Map UI component, upon notification of receipt of tiles, redraws itself when appropriate.

An Advanced Tile Manager component resides in the NavBuilder™ Inside (NBI) component of the platform-independent layer. Its purpose is to retrieve and store tiles as requested by the UI layer, as well as to manage the tile cache of the system and the data interaction layer. It is agnostic of any map center or user interaction and is focused on the retrieval of tiles as prioritized by the UI layer.

The following are requirements for the interface by which the UI layer requests tiles and sets up notification of new tiles. In particular, the Advanced Tile Manager provides a generic Get Tile function which takes universal tile coordinates, a download priority, and the type of tile image (map, bird's eye, satellite, etc.) The Advanced Tile Manager returns the tile if found in the cache, or signals to the caller that the tile has been added to the download queue. The Advanced Tile Manager provides a way to notify the UI layer that a tile previously added to the download queue is available for drawing. The Advanced Tile Manager provides a way to reset the priority of pending tiles so that their priority can be reevaluated by the UI layer. The Advanced Tile Manager provides a way to flush pending tiles that are no longer relevant to the current map state.

The Advanced Tile Manager component manages the cache as well as the data services. The following are the required operations carried out by the Advanced Tile Manager (ATM) that do not pertain to external interfaces. In addition, the Advanced Tile Manager (ATM) keeps track of usage data, collected for the session and saved in prefs.

In particular, the Advanced Tile Manager manages a queue of pending tile downloads ordered by priority, maintains the Data Source object, and maintains the Map Tile Cache object. The Advanced Tile Manager uses the result from the Data Source's Service URL query to invalidate/clear the Map Tile Cache in the event of a new tile generation. The Advanced Tile Manager mediates tile requests between the UI Layer, the Map Tile Cache, and the Data Source as necessary, and adds tiles to the Cache upon receipt of them from the Data Source. The Advanced Tile Manager keeps track of usage data for Tile Maps, comprising per-tile-type data, and stored in persistent storage for Data Source to upload later for (1) Total number of requests; (2) Number of RAM cache hits; (3) Number of Database Cache hits; and (4) Tiles retrieved from the server.

The Map Tile Cache component is an NavBuilder™ Inside (NBI) component of the platform-independent layer. It has two levels of caching: a RAM cache and a database cache. The multi-level design is intended to optimize the speed in which tiles are fetched (RAM portion) while having a means of persistent storage for future sessions (database cache).

The RAM cache is a temporary cache for tiles that are the most relevant for drawing to the screen to avoid pauses caused by loading tiles from the database cache. Since the cache has no concept of screen position, tile relevance is tracked by the most recent request that was made for the tiles. The RAM Cache is a temporary storage for recently-fetched tiles and remains active until the app is exited. The RAM Cache has a capacity that is proportional to the number of tiles that could be realistically fetched at once to prevent thrashing. The RAM Cache, when at capacity, drops tiles in least recently used (LRU) order for storage in the DB cache. The RAM Cache serves as storage for tiles both as they are downloaded from the server and when they are recalled from the lower-level cache.

The database cache is a persistent means of tile storage and holds most commonly-used tiles to avoid accessing the network. One tile database saves tiles from all zoom levels. A combination of "least-often-used" and "least-recently-used" (least often used (LOU) and least recently used (LRU) attributes are used to discard tiles from this cache when it has reached its capacity. The Database Cache has persistent storage on the device with a device-configurable maximum capacity, and keeps track of how often tiles are accessed to determine which tiles to throw out when full. The Database Cache both stores and retrieves tiles fast enough to be performed synchronously.

All multi-level caching operations are handled within the Map Tile cache, leaving a very simple get/add/clear interface. The Map Tile Cache provides a means to Get a tile, which first looks in the RAM cache and then looks in the database. If there is a "hit" in the database, it is loaded into the RAM cache. The Map Tile Cache provides a means to Add new tiles to the cache when they are downloaded. The Map Tile Cache provides a means to Clear the database and RAM caches when a new tile generation is detected, or for other purposes such as the un-installation of the app or a Master Clear.

The Data Source component is an NavBuilder™ Inside (NBI) component of the platform-independent layer which is responsible for the interaction with both the NIM Service URL server and the HTTP tile server. Data Source is also responsible for tracking user analytics, which tracks information for each tile request and download.

One duty of the Data Source component is to obtain the Service URL used to download tiles over a HTTP connection. Upon initialization, the Data Source makes a request to the NIM Service URL server to obtain the format for the requests and tile generation for the pre-designated tile server. The Data Source considers this Service URL valid for the duration of the application session. As part of the request, Data Source also uploads usage data collected from the previous session. The Service URL returned by the server has a schema flexible enough to provide a template for any provider's tile URL.

If the system does not have a needed map tile, the Advanced Tile Manager (ATM) requests a tile from Data Source. It is the duty of Data Source to do the conversion functions necessary to form an HTTP request to obtain map tiles. The Data Source has the ability to create HTTP file requests using the template provided by the Service URL and the universal tile request parameters as provided by the higher layers.

Data Source provides a means for the Advanced Tile Manager (ATM) to make tile requests in universal tile <tx, ty, tz> coordinates, along with a supplied map type. Note that different map sources might support different map projections and the client module might need to convert from one coordinate system to another. The Data Source provides a means to cancel all pending tile downloads, and a notification system to return tiles asynchronously after completing a tile download request.

Upon launch of Tile Map data services, the client needs to retrieve a map server URL from NIM servers. This URL is specified as a template for making requests from that particular server. The template has placeholders for the 'parameters', which are filled in by the client, before issuing the HTTP request. This extra 'layer' between the client app and the dynamic tile server is put in place so that an administrator can update the URL at the server side and thus point the client to a 'different' map server, with ease.

The map server returns a value indicating the 'generation' of the map tiles along with other information related to a 'map source'. Client can use this value to invalidate the cache it maintains at the client side. The map server returns a value indicating the 'map projection' associated with each returned map source. The map source server returns information about at least 2 map sources. One primary and the other, secondary.

The URL 'template', returned by the map source server, has the following parameters.

| Parameter | Description |
| --- | --- |
| type | type of the tile downloaded<br>'map'—base map tile.<br>'traffic'—traffic overlay tile<br>'route'—route polyline tile |
| v | version of map tiles. |
| $fmt | image format can be any one of the following;<br>'png'<br>'gif'<br>'jpg' |
| x | x coordinate of the requested map tile |
| y | y coordinate of the requested map tile |
| z | zoom level |
| sz | size of the map tile (width shall be equal to the height) |
| res | Map resolution. This is the DPI value for the device's screen size. Takes the format 'X' where X is the DPI value. '96', '192' etc. |
| <rid1> | This parameter is only valid for 'route' overlay tiles. This is base64 encoded version of the routeid. |
| <rc1> | This parameter is only valid for 'route' overlay tiles. Color is specified either as RRGGBB or RRGGBBAA. |
| <rid2> | Similar to 'rid1' parameter. This parameter was added to support route detours. |
| <rc2> | Similar to 'rc1' parameter. This parameter was added to support route detours. |

The Dynamic Tile Server (DTS) is the source from where clients can download 'base' map tiles using the HTTP protocol. Internally the map tiles served by the DTS are generated by the DDS and depict geographical features. The dynamic tile server provides an HTTP interface for the clients to download map tiles, and supports PNG, GIF and JPG image formats. The dynamic tile server supports tiles of size 256×256 and 128×128 and 64×64. While the dynamic tile server supports only one tile size from a list of supported tile sizes (at this time comprising 64×64, 128×128 and 256×256), support for other tile sizes are within the principles of the present invention. Dynamic tile server supports generation of maps for both 'low' and 'high' resolution devices. Dynamic Tile Server supports caching of the generated tiles at the server side to speed up the process of delivering the map tiles.

With the design of the new map tile server, the base map tile is generated from a dedicated tile server (DTS), which serves 'base' map tiles for different zoom levels. The overlay tile server has the responsibility of serving different 'overlay' tiles. An overlay tile here means an image of either the route polyline or the traffic flow, with a transparent background. The transparent background enables the client application to 'overlay' the tiles as appropriate on the 'base' map tiles.

The overlay tile server provides an HTTP interface for the client to download a particular overlay tile, and supports two kinds of overlay tiles: traffic tiles, and route polyline tiles. The overlay tile server generates tile images with a transparent background, and generates the overlay tile image for a given x,y coordinate (unit is a tile) and a zoom level. The overlay the image server is delivered in the 'PNG' format, and allows the client to specify the tile size. The overlay tile server supports tile sizes (length, breadth) which are powers of 2, and supports caching at the server side to speed up delivery of the overlay images.

The tile servers serve 'tiles' of different types. The tiles can be 'base' map tiles, traffic tiles etc. The dynamic tile server can be accessed through the HTTP interface to download a map tile. The HTTP client requests a particular tile by specifying the coordinate (x, y) of the tile and the zoom level.

The URL format is as follows:
http://www.server.com/type?v='version'&loc='locale'& fmt='format'&res='res'&x='x'&y='y'&z='z'&sz='size'& rid='route'&rc='color'

'$rid' and '$rc' are optional parameters and are only valid when a 'route polyline' overlay tile is requested. For example, the HTTP request for downloading a traffic tile for coordinate (4, 5) at zoom level 3 has the following form:
http://www.server.com/traffic?v=1.0&loc=enus&fmt= PNG&res=96&x=3&y=4&z=5&sz=256

Similarly, to request a 'route' polyline for the coordinate (4,5) at zoom level 3, displaying the route identified by route 'xyz' has the following form:
http://www.server.com/route?v=1.0&loc=enus&fmt= PNG& res=96&x=3&y=48a=5&sz=256&rid1=a1b2b3b4 b5&rc1=FF0000

Also, to draw two routes on the overlay, the request is issued as follows:
http://www.server.com/route?v=1.0&loc=enus&fmt= PNG&res=96&x=3&y=4z=5&sz=256&rid1=a1b2b3b4b5& rc1=0000FF& rid2=a1b2b3b4b5&rc2=FF0000

Note: A maximum of two routes can be drawn on an overlay.

The dynamic tile server includes different hardware components such as a Nginx HTTP Server and a Varnish cache server. The Dynamic Tile Server (DTS) requires a 64 bit server to implement caching, with a cache size in excess of 2 Gb.

The TPS servlets for a tiled map support the following functions (queries):

a map tile source request (maptile-source-query) to obtain a validated location for a user specified location.

a map tile source reply (maptile-source-reply) to obtain a validated location for a user specified location.

| Type | Number | Description |
| --- | --- | --- |
| maptile-source | 1 . . . n | Information about the map tile source |

Maptile Source

| Type | Number | Description |
| --- | --- | --- |
| internal-source | 0 . . . 1 | If present, the map source is owned by NIM. |
| url | 0 . . . 1 | The tile server base URL |
| url-args-template | 0 . . . 3 | The url templates to be used for fetching different types of tiles. The 'real' URL shall be formed by concatenating 'server-url' with the appropriate url template from this collection. |

Attributes

| Name | Type | Description |
| --- | --- | --- |
| gen | string | Generation of the map tiles |
| projection | string | Map projection type. The client can use this value to determine, if it needs to convert the NIM coordinates to match the coordinate system used by the map source server. Supported types: 'mercator' |

Note:
This element is added to support diverse $3^{rd}$ party map sources. NIM map server uses Mercator projection. But other map sources might use different map projections.

URL-ARGS Template

This element specifies the URL template for a particular 'map tile' type.

| Name | Type | Description |
| --- | --- | --- |
| type | string | Type of the tile downloaded 'map'—base map tile. 'traffic'—traffic overlay tile 'route'—route polyline tile |
| template | string | The template for the URL arguments. |

| Parameter | Description |
| --- | --- |
| $v | The version (generation) of tiles |
| $loc | The locale. Ex: 'en-us' |
| $fmt | Format can be any one of the following; 'PNG' 'GIF' 'JPG' |
| $x | x coordinate of the requested map tile |
| $y | y coordinate of the requested map tile |
| $z | zoom level |
| $sz | size of the map tile (width shall be equal to the height) |
| $res | map resolution The resolution is specified as client DPI. |
| <$rid1> | This parameter is only valid for 'route' overlay tiles. This is the base64 encoded representation of the 'route id'. |
| <$rc1> | This parameter is only valid for 'route' overlay tiles. Color is specified either as RGB(r, g, b) or RGB(r, b, g, a) |
| <$rid2> | Similar to '$rid2' |
| <$rc2> | Similar to '$rc2' |

Note:
The second route parameter set ('$rid2' and '$rc2') is optional, so those parameters are not present in the exemplary template.

It may be desirable to limit the maximum number of routes that can be specified on a route overlay, e.g., to 2 routes.

The URL element specifies the map usage data that is uploaded by the client to a server side persistent medium.

Facebook Update

Facebook™ is an external website that aids its users with their social networking needs. In accordance with the principles of the present invention, "NIM FB APP" is a Facebook application created for communicating with Facebook for each of the users. "NIM FB APP DB" is a database for NIM FB APP functionality.

The AB Navigator mobile client provides users with location based services they are interested in. This inventive Facebook update feature provides the user with an option to update the status field of his/her Facebook (FB) account from the AB Navigator mobile client.

There are three ways to communicate with FB servers: The first method, which can be used for any platform, creates the web Facebook application "NIM FB APP" for this purpose. The NIM FB APP is the medium of communication between AB Navigator and Facebook servers. To facilitate this, the user adds the NIM FB APP onto their Facebook account. Upon adding the NIM FB APP to their account, Facebook would generate a userid and session key associating the NIM FB APP and the user account. This userid and session key are used to directly talk to the Facebook server for updating the user's status.

The second method uses the FACEBOOK Connect library, provided by Facebook. This is currently only available as an Objective C library which can be used for the iPhone platform. The library provides api for authenticating the user through the mobile client, and uses the Facebook api to update status directly from the mobile client.

The third method uses the Short Messaging System (SMS) mechanism, though this method involves the costs associated with SMS, and also won't give the complete capabilities that are obtained from the api. Because of these issues the third method is not preferred over the second approach. The second method provides a platform on which there is no library to directly talk to Facebook servers, e.g., the use of the FB Connect api for iPhone.

Figure 77:
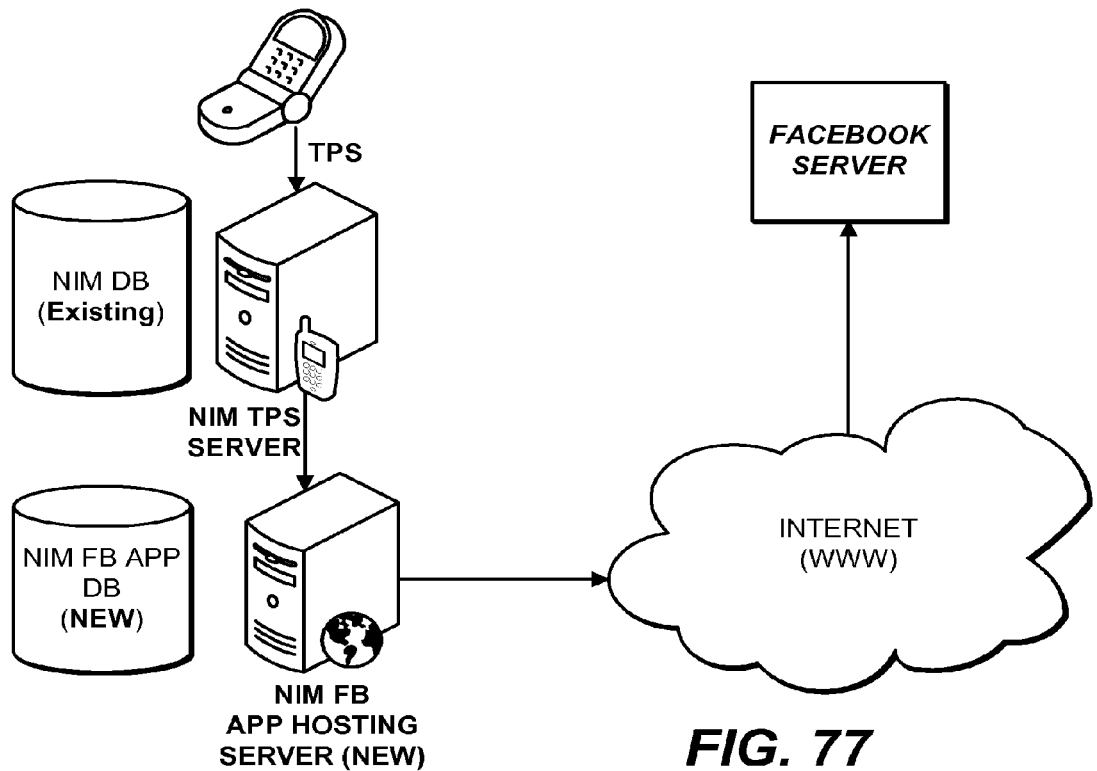
FIG. 77 shows an overall functional block diagram of an exemplary platform taking the first approach, in accordance with the principles of the present invention.

FIG. 77 shows an overall functional block diagram of an exemplary platform taking the first approach, in accordance with the principles of the present invention.

A goal of the Facebook status update in accordance with the principles of the present invention is to provide the user with the ability to update the status field of their Facebook account with the location based information available on the mobile client, with minimal delay.

The client, upon first access to the Facebook status update feature, show an information popup menu instructing the user about how to proceed for authentication. The authenticating web application provides an easy to use PIN, and obtains a password from the user to match with a pre-stored PIN associated with an authorized user. This is performed when received from the mobile client to avoid unintended PIN matching. An SMS notification may be used if desired.

The client uses an FBConnect api (Facebook connect library) for authentication for the given platform.

The user is able to select any location based information available for constructing the status, and is able to view and customize the message before posting it. The user is provided with an option to set a default prefix and suffix, which are applied for all posted messages. The user has a choice of posting the status as a Short story or as a Full story.

The user is provided with an option to reset the password. The user is shown the PIN if it is not already attached to the client key. The user is enabled to send a SMS message with the PIN and password.

The user is provided with an option to change the prefix and suffix of the message at the point in time from the application preferences.

Cell ID

The CellID servlet provides a newly powered on mobile terminal (phone) with an approximate location until a GPS fix has been obtained. The location is obtained by providing information about the mobile network resources (network code, cell id etc) currently seen by the terminal to a web service, which translates these into a lat/lon point that is returned to the terminal. The lat/lon location can then be used by the phone to initiate navigation (poi, etc) before the GPS fix process has completed.

The CellID is implemented as a new tps transaction which can be sent from a terminal to a mux. The servlet itself contacts a web service (currently navizon) to do the translation.

Network types supported in the exemplary embodiments are CDMA, GSM and WiFi.

The CellID is a GSM/CDMA A single base station within a Location Area Code (LAC, which is a GSM definition of a collection of geographically contingent base stations. The CellID is implemented as a servlet, which receives incoming queries from the terminal. The CellID accesses an external web service to translate the provided network information to a latitude/longitude/radius (lat/lon/radius) triplet. The returned radius specifies a circle around the lat/lon point that the terminal is located within.

Multiple network information entries may be provided by a terminal to increase accuracy. These entries can be mixed from several different network types such as GSM, CDMA and WiFi. The web service aggregates position from all entries to achieve a more exact location.

Figure 78:
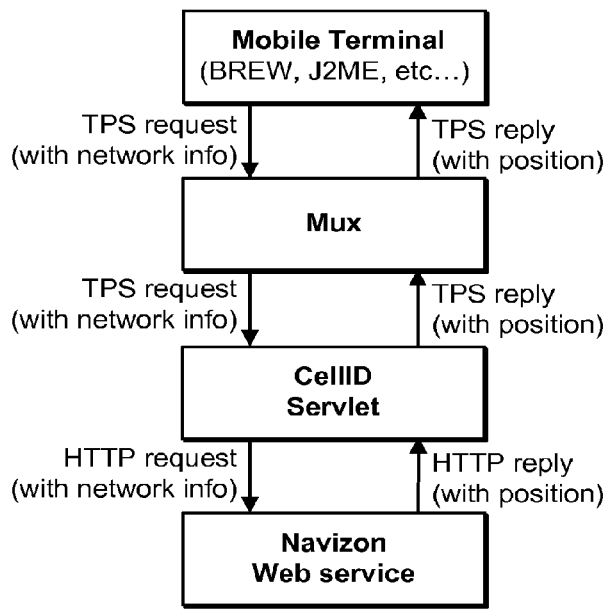
FIG. 78 shows an exemplary flow of information from terminal to the web service, and back, in accordance with the principles of the present invention.

FIG. 78 shows an exemplary flow of information from terminal to the web service, and back, in accordance with the principles of the present invention.

The CellID preferably supports queries for CDMA, GSM and WiFi network types. CDMA utilizes SID, NID, CellID and signal strength network resources; GSM utilizes MCC, MNC, LAC, CellID and signal strength network resources; and WiFi utilizes WiFi router MAC address and signal strength.

A single CellID-query sent from the terminal supports multiple network resource entries to increase precision of the returned answer. Resources within a single entry may be of different types (such as WiFi and GSM) if necessary. In the disclosed embodiments, up to 5 resources can be specified.

The location returned from the CellID servlet to the terminal contains a radius-of-confidence describing a circle around the lat/lon position in which the terminal is located.

Exemplary elements that are configurable (through the standard configuration system) for the CellID servlet include: License key (used to authorize the servlet toward the web service); Web service host (which is the DNS name or IP address of the web server that does the translation); and Web server URI (which is the URI, or path within the web server, that the service resides in.)

In addition to normal events generated by the servlet framework, a specific event is generated for each successful transaction handled by the CellID servlet. In disclosed embodiments the event contains the following information: time stamp; device ID (e.g., MDN, MSISDN); the data sent to the web service; the returned lat/lon position; the returned radius-of-confidence; and the method (according to the web service) that the device's position was obtained through.

The CellID servlet is completely dependent on the authorized web service (e.g., Navizon web service) for its operation. Requirements placed on the servlet are constrained by functionality available from the web service.

The CellID capacity is limited by the web service (e.g., Navizon) capacity and/or SLA.

Multiple CellID servlets are deployed to scale to more clients. Since the CellID does not do anything but forward requests to the web service and generate event records, the servlet is unlikely to become a bottleneck before the web service (e.g., Navizon) reaches its limits.

Warnings are logged when one or more of the following conditions occur: The web service is unavailable; The web service did not reply with a "200 OK HTTP" response; Not all necessary TPS arguments were provided by the terminal; and/or Provided TPS arguments were out of range or incorrectly formatted.

To limit network bandwidth usage, the communication between a single servlet and the web service preferably does not exceed 512 bytes to the service and 512 bytes back from the service, including HTTP headers.

The devices that use the CellID servlet are able to access information about network resources available to the terminal. This access is provided through a client-side API.

As an exemplary call flow:
1. Terminal sets up data link to the mux;
2. Terminal sends CellID tps request;
3. Mux forwards request to CellID servlet;
4. CellID servlet repackages incoming TPS elements to a HTTP URL;
5. CellID servlet sends request to Navizon server;
6. CellID servlet repackages reply lat/lon/radius to a CellID tps reply;
7. CellID servlet sends reply to mux; and
8. Mux forwards reply to the handset.

Traffic Probes

Traffic Probes is/are a new navigation application v5.0 feature to collect near real time traffic speed information.

Figure 79:
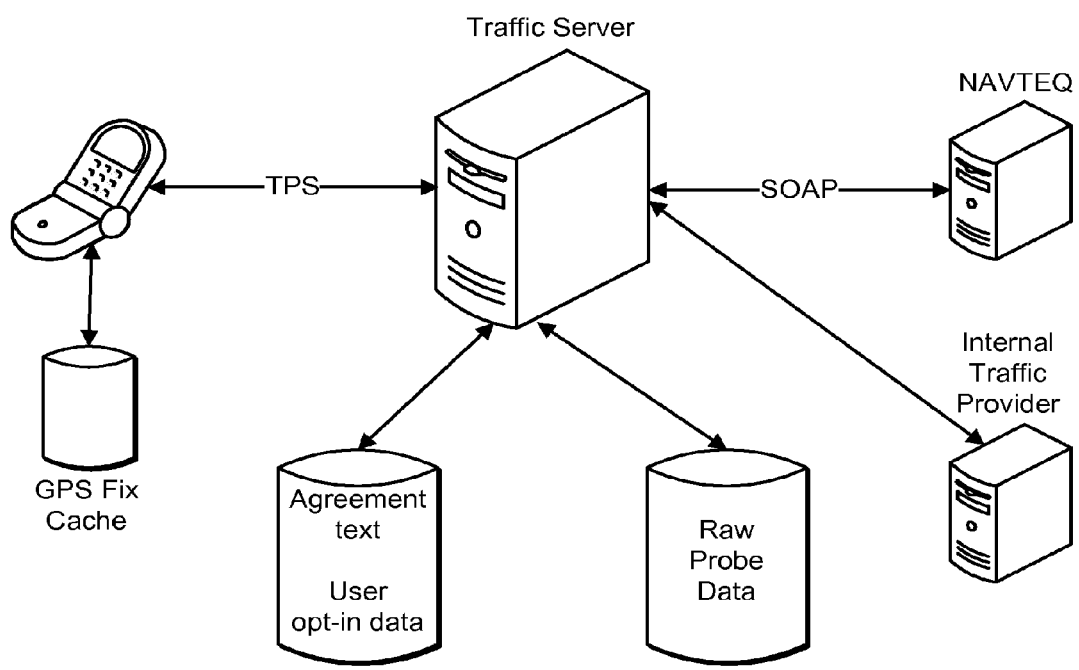
FIG. 79 shows an exemplary traffic probe network, in accordance with the principles of the present invention.

FIG. 79 shows an exemplary traffic probe network, in accordance with the principles of the present invention.

In particular, as shown in FIG. 79, accumulated traffic data is sent to a traffic server, which forwards the information to the traffic data provider. Ideally, the data is used to generate more accurate traffic speed information for freeways, and may provide information for roadways without dedicated speed sensors.

The system design of Traffic Probes includes modifications to the AtlasBook client, server and databases. A user accessible web site is not necessary for the system to function properly.

During a navigation session and while viewing a Follow Me Map, the client saves GPS fix information at set intervals and periodically transfers the accumulated data to the server. The server, in turn, transfers the information to the traffic data provider. All valid fixes are transmitted to the provider; no data filtering is done on the client or server.

Traffic Probes need not be tightly integrated with navigation. That is, the current speed need not be correlated with the speed limit or expected travel speed of the current routing segment to provide special functionality. The only correlation is that the probes from a single navigation or "follow me" session have the same navigation session ID to indicate that they belong to the same route. The only impact these probes have on navigation is that there is an additional, "out-of-band," upload to send the accumulated fix data to the server prior to the final maneuver announcement, reducing the chance that the application will end before transmitting cached data to the server.

Carriers are able to decide whether this feature is voluntary or mandatory. In either case, they are provided with the ability to require the user to acknowledge that their location and speed information may be anonymously sent to a third party for processing. If the feature is voluntary, users may opt-in or opt-out of Traffic Probes at any time by modifying preferences within the client. A carrier may also require that the user be allowed to review the terms of the Traffic Probes agreement within the client.

Traffic probes upload collected data to optimize usage of network resources.

User participation may be compulsory or voluntary.

Data is collected during navigation and Follow Me Map sessions. The data includes timestamp, latitude, longitude, speed and heading information. Collected data is uploaded automatically with no perceivable impact on the user. Data is sent to a traffic partner with no identifying information, to ensure privacy. Uploaded data may be stored for a given relevant period of time, e.g., for at least one month. Collection and upload frequency is preferably configurable by the server. Traffic probes do not impact user performance. Voluntary users may change participation at any time.

Traffic Probes participation may be either mandatory or voluntary on a per-build basis, thus each client build has a default participation. Participation in traffic probes is configured by client build based on product information such as carrier and product. Mandatory participation allows a notice, in the form of a EULA, MOTD or help text displayed to the user. Voluntary participation has a default value for each carrier/product combination, which is configured on the client. The client allows the user to change from the default participation during FTT (first time through) processing with a "confirmation MOTD" or "Feature EULA". The client considers the next invocation after the "Master Clear" function has been used as FTT. The client allows the user to change participation with a new option within a General Preferences menu. The client immediately deletes any collected data whenever the user opts out. The server retains any uploaded probe data if the user opts out. The client does not provide a new settings option for mandatory participation. The server stores the user participation setting in the server's user database. The user participation setting is synched with the client, and may be made available to sync with a companion web site.

With respect to configuration, a preferred default of 15 seconds collection sample rate is set (i.e., how often, preferably in seconds, to collect data.) A default of 900 seconds (15 minutes) is set for the transmission interval (i.e., the maximum time, in seconds, between data transfers to the server.) A default of 0 seconds is set for the maximum data age that accumulated data can reside on the handset before being deleted. (A value of 0 means that the data will never be deleted.) A maximum collected data byte count may be set (i.e., the maximum handset storage space that can be used for collected data.) A maximum collected data byte count is set in the admin fileset on a per-device type basis with a value deemed reasonable for the device. Devices with limited storage space have a smaller maximum. The client obtains the maximum collect byte count configuration value from the admin fileset, with the values determined on a carrier-by-carrier basis. The current configuration is requested the first time the client connects to the server.

Configuration values retrieved from the server include sample rate (Config-1), transmission interval (Config-2), maximum data age (Config-3) and maximum probe upload count (Config-18). Once retrieved from the server, these values become the new default value, even across client sessions. The client tries to retrieve the current configuration values at most once per client session. The client applies the configuration values from the server immediately. For example, if the max data age is decreased, the client immediately deletes data that is then considered stale.

In response to each probe data upload, the server sends the following settings to the client: sample rate (Config-1), transmission interval (Config-2), maximum data age (Config-3) and maximum probe upload count (Config-18). The client uses the collection sample rate and transmission interval from the server response for the remainder of the navigation/follow me map session, or until new values are received. If a navigation session is paused, it is considered to be ended for the purpose of traffic probes. If a navigation session is resumed, the session collection and upload configuration values are used until new values are received in an upload reply.

The client does not cache the collection sample rate and transmission interval from the server response. There is a separate "data density" interval for each traffic provider that defines the apparent collection interval for that vendor. The data density intervals have a common factor greater than 1. The client data collection interval is the greatest common factor of the data density intervals.

The client collects valid GPS fixes at set intervals during a navigation session, and during a Follow Me Map session. The client considers a GPS fix as valid if both the latitude and longitude values are marked as valid by the GPS subsystem, and represent a non-(0,0) location. The client does not collect fixes that are not valid. The client does not correlate fix information with navigation road segment information. The client stores the GPS timestamp, latitude, longitude, speed, heading and accuracy. These are the standard GPS fix values. The client does not store any other GPS information, or collected data in non-volatile storage. The client uploads collected data to the server whenever a message is already being sent to the server or when the maximum transmission interval is reached. The client uploads collected data to the server prior to the arrival maneuver announcement in a navigation session. The client uploads collected data when a navigation session is ended or paused. The client uploads collected data to the server when a Follow Me Map session is ended.

The client does not display a wait screen when uploading collected information. The client deletes all uploaded information when the server returns a success code.

The client packs the collected data before storing it on the handset. The client uploads all collected data to the server, and has a maximum number of probes that can be uploaded at one time. The client attempts to upload collected data three times at each interval, and has a maximum collected data bundle count. The client purges collected data prior to upload, if necessary. This might happen if the data was collected in a prior application session and now exceeds the max-data-age, or when the max-data-age value is reduced. If the maximum number of bytes stored is reached, the oldest probes are deleted as needed to make room for the new probes. Any probes with timestamps older than the maximum data age are deleted. out-of-date data is purged at least once per minute. The "Master Clear" function deletes all collected data from non-volatile storage. A unique identifier is assigned to each group of data probes from the same navigation or Follow Me session, e.g., the timestamp of the start of the navigation session.

The server stores all uploaded client data. A unique identifier is assigned to each group of data probes from the same navigation or Follow Me session, e.g., the session ID from the client in addition to the user string (not MDN). Each data bundle is stored with the unique identifier, the UTC upload time, and the initial GPS time from the bundle. The server stores uploaded probe data for at least 30 days, and may backup or archive saved probe data before purging. The server sends probe data to the traffic partner as required, and unpacks the probe data received from the client. The server formats the data as required and transfers it to the traffic partners (such as NAVTEQ, NIM Traffic Team, etc.) The server doesn't send identifying information such as the MDN to the traffic partner.

The server also stores a Traffic Probes user agreement, and enables a user to agree or decline the terms of the agreement. The server sends the agreement and key text to the user in the form of a MOTD requiring confirmation, and stores the result of the client confirmation in a database.

Because the client sends the collected data whenever other messages are being sent to the server, it is possible that the server will send data to the NAVTEQ service more often than every 15 minutes for a given handset. No more than 1000 probes are sent per message, and messages are not sent more frequently than every 10 seconds.

The server is capable of handling near 100% participation rate probe data, thus for all navigation sessions. As an example sizing, presume a peak hour of 137,377 navigation sessions. The average navigation session lasts at least 20 minutes, which translates to 80 probes sent in 2 queries. Thus, the system is sized to support 77 TPS for probe queries with the expectation of about 3000 probes per second. Further sizing for growth out, e.g., 6 months, the system would be sized to support 115 TPS and 4500 probes per second.

Each probe is packed on the client into 12 bytes. Ignoring the relatively small headers and other settings, the system handles sending 53 KB of probe data OTA each second.

The server uses an event monitoring database to record queries received from the client as well as information sent to third parties. This information may be used to generate monthly or other reports.

In the given embodiments and exemplary sizing, the system expects 53 KB per second of GPS probe data to be send OTA from the client to server. The NAVTEQ SOAP request is approximately 550 bytes per GPS fix, so the connection between the traffic server and the NAVTEQ web service expects 2.4 MB per second.

Preferably client preferences for traffic probes are fully localized. The server is able to store localized agreements and button text, in UTF-8 encoding, to be retrieved by the client language specified in an "ident" packet.

The Traffic Probes user preferences use a Profile servlet, and the data itself is sent as a new analytics event.

Figure 80:
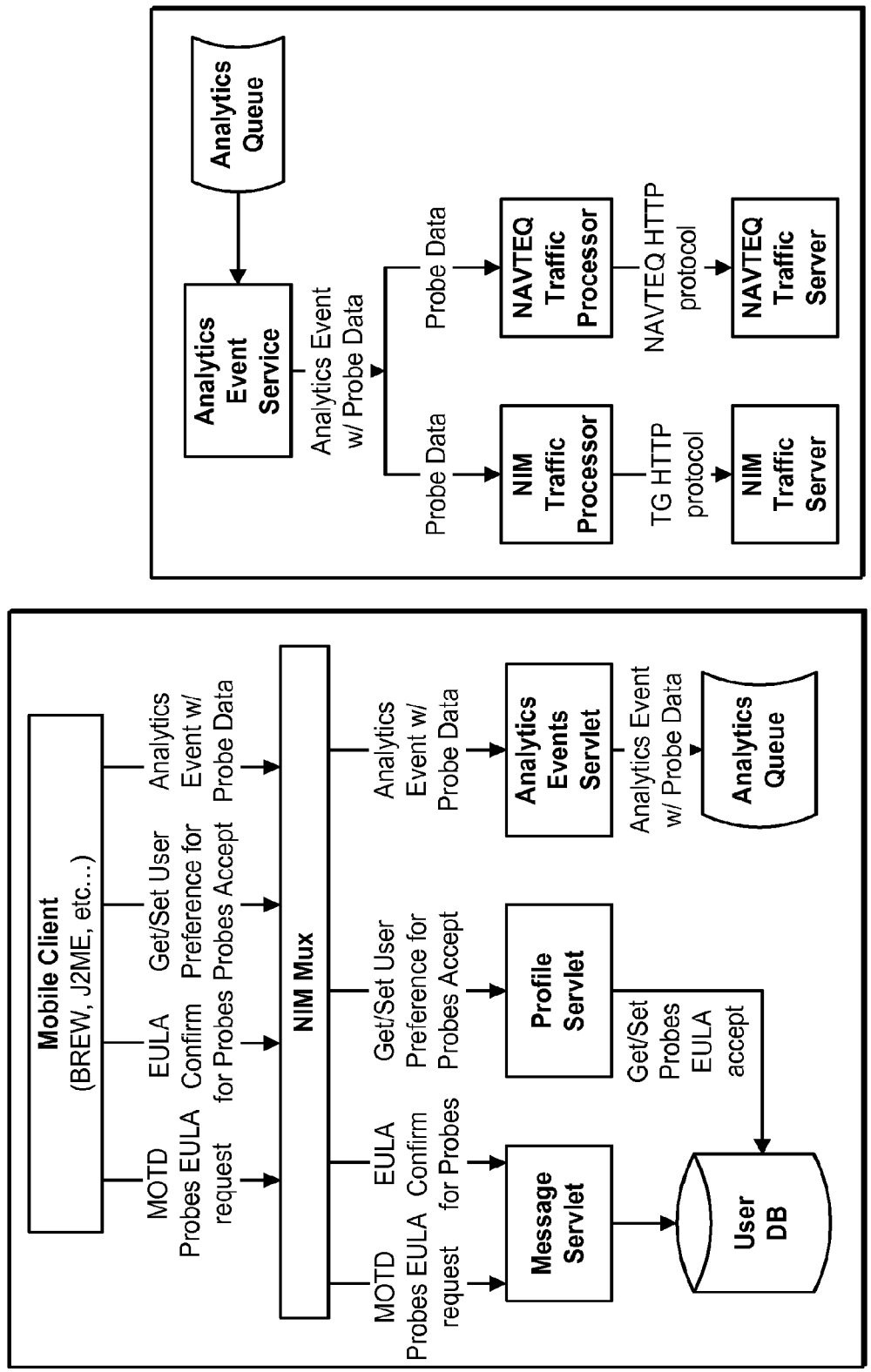
FIG. 80 shows traffic probe and related components, in accordance with the principles of the present invention.

FIG. 80 shows traffic probe and related components, in accordance with the principles of the present invention.

One goal of Traffic Probe services include the ability to determine the severity of stop and go traffic. Because fix data is collected at "long" intervals, it is possible for each fix to have a non-zero speed, even when much of the interval is spent at a dead stop. Inferences about traffic flow are made by comparing the speed and relative positions of successive fixes. It is possible that the collection interval may vary.

Figure 81:
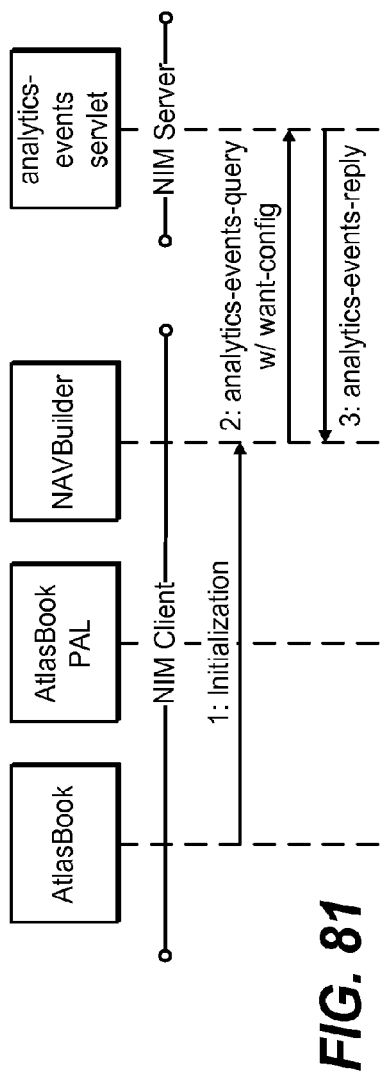
FIG. 81 shows exemplary call flows when the application starts up and requests initial settings from the server, in accordance with the principles of the present invention.

FIG. 81 shows exemplary call flows when the application starts up and requests initial settings from the server, in accordance with the principles of the present invention.

In particular, as shown in step 1 of FIG. 81 showing initialization, the application starts up.

In step 2 showing analytics-events-query with want-config, configuration information is requested from analytics-events servlet without sending any events.

In step 3 showing analytics-events-reply, configuration settings are returned.

Figure 82:
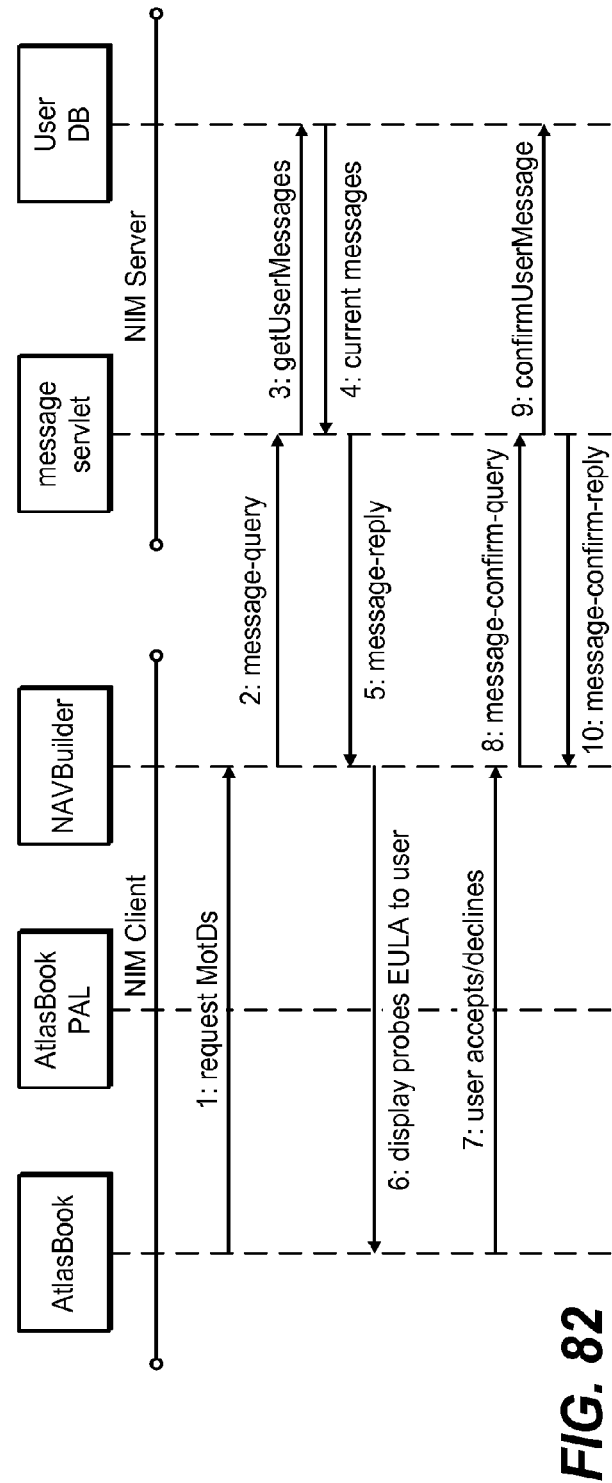
FIG. 82 shows exemplary call flow when the client requests MOTDs, and probes the EULA for collecting probe data, in accordance with the principles of the present invention.

FIG. 82 shows exemplary call flow when the client requests MOTDs, and probes the EULA for collecting probe data, in accordance with the principles of the present invention. The user's response is stored in the same way as other EULA responses.

In particular, step 1 of FIG. 82 shows a request for messages of the day (MOTD.)

In step 2 showing message-query, the client requests messages-of-the-day (MOTDs).

In step 3 showing getUserMessages, messages are requested from the database.

In step 4 showing current messages, current MOTDs are returned from the database.

In step 5 showing message-reply, the messages are returned to the client.

In step 6, a Probes EULA message is displayed to the user.

In step 7, a user accepts/declines Probes EULA.

In step 8 showing message-confirm-query, the user's response is sent to the server for storage.

In step 9 showing confirmUserMessage, the user's response is saved into the UserDB.

In step 10 showing message-confirm-reply, confirmation is sent that the setting has been stored.

Figure 83:
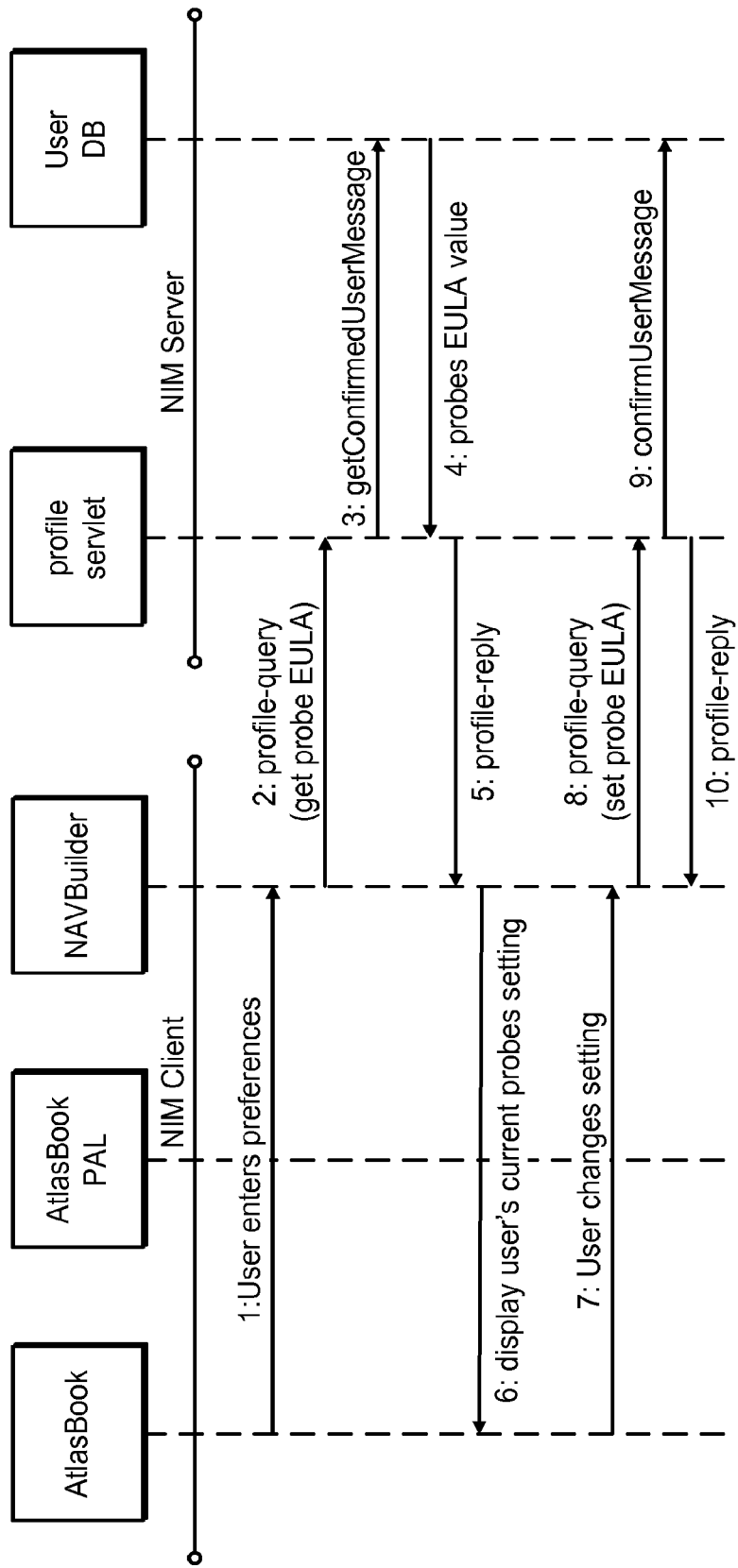
FIG. 83 shows exemplary call flows relevant to the use of User Preferences to change the accept/decline status of the Probes EULA, in accordance with the principles of the present invention.

FIG. 83 shows exemplary call flows relevant to the use of User Preferences to change the accept/decline status of the Probes EULA, in accordance with the principles of the present invention.

In particular, in step 1 of FIG. 83 the user enters the preferences screen.

In step 2 showing profile-query, the client requests the current value of the Probes EULA for the user.

In step 3 showing getConfirmedUserMessage, the value is requested from the UserDB.

In step 4 showing Probes EULA value, the value is returned.

In step 5 showing profile-reply, the value is returned to the client.

In step 6, the current setting is displayed to the user.

In step 7, the user accepts/declines Probes EULA.

In step 8 showing profile-query, the user's response is sent to the server for storage.

In step 9 showing confirmUserMessage, the user's response is saved into the UserDB.

In step 10 showing profile-reply, confirmation is made that the setting has been stored.

Figure 84:
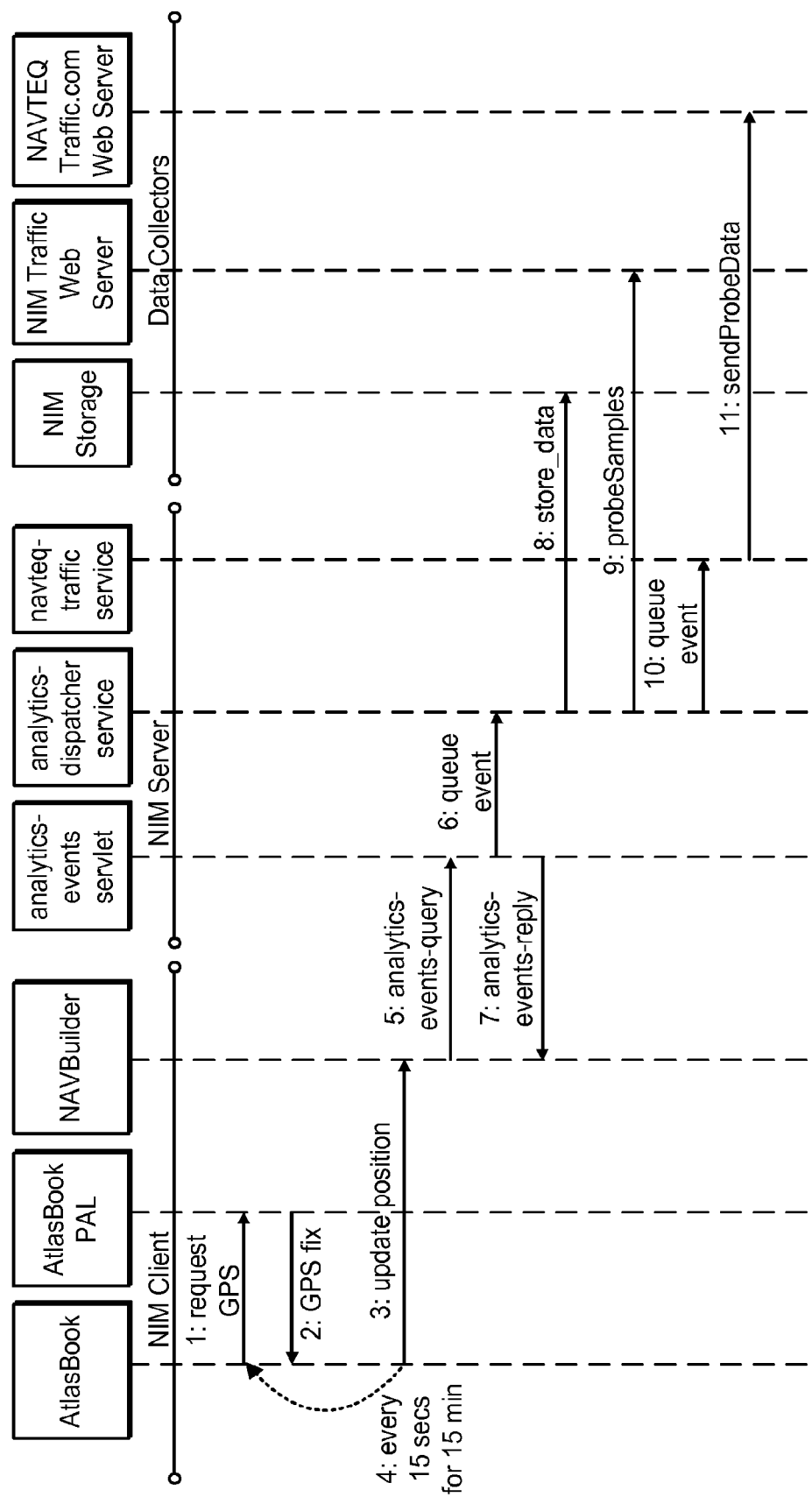
FIG. 84 shows exemplary call flows relevant to GPS probe data collected by the client which periodically sends it to the server for distribution to the various data collectors.

FIG. 84 shows exemplary call flows relevant to GPS probe data collected by the client which periodically sends it to the server for distribution to the various data collectors.

In particular, step 1 of FIG. 84 shows a request for a GPS fix.

Step 2 shows a GPS fix.

Step 3 shows an update position.

In step 4 showing Every 15 sec for 15 min, GPS fixes are continued to be gathered. The actual times will vary depending on the sample rate and transmission interval settings.

In step 5 showing analytics-events-query, the collection of GPS fixes are sent to the server in a gps-probes-event.

In step 6 showing queue event, gps-probes-event data is added on to the queue for the analytics-dispatcher service.

In step 7 showing analytics-events-reply, a response is sent to the client including the current sample rate.

In step 8 showing store_data, the service stores the data local to the service provider.

In step 9 showing probeSamples, the service sends the GPS fixes to the traffic server.

In step 10 showing queue event, the analytics-dispatcher service queues the gps data for the navteq-traffic service. This second service throttles the data flow for the NAVTEQ web server.

In step 11 showing sendProbeData, the GPS fixes are sent to the Navteq traffic server.

In the user preferences, the user may change whether they accept GPS Probes being sent. The client queries the server to confirm that the value has not been changed via the web (for when the web access is implemented). If the user changes the setting, the client sends the new setting to the server for storage. TPS protocol is the existing profile TPS protocol with a new setting, probes-EULA, added.

A message/message confirm—Probe EULA component sends the Probes EULA to the client, and stores the user's response in the database.

Carousel

The carousel feature of the personal wireless navigation system discloses display of real time content in a carousel section of the heads-up display for ABN v5.

The carousel provides useful information about popular content that users regularly query. This proactive nature of the carousel and heads up display makes ABN v5 more 'sticky' to users who might otherwise churn, as they might not invest time to learn how the same information could be ascertained by clicking through menus and options.

The carousel in ABN v5 lists various content, which rotates in the carousel in a circular fashion, including: local weather, local gas prices, local movies, product tips, and local events. Additional information to display in the carousel includes commuter traffic alerts, local traffic alerts & advisories, next meeting alert (time & place), flight status, partner defined events, and coupons from advertisers.

Figure 85:
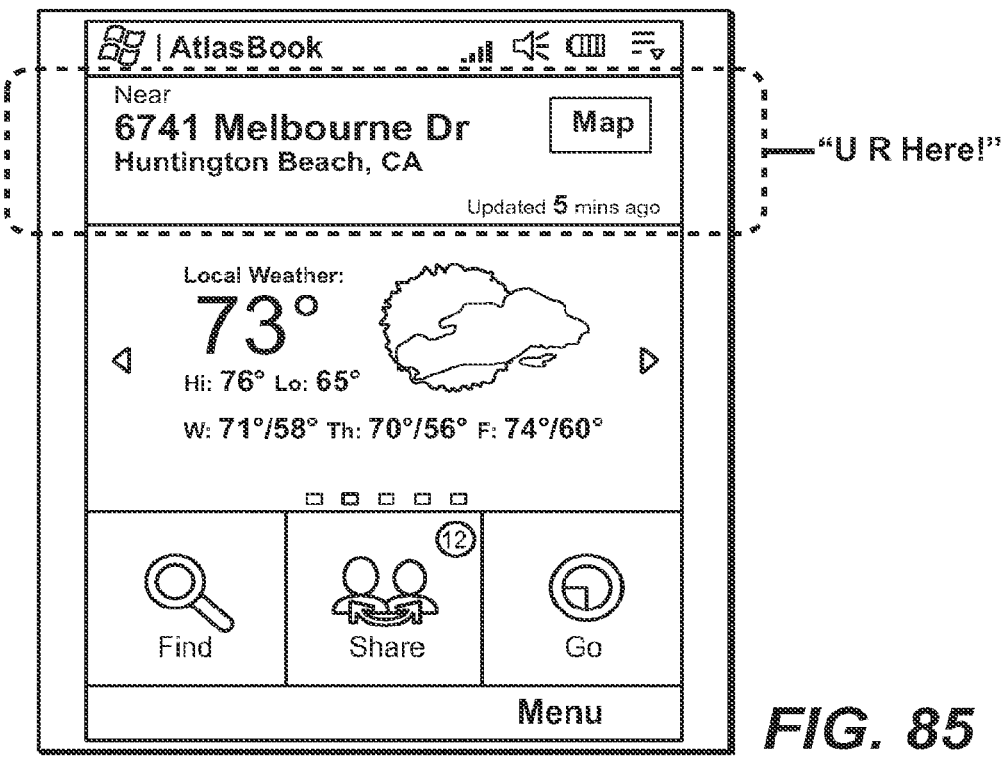
FIG. 85 shows an exemplary "U R Here!" area of a Heads-Up display, in accordance with the principles of the present invention.

FIG. 85 shows an exemplary "U R Here!" area of a Heads-Up display, in accordance with the principles of the present invention.

In particular, as shown in FIG. 85, the "U R Here!" area of the Heads-Up display informs a person of his/her current location, by reverse geo-coding their location to at least a pair of 'City, State', etc. The accuracy and type of service is used to decide whether to show "Street, City, State, Zip code" string, or just "City, State". Since the location may be acquired using other services besides GPS which are less accurate, there is no need to include a street name or number associated with the reverse geo-coded location. Plus if the person is using the product in a dense metropolitan area, the urban canyon effect impacts the reported latitude and longitude by the GPS signal. Country need not be shown unless it changes from the previous time displayed.

A 'Map' button allows the user to switch from Heads-Up display to 'Map' mode. An 'Update' button allows the user to manually request updated content for the entire Heads-up display. Next to the button there is a small indicator that displays the last time the content was updated. The bottom left of the "U R Here!" displays the text 'Roaming' every time the application is in data roaming mode. This let's the user decide whether they want to press the 'Update' button or not.

Figure 86:
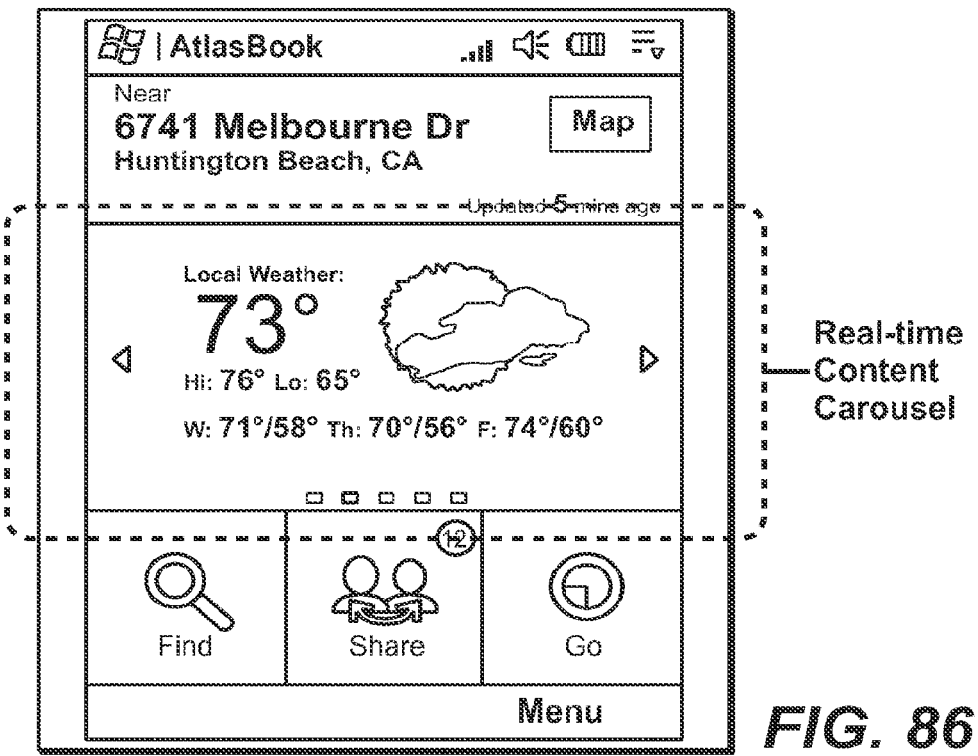
FIG. 86 shows an exemplary "Real-time Content Carousel" area of a Heads-Up display, in accordance with the principles of the present invention.

FIG. 86 shows an exemplary "Real-time Content Carousel" area of a Heads-Up display, in accordance with the principles of the present invention.

In particular, as shown in FIG. 86, the "Real-time Content Carousel" area of the Heads-Up display provides each person with location real time location relevant contents around his/her current area. The Carousel displays different real time local contents. Each content screen displays for a period of 5 seconds. Preferably this display period is configurable (though preferably not by the user).

There are exceptions for when the Carousel is not displayed as part of the Heads-Up display, where only 'U R here!' and Command buttons are displayed. For instance, the Carousel may not be displayed on devices with very small screen size. Also, for devices with orientation support (landscape and portrait modes), if the carousel cannot be displayed in landscape mode, it is not displayed in the portrait mode either.

Figure 87:
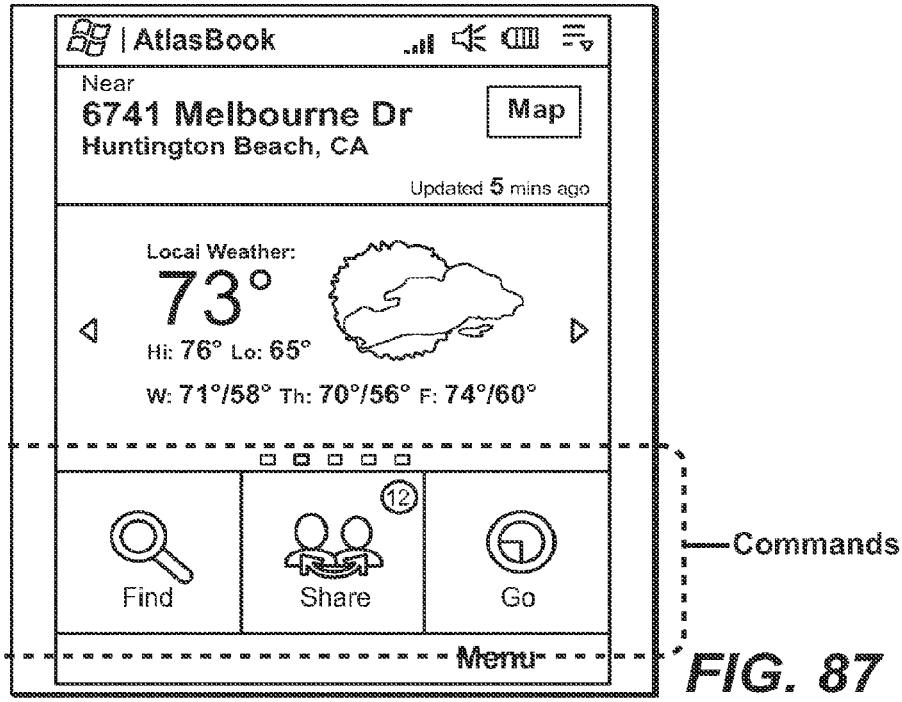
FIG. 87 shows an exemplary "Commands" area of a Heads-Up display, in accordance with the principles of the present invention.

FIG. 87 shows an exemplary "Commands" area of a Heads-Up display, in accordance with the principles of the present invention.

In particular, as shown in FIG. 87,

The "Commands" area of the Heads-Up display comprises three starting places for the user who needs to use the application to Find a POI, movie, or event; Share an existing place, or Go to a new or existing destination.

The graphics for the "Command" buttons are intuitive, i.e. can stand alone without text pairing, to accommodate the situation where some translated text would not otherwise fit properly inside the button.

Figure 88:
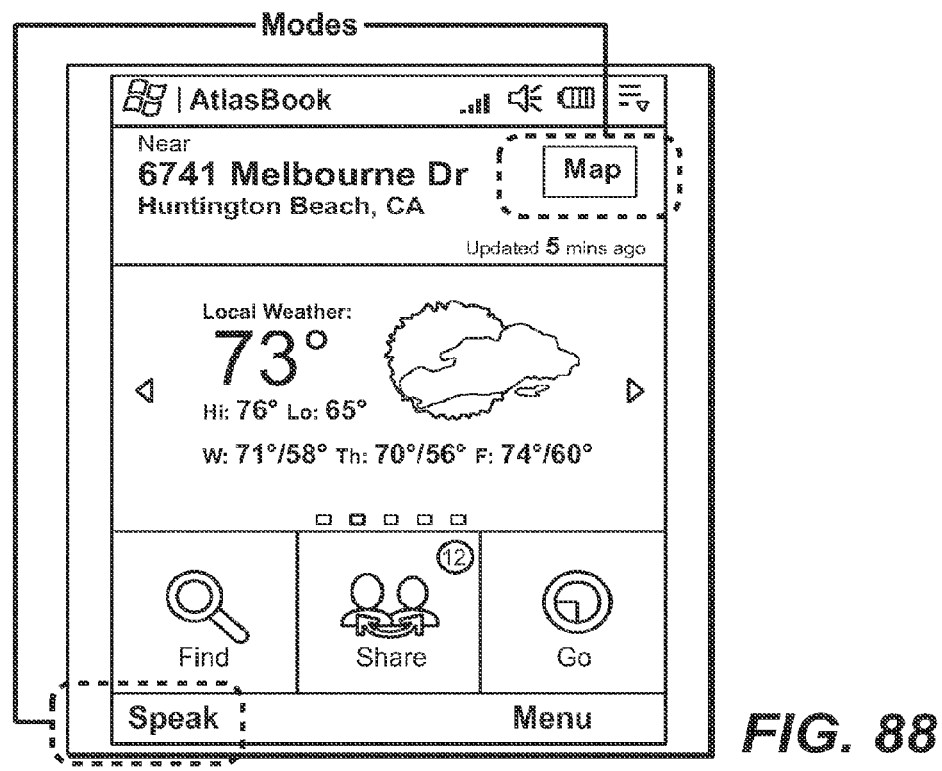
FIG. 88 shows exemplary alternative display modes, in accordance with the principles of the present invention.

FIG. 88 shows exemplary alternative display modes, in accordance with the principles of the present invention.

In particular, as shown in FIG. 88, in the Heads-Up display of ABN v5, 'Map' and 'Speak' are presented as alternative display modes and not 'Commands'.

Each screen displays real time content once a location has been acquired. Rules for when and how (frequency) the 'location' is updated (background) and the respective location related contents and elements are refreshed (foreground) are as follows:

While ABN v5 is obtaining an updated location fix, it continues showing the most recent content for the most recent location fix. This includes when the device is roaming, and when the data network coverage has been lost. It also includes a distinct 'location' indicator on the Heads-Up display to notify the user if 'location' cannot be acquired.

If ABN v5 is unable to find real time information for each content, the carousel skips that specific content screen, until real time data has been downloaded and processed for display. The carousel does not display any content screen with blanks.

For the initial start of the application when four default content screens are displayed, but the data to display weather, gas prices, and movies has not yet been downloaded, the 'Tip' screen is the first content screen displayed to the user, and the content screens for each of the other 3 default screens display a general 'downloading information' message.

All content in different areas of the Heads-up display are properly localized, based on what each user selected in the regional settings. If the user returns to the Heads-up display from another mode, or after finishing with a route or search, the Carousel displays the weather content screen.

ABN v5 updates the location in the background and Heads-Up display refreshes the location related contents in the foreground. If ABN v5 is idle in the Heads-up display mode, Map Mode, or ASR Mode, or any other part of the application (e.g., recent searches menu, POI category list) such that no LBS requests have been sent to the server, then ABN v5 requests location every 20 minutes. This applies to both cases where ABN v5 is running in the foreground or background, as these are common cases in the smart phones.

If the newly acquired location is more than 5 miles apart from the most recent location, then ABN v5 obtains updated content and elements, the location of the 'U R Here!' is refreshed instantly on the Heads-Up display. Also, all the content in the carousel is updated—the current content screen in the carousel can be refreshed after the next cycle.

If the user returns to the Heads-up display after a number of functions, the content of the Heads Up display is refreshed. These functions include returning from a Navigation session, or from a Follow Me Map session. Also if the user put ABN v5 in the background (idle) to read email, or play music, and then brought it back to the foreground. Also if the Heads-Up display comes back to the foreground, after the user finishes a phone call.

Preferably local weather, local gas prices, local movies, and product tips are displayed as default content in a Carousel. The Carousel setup screen is configurable, and thus some implementations of the wireless navigation device may exclude certain content from the Carousel. For example, no support for Events is available in Austria.

Similarly, the default set is configurable as well.

The content for the Carousel and the list in the Carousel setup screen is upgradable via a file set update. In this way a distinct version of ABN v5 may be deployed in a given market without certain content displayed in the Carousel, e.g., without Gas Prices as a selectable content.

Each user can go to the 'Carousel setup screen' via 'Preferences', and select a different list of content to rotate in the Carousel. Whatever the user selects is 'sticky'.

Figures 89, 90:
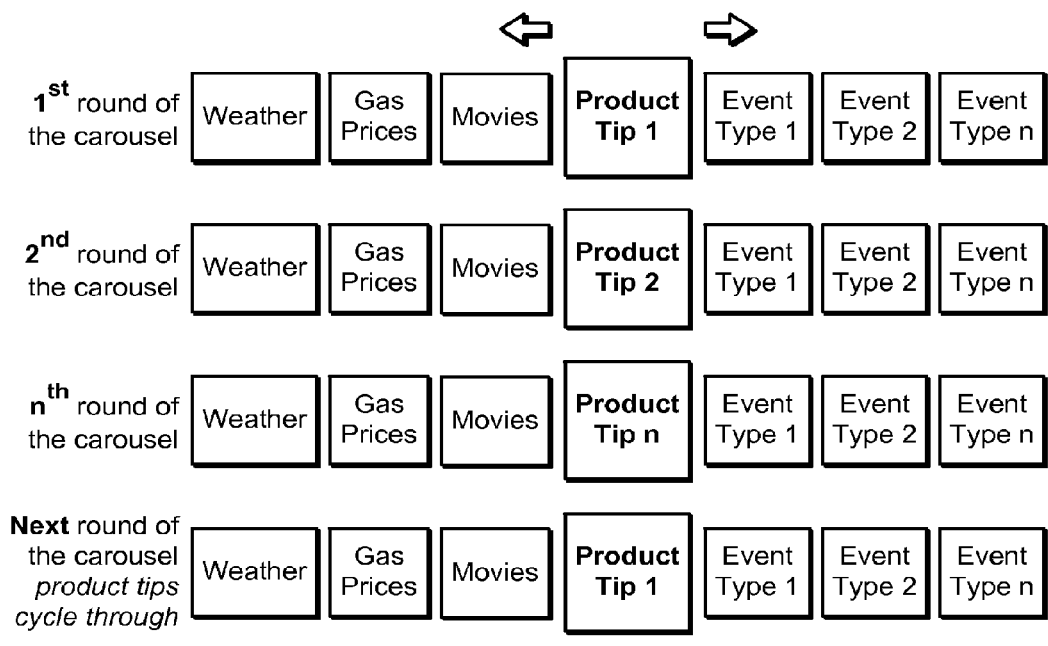
FIG. 89 shows an exemplary Carousel setup screen, in accordance with the principles of the present invention.
FIG. 90 shows a carousel display sequence, in accordance with the principles of the present invention.

FIG. 89 shows an exemplary Carousel setup screen, in accordance with the principles of the present invention.

In particular, as shown in the exemplary embodiment of FIG. 89, 'Local Weather' is the only content that is always displayed, and the user cannot deselect it. This assures that there is always real time content in the carousel. If 'Local Weather' is the only content, and the user has explicitly deselected all other content from being displayed, then the left and right arrows are not displayed, when 'Local Weather' is displayed, meaning the carousel does not spin.

If a user selects a content screen by touching it (or pressing CSK/OK on non-touch devices), the personal wireless navigation system proceeds to a landing area off the relevant content screen. For instance:

'Weather Content Screen'→'Weather Search Results'
'Gas Prices Content Screen'→'POI Search Results'
'Local Movies Content Screen'→'Now Playing Results'
Local Events—→'Events Near Me Results'

Product Tip Screens are not selectable or clickable. In the exemplary embodiments there is no landing area for this content type.

There is a set display time per screen for each content type. After that, the screen displays the next content screen in the Carousel. The display time per content type is an adjustable value and configurable. This time value is preferably not adjustable by the end user.

The content screen for 'Local Weather' displays current temperature, high and low temperatures for the current day, a graphical representation of current conditions, and high and low temperatures for the next 3 days. The default unit of measure is set per brand of the personal wireless navigation system, and can be changed from Fahrenheit to Celsius and vice versa, via the regional settings under 'Preferences'. If a user clicks on the weather content screen (or by pressing CSK/OK on non-touch devices), the personal wireless navigation system displays the 'Weather Search Results Screen'. This content is properly localized when a user selects a suitable regional setting.

If the user returns to the Heads-Up display from another mode (Map mode or ASR mode), or after finishing with a route or search, the Carousel displays the weather content screen.

The personal wireless navigation system displays local weather information of the most recent location in the Carousel (foreground), until the location has been updated in the background and updated data acquired from the server.

The content screen for 'Local Gas Prices' displays: Average local price of regular unleaded gasoline; gas station with the lowest price for regular unleaded gasoline; and the closest gas station where the lowest price for regular gas is available. For example:

| | |
|---|---|
| Average: | $2.49 |
| Lowest: | $2.39 |
| Shell 1.5 mi | $2.59 |

If the closest gas station and the gas station with the lowest price are the same station, it is listed twice, once under 'Lowest', and also under 'Closest'. If a user clicks on the gas station content screen (or presses CSK/OK on non-touch devices), the personal wireless navigation system displays a 'Search Results Screen'. This content is properly localized, when users select different regional settings. For this content, the display of distance matches the regional settings. The personal wireless navigation system displays local gas prices and stations around the most recent location in the Carousel (foreground), until the location is updated in the background and updated data acquired from the server.

The content screen for 'Local Movies' lists the three most popular movies in the local area. This is the same rule that is used for displaying a list of movies when a user selects 'Now Playing'.

For some tiers with large screens, the list may include up to 5 movies that are 'Now Playing'.

| Now Playing | | |
|---|---|---|
| <Title 1> | MPAA | star rating |
| <Title 2> | MPAA | star rating |
| <Title 3> | MPAA | star rating |

Preferably each movie listing includes the rating, if available.

If a user clicks on the local movie content screen (or presses CSK/OK on non-touch devices), the personal wireless navigation system displays the 'Search Results Screen'. The local movies around the most recent location are displayed in the Carousel (foreground), until the location is updated in the background and updated data is acquired from the server.

The content screen for 'Product Tips' displays quick tips on how to use certain functions of the personal wireless navigation system, including the ability to setup and modify the contents of the Carousel. Preferably there is a finite set of product quick tips, with the ability to update this finite set periodically, e.g., via a file set update per released branded versions of the personal wireless navigation system.

The description text within each tip fits inside the content screen of the Carousel such that no scrolling up and down is required. Once the first product tip is displayed in the Carousel, it is not displayed again until all the other product tips in the set have been displayed. After that the sequence shall resume, as illustrated in FIG. 90.

The content screen for each 'Local Event Type' displays the three closest event types starting with the current day. The format for displaying the each event is as follows:

| <Event TYPE 1> | |
|---|---|
| <Event name 1> | <d d> mi |
| <Event name 2> | <d d> mi |
| <Event name 3> | <d d> mi |

The syntax for displaying <next day> is the first three letters of the day of the week. If there are more than three events of the same type in the current day, the personal wireless navigation system lists the three whose venue are the closest. If there is only one listing in the current day for that event type, additional events of the same type that will occur in the next two days are listed. If an event listing is shown at multiple times on the same day, it will be listed up to three times, unless there are other event listings of the same type in that day. This content is properly localized when users select different regional settings. If an event listing is shown for multiple days (including the current day) it will be listed up to three times, if there are no other events of that type occurring sooner.

If a user clicks on the gas station content screen (or presses on CSK/OK on non-touch devices), the 'Search Results Screen' is displayed. This content is properly localized, as indicated by the user's configured different regional settings. For this content, the display of the show dates and times matches the regional settings.

The local events around the most recent location in the Carousel (foreground) are displayed until the location is updated in the background and updated data is acquired from the server.

Content types such as alerts require a user to define and setup the criteria that the Carousel uses to display the content. When the user goes to the screen to select such content types, the personal wireless navigation system leads them to (▸) the screen to define or modify the criteria. In addition, the Carousel setup screen provides the ability for users to define the time window for when the Carousel displays certain contents in the Carousel. For example, for movies and events, the user is able to drill down (▸) and select "Show on Weeknights and Weekends Only" or "Always Show".

FIG. 91 shows an exemplary Carousel Setup Screen enabling users to add additional content in the Carousel, in accordance with the principles of the present invention.

The content screen for Commuter Traffic Alerts displays all traffic alerts along the user's commute route. The personal wireless navigation system provides a set up screen to define the commute route and the window of time when the user wishes to know about the alert. The 'Commuter Traffic Alert' content screen is only displayed in the relevant time window (which is set up by the user including the days of the week that the user cares to know about the traffic around the commute.) The 'Commuter Traffic Alert' content screen can be set up for one location, most typically the user's 'Home' area. When the user is traveling outside the Home area, this content is not displayed in the Carousel.

The content screen for Local Traffic Alerts & Advisories displays local traffic reports for incidents and congestion. This is similar to display of local traffic incidents and congestions near the user's current location. The Carousel lists the three closest incident/congestions reports regardless of severity.

FIG. 92 illustrates an exemplary model for displaying this content type, which is properly localized in accordance with the user's regional settings.

The local traffic displays around the most recent location in the Carousel (foreground), until the location is updated in the background and updated data is acquired from the server.

If there are no traffic incident reports available in the local area, this content screen is not displayed (no screen with blank rows).

If a user clicks on the traffic alerts content screen (or presses on the CSK/OK on non-touch devices), the 'Map Traffic Incidents' is displayed.

FIG. 93 shows an exemplary content screen displaying the name and location of the upcoming Next Meeting Alert (Time & Place) event that is on the user's calendar, such that the user can invoke an LBS action such as 'Go', 'Find', 'Share', or 'Map'.

The personal wireless navigation system provides a set up screen for the user to import calendar events such as a meeting that have location, from the device's Calendar to the navigation application. Calendar content is properly localized when a user selects the relevant regional settings.

The content screen displays the status of a flight (Flight Status) that the user has set up to be tracked in the personal wireless navigation system. To display the Flight Status, a set up screen is provided for the user to import flight information either manually, or via another service. Flight Status is properly localized when a user selects the relevant regional setting(s).

The content screen displays partner defined upcoming events that are sponsored by, or on behalf of, a Business partner (e.g., Verizon, US cellular, etc.) Upcoming partner defined events are properly localized when a user selects the relevant regional setting(s).

The content screen may also display Coupons from Advertisers. In particular, the content screen displays a coupon advertisement from local advertisers, or advertisers having a nearby POI to the current location of the personal wireless navigation system.

Poi Customization

A POI customization capability is provided for VZ Navigator V5. In accordance with this aspect of the invention, custom POIs are maintained on the client side, not on a NIM server. This puts the onus of keeping user lists with the organizations themselves.

There are three elements to the solution:

Defining/maintaining an "enterprise" capability for business users;

Client handset code that accepts a new type of place message, stores and uses them; and Providing the information when a query is received.

For some time a market need has existed to support custom POIs. Custom POIs enable some users to easily select businesses and other locations that, in general, are not as easily accessible to others. In some instances, custom POIs may refer to location names that are not available at all through other services. This has been challenging because of several specific issues, described below. The challenge is to provide POIs only to those entitled to or with an expressed interest in specific POIs.

VX Navigator v5 provides an enterprise administrator with the ability to provision an enterprise user MDN list to access the enterprise POIs. The ability to manage (i.e., add/update/delete) enterprise specific POIs for enterprise employees usage is also provided, as is the ability to perform local search on POIs that are specific to the enterprise. Local search on enterprise related POIs from VZ Navigator V5.0 Website & application are enabled to enterprise users whose MDNs have been provisioned on the enterprise MDN list.

The challenge of managing custom POIs for enterprise or special interest group use involves four specific requirements: ensuring location "validity"; defining a way to collect new POI information quickly and automatically from third parties; An ability to present specific POIs and to handle conflicting information from different databases with similar, sometimes overlapping information—Example: Gas stations from NAVTEQ, and gas stations from OPIS; and Presenting custom POIs only to users who are entitled to them, or alternatively, have expressed interest in seeing additional POIs.

The present invention ensures that a location is "valid";

manages the various POIs that each application user is entitled to view; and provides a way to alert a defined user that a custom POI option is available. Custom POIs are presented only to users who are either entitled to see them (enterprise POIs), or those with a specific interest using a solution that is client-based, not centrally managed on a NIM-hosted service.

The following sections describe how a service offering these capabilities works, which investigate each of four challenges: Managing custom POI locations; Resolving POI conflicts; Managing custom POI users; and User flexibility for handling custom POIs.

As noted earlier, challenges in this area include defining an "enterprise" partner, and accommodating changes to the listed locations.

At a minimum, several items are provided to an "enterprise" customer, who in turn must ensure adherence to some standards.

A new enterprise partner must permit submission validation, ensuring that field definitions agree with content; and address "validation".

Requirements for supporting updates to the enterprise location list are based on the "volatility" of the list. Most lists are unlikely to change for many weeks/months. This relates to business locations, while others may have many locations and are hence likely to be updated more frequently. Within the invention it is also possible for the list to change on a minute by minute basis—An example is a list of locations that require a site visit (route based on deliveries, requests for pick-up).

Preferably enterprise administrators define categories of locations. Establishment of a service requires a service "template" that includes the "Enterprise ID", core field, and location information.

The "Enterprise ID" preferably includes: The name of the "enterprise"; and the number and names of sub-category fields that the enterprise commits to support.

Core field options include:

Enterprise ID (assigned automatically with acceptance of enterprise)

Enterprise name (Required)—This is the level 1 (top level name) presented for the user to select—(This is the default if no level 2) Location types (Optional Level 2)—Must agree with definition set.

Location Information includes:

Location name (Optional) (Example "Central States Office")

Street address 1 (Required)
Street address 2 (Optional)
City (Required)
State/province (Required)
Postal/zip code (Required)
Country (Optional)
Phone number (Optional)
Lat/Lon (Optional)

The absence of a country code causes the system to default to local country.

The preferred periodicities of which when new information is supplied include: once a day; once a week (preferred); once a month; Annual; and once.

Location list submission supports list updates as frequently as once a day though initially weekly system updates are suitable. The initial requirement is for one update/week, which may be combined with any other updates. Complete list replacement is acceptable as the ONLY model for list updates initially. An option to add a new address incrementally is preferred. Not required is the option to delete an existing address except through complete list replacement.

The geo-code of each address is supplied through a defined update process. A response is provided to the originator listing the original address, and providing any information available on the failure (e.g., "invalid street address"). Suitable error messages are provided for likely/possible issues detected in the process (feed issues, etc.)

The requirement is based on defining "valid" locations. Validity in this case means that an address can be geo-coded. It does not mean that the location is "correct".

Additional explanation of location types: The category listings supports one "category" or "sub-category" per location: "Company" (default, Category A); or "Sub-categories" (example: "Sales Offices", Category B).

It is possible to define the same location multiple times to support multiple category listings. (In the following examples, the first field has "level" (Category A is "all locations"), the second is the name of the office, the third, is the first line of a street address, the fourth could be a suite # (address line 2), etc.

An example with no location name:
"A, 123 Main Street, Dayton, Ohio, 43210, 513-640-4120"
"B, 123 Main Street, Dayton, Ohio, 43210, 513-640-4000"

An example with named locations:
"B, Southern Ohio Region, 123 Main Street, Dayton, Ohio, 43210, 513-640-4120"
"A, District Sales Office, 123 Main Street, Dayton, Ohio, 43210, 513-640-4000"

An administrator is permitted to change the "my company" definition, but preferably only in areas that do not impact client side functionality (enterprise name, sub-category names). For example, a sales office might have a different name.

Moreover, some changes cannot be made without changing the place message definition. These require updates to the definition of what can be searched (on the mobile). Examples of changes that cannot be "incremental": adding a new "sub-category" (example—"distribution centers"); or changing the company name.

A user notification service, as part of an enterprise program, provides a new category of place messaging, referred to as "Custom POI Place Message" that provides the following capabilities:

A web interface enables the designated enterprise administrator to send the Custom POI Place Message to one or multiple MDNs. The interface is protected by an ID/password that must be unique for each enterprise.

Two "options" are available through the interface for the Custom POI message: Establish/Update Custom POI categories—New "Custom POI" message to establish custom category and any required sub-categories (DEFAULT); and a Remove Custom POI option to delete a category and any sub-categories. Each of the categories relies on an "invisible ID" to ensure that the right POIs are impacted. The ID is managed by the manufacturer when the account is created, and preferably remains with the account.

The Custom POI Place Message is created by the enterprise administrator, and is maintained on a manufacturer server. The Custom POI Place Message is accessible from a web-based interface. The Custom POI Place Message preferably includes, at a minimum: Enterprise ID (not displayed); Enterprise display name; Enterprise category(ies) (as needed); Purpose; and accompanying message, which may be limited. The enterprise ID is essential to ensure the user's ability to reference the appropriate location list.

Figure 94A:
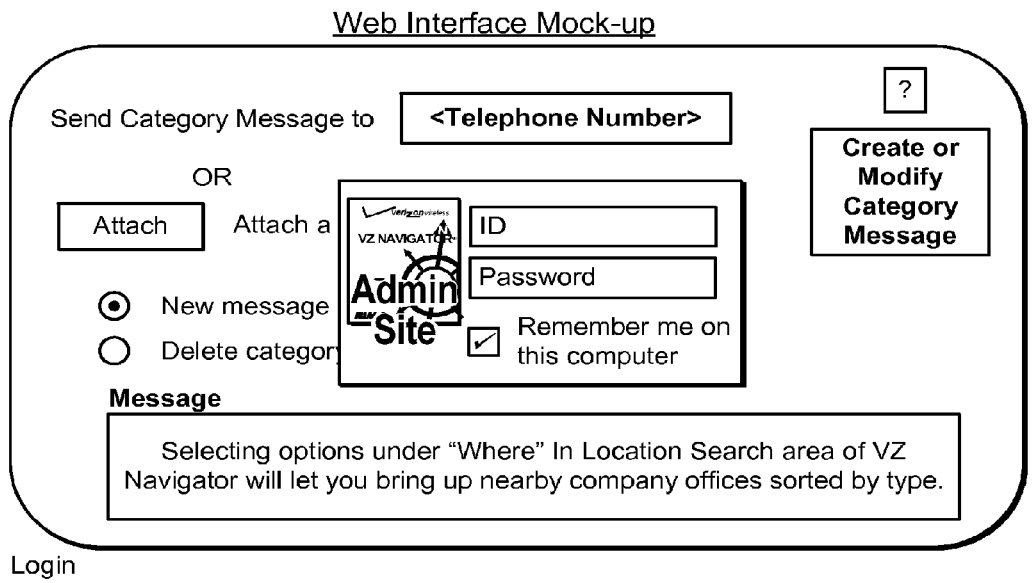
FIGS. 94A-94C show an exemplary web interface Mock-up, in accordance with the principles of the present invention.
Figure 94B:
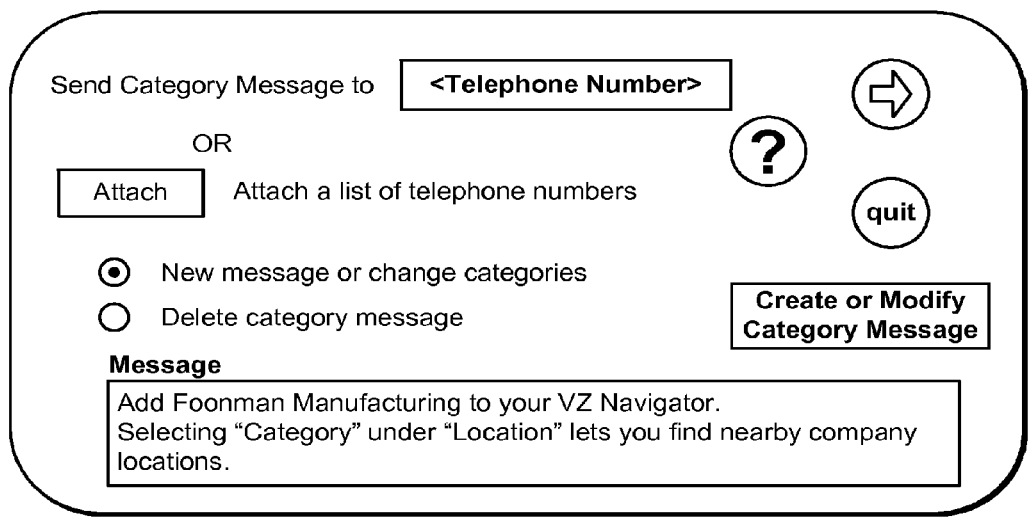
Figure 94C:
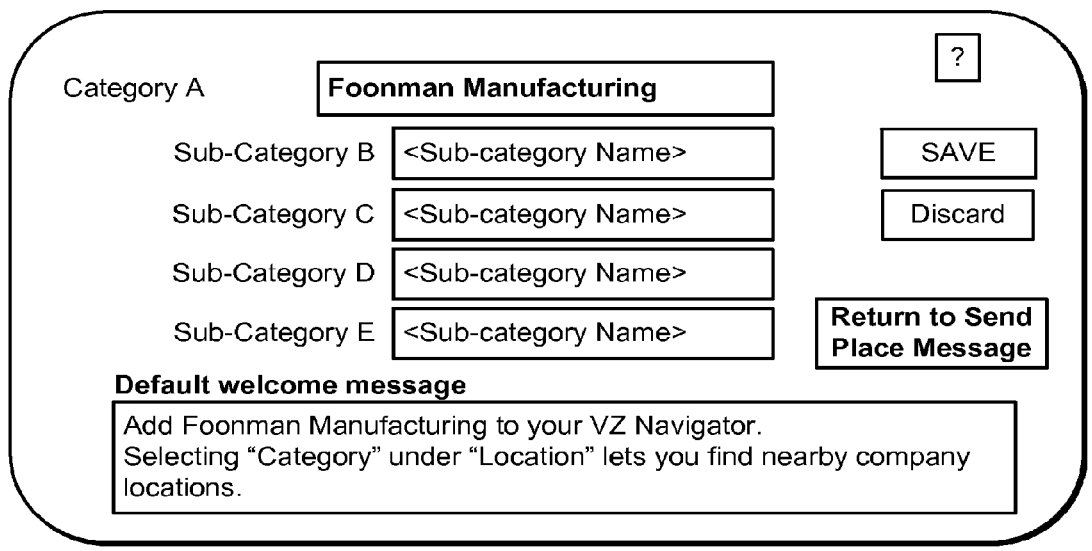

FIGS. 94A-94C show an exemplary web interface Mock-up, in accordance with the principles of the present invention.

In particular, FIG. 94A shows an exemplary Login; FIG. 94B shows an exemplary interface to send a message; and FIG. 94C shows an exemplary page defining support for company name and optional sub-categories.

Figure 95:
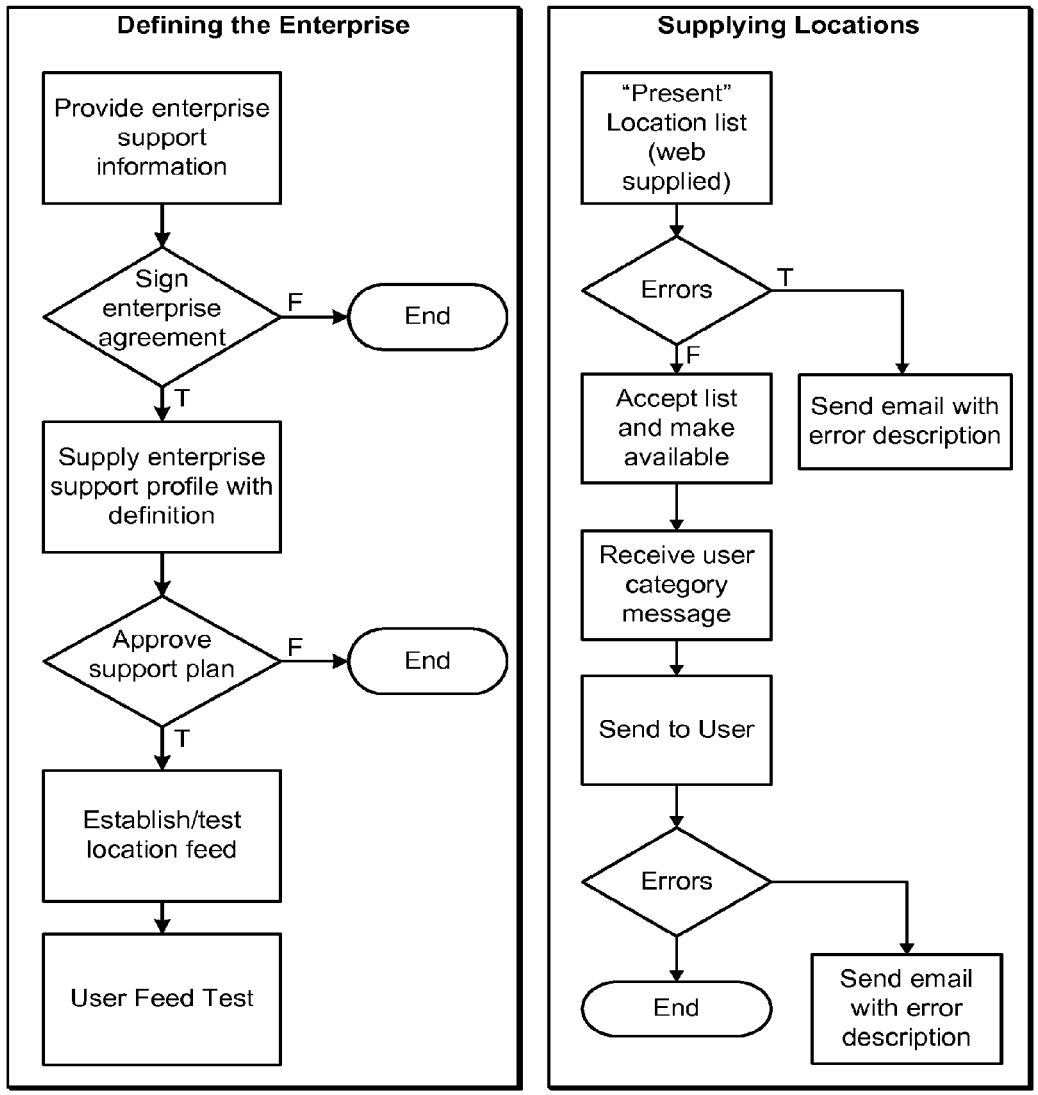
FIG. 95 shows exemplary support for Enterprise definition, in accordance with the principles of the present invention.

FIG. 95 shows exemplary support for Enterprise definition, in accordance with the principles of the present invention.

Figure 96:
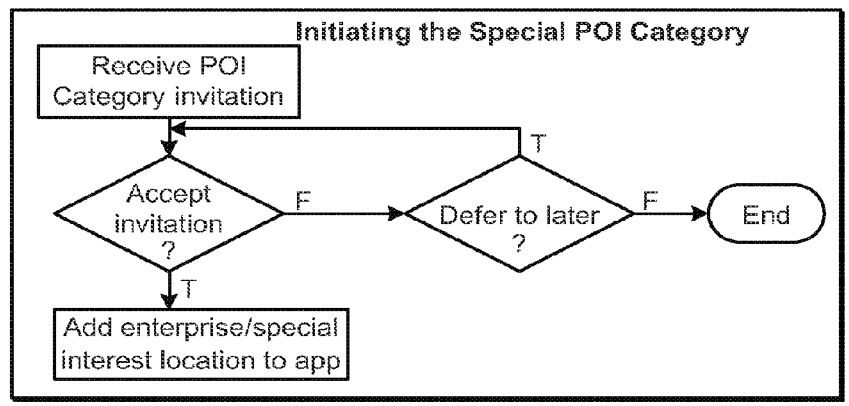
FIG. 96 shows presentation of Custom POIs to eligible/interested users, in accordance with the principles of the present invention.

FIG. 96 shows presentation of Custom POIs to eligible/interested users, in accordance with the principles of the present invention.

There are two classes of users (enterprise, special interest), but both are likely to require similar approaches to resolving custom POIs. These needs are likely to occur in user reception options, when using custom POIs, and/or when deleting/restoring custom POIs.

The following define user options for receiving a "POI category" place message. A POI category place message functions similarly to today's place messages with automatic invocation of the application. A receiving user has the option to: (1) Accept the request to automatically incorporate the defined POI options (category and sub-category). This may include either a new or modified category list. (2) Postpone a decision on whether to incorporate the new POI list. (3) Refuse to incorporate the POI category(ies). (4) The option to reply to the receiving message may be suspended. Thus, a new category listing may be added, a category listing may be updated, and/or a category listing may be removed.

Figure 97:
FIG. 97 depicts a device screen for a user to select enterprise or interest-specific POIs as a specific Category (SEARCH>CATEGORY), in accordance with the principles of the present invention.

FIG. 97 depicts a device screen for a user to select enterprise or interest-specific POIs as a specific Category (SEARCH>CATEGORY), in accordance with the principles of the present invention.

The location for a single enterprise category is preferably the second position in the category listing. If the user receives and accepts multiple custom POIs messages (different enterprises) they are preferably presented in the following order: The most recent custom POI category accepted by the user is presented at the second position (below "All Categories"). If the user accepts an additional customer POI category message, it displaces the earlier category which will then be presented in the third position. As categories are added, older selections are "pushed down".

If sub-categories are available, a right arrow (▸) at the right-most point of the column indicates the option. This functions as today's "eating & drinking" option, meaning that if the "main category" is selected, all locations in the category are presented. If a "sub-category" is selected, only locations meeting this criterion are selected. If no sub-categories are designated, the category offers no "right arrow" option.

Users have two options to delete category listings for custom POIs: "Delete a custom category" (which will delete all sub-categories); and delete ALL custom categories (if there are multiple ones). Users do not have the option to delete "sub-category" listings (e.g., "sales offices").

In operation, delete custom categories are an option on the SEARCH>CATEGORY screen. If NO custom categories are loaded on the device, the option may either be NOT provided at all (preferred), or "Grayed out". The option is preferably not "actionable" if no custom POIs are available. If user selects the option to delete, they are presented with a new screen listing of any custom categories on a list in the same order as they appear on the displayed screen (LIFO). The cursor highlights the top entry but is scrollable to any other custom POI category entry. The CSK for the screen is "Delete" for the Delete Custom Category screen. Sub-categories need not be displayed. If the "Delete" option is selected, a "confirm delete" message is presented. If the user fails to confirm the deletion, the category listing is preserved.

Search Options and Resolution of POI Conflicts.

Location information supplied by the enterprise partner is preferably not added to a general search database. Thus, a search from subscribers who do not have the Custom POI category should not be enabled to locate this information, though this preferably does not preclude others from finding the "equivalent" location from a standard database. (Business offices may be listed in a standard data feed). The custom POI category takes precedence over other factors. For instance, if a user selects a custom POI category, no results other than those in the custom POI category are returned.

"Combined" searches may be supported. For instance, a user may combine a "What" with a special POI category. Similarly, a user may change the origin for the search. All returned results are from within a set defined by the Custom Category.

Figure 98:
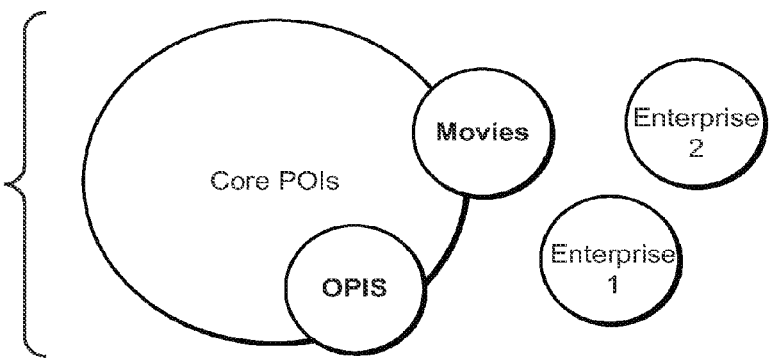
FIG. 98 shows that in this way the inventive navigation product avoids potential problems of multiple duplicate listings by providing a "binary" selection capability that does not merge existing/other POIs with enterprise or interest-specific POIs.

FIG. 98 shows that in this way the inventive navigation product avoids potential problems of multiple duplicate listings by providing a "binary" selection capability that does not merge existing/other POIs with enterprise or interest-specific POIs.

There are two broadly defined types of users: Enterprise users, and "special interest" users.

Enterprise users are those that are either employed by, or worth with/for a company that subscribes to an enterprise version of an wireless navigation device (e.g., AtlasBook Navigator v5) or related product. In either event, their identifying information is known to an "administrator" of the company who has the option to send a special "Custom POI" place message. If the place message is not successfully transmitted/received, the administrator would receive a report explaining the issue.

When the message is received, the user may or may not accept the message. If the user elects to do so, the message activates the navigation service and is provided the option to add the POI category option(s) indicated (or not). If the option is not immediately added, the message may still be stored, and activated later. Once the category message is "accepted", the user may immediately use the capability.

In operation, when the user selects "Local Search", and then "My Company" inside the "Category" box, all searches apply to "My Company" locations. If the "My Company" option incorporates additional options, these are presented for selection at any time. If no sub-option is selected, then all relevant company locations are delivered.

Special Interest User Scenario works best with "automated" processing of initial custom POI place messages, essentially eliminating the gatekeeper function (sending "activation" messages) provided by the administrator in the enterprise scenario. In this option, a user interested in "subscribing" to a list of locations that may be very specialized (example: Geo-cache enthusiasts), goes to a website. At the website, the user registers to have access to the "list" and receives either a directed SMS, or some other link for activating the service. Then, the reception/acceptance process is as otherwise shown and described above.

While the invention has been described with reference to the exemplary embodiments thereof, those skilled in the art will be able to make various modifications to the described embodiments of the invention without departing from the true spirit and scope of the invention.

What is claimed is:

1. A carousel user interface for a personal wireless device, comprising:
   a location wizard to periodically update a current location of a personal wireless device;
   a configuration file storing a plurality of pre-configured location-based information types for inclusion in a circular-depicted carousel;
   said circular-depicted carousel comprising a plurality of carousel pages of location-based information, said carousel being visually rotated about a center, and said carousel continuously rotating sequentially said plurality of carousel pages of location-based information, and repeating said rotation in a same order on subsequent full rotations of said carousel;

wherein said carousel further comprises at least one carousel page of changing location-based information that changes upon each full rotation of said carousel.

2. The carousel user interface for a personal wireless device according to claim 1, wherein:
said location wizard periodically updates said current location of said personal wireless device to refresh a latest current location when said carousel user interface is operating in a background of said personal wireless device.

3. The carousel user interface for a personal wireless device according to claim 1, wherein:
said location wizard periodically updates said current location of said personal wireless device to refresh a latest current location when said carousel user interface is operating in a foreground of said personal wireless device.

4. The carousel user interface for a personal wireless device according to claim 1, wherein:
said location wizard periodically updates said current location of said personal wireless device to refresh a latest current location when said carousel user interface is operating in either a foreground of said personal wireless device or a background of said personal wireless device.

5. The carousel user interface for a personal wireless device according to claim 1, wherein:
if a latest current location is greater than a predetermined distance from an immediately prior current location, updating each of said carousel pages of location-based information.

6. The carousel user interface for a personal wireless device according to claim 1, wherein:
said periodic update is approximately every 20 minutes.

7. The carousel user interface for a personal wireless device according to claim 1, wherein said plurality of location-based information types includes:
local weather.

8. The carousel user interface for a personal wireless device according to claim 1, wherein said plurality of location-based information types includes:
gas prices at each of a plurality of gas stations nearest a most recent current location of said personal wireless device.

9. The carousel user interface for a personal wireless device according to claim 1, wherein said plurality of location-based information types includes:
movies at least one closes theater to said latest current location of said personal wireless device.

10. The carousel user interface for a personal wireless device according to claim 1, wherein at least one of said plurality of carousel pages of location-based information comprises:
an upcoming event in a local region including said latest current location of said personal wireless device.

11. The carousel user interface for a personal wireless device according to claim 1, wherein at least one of said plurality of carousel pages of location-based information includes:
a navigation application running on said personal wireless device.

12. The carousel user interface for a personal wireless device according to claim 1, wherein:
content of at least one of said plurality of carousel pages of location-based information is replaced after each full 360 degree rotation of said carousel.

13. A method of displaying a plurality of location-based pages of information on a personal wireless device, comprising:
periodically updating a current location of a personal wireless device;
accessing a configuration file to determine a plurality of pre-configured location-based information types for inclusion in a circular-depicted carousel;
assembling a plurality of carousel pages of location-based information visually into a carousel that rotates about a center point, said plurality of carousel pages of location-based information displaying information readable from a direction outside a perimeter of said carousel; and
changing a content of one of said plurality of carousel pages of information after each rotation of said carousel beyond when said one of said plurality of carousel pages of information is displayed front and center;
wherein said carousel is rotated in a clockwise or counter-clockwise direction by hand gestures on a touch screen of said personal wireless device.

14. The method of displaying a plurality of location-based pages of information on a personal wireless device according to claim 13, wherein:
said current location of said personal wireless device is periodically updated with a latest current location when said carousel user interface is operating in a background of said personal wireless device.

15. The method of displaying a plurality of location-based pages of information on a personal wireless device according to claim 13, wherein:
said current location of said personal wireless device is periodically updated with a latest current location when said carousel user interface is operating in a foreground of said personal wireless device.

16. The method of displaying a plurality of location-based pages of information on a personal wireless device according to claim 13, wherein:
said current location of said personal wireless device is periodically updated with a latest current location when said carousel user interface is operating in either a foreground of said personal wireless device or a background of said personal wireless device.

17. The method of displaying a plurality of location-based pages of information on a personal wireless device according to claim 13, wherein:
updating each of said carousel pages of location-based information if a latest current location is greater than a predetermined distance from an immediately prior current location.

18. The method of displaying a plurality of location-based pages of information on a personal wireless device according to claim 13, wherein:
said periodic update is approximately every 20 minutes.

19. The method of displaying a plurality of location-based pages of information on a personal wireless device according to claim 13, wherein said plurality of location-based information types includes:
local weather.

20. The method of displaying a plurality of location-based pages of information on a personal wireless device according to claim 13, wherein said plurality of location-based information types includes:
gas prices at each of a plurality of gas stations nearest a most recent current location of said personal wireless device.

21. The method of displaying a plurality of location-based pages of information on a personal wireless device according to claim 13, wherein said plurality of location-based information types includes:
- movies at least one closes theater to said latest current location of said personal wireless device.

22. The method of displaying a plurality of location-based pages of information on a personal wireless device according to claim 13, wherein at least one of said plurality of carousel pages of location-based information comprises:
- an upcoming event in a local region including said latest current location of said personal wireless device.

23. The method of displaying a plurality of location-based pages of information on a personal wireless device according to claim 13, wherein at least one of said plurality of carousel pages of location-based information includes:
- a navigation application running on said personal wireless device.

24. The method of displaying a plurality of location-based pages of information on a personal wireless device according to claim 13, wherein:
- content of at least one of said plurality of carousel pages of location-based information is replaced after each full 360 degree rotation of said carousel.

* * * * *